(12) United States Patent
Novek

(10) Patent No.: US 10,948,224 B2
(45) Date of Patent: *Mar. 16, 2021

(54) REFRIGERATION CYCLES WITH LIQUID-LIQUID PHASE TRANSITIONS

(71) Applicant: Ethan J. Novek, Greenwich, CT (US)

(72) Inventor: Ethan J. Novek, Greenwich, CT (US)

(73) Assignee: Innovator Energy, LLC, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/826,469

(22) Filed: Mar. 23, 2020

(65) Prior Publication Data

US 2020/0363108 A1 Nov. 19, 2020

Related U.S. Application Data

(60) Provisional application No. 62/822,501, filed on Mar. 22, 2019, provisional application No. 62/872,851, filed on Jul. 11, 2019, provisional application No. 62/976,398, filed on Feb. 14, 2020, provisional application No. 62/984,394, filed on Mar. 3, 2020, provisional application No. 62/988,999, filed on Mar. 13, 2020.

(51) Int. Cl.
| | |
|---|---|
| *C09K 5/10* | (2006.01) |
| *F25D 5/00* | (2006.01) |
| *F25B 43/00* | (2006.01) |
| *F25B 45/00* | (2006.01) |
| *F25B 15/00* | (2006.01) |

(52) U.S. Cl.
CPC .............. *F25B 43/00* (2013.01); *C09K 5/10* (2013.01); *F25B 15/002* (2013.01); *F25B 45/00* (2013.01); *F25D 5/00* (2013.01); *F25B 2315/00* (2013.01)

(58) Field of Classification Search
CPC ...... C09K 5/10; F25B 15/002; F25B 2315/00; F25B 43/00; F25B 45/00; F25D 5/00
USPC ......................................................... 62/4, 112
See application file for complete search history.

(56) References Cited

U.S. PATENT DOCUMENTS

| | | |
|---|---|---|
| 4,283,918 A | 8/1981 | Mehta |
| 4,420,946 A | 12/1983 | Rojey et al. |
| 9,207,003 B2 | 12/2015 | Said et al. |
| 10,400,148 B2 * | 9/2019 | Novek .................... F25B 37/00 |

(Continued)

OTHER PUBLICATIONS

Int'l Search Report & Written Opinion, dated Jul. 31, 2020.

*Primary Examiner* — Edward F Landrum
*Assistant Examiner* — Chang H Park
(74) *Attorney, Agent, or Firm* — Gregory L. Porter; Hunton Andrews Kurth LLP

(57) ABSTRACT

The present invention pertains to cooling, heating, and refrigeration cycles using, for example, phase transitions to pump heat. Embodiments of the present invention may comprise systems, methods, or processes for liquid-liquid phase transition refrigeration cycles pumping heat across temperature differences greater than the adiabatic temperature change of a liquid-liquid phase transition within said liquid-liquid phase transition refrigeration cycle. Embodiments of the present invention also may comprise powering said liquid-liquid phase transition refrigeration cycle using electricity, heat, 'cold', the mixing of a saltwater and freshwater, the mixing of high osmotic pressure liquid and low osmotic pressure liquid, or a combination thereof.

8 Claims, 41 Drawing Sheets

(56) References Cited

U.S. PATENT DOCUMENTS

2010/0132384 A1 6/2010 Shiflett et al.
2018/0259229 A1* 9/2018 Moghaddam .......... F25B 15/06

* cited by examiner

US 10,948,224 B2

REFRIGERATION CYCLES WITH LIQUID-LIQUID PHASE TRANSITIONS

CROSS-REFERENCE TO RELATED APPLICATIONS

The instant application claims priority to U.S. provisional application numbers: 62/822,501 filed Mar. 22, 2019; 62/872,851 filed Jul. 11, 2019; 62/976,398 filed Feb. 14, 2020; 62/984,394 filed Mar. 3, 2020 and 62/988,999 filed Mar. 13, 2020. Each of the aforementioned provisional applications are incorporated herein by reference.

BACKGROUND AND SUMMARY

The present invention pertains to cooling, heating, and refrigeration cycles. The present invention pertains to refrigeration cycles employing liquid-liquid phase transitions to pump heat or transfer heat or a combination thereof. Embodiments of the present invention may comprise systems, methods, or processes for liquid-liquid phase transition refrigeration cycles pumping heat across temperature differences greater than the adiabatic temperature change of a liquid-liquid phase transition within said liquid-liquid phase transition refrigeration cycle. Embodiments of the present invention may comprise powering said liquid-liquid phase transition refrigeration cycle using electricity, heat, 'cold', the mixing of a saltwater and freshwater, the mixing of high osmotic pressure liquid and low osmotic pressure liquid, or a combination thereof. Embodiments of the present invention may comprise the integration or application or incorporation of said liquid-liquid phase transition refrigeration cycle in a gas separation process to facilitate gas separation, or increase energetic efficiency of gas separation, or reduce OPEX or reduce CAPEX, or a combination thereof. Embodiments of the present invention may involve adjustment of phase transition temperature or initiating liquid-liquid phase transitions in liquid-liquid phase transition refrigeration cycles and heat transfer.

BRIEF DESCRIPTION OF THE FIGURES

FIG. 1 may comprise a liquid phase refrigeration cycle with temperature zones with liquid-liquid phase transitions occurring in Heat Exchanger #1 and Heat Exchanger #3.

FIG. 1 may comprise a liquid phase refrigeration cycle with temperature zones with liquid-liquid phase transitions occurring before Heat Exchanger #1 and Heat Exchanger #3.

FIG. 3A may comprise a liquid phase refrigeration cycle with temperature zones with liquid-liquid phase transitions occurring before Heat Exchanger #1 and Heat Exchanger #3.

FIG. 3B may comprise a liquid phase refrigeration cycle with temperature zones with example temperature labels representative of example temperatures of each liquid stream during an example instance of operation.

FIG. 4 may comprise a liquid phase refrigeration cycle with temperature zones wherein concentration adjustment using a membrane occurs after Heat Exchanger #2.

FIG. 5 may comprise a liquid phase refrigeration cycle with temperature zones wherein concentration adjustment using a membrane occurs after Heat Exchanger #2.

FIG. 6 may comprise a liquid phase refrigeration cycle with temperature zones wherein concentration adjustment using a membrane occurs after Heat Exchanger #2 and may involve rejecting or releasing at least a portion of heat using evaporative cooling or wet surface contactor or a combination thereof.

FIG. 7 may comprise a liquid phase refrigeration cycle with temperature zones wherein concentration adjustment using a membrane occurs after Heat Exchanger #2 and may involve rejecting or releasing at least a portion of heat using evaporative cooling or wet surface contactor or a combination thereof.

FIG. 8 may comprise a liquid phase refrigeration cycle with temperature zones wherein concentration adjustment using a membrane occurs after Heat Exchanger #2.

FIG. 9 may comprise a liquid phase refrigeration cycle wherein solvent may be added and removed to drive liquid-liquid phase transitions to 'pump' heat, and wherein solvent removal may be conducted using forward osmosis and/or powered by heat or 'cold'.

FIG. 10 may be the same as FIG. 9, except further comprises a step for separating residual organic Composition #2 or other residual reagents in the regeneration portion from the regenerated solvent before adding said regenerated solvent to the refrigeration cycle portion.

FIG. 11 may comprise a liquid phase refrigeration cycle with temperature zones, and/or forward osmosis, and/or forward osmosis regenerated/powered by heat or 'cold'.

FIG. 12 may be the same as FIG. 11, except further comprises a step for separating residual organic Composition #2 or other residual reagents in the regeneration portion from the regenerated solvent before adding said regenerated solvent to the refrigeration cycle portion.

FIG. 13 may be the same as FIG. 9 or FIG. 10, except may further comprise adding the added solvent by employing organic Composition #1 as a draw solution in a forward osmosis or osmotically assisted reverse osmosis step.

FIG. 14 may comprise a liquid phase refrigeration cycle adjusting a concentration using forward osmosis and/or powered by the osmotic pressure difference of a low or lesser osmotic pressure solution and a high or greater osmotic pressure solution.

FIG. 15 may be the same as FIG. 14, except the added solvent added to the refrigeration cycle may comprise reagents other than water or reagents in addition to water.

FIG. 16 may be the same as FIG. 14 or FIG. 15, except may further comprise adding the added solvent by employing organic Composition #1 as a draw solution in a forward osmosis or osmotically assisted reverse osmosis step.

FIG. 17 may comprise a liquid phase refrigeration cycle with temperature zones powered by the mixing or indirect mixing of a low or lesser osmotic pressure solution and a high or greater osmotic pressure solution and/or employing forward osmosis for adjusting a concentration of a reagent.

FIG. 18 may be the same as FIG. 12, except employ a UCST based liquid-liquid phase transition regeneration in the Regeneration Portion.

FIG. 19 may be the same as FIG. 12, except employ a UCST based liquid-liquid phase transition in the Refrigeration Cycle Portion.

FIG. 20 may be the same as FIG. 12, except employ a UCST based liquid-liquid phase transition in the Refrigeration Cycle Portion and Regeneration Portion.

FIG. 21 be the same as FIG. 16, except shows Liquid A undergoing a treatment step (RO) before Liquid A is added to the process.

FIG. 22 be the same as FIG. 17, except shows Liquid A undergoing a treatment step (RO) before Liquid A is added to the process.

FIG. 23 shows a liquid phase only refrigeration cycle functioning as a secondary refrigeration cycle and/or heat transfer liquid connected to a conventional vapor compression refrigeration cycle chiller

FIG. 33 may show an example simplified liquid-liquid refrigeration cycle based chiller.

DETAILED DESCRIPTION OF THE INVENTION

Example Definitions

Figure 1:
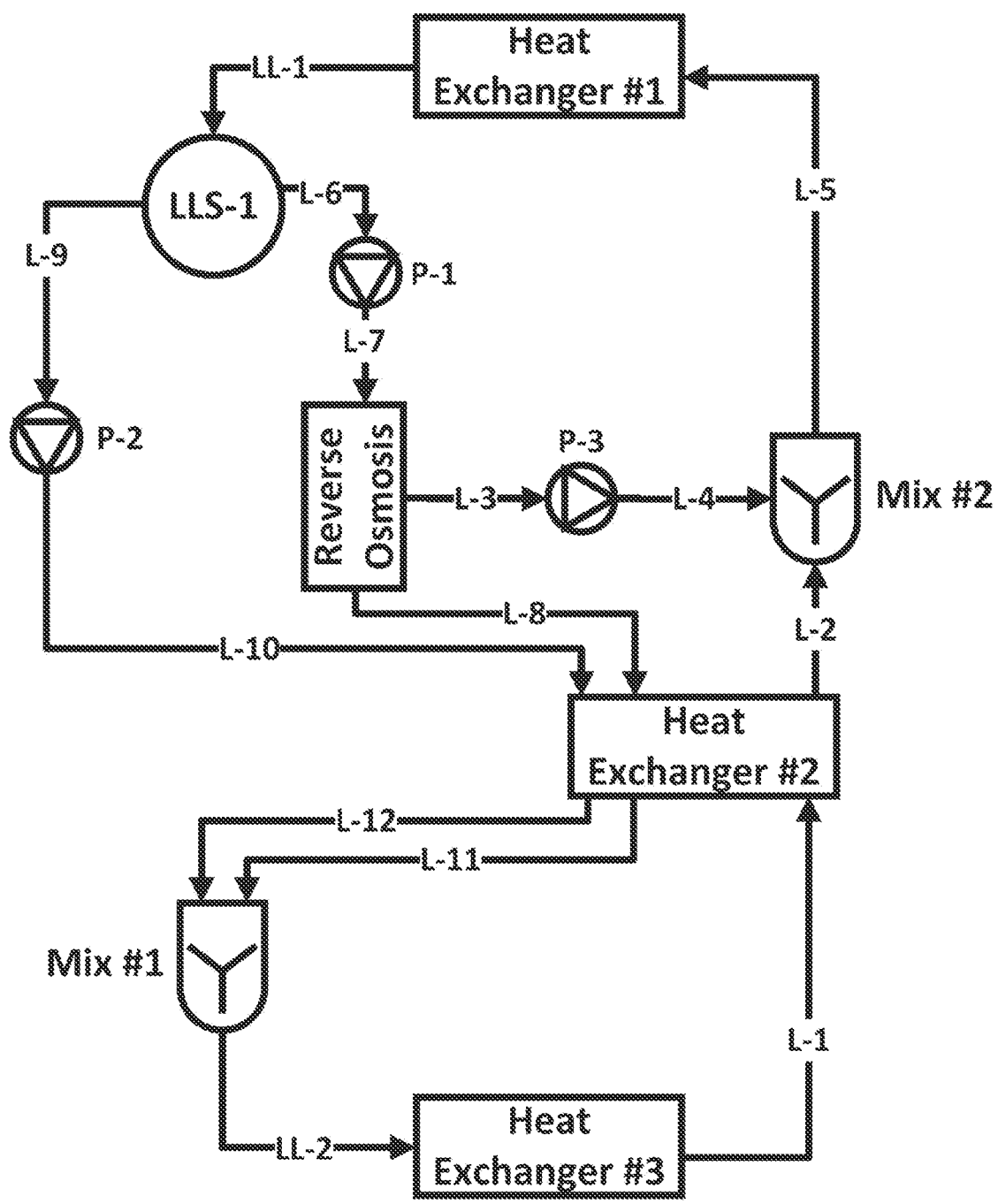
FIG. 1.

Single Liquid Phase Solution, or Combined Single Liquid Phase Solution, or Single Liquid Phase Combined Solution:
- A solution which may have originated from two separate liquid phases or liquid streams
  - Wherein said Single Liquid Phase Solution, or Combined Single Liquid Phase Solution, or Single Liquid Phase Combined Solution comprises the solution resulting from the dissolution of said two liquid streams in each other
  - Wherein one of said two liquid streams may comprise mostly water
  - Wherein one of said two liquid streams may comprise mostly organic
  - Wherein said Single Liquid Phase Solution, or Combined Single Liquid Phase Solution, or Single Liquid Phase Combined Solution comprises the solution resulting from said liquid stream comprising mostly water dissolving in said liquid stream comprising mostly organic
  - Wherein said Single Liquid Phase Solution, or Combined Single Liquid Phase Solution, or Single Liquid Phase Combined Solution comprises the solution resulting from said liquid stream comprising mostly organic dissolving in said liquid stream comprising mostly water
- A solution which resulted from an exothermic liquid-liquid phase transition, wherein said exothermic phase transition comprises the dissolution of a first liquid phase into a second liquid phase
  - Wherein said dissolution comprises at least 99% of said first liquid phase dissolving into said second liquid phase
  - Wherein said dissolution comprises at least 95% of said first liquid phase dissolving into said second liquid phase Wherein said dissolution comprises at least 90% of said first liquid phase dissolving into said second liquid phase
Wherein said dissolution comprises at least 80% of said first liquid phase dissolving into said second liquid phase
Wherein said dissolution comprises at least 70% of said first liquid phase dissolving into said second liquid phase
Wherein said dissolution comprises at least 60% of said first liquid phase dissolving into said second liquid phase
Wherein said dissolution comprises at least 50% of said first liquid phase dissolving into said second liquid phase
Wherein said dissolution comprises at least 40% of said first liquid phase dissolving into said second liquid phase
Wherein said dissolution comprises at least 30% of said first liquid phase dissolving into said second liquid phase
Wherein said dissolution comprises at least 20% of said first liquid phase dissolving into said second liquid phase
Wherein said dissolution comprises at least 10% of said first liquid phase dissolving into said second liquid phase A solution which resulted from an endothermic liquid-liquid phase transition, wherein said endothermic phase transition comprises the dissolution of a first liquid phase into a second liquid phase
Wherein said dissolution comprises at least 99% of said first liquid phase dissolving into said second liquid phase
Wherein said dissolution comprises at least 95% of said first liquid phase dissolving into said second liquid phase
Wherein said dissolution comprises at least 90% of said first liquid phase dissolving into said second liquid phase
Wherein said dissolution comprises at least 80% of said first liquid phase dissolving into said second liquid phase
Wherein said dissolution comprises at least 70% of said first liquid phase dissolving into said second liquid phase
Wherein said dissolution comprises at least 60% of said first liquid phase dissolving into said second liquid phase
Wherein said dissolution comprises at least 50% of said first liquid phase dissolving into said second liquid phase
Wherein said dissolution comprises at least 40% of said first liquid phase dissolving into said second liquid phase
Wherein said dissolution comprises at least 30% of said first liquid phase dissolving into said second liquid phase
Wherein said dissolution comprises at least 20% of said first liquid phase dissolving into said second liquid phase
Wherein said dissolution comprises at least 10% of said first liquid phase dissolving into said second liquid phase Adiabatic Temperature Change or Adiabatic Temperature Difference:
Comprises the change in temperature of a liquid-liquid phase transitioning composition if a liquid-liquid phase transition occurs in an adiabatic environment or a container where no heat enters or exits. The adiabatic temperature change may be the change in temperature of a liquid-liquid phase transitioning solution due to an enthalpy of phase transition in an insulated container or environment.
In practical terms, the adiabatic temperature change may be calculated by dividing the enthalpy of phase transition of a liquid-liquid phase transition ($\Delta H\_((L-L))$) by the baseline specific heat capacity ($C\_p$).
Adiabatic Temperature Change=$\Delta H_{(L-L)} \div C_p$
For example, if the total enthalpy of phase transition is 27 kJ/kg and the baseline specific heat capacity of a total liquid is 3.6 J/g° C., then the adiabatic temperature change is 7.5° C. or 7.5° K
If the liquid-liquid phase transition is undergoing an exothermic liquid-liquid phase transition, the adiabatic temperature change is known as an adiabatic temperature rise
If the liquid-liquid phase transition is undergoing an endothermic liquid-liquid phase transition, the adiabatic temperature change is known as an adiabatic temperature drop Baseline Specific Heat Capacity:
Specific heat capacity of a liquid under conditions where no liquid-liquid phase transition is occurring, and/or no other phase transitions or reactions are occurring Operatively Connected or Operably Connected or Linked
May involve two or more process operations where mass is transferred or exchanged between the two or more process operations.
For example, in the instance of temperature zones, liquids are transferred between temperature zones.
For example, at least a portion of mass of liquids may be transferred from one temperature zone to another temperature zones. Liquid mass entering a temperature zone may be heat exchanged with liquid mass exiting said temperature zone.
For example, liquids may be transferred from one temperature zone to another temperature zone.
The concentration of a reagent in said liquids may be adjusted in one or more of said temperature zones. The concentration of a reagent in one temperature zone or a portion of one temperature zone may be different than the concentration of said reagent in another operatively connected temperature zone. Although the concentration of a reagent may be adjusted in a temperature zone, at least a portion of liquid mass in both temperature zones is exchanged or transferred between temperature zones (for example: liquid mass in a first temperature zone is transferred to a second temperature zone and liquid mass in a second temperature zone is transferred to a first temperature zone).

Organic
Organic may comprise a reagent which comprises more than 40% or more than 50% reagents or a reagent which is a non-water reagent. A non-water reagent comprises a reagent which is not water.
In the context of a liquid phase or 'an organic liquid phase' or 'mostly organic phase', organic may comprise a liquid phase with a greater concentration of a non-water reagent than another liquid phase used for comparison. Said 'another liquid phase used for comparison' may comprise a liquid phase which contains reagents which were previously dissolved in or dissolved with or in the same solution as said organic liquid phase before a liquid-liquid phase transition. Said 'another liquid phase used for comparison' may comprise a greater concentration of water than said organic phase. Said 'another liquid phase used for comparison' may comprise a greater concentration of salt or phase transition adjustment reagent than said organic phase. Organic phase may be insoluble or possess limited solubility in said 'another liquid phase used for comparison'. Organic phase may be soluble or possess greater solubility in said 'another liquid phase used for comparison' if said 'another liquid phase used for comparison' possessed a lesser concentration of salt or phase transition temperature adjustment reagent. Alternatively or additionally, organic phase may be soluble or possess greater solubility in said 'another liquid phase used for comparison' if said organic phase possessed a lesser concentration of salt or phase transition temperature adjustment reagent.

A reagent which may possess liquid-liquid phase transition properties or exhibit a liquid-liquid phase transition temperature range or both in a solution comprising water.

May also be described as Organic phase, or Non-Aqueous, or Non-Aqueous Phase, or Non-Water Reagent, phase transition reagents rich phase or organic-rich phase Diluted Salt Solution or Phase Transition Temperature Adjustment Reagent Solution:

May comprise a solution which originated from the dissolution of a salt or phase transition temperature adjustment reagent or the dissolution of a concentrated solution of salt or phase transition temperature adjustment reagent in a solution without or with a lesser concentration of a salt or phase transition temperature adjustment reagent.

May comprise a solution which possesses a sufficient concentration of a salt or phase transition temperature adjustment reagent for an organic liquid phase to be insoluble or possess limited solubility in said solution and/or to enable the formation of a separate organic liquid phase.

A solution comprising 'another liquid phase used for comparison' (as described in the definition of 'Organic').

Heat Exchanger Delta T:

In a counterflow heat exchanger, the temperature difference between a 'cold' input stream and a 'cooled' output stream In a counterflow heat exchanger, the temperature difference between a 'warm' input stream and a 'warmed' or 'heated' output stream In a parallel heat exchanger, the temperature difference between a heated output stream and cooled output stream Reagent:

May comprise a single chemical or a composition comprising multiple chemicals or a combination thereof Draw Solution Reagent:

A reagent which functions as a draw solution in a forward osmosis or osmotically assisted reverse osmosis or a combination thereof process A reagent which may be different from the liquid-liquid phase transitioning reagents within a liquid phase refrigeration cycle and may be employed as a draw solution to regenerate or concentrate a reagent within the refrigeration cycle using forward osmosis Liquid-Liquid Phase Transition Temperature Range:

The temperature range which a composition transitions from a single liquid phase to multiple liquid phases or from multiple liquid phases to a single liquid phase A temperature range wherein a composition exhibits heat absorbing or heat releasing characteristics (endothermic or exothermic phase transitions) beyond the baseline specific heat capacity of the composition An intrinsic property of a liquid composition A temperature range wherein two liquid phases exists A temperature range wherein a single liquid phase exists A temperature range wherein the number of or relative volume of or relative composition of or a combination thereof of liquid phases changes when heat is added or removed from a composition. Wherein said composition comprises said liquid phases Liquid-Liquid Phase Transition:

When the number of or relative volume of or relative composition of or a combination thereof of liquid phases changes in a liquid composition or liquid mixture. Wherein said composition or mixture comprises a liquid phases or multiple liquid phases.

When a liquid composition exhibits heat absorbing or heat releasing characteristics (endothermic or exothermic phase transitions) beyond the baseline specific heat capacity of the composition while remaining a liquid phase. It may exclude heat absorbing or releasing phenomena due to solid-liquid, gas-liquid, gas-gas, liquid-gas, and/or liquid-solid phase transition.

When a liquid composition transitions from a single liquid phase to multiple liquid phases or from multiple liquid phases to a single liquid phase.

Temperature Zone Refrigeration Cycle with Pressurized Membrane Regeneration Summary of Embodiments:

The present invention comprises a refrigeration cycle employing liquid-liquid phase transitions. The present invention may involve reversible endothermic and exothermic phase transitions which are facilitated or engineered to occur at different temperatures. Advantageously, some embodiments described herein may enable the refrigeration cycle to generate a temperature difference greater than the adiabatic temperature rise (or fall) of an enthalpy of phase transition of the liquid-liquid phase transitioning liquid.

Some embodiments of the present invention may involve employing heat exchanging to create two separate temperature zones. Said temperature zones may involve a 'warm temperature zone' and a 'cold temperature zone'. Said 'warm temperature zone' (or second temperature zone) may involve releasing heat and said 'cold temperature zone' (or first temperature zone) may involve absorbing heating. Said heat exchanging may involve heat exchanging 'cold' solutions from the cold temperature zone entering the warm temperature zone with 'warm' solutions from the warm temperature zone entering the cold temperature zone. Said heat exchanging may enable a liquid phase refrigeration cycle which possesses a temperature difference greater than the adiabatic temperature change of an enthalpy of liquid-liquid phase transition. It may be desirable for phase transition temperature adjustment or solubility adjustment or concentration adjustment or composition adjustment or a combination thereof to enable an endothermic phase transition to occur in the cold temperature zone and an exothermic phase transition to occur in the warm temperature zone. It may be desirable for said phase transition temperature adjustments, system solutions, or a combination thereof to be reversible or reversed within the process. The temperature difference which can be generated in some embodiments may be dependent on the greatest temperature of an adjusted exothermic liquid-liquid phase transition and the greatest temperature of an adjusted endothermic liquid-liquid phase transition within a system.

Figure Summaries:

FIG. 1: FIG. 1 may comprise a liquid phase refrigeration cycle. FIG. 1 may possess a LCST or an UCST liquid-liquid phase transition or reagents which possess liquid-liquid phase transitions when the concentration of one or more reagents are adjusted or a combination thereof. FIG. 1 may involve heat exchanging such that it possesses a 'warm temperature zone' and a 'cold temperature zone'. FIG. 1 may possess liquid-liquid phase transitions which occur during heat exchanging with one or more applications requiring cooling or heating and/or after phase transition temperature adjustment.

Figure 2:
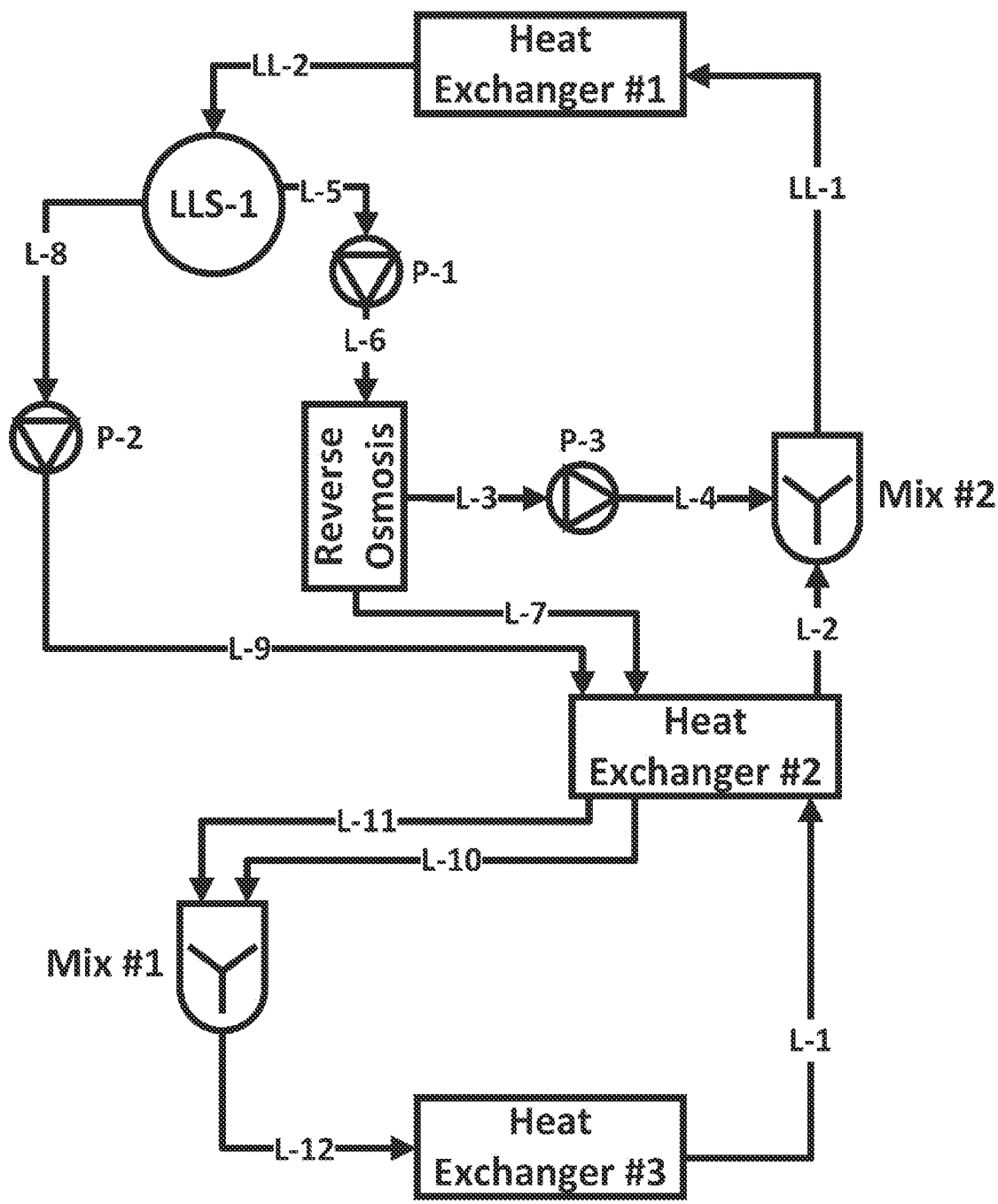
FIG. 2.

FIG. 2: FIG. 2 may comprise a liquid phase refrigeration cycle. FIG. 2 may possess a LCST or an UCST liquid-liquid phase transition or reagents which possess liquid-liquid phase transitions when the concentration of one or more reagents are adjusted or a combination thereof. FIG. 2 may involve heat exchanging such that it possesses a 'warm temperature zone' and a 'cold temperature zone'. FIG. 2 may possess liquid-liquid phase transitions which occur before or during heat exchanging with one or more applications requiring cooling or heating and/or before or during phase transition temperature adjustment.

Figure 3A:
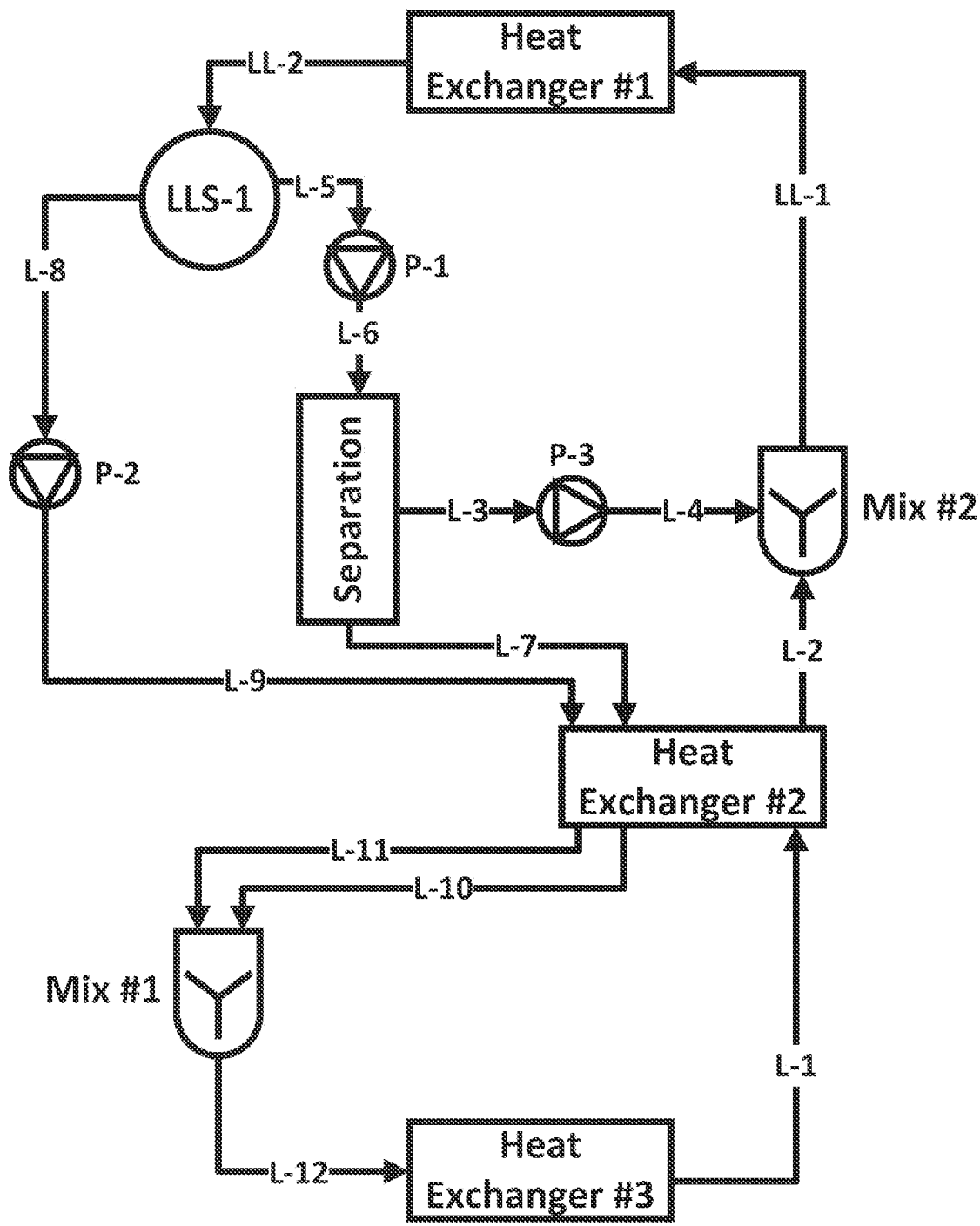
FIG. 3A.
Figure 3B:
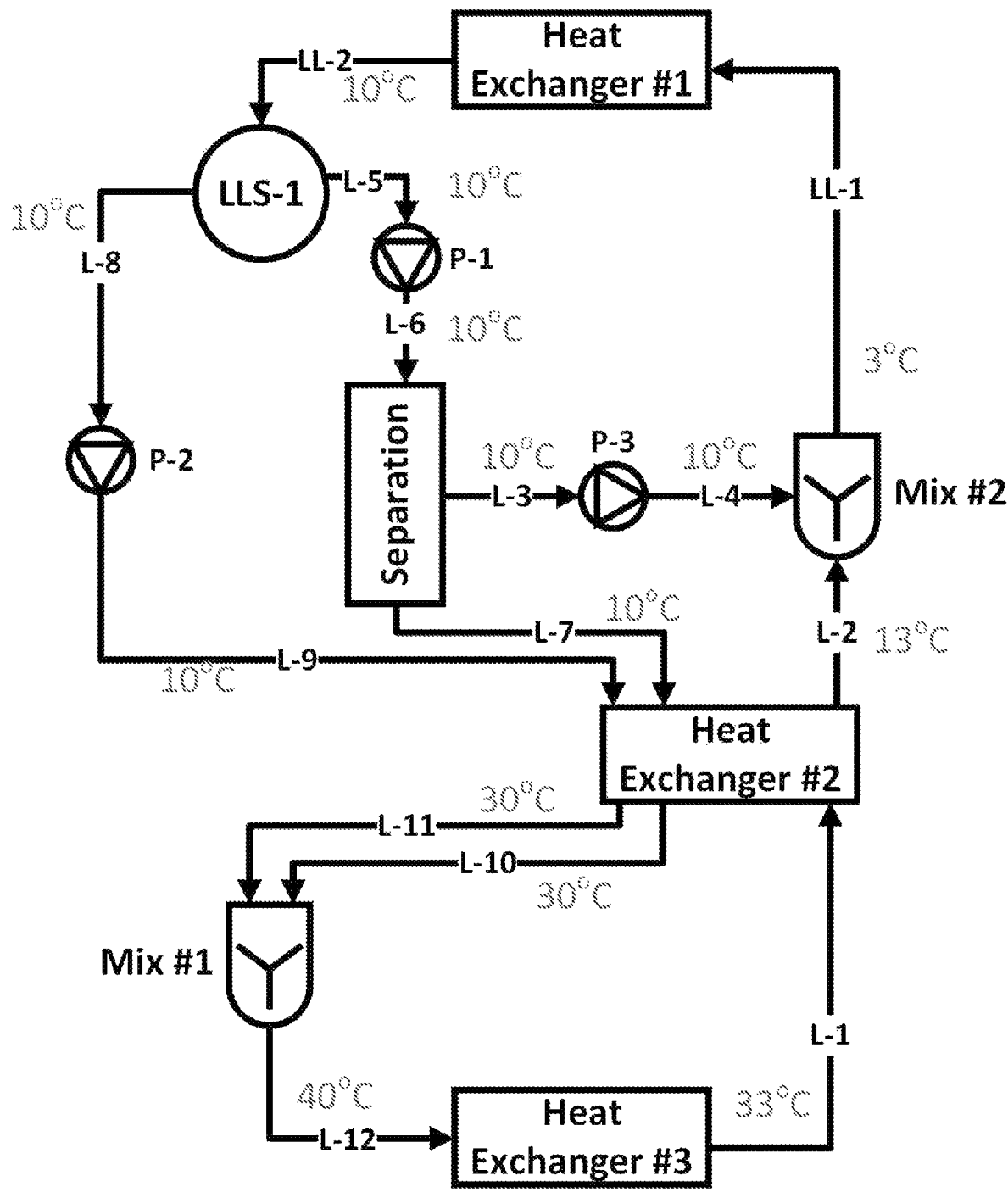
FIG. 3B.

FIG. 3: FIG. 3 may comprise a liquid phase refrigeration cycle. FIG. 3 may possess a LCST or an UCST liquid-liquid phase transition or reagents which possess liquid-liquid phase transitions when the concentration of one or more reagents are adjusted or a combination thereof. FIG. 3 may involve heat exchanging such that it possesses a 'warm temperature zone' and a 'cold temperature zone'. FIG. 3 may possess liquid-liquid phase transitions which occur before or during heat exchanging with one or more applications requiring cooling or heating and/or before or during phase transition temperature adjustment. FIG. 3 may show example temperatures for each stream in an example embodiment of the present invention.

Figure 4:
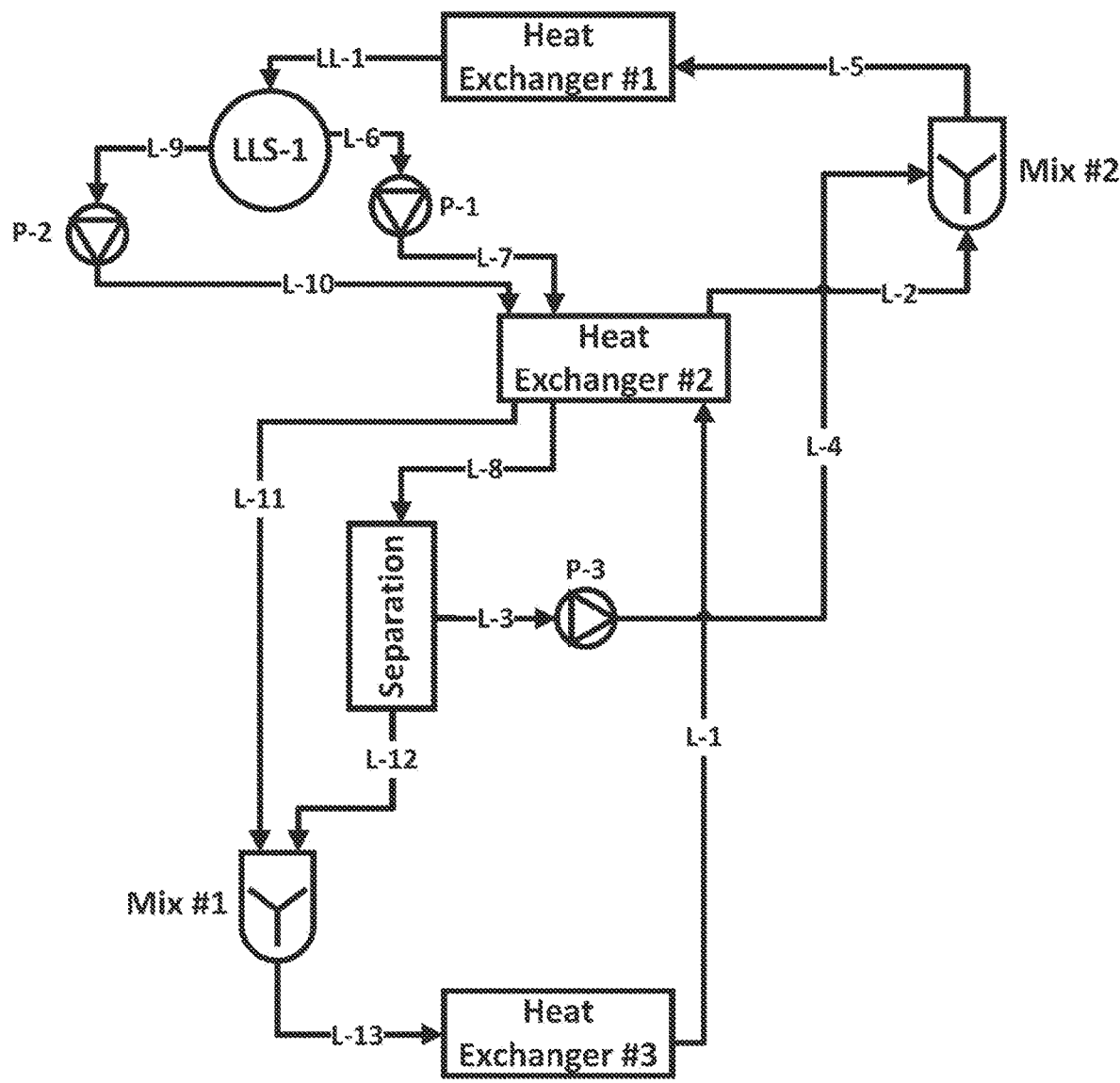
FIG. 4.

FIG. 4: FIG. 4 may comprise a liquid phase refrigeration cycle. FIG. 4 may possess a LCST or an UCST liquid-liquid phase transition or reagents which possess liquid-liquid phase transitions when the concentration of one or more reagents are adjusted or a combination thereof. FIG. 1 may involve heat exchanging such that it possesses a 'warm temperature zone' and a 'cold temperature zone'. FIG. 4 may possess liquid-liquid phase transitions which occur during heat exchanging with one or more applications requiring cooling or heating and/or after phase transition temperature adjustment. FIG. 4 may possess phase transition temperature adjustment and/or concentration adjustment in a different temperature zone than FIG. 3.

Figure 5:
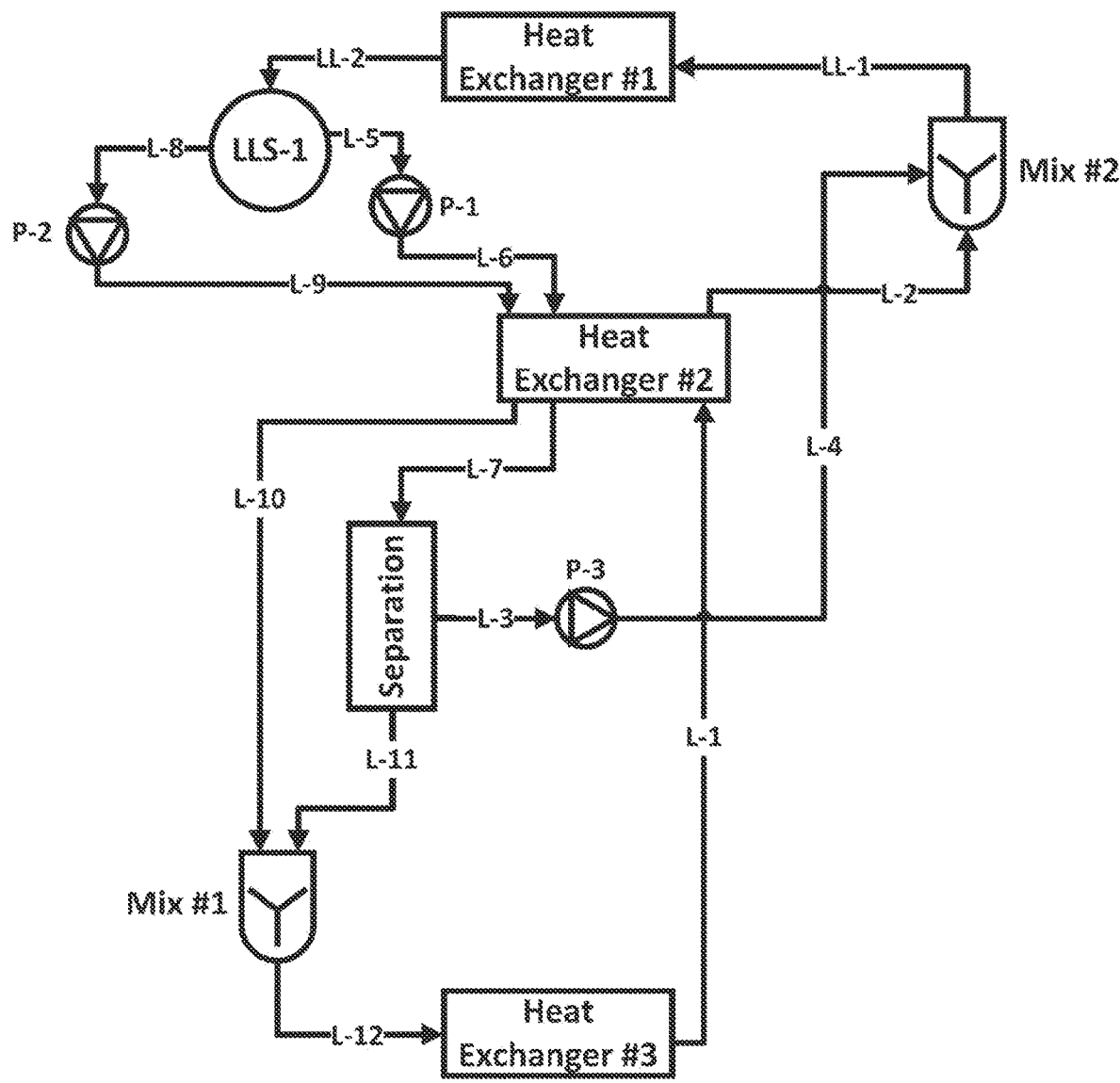
FIG. 5.

FIG. 5: FIG. 5 may comprise a liquid phase refrigeration cycle. FIG. 5 may possess a LCST or an UCST liquid-liquid phase transition or reagents which possess liquid-liquid phase transitions when the concentration of one or more reagents are adjusted or a combination thereof. FIG. 5 may involve heat exchanging such that it possesses a 'warm temperature zone' and a 'cold temperature zone'. FIG. 5 may possess liquid-liquid phase transitions which occur before or during heat exchanging with one or more applications requiring cooling or heating and/or before or during phase transition temperature adjustment. FIG. 5 may possess phase transition temperature adjustment and/or concentration adjustment in a different temperature zone than FIG. 3.

Figure 6:
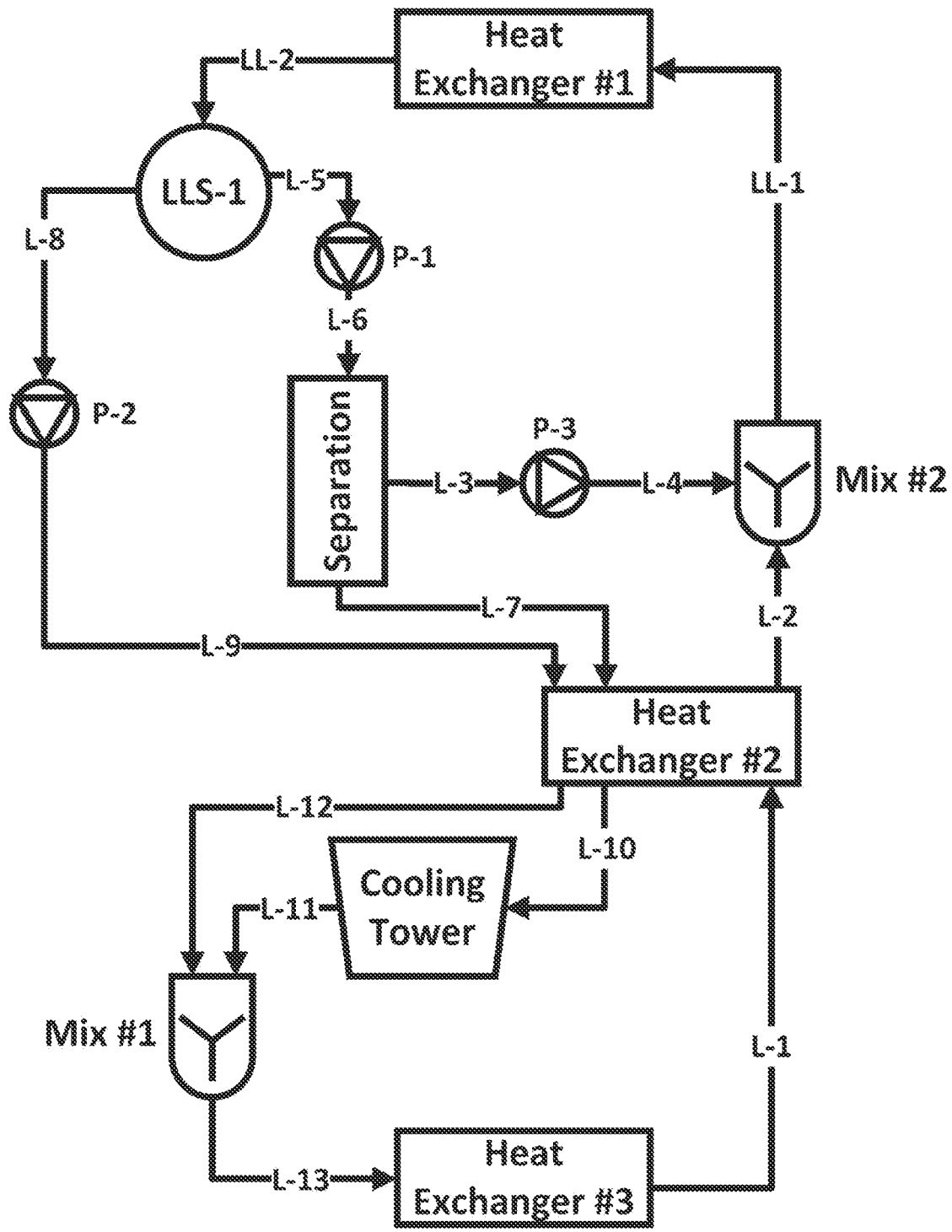
FIG. 6.

FIG. 6: FIG. 6 may comprise a liquid phase refrigeration cycle. FIG. 6 may possess a LCST or an UCST liquid-liquid phase transition or reagents which possess liquid-liquid phase transitions when the concentration of one or more reagents are adjusted or a combination thereof. FIG. 6 may involve heat exchanging such that it possesses a 'warm temperature zone' and a 'cold temperature zone'. FIG. 6 may possess liquid-liquid phase transitions which occur before or during heat exchanging with one or more applications requiring cooling or heating and/or before or during phase transition temperature adjustment. FIG. 6 may involve rejecting or releasing at least a portion of heat using evaporative cooling or wet surface contactor or a combination thereof. For example, FIG. 6 may involve direct evaporative cooling of a mostly freshwater stream within the process to, for example, facilitate cooling and minimize heat exchanger Delta-T. A cooling tower or evaporative cooling contactor may be configured to minimize biofouling or loss of reagents, which may include, but is not limited to, for example, using a gas-liquid or air-liquid membrane contactor. Evaporated water may be replenished with makeup water or makeup liquid water.

Figure 7:
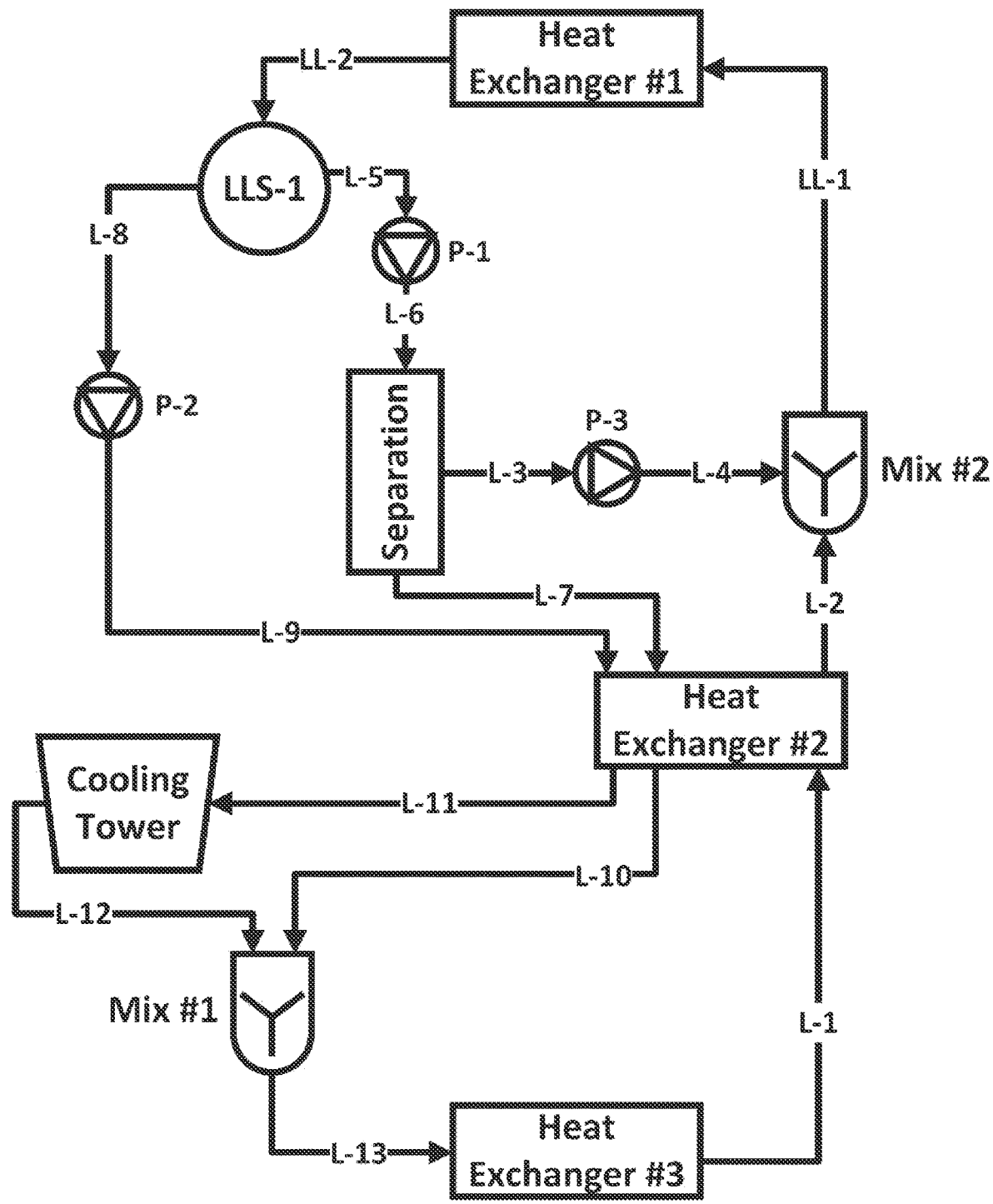
FIG. 7.

FIG. 7: FIG. 7 may comprise a liquid phase refrigeration cycle. FIG. 7 may possess a LCST or an UCST liquid-liquid phase transition or reagents which possess liquid-liquid phase transitions when the concentration of one or more reagents are adjusted or a combination thereof. FIG. 7 may involve heat exchanging such that it possesses a 'warm temperature zone' and a 'cold temperature zone'. FIG. 7 may possess liquid-liquid phase transitions which occur before or during heat exchanging with one or more applications requiring cooling or heating and/or before or during phase transition temperature adjustment. FIG. 7 may involve rejecting or releasing at least a portion of heat using evaporative cooling or wet surface contactor or a combination thereof. For example, FIG. 7 may involve direct evaporative cooling of a mostly organic stream which may contain a portion of water to, for example, facilitate cooling and minimize heat exchanger Delta-T. A cooling tower or evaporative cooling contactor may be configured to minimize biofouling or minimize loss of reagents or both, which may include, but is not limited to, for example, using a gas-liquid or air-liquid membrane contactor. Evaporated water may be replenished with makeup water or makeup liquid water.

Figure 8:
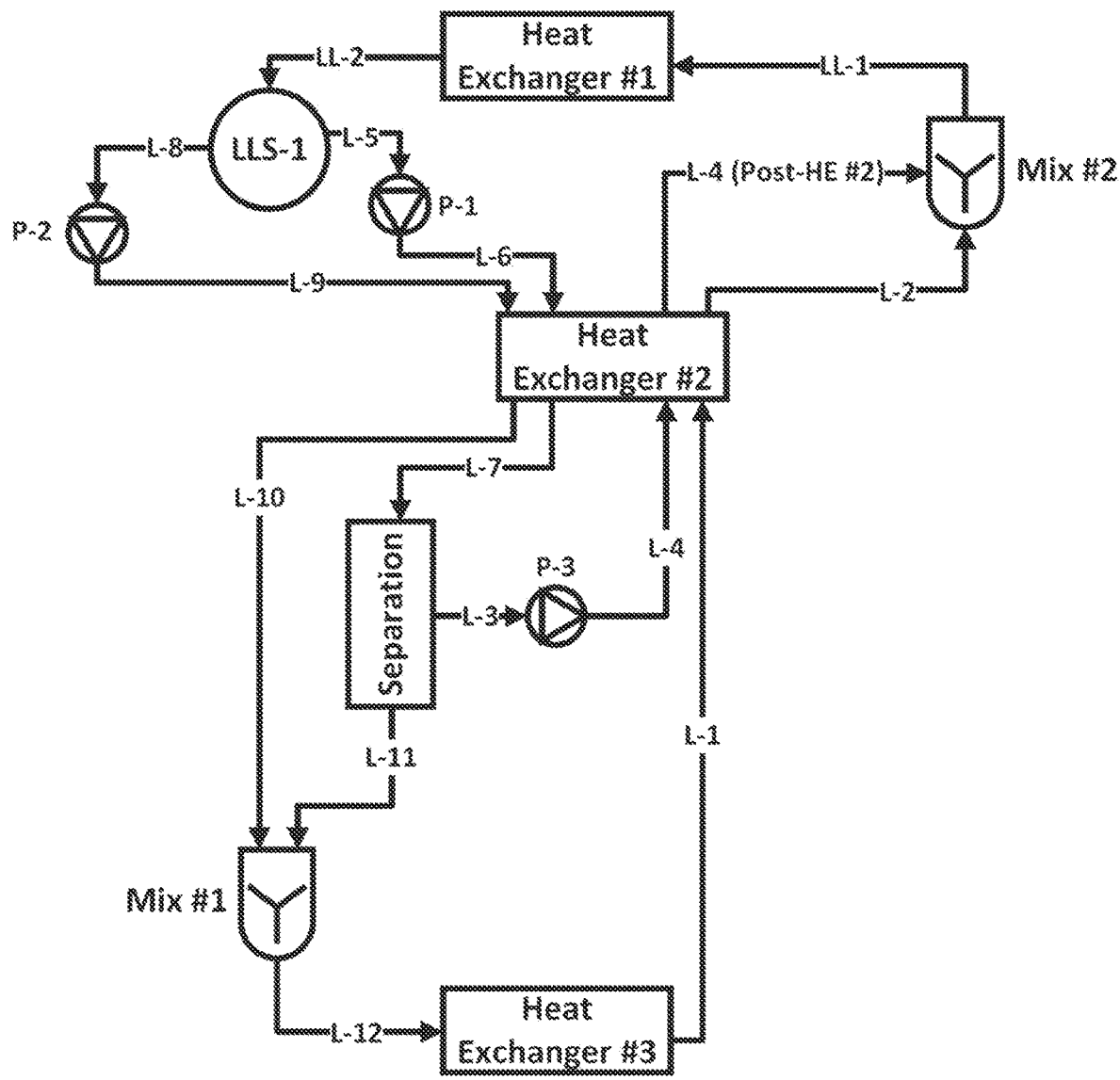
FIG. 8.

FIG. 8: FIG. 8 is the same as FIG. 5, except shows L-4 heat exchanging in Heat Exchanger #2.

Definitions

Single Liquid Phase Combined Solution: May comprise a solution of organic liquid-liquid phase transition reagent(s) dissolved in water or other solvent.

Multi-Liquid Phase Mixture: May comprise a mixture of liquid phases. May comprise a mixture of liquid phases, wherein at least one liquid phase comprises mostly organic, and/or at least one liquid phase comprises mostly water or aqueous solution or solvent.

Temperature Zones:
  Cold Temperature Zone: A temperature zone which may at a lesser temperature than another portion of a process and may exhibit an endothermic phase transition.
  Warm Temperature Zone: A temperature zone which may at a greater temperature than another portion of a process and may exhibit an exothermic phase transition.
LCST: May involve a liquid composition which undergoes an exothermic phase transition when transforming from two liquid phases to a single liquid phase and an endothermic phase transition when transforming from a single liquid phase to two liquid phases.

UCST: May involve a liquid composition which undergoes an exothermic phase transition when transforming from a single liquid phase to two liquid phases and an endothermic phase transition when transforming from two liquid phases to a single liquid phase.

'Salting-Out' Reagent or Phase Transition Temperature Adjustment Reagent: May comprise a salt or an organic or a combination thereof. May also be described as phase transition temperature adjustment reagent or reagent with high affinity for water relative to the organic phase Example desirable properties of salts may include, but are not limited to, one or more or a combination of the following:

Capability to reduce phase transition temperature or salt out Organic with minimal salt concentration or osmotic pressure.

Insoluble or minimally soluble or only partial solubility or a combination thereof in organic liquid phase.

Ratio of phase transition temperature adjustment relative to salt concentration or osmotic pressure of salt in solution Enthalpy of phase transition of organic when a liquid-liquid phase transition is driven by 'salting out' or phase transition temperature adjustment Concentration of residual organic in an aqueous phase after liquid-liquid phase transition or 'salting-out' into a multi-liquid phase mixture Chemical compatibility with other reagents and/or materials and/or equipment in the process Example desirable properties of phase transition temperature adjustment or 'salting-out' organics may include Capability to reduce phase transition temperature or salt out a liquid-liquid phase transitioning organic with minimal salt concentration or osmotic pressure.

Insoluble or minimally soluble or only partial solubility or a combination thereof in a liquid-liquid phase transitioning organic If the concentration adjustment involves adjusting the concentration within an organic phase—greater solubility in or affinity to a liquid-liquid phase transitioning phase than an aqueous or solvent phase.

Ratio of phase transition temperature adjustment relative to phase transition temperature adjustment or 'salting-out' organic concentration or osmotic pressure of said phase transition temperature adjustment or 'salting-out' organic in solution Enthalpy of phase transition of liquid-liquid phase transitioning organic when a liquid-liquid phase transition is driven by 'salting out' or phase transition temperature adjustment Concentration of residual phase transition organic in an aqueous liquid phase after 'salting out'

Chemical compatibility with other reagents and/or materials and/or equipment in the process.

Example Step-by-Step Descriptions

FIG. 2:

1—Mixing Reagents to Form Endothermic Phase Transition: A solution comprising mostly single liquid phase combined solution (L-2) may be mixed with a solution concentrated in 'salting-out' reagent or phase transition temperature adjustment reagent (L-4) in a mixing device (Mix #2). Said mixing of L-4 and L-2 may result in an endothermic liquid-liquid phase transition into a multi-liquid phase mixture. L-4 may dissolve in the aqueous component of L-2, which may result in at least an organic reagent becoming at least partially insoluble and/or forming a separate liquid phase in a liquid-liquid phase transition. A resulting multi-liquid phase mixture (LL-1) may comprise a mostly organic liquid phase and a mostly aqueous dilute 'salting-out' reagent or mostly phase transition temperature adjustment reagent liquid phase. The previously described liquid-liquid phase transition may be endothermic and may result in the temperature of LL-1 being less than the mean temperature of L-2 and L-4. In some embodiments, step 1 and step 2 may be combined. For example, in some embodiments, Mix #2 may be combined with Heat Exchanger #1.

2—Heat Absorbing Heat Exchange: LL-1 may be heat exchanged (Heat Exchanger #1) with a heat source or an application requiring cooling or an enthalpy source or a combination thereof. LL-1 may absorb heat from or 'cool' said heat source or an application requiring cooling or an enthalpy source or a combination thereof, while said heat source or an application requiring cooling or an enthalpy source or a combination thereof may be cooled or supply heat to LL-1. Depending on the liquid state of LL-1, the temperature of LL-1, the temperature of Heat Exchanger #1, and phase transition properties of LL-1, LL-1 may absorb heat in Heat Exchanger #1 due to an enthalpy of liquid-liquid phase transition, or specific heat capacity due to an enthalpy of phase transition, or specific heat capacity or a combination thereof. LL-1 may exit Heat Exchanger #1 at a greater enthalpy or temperature or a combination thereof state and/or may comprise at least a portion a multi-liquid phase solution (LL-2).

3—Liquid-Liquid Separation: LL-2 may be separated into two separate liquid streams using a liquid-liquid separation device (LLS-1). One of the two liquid phases may comprise a mostly organic liquid phase (L-8 and L-9). One of the liquid phases may comprise mostly aqueous dilute 'salting-out' reagent or mostly phase transition temperature adjustment reagent solution (L-5).

4—Membrane Based Concentrating: Mostly aqueous dilute 'salting-out' reagent or mostly phase transition temperature adjustment reagent solution (L-5) may be pumped (P-1) and fed (L-6) into a reverse osmosis or nanofiltration or ultrafiltration or a combination thereof system (Reverse Osmosis). A portion of water or other permeable solvent in L-6 may permeate across a semi-permeable membrane, while 'salting-out' reagent or phase transition temperature adjustment reagent in L-6 may be rejected by said membrane. Reverse Osmosis may concentrate L-6 into a retentate solution comprising a concentrated solution of salting-out' reagent or phase transition temperature adjustment reagent (L-3 and L-4) and form a permeate comprising water or other solvent or a combination thereof (L-7).

5—Heat Exchange to Heat L-7 and L-9 into 'Warm' Temperature Zone: 'Cold' liquid phase comprising mostly organic (L-9) and a 'cold' liquid phase comprising mostly water or other solvent (L-7) may be heat exchanged (Heat Exchanger #2) with 'warm' mostly single liquid phase combined solution (L-1), which may result in 'warm' L-7 (L-10) and warm L-9 (L-11) and 'cold' L-1 (L-2). L-7 and L-9 may be non-contiguously separate liquid streams during Heat Exchanger #2 to, for example, prevent dissolution of L-7 into L-9 before or during Heat Exchanger #2.

6—Mixing Reagents to Form Exothermic Phase Transition: L-10 may be mixed with L-11 in a mixing device, Mix #1, forming L-12. Depending on the liquid-liquid phase transition temperature range, the temperature of L-10 and L-11, and the enthalpy of the liquid-liquid phase transition, L-12 may comprise a multi-liquid phase mixture, or a multi-liquid phase mixture with some L-10 dissolved in L-11, or a single liquid phase combined solution.

7—Heat Releasing Heat Exchange: L-12 may be heat exchanged with an application requiring heating, a heat sink, or a combination thereof using a heat exchanger (Heat Exchanger #3). L-12 may release heat to said application requiring heating, a heat sink, or a combination thereof, while said application requiring heating, a heat sink, or a combination thereof may cool L-12. Depending on the liquid state of L-12, the temperature of L-12, the temperature of the Heat Exchanger #3, and the phase transition properties of L-12, L-12 may release heat in the Heat Exchanger #3 due to an enthalpy of liquid-liquid phase transition, or specific heat capacity due to an enthalpy of phase transition, or specific heat capacity or a combination thereof. L-12 may exit Heat Exchanger #3 at a lower enthalpy or temperature or a combination thereof state and may comprise at least a portion a single liquid phase combined solution (L-1).

8—Heat Exchange to 'Cool' L-1 into 'Cold' Temperature Zone: 'Warm' mostly single liquid phase combined solution (L-1) may be heat exchanged (Heat Exchanger #2) with a 'cold' liquid phase comprising mostly organic (L-9) and a 'cold' liquid phase comprising mostly water or other solvent (L-7), which may result in 'warm' L-9 (L-11) and warm L-7 (L-10) and 'cold' L-1 (L-2). L-7 and L-9 may be non-contiguously separate liquid streams during Heat Exchanger #2 to, for example, prevent dissolution of L-7 into L-9 before or during Heat Exchanger #2.

FIGURE KEYS

| Label in FIG. | Description |
|---|---|
| | Example FIG. Key for FIG. 2 |
| L-1 | L-1 may comprise a solution comprising a combined solution of an organic and aqueous reagents. L-1 may comprise at least a portion a single liquid phase combined solution. L-1 may comprise L-12, except after heat removal from L-12 in, for example, the Heat Exchanger #3. Heat removed in the Heat Exchanger #3 may include, but is not limited to, heat from enthalpy of liquid-liquid phase transition and/or heat from specific heat capacity. L-1 is an output of Heat Exchanger #3. |
| Heat Exchanger #2 | Heat Exchanger #2 may involve a heat exchange between 'warm' L-1 and 'cold' L-7 and L-9, which may result in 'cold' L-1 (L-2) and 'warm' L-7 (L-10) and L-9 (L-11). L-7 and L-9 may be heat exchanged with L-1 in Heat Exchanger #2 as non-contiguously separate liquid phases to, for example, prevent L-7 and L-9 from dissolving in each other and/or releasing an enthalpy of phase transition during Heat Exchanger #2. Heat Exchanger #2 may enable two separate temperature zones within the Refrigeration Cycle portion of the process. For example, L-10, L-11, Mix #1, L-12, Heat Exchanger #3, and L-1 may comprise a first temperature zone, while L-2, Mix #2, LL-1, Heat Exchanger #1, LL-2. LLS-1, L-5, L-8, L-6, L-3, L-4, L-7, and L-9 may comprise a second temperature zone which may be at a significantly different temperature or temperature range than the first temperature zone. Said significantly different temperature may comprise a temperature difference greater than the adiabatic temperature change of a enthalpy of the liquid-liquid phase transition. Said temperature zones may enable the refrigeration cycle to move heat or pump heat across a temperature difference greater than the adiabatic temperature change of the enthalpy of liquid-liquid phase transition. |
| L-2 | L-2 may comprise L-1 after heat exchange in Heat Exchanger #2. L-2 may be at a significantly different temperature than L-1, such as, for example, a temperature difference greater than the adiabatic temperature change of the liquid-liquid phase transition of L-11 dissolving in L-10. |
| Mix #2 | Mix #1 may involve mixing or combining L-2 and L-4 to form a multi-liquid phase solution, LL-1. Said mixing may result in a liquid-liquid phase transition, which may possess an enthalpy of phase transition. Said enthalpy of phase transition may be endothermic or exothermic, although may be endothermic in the present embodiment. |
| L-4 | L-4 may comprise L-3 after pumping (P-3). L-4 may comprise a concentrated solution of 'salting-out reagent' or 'phase transition temperature adjustment reagent' or a 'concentrate' or a 'retentate'. L-4 may also comprise some residual organic reagent, which may be due to, including, but not limited to, residual from L-6 and/or an incomplete separation in LLS-1 and/or residual organic liquid phase dissolved in L-6. The concentrate or retentate may be generated by a membrane-based process, such as reverse osmosis or nanofiltration. |
| LL -1 | LL-1 may comprise a multi-liquid phase mixture, which may have resulted from the mixing of L-2 and L-4 in Mix #2. LL-1 may possess a lesser temperature and/or lesser enthalpy than L-4 and L-2. LL-1 may possess said lesser temperature, due to, for example, an endothermic liquid-liquid phase transition in Mix #2. LL-1 may possess a latent endothermic enthalpy of phase transition, which may absorb heat in Heat Exchanger #1. LL-1 may possess a lesser temperature than LL-2, which may enable the absorption of heat in Heat Exchanger #1 due to specific heat capacity. |

-continued

Example FIG. Key for FIG. 2

| Label in FIG. | Description |
|---|---|
| Heat Exchanger #1 | Heat Exchanger #1 may comprise a heat exchanger between LL-1 and an application requiring cooling or a heat source or enthalpy source. LL-1 may absorb heat in a heat exchange with an application requiring cooling or a heat source or enthalpy source, which may result in a higher temperature and/or enthalpy LL-1 (for example: LL-2) and a lower temperature and/or less enthalpy application requiring cooling or heat source or enthalpy source. |
| LL-2 | LL-2 may comprise the same overall composition as LL-1, except at a higher temperature and/or greater enthalpy. LL-2 may comprise LL-1 after heat exchanging in Heat Exchanger #1. LL-2 may comprise at least a portion a multi-liquid phase mixture. It may be desirable for at least one liquid phase of said multi-liquid phase mixture to comprise a liquid phase of mostly organic. It may be desirable for at least one liquid phase of said multi-liquid phase mixture to comprise mostly water or a dilute aqueous solution of 'salting-out' reagent or dilute aqueous 'phase transition temperature adjustment' reagent. |
| LLS-1 | LLS-1 may comprise a liquid-liquid separation device. LLS-1 may separate LL-2 into constituent liquid phases, which may comprise L-5 and L-8. |
| L-5 | L-5 may comprise a dilute solution of 'salting-out reagent'. L-5 may comprise an aqueous solution. L-5 may comprise one of the liquid phases separated by LLS-1 from multi-liquid phase mixture LL-2. L-5 may contain a portion of residual organic liquid phase, which may be due to, for example, an incomplete separation in LLS-1 and/or residual organic dissolved in L-5. |
| L-6 | L-6 may comprise L-5 after pressurization using a feed pump (P-1). |
| L-8 | L-8 may comprise a solution comprising mostly organic liquid phase. L-8 may comprise one of the liquid phases separated by LLS-1 from multi-liquid phase mixture LL-2. L-8 may contain a portion of residual water and/or 'salting-out' reagent, which may be due to, for example, an incomplete separation in LLS-1 and/or residual water and/or 'salting-out' reagent and/or 'phase transition temperature adjustmen' reagent dissolved in L-8. |
| L-9 | L-9 may comprise L-8 after pumping (P-2). |
| Reverse Osmosis | 'Reverse Osmosis' may comprise a membrane-based separation process, such as reverse osmosis, nanofiltration, ultrafiltration, or a combination thereof. Reverse osmosis may involve a feed solution comprising L-6, which may be separated into a concentrate or retentate, L-3, and a permeate, L-7. |
| L 7 | L-7 may comprise a permeate from 'Reverse Osmosis'. L-7 may comprise mostly water or other solvent and may comprise a significantly lesser concentration of 'salting-out reagent' or 'phase transition temperature adjustment reagent' than L-6. |
| L-3 | L-3 may comprise a concentrate from 'Reverse Osmosis'. L-3 may comprise mostly water or other solvent and may comprise a significantly greater concentration of 'salting-out reagent' or 'phase transition temperature adjustment reagent' than L-6. L-4 may comprise a concentrated solution of 'salting-out reagent' or 'phase transition temperature adjustment reagent' or a 'concentrate' or a 'retentate'. L-4 may also comprise some residual organic reagent, which may be due to, including, but not limited to, residual from L-6 and/or an incomplete separation in LLS-1 and/or residual organic liquid phase dissolved in L-6. The concentrate or retentate may be generated by a membrane-based process, such as reverse osmosis or nanofiltration. |
| L-11 | L-11 may comprise L-9 after heat exchange in Heat Exchanger #2. L-11 may be at a significantly different temperature than L-9, such as, for example, a temperature difference greater than the adiabatic temperature change of an enthalpy of a liquid-liquid phase transition. L-11 may be non-contiguously separate from L-10. |
| L-10 | L-10 may comprise L-7 after heat exchange in Heat Exchanger #2. L-10 may be at a significantly different temperature than L-7, such as, for example, a temperature difference greater than the adiabatic temperature change of an enthalpy of a liquid-liquid phase transition. L-10 may be non-contiguously separate from L-11. |
| Mix #1 | Mix #1 may involve mixing or combining L-10 and L-11 to form, including, but not limited to, one or more or a combination of the following: a multi-liquid phase solution, L-12, or at least a portion single liquid phase combined solution, L-12, or a single liquid phase combined solution, L-12. L-10 and L-11 may Mix in Mix #1 to form an exothermic or endothermic liquid-liquid phase transition, although the present embodiment may form an exothermic phase transition. It may be desirable for the adiabatic temperature change of said enthalpy of said liquid-liquid phase transition to be greater than the approach temperature and/or heat exchanger Delta-T of Heat Exchanger #2 or the temperature difference between L-2 and L-11 or L-10. |

-continued

Example FIG. Key for FIG. 2

| Label in FIG. | Description |
|---|---|
| L-12 | L-12 may comprise a combination of L-10 and L-11. L-12 may comprise including, but not limited to, one or more or a combination of the following: a multi-liquid phase solution, or at least a portion single liquid phase combined solution, or a single liquid phase combined solution. L-12 may be at a greater temperature and/or greater enthalpy than L-1. |
| Heat Exchanger #3 | Heat Exchanger #3 may involve heat exchanging L-12 with an application requiring heating or a heat sink or a cold source, which may result in a lesser temperature and/or lesser enthalpy L-12 (for example: L-1) and a greater temperature and/or greater enthalpy application requiring heating or a heat sink or a cold source. |

Example Exemplary Embodiments

A refrigeration cycle comprising:
A first step comprising a liquid-liquid phase transition from a single liquid phase to multiple liquid phases absorbing heat
A second step comprising a liquid-liquid phase transition from multiple liquid phases to a single liquid phase releasing heat
Wherein a liquid-liquid phase transition temperature is adjusted between the first and second steps
Wherein the first step and second step occur at different temperature ranges in different temperature 'zones'
Wherein temperature zones are maintained by heat exchanging the liquids exiting the first step temperature zone with the liquids exiting the second step temperature zone Example Notes Note: Any or each liquid stream in the present invention may be stored in a storage container in the present invention. Storing in a storage container may enable numerous benefits. For example, storing one or more or a combination of liquid phases may enable the desynchronization of the components which consume electricity or heat or cold or work or a combination thereof from the components or steps involved with absorbing or releasing heat. Said desynchronization may enable, for example, the operation of said components which consume electricity or heat or cold or work or a combination thereof when it is most optimal or least costly (for example: when cost of electricity or heat is the least expensive) and the operation of said components or steps involved with absorbing or releasing heat when cooling or heating is needed.

A liquid phase only refrigeration cycle may require less heat exchangers than a gas-liquid phase transition refrigeration cycle based processes.
  For example, a vapor compression refrigeration cycle based geothermal ground source heat pump requires a heat exchanger between an anti-freeze-water loop heat exchanging with the ground and the refrigeration cycle and also a heat exchanger between the refrigeration cycle and the chilled or heated water circulating through the building (or other application requiring heating or cooling from the heat pump). These two heat exchangers require a combined approach temperature of at least 6-10° C., which means the temperature difference created by the refrigeration cycle must be at least 6-10° C. greater than the temperature difference between the heat source and heat sink.
  A liquid-phase only refrigeration cycle heat may eliminate the need for said two heat exchangers. Instead of heat exchanging between a non-volatile liquid heat transfer liquid and a gas-liquid phase transition refrigerant, the liquids employed in a liquid phase only refrigeration cycle can simultaneously function as both a non-volatile liquid heat transfer liquid and phase transition refrigeration (liquid-liquid phase transition).
Heat exchanger between before "mixing" and stream after heat releasing heat exchanger.
  May allow process to operate at a temperature difference greater than the adiabatic temperature rise.

Liquid Phase Refrigeration Cycle Powered by Osmotic Pressure Differences or by Temperature Differences or Both Summary
  The present inventions pertain to liquid phase refrigeration cycles. The present inventions may pertain to refrigeration cycles driven by liquid-liquid phase transitions which are engineered to occur at two or more different temperatures. The present inventions may involve engineering said liquid-liquid phase transitions to occur at two or more different temperatures by adjusting a concentration of a reagent. The present inventions may involve adjusting a concentration of a reagent by employing a membrane based process, which may include, but is not limited to, one or more or a combination of the following: forward osmosis, osmotically assisted reverse osmosis, reverse osmosis, nanofiltration, ultrafiltration, electrodialysis, or membrane distillation. The present inventions may involve adjusting the concentration of a reagent by the addition of a solvent, such a water, or the removal of a solvent, such as water, or both. In some embodiments, said addition and removal of a solvent, such as water, may involve membrane based processes which occur exclusively or almost exclusively at a liquid phase within the refrigeration cycle.
  In some embodiments, said addition and removal of a solvent is reversible within the system. For example, said reversible addition and removal may involve water added at one point in the cycle being removed at another point in the cycle. For example, in some embodiments, said reversible addition and removal may further comprise regenerating the 'added solvent' from the removed solvent.
  In some embodiments, removed solvent may comprise the same or relatively similar composition to said added solvent, and said removed solvent may be employed as said added solvent with minimal additional treatment steps, if any at all. Said some embodiments may include, but are not limited to, embodiments wherein solvent is removed using reverse osmosis, osmotically assisted reverse osmosis, nanofiltration, or ultrafiltration, or membrane distillation.

In some embodiments, solvent may be removed by means of a draw solution of in forward osmosis or osmotically assisted reverse osmosis. In some embodiments, a water-lean draw solution (or draw solution) may remove solvent by means of forward osmosis or osmotically assisted reverse osmosis, and may become water-rich draw solution (or diluted draw solution). Said water-rich draw solution may regenerated into a mostly water liquid phase and a water-lean draw solution liquid phase by means of a liquid-liquid phase transition, which may be thermally driven. Said water lean draw solution may comprise a solution with greater osmotic pressure which may be employed as a draw solution to remove solvent. Said mostly water liquid phase may comprise a solution with a lesser osmotic pressure which may be employed as said added solvent or may be employed as said added solvent after treatment to remove residual reagents, such as draw solution reagent or other potential residual reagents.

Said regenerating may involve a natural or engineered system which may involve a relatively plentiful source of lesser osmotic pressure solution and a relatively plentiful source of greater osmotic pressure solution. Said relatively plentiful source of lesser osmotic pressure solution may include, but is not limited to, one or more or a combination of the following: rainwater, river water, lake water, brackish water, seawater, dew, or groundwater, wastewater, non-potable water, or a derivative thereof. Said relatively plentiful source of greater osmotic pressure solution may include, but is not limited to, one or more or a combination of the following: seawater, saline aquifer, salt mine, or frackwater, or mine tailings, brine pond, solar pond, evaporation pond, reverse osmosis brine, desalination brine, waste brine, or mining water, or hypersaline lake, or antifreeze reagent, or sugar concentrate, or molasses, or organically derived draw solution, or lubricant, or a derivative thereof.

In some embodiments, solvent addition or removal or both may be conducted using a membrane based process.

The present refrigeration cycles may be powered by the enthalpy of mixing of two or more solutions with different osmotic pressures. For example, an added solvent may comprise a solution with a lesser osmotic pressure. For example, added solvent may comprise water or freshwater. For example, the draw solution employed to remove solvent in a forward osmosis or osmotically assisted reverse osmosis process may comprise a solution with a greater osmotic pressure. Solvent may be added in one portion of the refrigeration cycle. Solvent may be removed at another portion of the refrigeration cycle, whereby said removing may involve the formation of a diluted draw solution or solution with a greater osmotic pressure than said added solvent, which may involve forward osmosis or osmotically assisted reverse osmosis. Said two or more solutions with different osmotic pressures may be regenerated internally, or regenerated externally, or may be naturally occurring, or a combination thereof. For example, regenerating internally may involve regenerating a diluted draw solution by a liquid-liquid phase transition, which may include, but is not limited to, a thermally driven liquid-liquid phase transition or a light driven liquid-liquid phase transition or a combination thereof. For example, regenerating internally may involve regenerating by means of reverse osmosis, or nanofiltration, or ultra-filtration, or osmotically assisted reverse osmosis. For example, regenerating internally may involve regenerating a diluted draw solution by a liquid-liquid phase transition, which may include, but is not limited to, a thermally driven liquid-liquid phase transition or a light driven liquid-liquid phase transition or a combination thereof, and further regenerating by means of reverse osmosis, or nanofiltration, or ultra-filtration, or osmotically assisted reverse osmosis. For example, regenerating externally may involve a distillation process, or an evaporation process, or a process employing regenerating for an external use. For example, a process employing regenerating for an external use may involve a seawater desalination process, such reverse osmosis or MSF or cryodesalination or other desalination process, which may generate brine or concentrate or retentate, which may be employed as a high osmotic pressure solution. For example, said naturally occurring two or more solutions with different osmotic pressures may be involve a lesser osmotic pressure solution derived from rainwater, river water, lake water, brackish water, seawater, dew, or groundwater, and a greater osmotic pressure solution derived from seawater, saline aquifer, salt mine, or frackwater, or mining tailings, or mining, or hypersaline lake. For example, a combination of naturally and external regeneration may involve a rainwater or other 'naturally' occurring source of freshwater as a lesser osmotic pressure solution and a greater osmotic pressure solution comprising a saline water source regenerated in a solar pond or evaporation pond or evaporative cooling system or evaporation system.

Advantages of the present invention may include, but are not limited to, one or more or a combination of the following:

- The capability of powering refrigeration cycles, including heating or cooling, using small temperature differences. Said small temperature differences may comprise low temperature heat, which may be at too low of a temperature to efficiently or effectively power prior art refrigeration cycles. Said small temperature differences may comprise higher temperature 'cold', which may be at too high of a temperature to efficiently or effectively power prior art refrigeration cycles.
- The capability of achieving high coefficients of performance or energy efficiency with a thermally powered refrigeration cycle or with small temperature differences or a combination thereof
- The ability to power a refrigeration cycle with thermal input or heat or temperature differences operating using liquid-liquid phase transitions.
- The ability to create a refrigeration cycle powered by heat or temperature differences without a gas-liquid phase transition, or gas-solid phase transition, or solid-liquid phase transition.
- The ability to power a refrigeration cycle, or heating, or cooling using the enthalpy of mixing of two or more liquids with different osmotic pressures or using two or more liquids with different osmotic pressures.

It is important to note that the vapor pressure difference, if any, between said two or more liquids with different osmotic pressures may be too small or insignificant to be employed or to be effective in an absorption refrigeration cycle. For example, the vapor pressure difference between solutions such as freshwater and seawater, or freshwater and saline lake water, or brackish water and seawater, or brackish water and saline lake water, or seawater and saline lake water, or a combination thereof may be too insignificant for an absorption refrigeration cycle, however the osmotic pressure difference between said solutions may significant enough or sufficient to power the refrigeration cycles introduced herein in the present invention.

Figure Summaries

Figure 9:
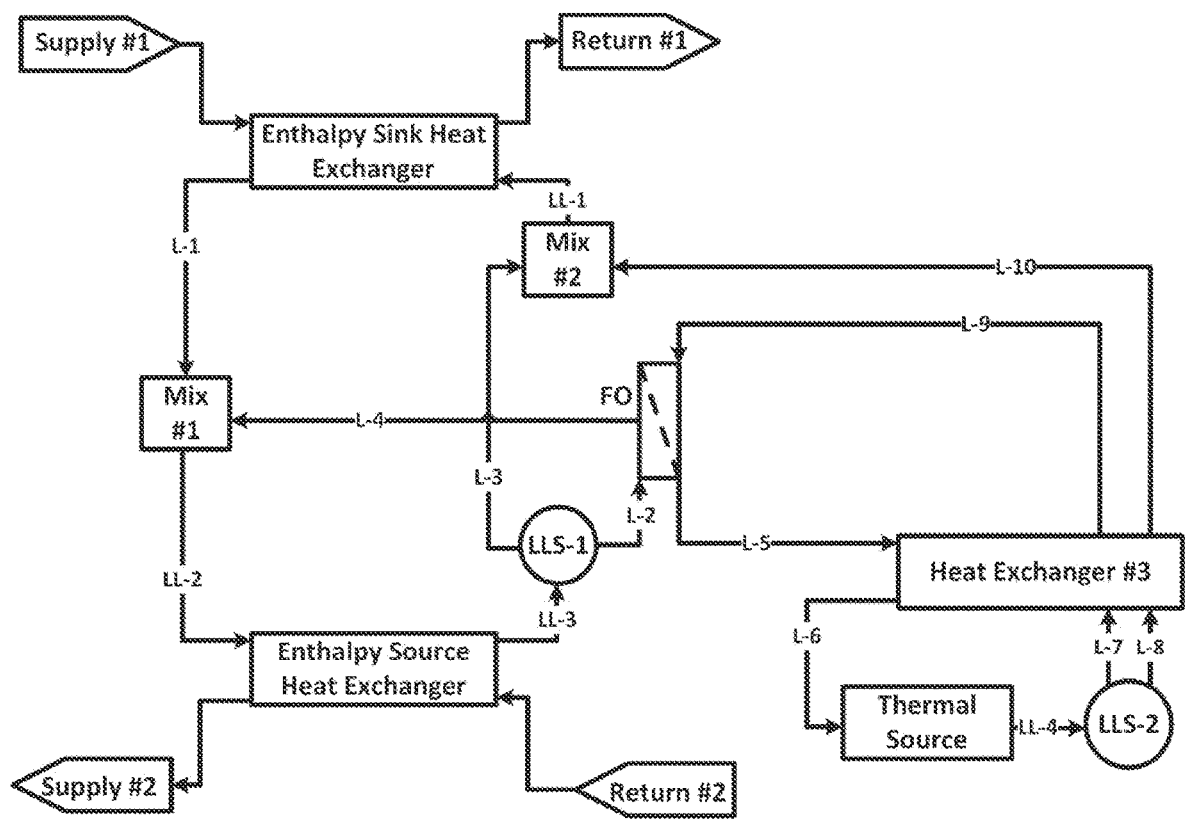
FIG. 9.

FIG. 9: FIG. 9 may comprise a liquid phase refrigeration cycle wherein solvent may be added and removed to drive liquid-liquid phase transitions to 'pump' heat, and wherein solvent removal may be conducted using forward osmosis. FIG. 9 may involve regenerating an added solvent and a draw solution for removing added solvent by means of a thermally driven liquid-liquid phase transition and/or separation of the resulting liquid phases. FIG. 9 may involve employing a solution with lesser osmotic pressure as an added solvent and a solution with greater osmotic pressure as a draw solution or organic Composition #2.

Figure 10:
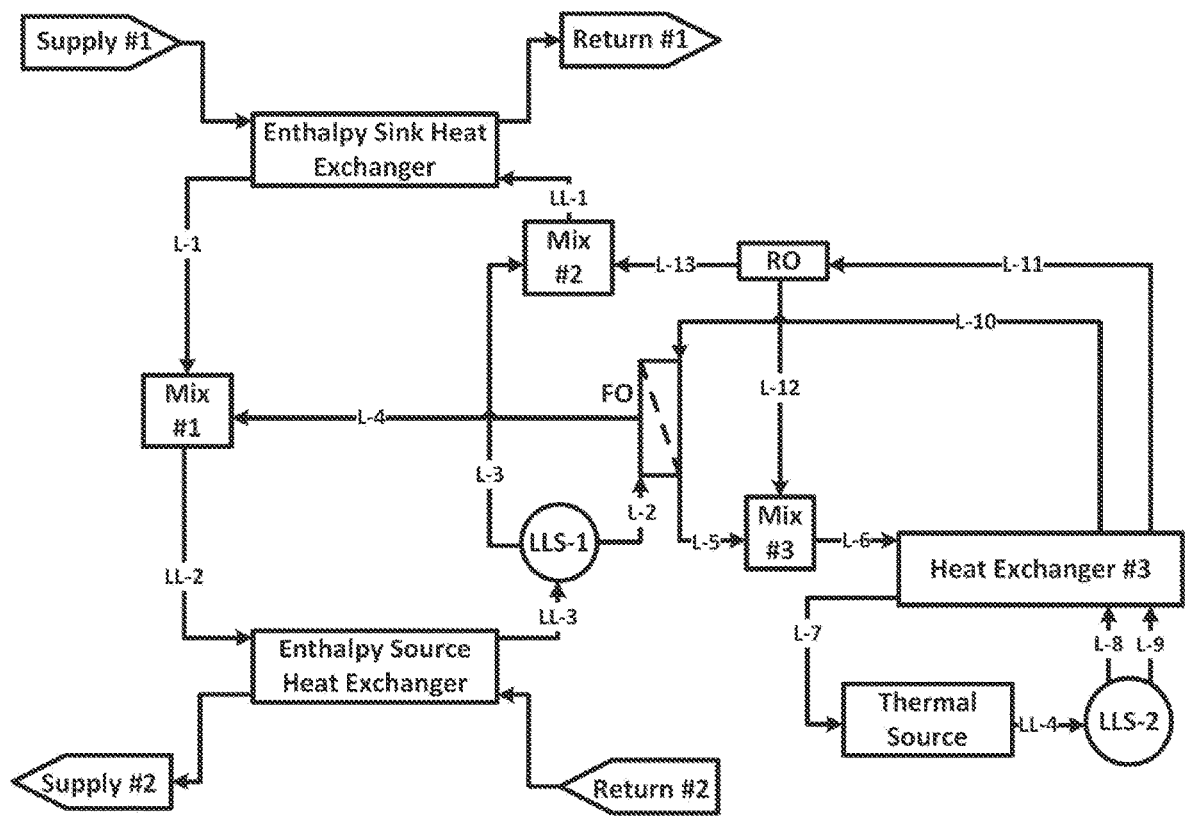
FIG. 10.

FIG. 10: FIG. 10 may be the same as FIG. 9, except further comprises a step for separating residual organic Composition #2 or other residual reagents in the regeneration portion from the regenerated solvent before adding said regenerated solvent to the refrigeration cycle portion. Said step may comprise a membrane-based process, such as reverse osmosis, or nanofiltration, or ultrafiltration, or forward osmosis, or osmotically assisted reverse osmosis, or a combination thereof.

Figure 11:
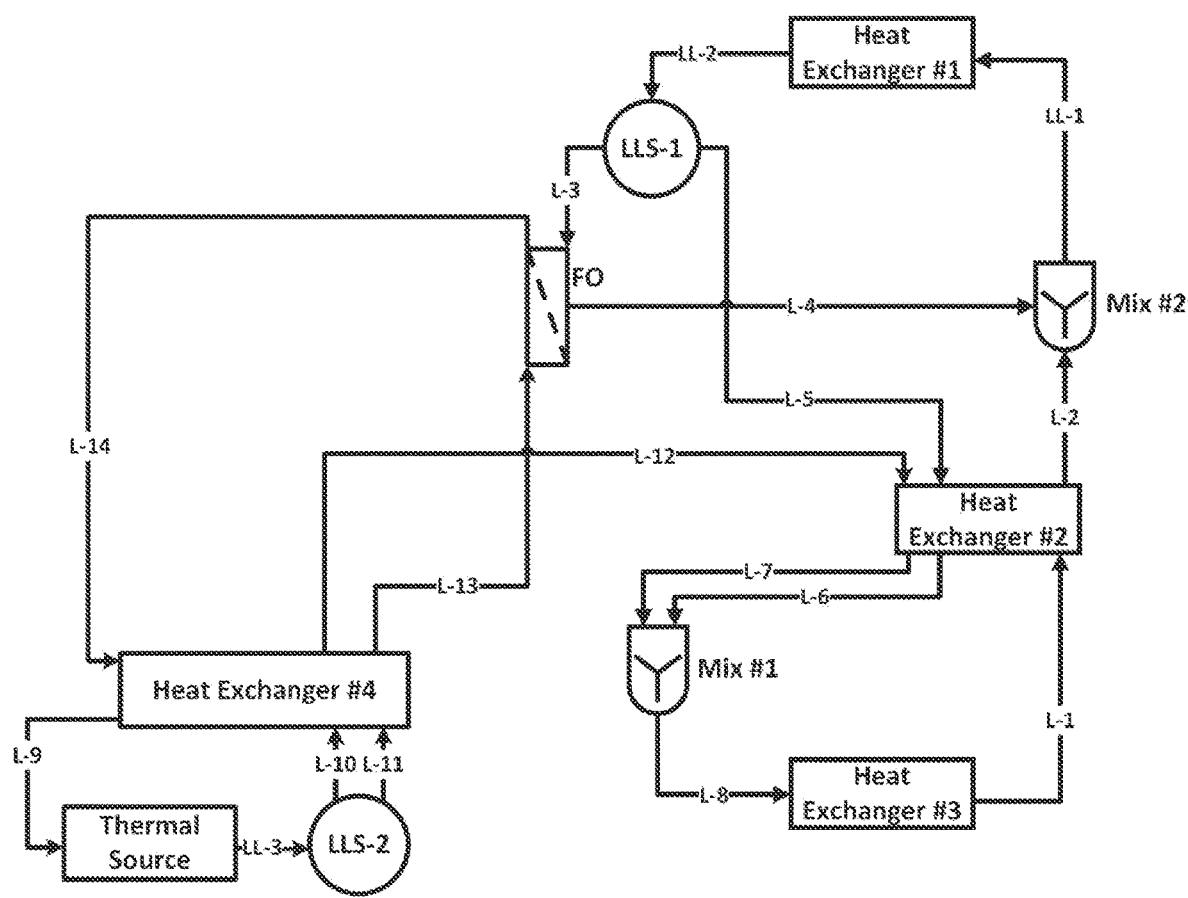
FIG. 11.

FIG. 11: FIG. 11 may comprise a liquid phase refrigeration cycle employing a heat exchanger to generate or form or create two temperature zones. The refrigeration cycle may involve an endothermic liquid-liquid phase transition in the cold temperature zone and an exothermic liquid-liquid phase transition in the warm temperature zone. The temperature difference between the temperature zones may be greater than the temperature difference which may be generated by the adiabatic temperature difference generated by an enthalpy of liquid-liquid phase transition in the refrigeration cycle. It may be desirable for the adiabatic temperature difference generated by an enthalpy of liquid-liquid phase transition in the refrigeration cycle to be greater than the delta-T or approach temperature or temperature difference between the outputs of the heat exchange or a combination thereof. Said temperature zones may be interconnected by said heat exchanger. FIG. 11 may enable a liquid phase refrigeration cycle which may be capable of generating a temperature difference or pumping heat across a temperature difference greater than the temperature difference generated by the adiabatic temperature difference generated by an enthalpy of liquid-liquid phase transition in the refrigeration cycle.

Figure 12:
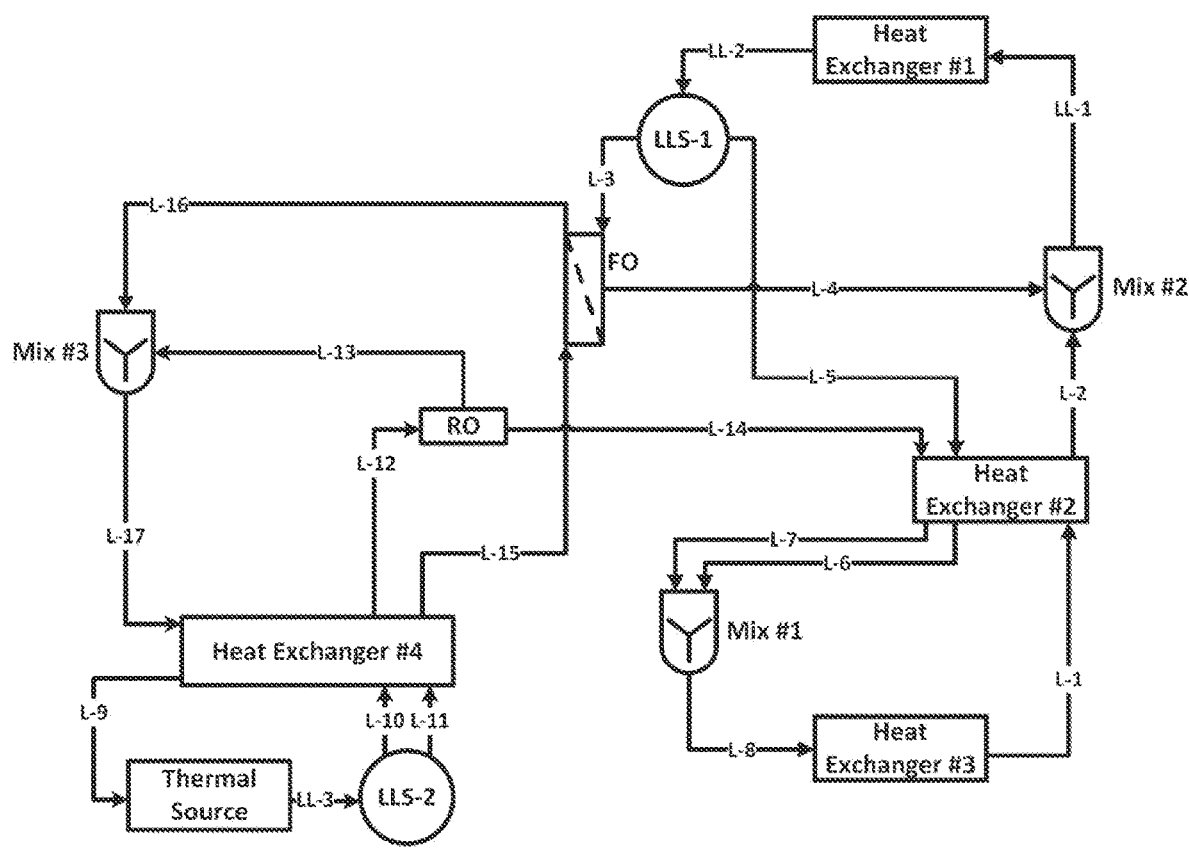
FIG. 12.

FIG. 12: FIG. 12 may be the same as FIG. 11, except further comprises a step for separating residual organic Composition #2 or other residual reagents in the regeneration portion from the regenerated solvent before adding said regenerated solvent to the refrigeration cycle portion. Said step may comprise a membrane-based process, such as reverse osmosis, or nanofiltration, or ultrafiltration, or forward osmosis, or osmotically assisted reverse osmosis, or a combination thereof.

Figure 13:
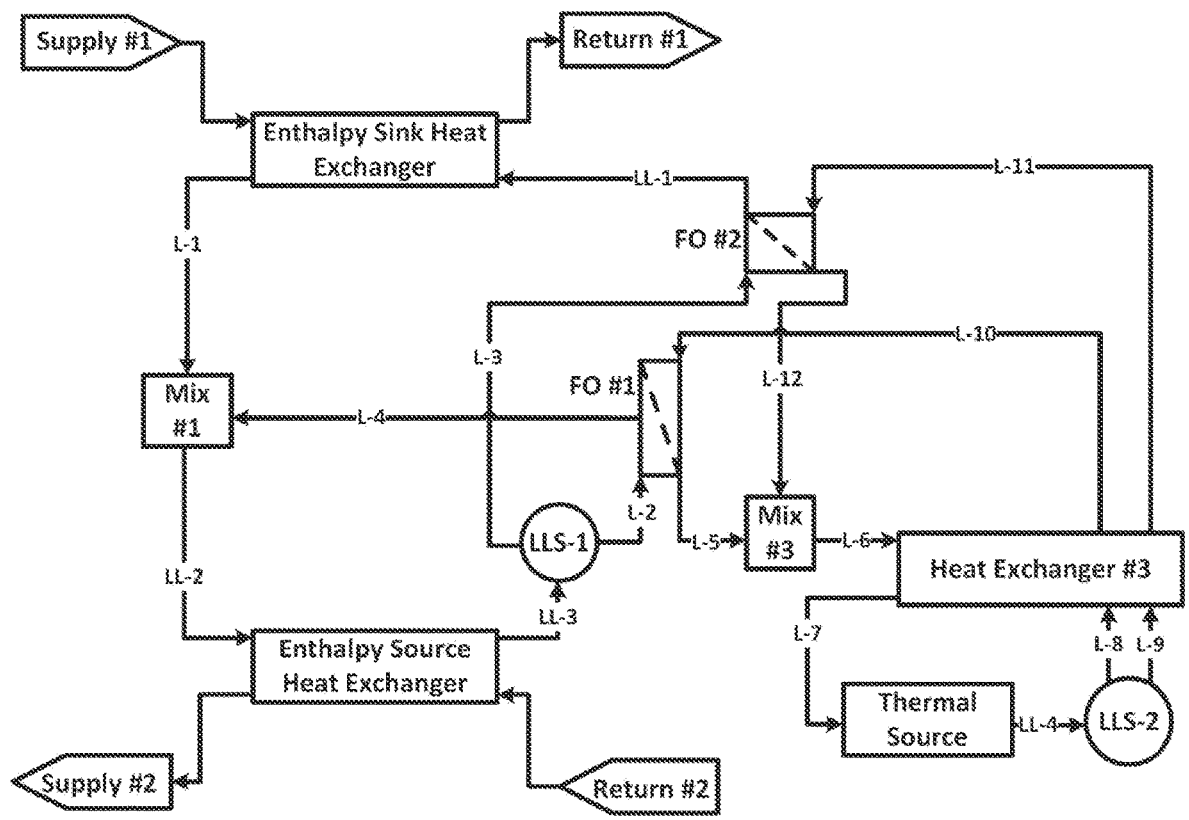
FIG. 13.

FIG. 13: FIG. 13 may be the same as FIG. 9 or FIG. 10, except may further comprise adding the added solvent by employing organic Composition #1 as a draw solution in a forward osmosis or osmotically assisted reverse osmosis step.

Figure 14:
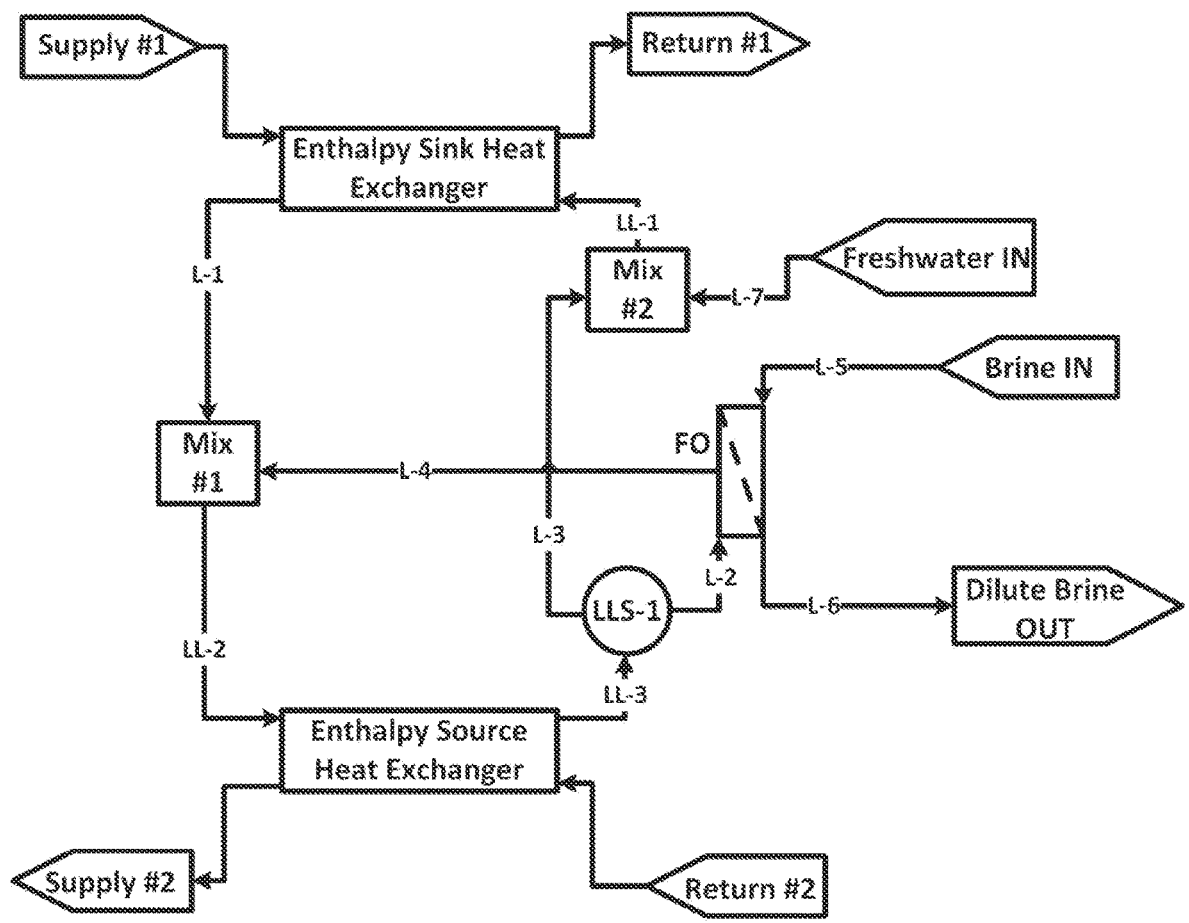
FIG. 14.

FIG. 14: FIG. 14 may comprise a liquid phase refrigeration cycle wherein solvent may be added and removed to drive liquid-liquid phase transitions to 'pump' heat, and wherein solvent removal may be conducted using forward osmosis. FIG. 14 may involve employing a solution with lesser osmotic pressure as an added solvent and a solution with greater osmotic pressure as a draw solution or organic Composition #2. FIG. 14 may involve a lesser osmotic pressure solution which is naturally sourced or externally regenerated and/or a greater osmotic pressure solution which is naturally sourced or externally regenerated. Said lesser osmotic pressure solution may be treated with one or more treatment processes, such as membrane processes, reverse osmosis, nanofiltration, filtration, UV, or other processes described herein, or other liquid treatment processes known in the art, before being added. For example, said treatment may be conducted to remove contaminants which may accumulate or may impact or may be detrimental to the operation of the refrigeration cycle if not removed or remediated or reduced.

Figure 15:
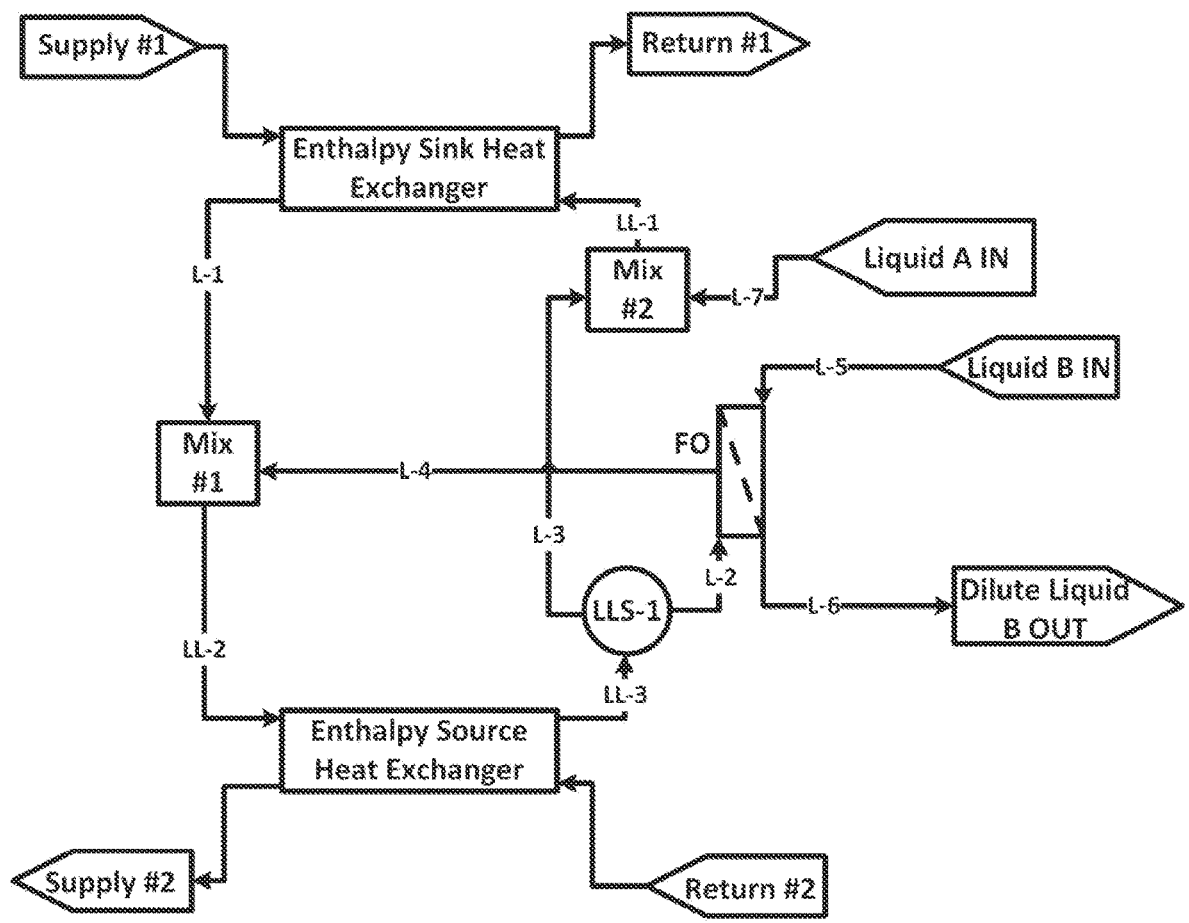
FIG. 15.

FIG. 15: FIG. 15 may be the same as FIG. 14, except the added solvent added to the refrigeration cycle may comprise reagents other than water or reagents in addition to water.

Figure 16:
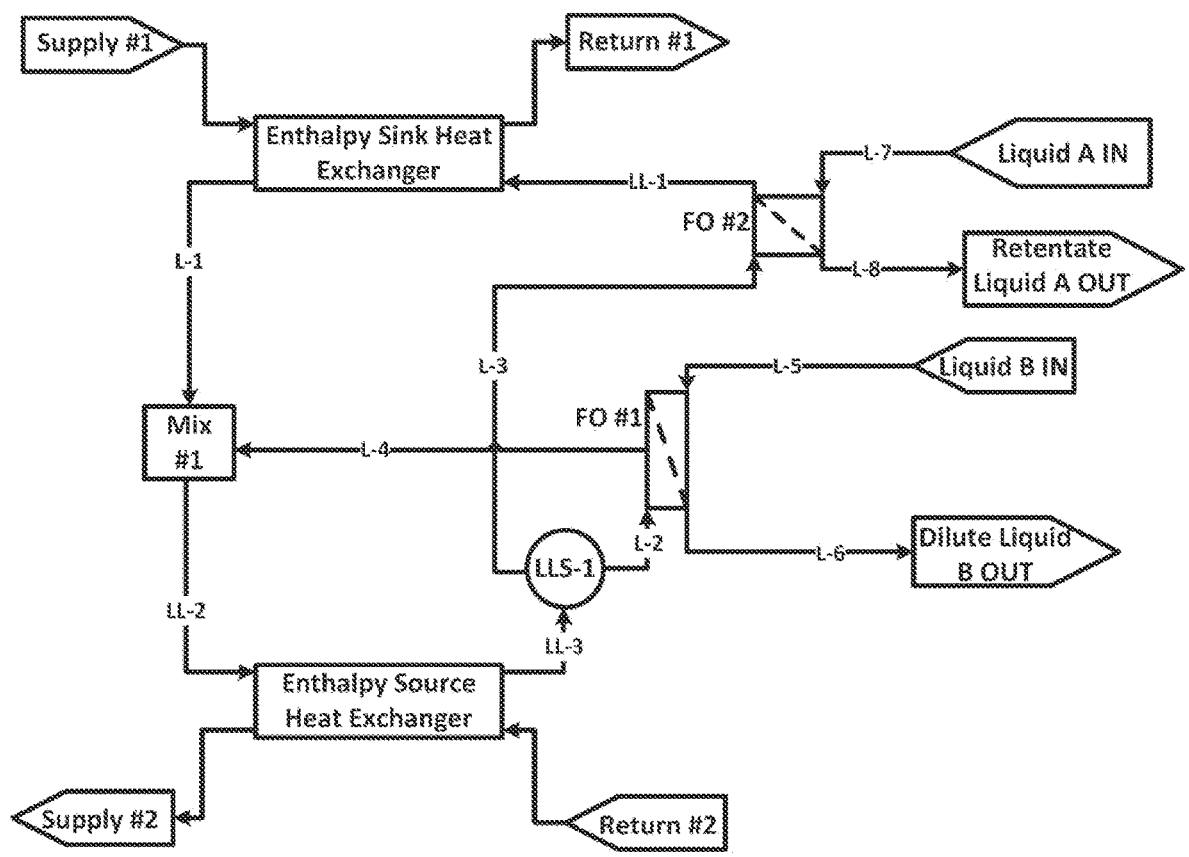
FIG. 16.

FIG. 16: FIG. 16 may be the same as FIG. 14 or FIG. 15, except may further comprise adding the added solvent by employing organic Composition #1 as a draw solution in a forward osmosis or osmotically assisted reverse osmosis step.

Figure 17:
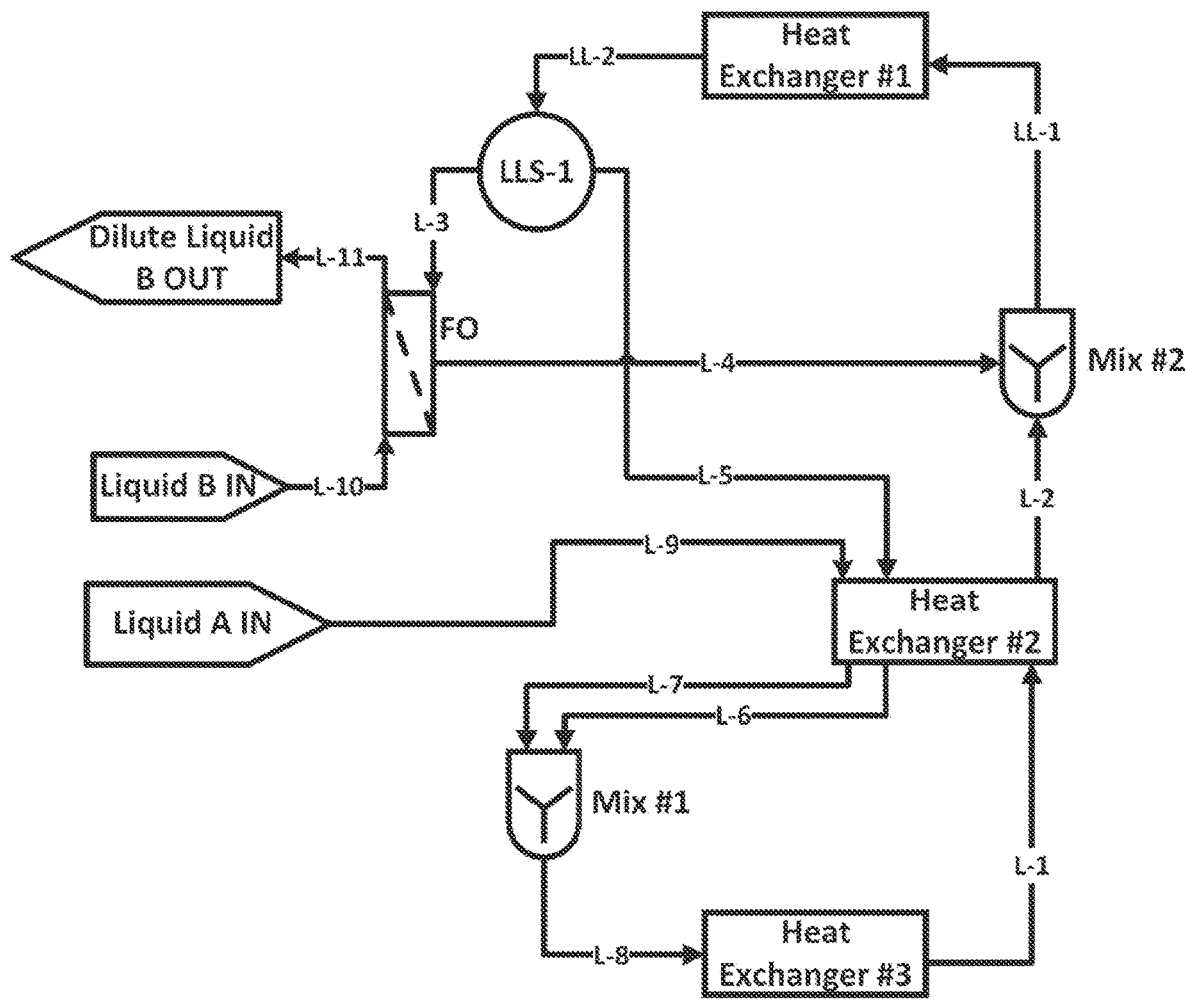
FIG. 17.

FIG. 17: FIG. 17 may comprise a liquid phase refrigeration cycle wherein solvent may be added and removed to drive liquid-liquid phase transitions to 'pump' heat, and wherein solvent removal may be conducted using forward osmosis. FIG. 17 may involve employing a solution with lesser osmotic pressure as an added solvent and a solution with greater osmotic pressure as a draw solution or organic Composition #2. FIG. 17 may involve a lesser osmotic pressure solution which is naturally sourced or externally regenerated and/or a greater osmotic pressure solution which is naturally sourced or externally regenerated. FIG. 17 may comprise a liquid phase refrigeration cycle employing a heat exchanger to generate or form or create two temperature zones. The refrigeration cycle may involve an endothermic liquid-liquid phase transition in the cold temperature zone and an exothermic liquid-liquid phase transition in the warm temperature zone. The temperature difference between the temperature zones may be greater than the temperature difference which may be generated by the adiabatic temperature difference generated by an enthalpy of liquid-liquid phase transition in the refrigeration cycle. It may be desirable for the adiabatic temperature difference generated by a enthalpy of liquid-liquid phase transition in the refrigeration cycle to be greater than the delta-T or approach temperature or temperature difference between the outputs of the heat exchange or a combination thereof. Said temperature zones may be interconnected by said heat exchanger. FIG. 17 may enable a liquid phase refrigeration cycle which may be capable of generating a temperature difference or pumping heat across a temperature difference greater than the temperature difference generated by the adiabatic temperature difference generated by a enthalpy of liquid-liquid phase transition in the refrigeration cycle.

Figure 18:
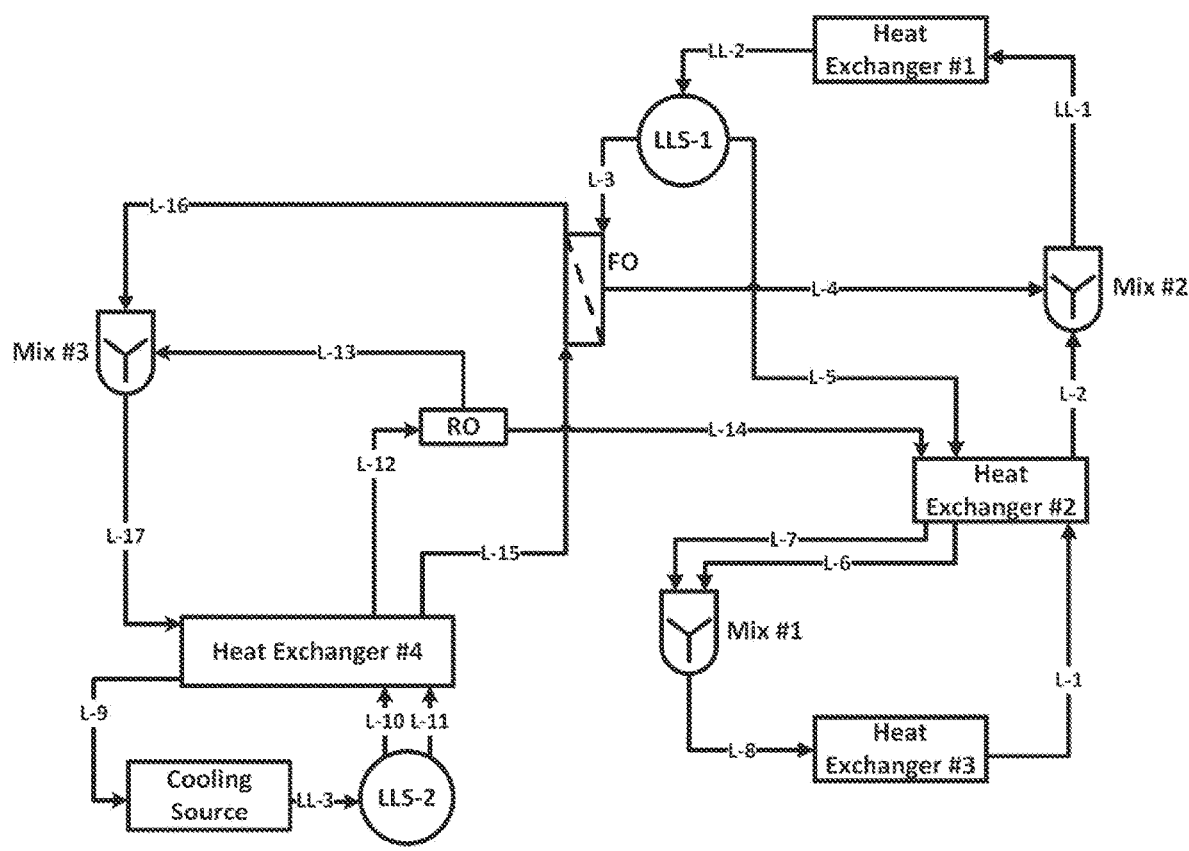
FIG. 18.

FIG. 18: FIG. 18 may be the same as FIG. 12, except employ a UCST based liquid-liquid phase transition regeneration in the Regeneration Portion. In FIG. 18, Organic Composition #2 may possess a UCST liquid-liquid phase transition. In FIG. 18, Organic Composition #1 may possess a LCST liquid-liquid phase transition.

Figure 19:
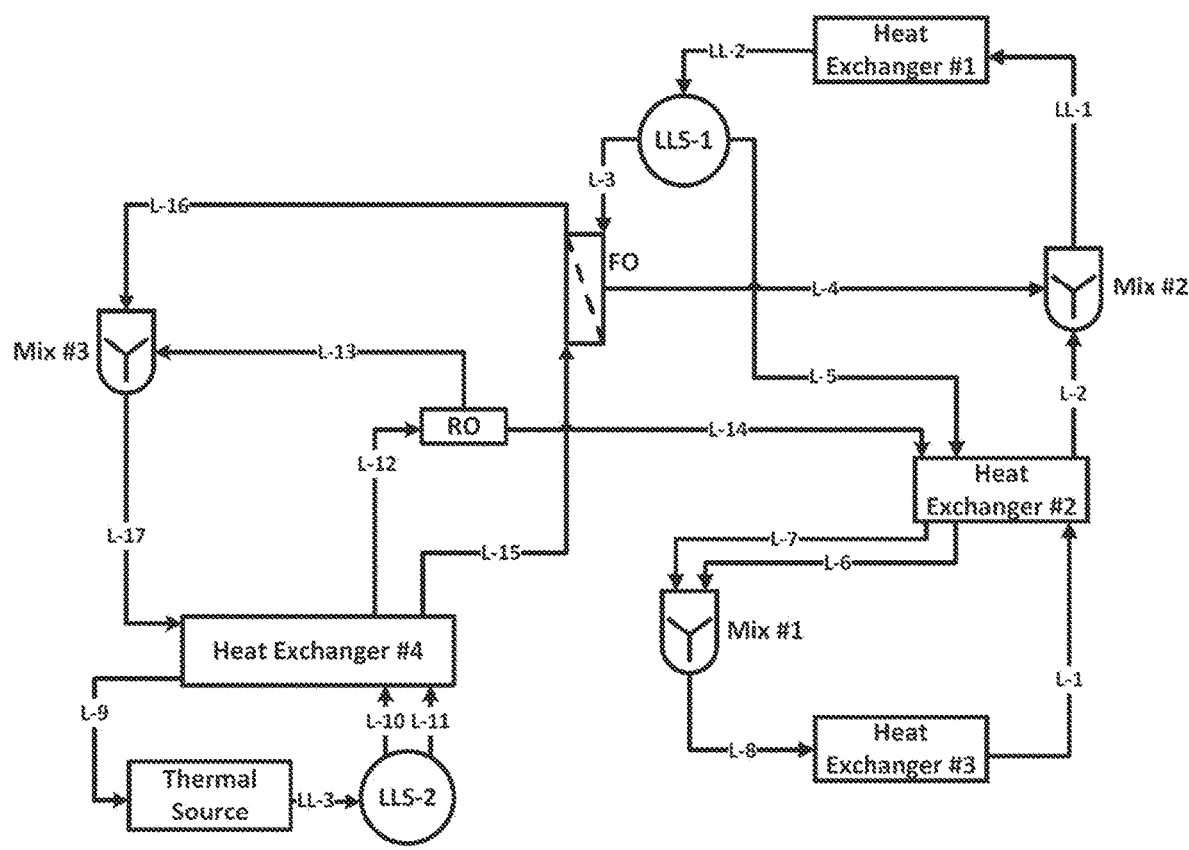
FIG. 19.

FIG. 19: FIG. 19 may be the same as FIG. 12, except employ a UCST based liquid-liquid phase transition in the Refrigeration Cycle Portion. In FIG. 19, Organic Composition #1 may possess a UCST liquid-liquid phase transition. In FIG. 19, Organic Composition #2 may possess a LCST liquid-liquid phase transition.

Figure 20:
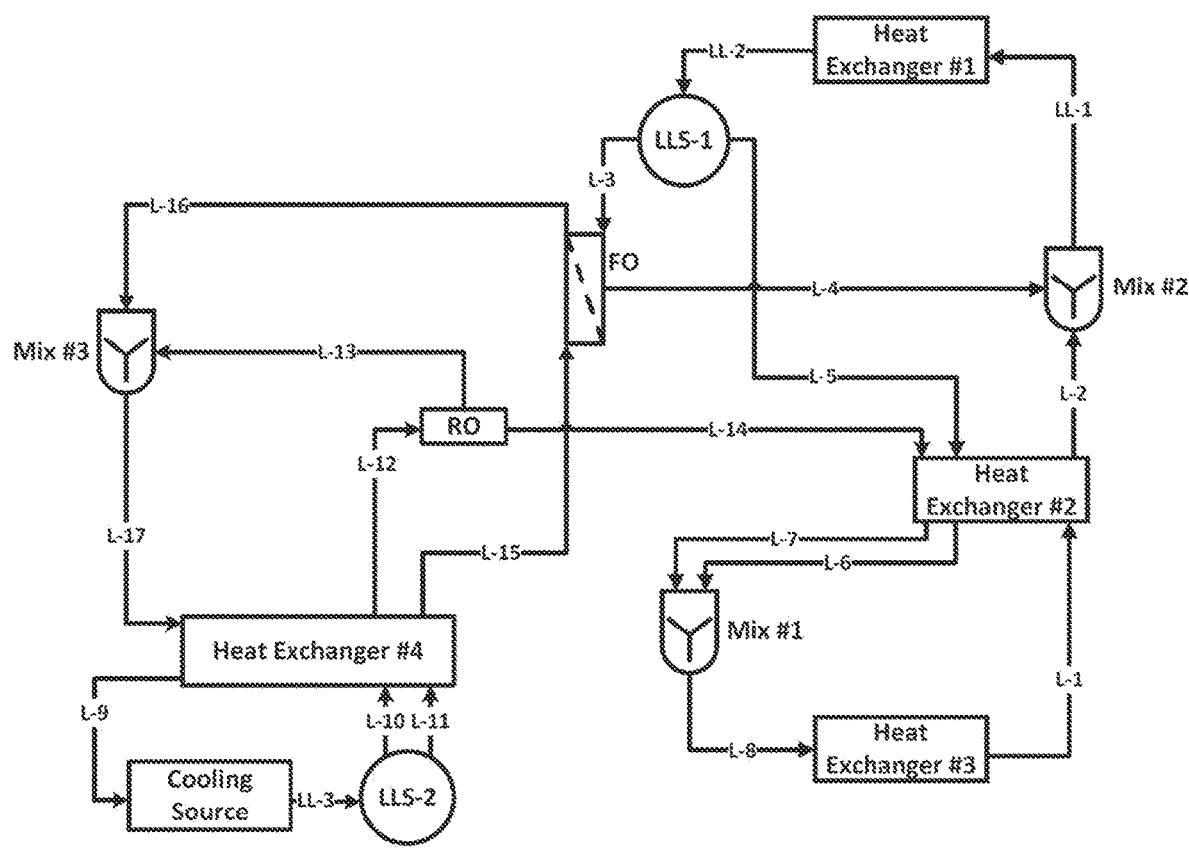
FIG. 20.

FIG. 20: FIG. 20 may be the same as FIG. 12, except employ a UCST based liquid-liquid phase transition in the Refrigeration Cycle Portion and a UCST based liquid-liquid phase transition in the Regeneration Portion. In FIG. 20, Organic Composition #1 may possess a UCST liquid-liquid phase transition and Organic Composition #2 may possess a UCST liquid-liquid phase transition.

Figure 21:
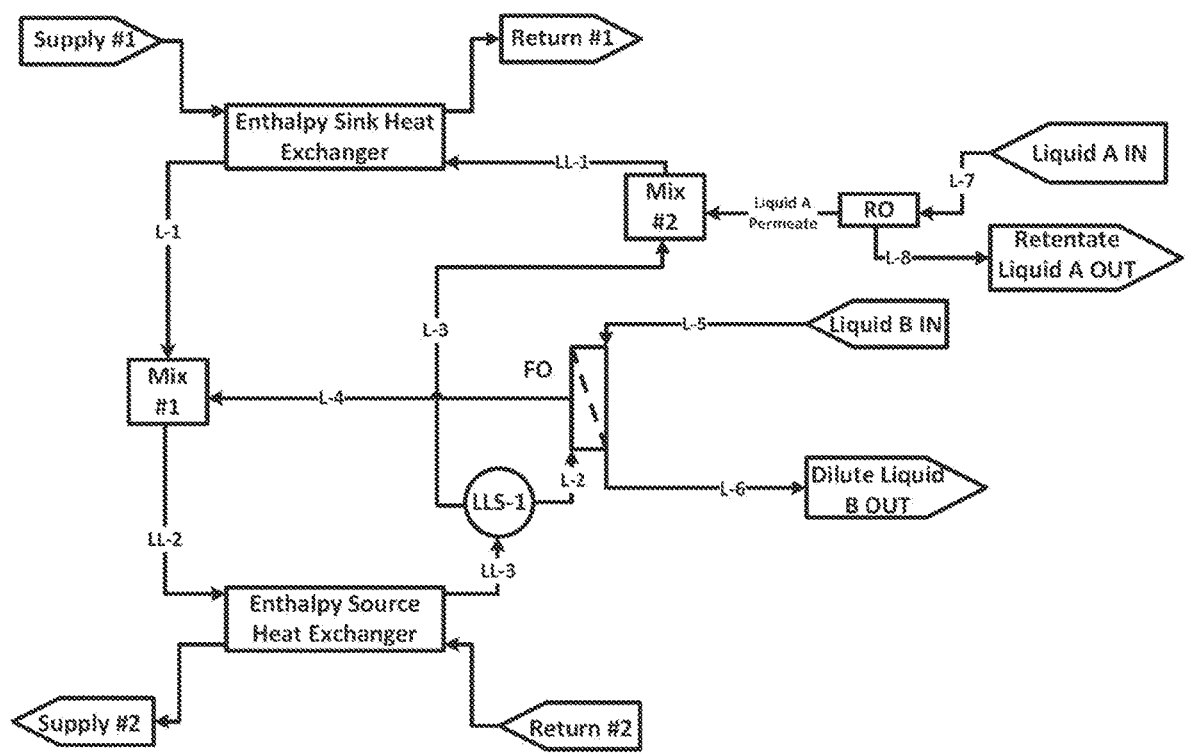
FIG. 21.

FIG. 21: FIG. 21 be the same as FIG. 16, except shows Liquid A undergoing a treatment step (RO) before Liquid A is added to the process.

Figure 22:
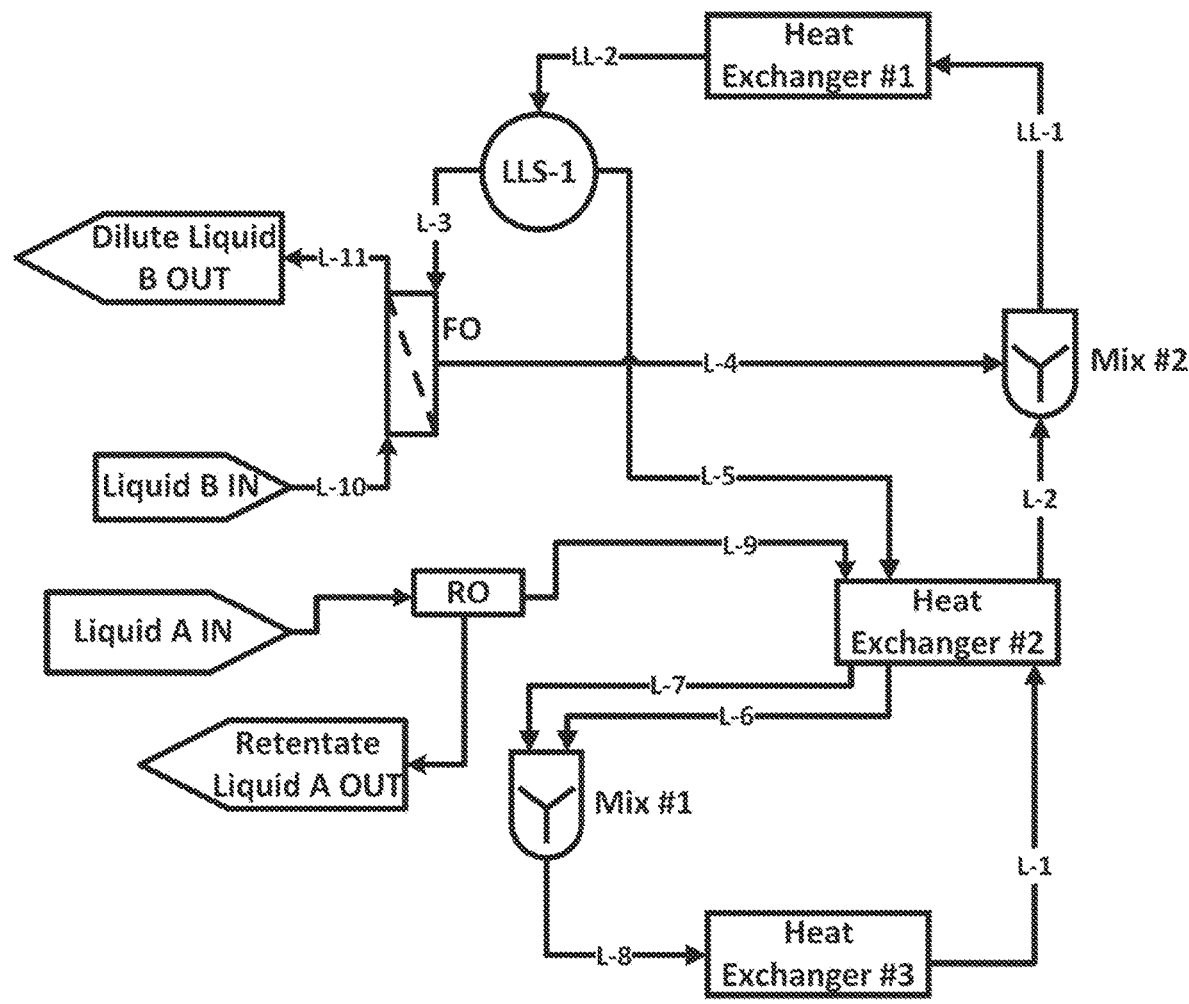
FIG. 22.

FIG. 22: FIG. 22 be the same as FIG. 17, except shows Liquid A undergoing a treatment step (RO) before Liquid A is added to the process.

Definitions

Organic Composition #1: Organic Composition #1 comprises the organic or liquid-liquid phase transition component or a combination thereof of the 'Refrigeration Cycle Portion'.

Organic Composition #2: Organic Composition #2 comprises the organic or liquid-liquid phase transition component or a combination thereof of the 'Regeneration Portion'. Organic Composition #2 may also be described as 'draw solution reagent' when described in the context of the Regeneration Portion of the process. Alternatively, Organic Composition #2 may simply comprise a draw solution employed to remove solvent from the refrigeration cycle in, for example, Forward Osmosis, Osmotically Assisted Reverse Osmosis, or another membrane based process, or another process, or a combination thereof.

Regeneration Portion: Regeneration Portion may comprise components and reagents in the process related to adding solvent, or removing solvent, or regenerating removed solvent, or regenerating draw solution for the removal of solvent, or a combination thereof.

Refrigeration Cycle Portion: Refrigeration Cycle Portion may comprise components and reagents in the process related to moving or pumping heat or absorbing heat and releasing heat between two different locations or initiating exothermic or endothermic phase transitions due to concentration adjustment or a combination thereof.

Regenerated Solvent: May comprise liquid which permeable and/or transferrable into the Refrigeration Cycle Portion. Regenerated Solvent may include, but is not limited to, water, or low molecular weight organic solvent, or ammonia, or amine, or a combination thereof. Regenerated Solvent may also be referred to as solvent or permeate or added solvent or a mostly water solution.

Single Liquid Phase Combined Solution: May comprise a solution of Organic Composition #1 dissolved in water or an aqueous solution or solvent, or Organic Composition #2 dissolved in water or an aqueous solution or solvent, or a combination thereof.

Multi-Liquid Phase Mixture: May comprise a mixture of liquid phases. May comprise a mixture of liquid phases, wherein at least one liquid phase comprises mostly Organic Composition #1 or Organic Composition #2, and/or at least one liquid phase comprises mostly water or aqueous solution or solvent.

LCST: May involve a liquid composition which undergoes an exothermic phase transition when transforming from two liquid phases to a single liquid phase and an endothermic phase transition when transforming from a single liquid phase to two liquid phases.

UCST: May involve a liquid composition which undergoes an exothermic phase transition when transforming from a single liquid phase to two liquid phases and an endothermic phase transition when transforming from two liquid phases to a single liquid phase.

'Salting-Out' Reagent: May comprise a salt or an organic or a combination thereof. May also be described as phase transition temperature adjustment reagent.

Example desirable properties of salts may include, but are not limited to, one or more or a combination of the following:

Capability to reduce phase transition temperature or salt out Organic Composition #1 with minimal salt concentration or osmotic pressure.

Insoluble or minimally soluble or only partial solubility or a combination thereof in Organic Composition #1 and/or Organic Composition #2.

Ratio of phase transition temperature adjustment relative to salt concentration or osmotic pressure of salt in solution Enthalpy of phase transition Organic Composition #1 when a liquid-liquid phase transition is driven by 'salting out' or phase transition temperature adjustment Concentration of residual Organic Composition #1 and/or Organic Composition #2 after 'salting out'

Chemical compatibility with other reagents and/or materials and/or equipment in the process Example desirable properties of organics may include Capability to reduce phase transition temperature or salt out Organic Composition #1 with minimal salt concentration or osmotic pressure.

Insoluble or minimally soluble or only partial solubility or a combination thereof in Organic Composition #1 and/or Organic Composition #2.

Ratio of phase transition temperature adjustment relative to salt concentration or osmotic pressure of salt in solution Enthalpy of phase transition Organic Composition #1 when a liquid-liquid phase transition is driven by 'salting out' or phase transition temperature adjustment Concentration of residual Organic Composition #1 and/or Organic Composition #2 after 'salting out'

Chemical compatibility with other reagents and/or materials and/or equipment in the process.

Step-by-Step Descriptions

FIG. 9:

Refrigeration Cycle Portion:

1A—Mixing Reagents to Form Endothermic Phase Transition: A solution comprising mostly single liquid phase combined solution (L-1) may be mixed with a solution concentrated in 'salting-out' reagent or phase transition temperature adjustment reagent (L-4) in a mixing device (Mix #1). Said mixing of L-4 and L-1 may result in an endothermic liquid-liquid phase transition into a multi-liquid phase mixture. L-4 may dissolve in the aqueous component of L-1, which may result in Organic Composition #1 becoming at least partially insoluble and/or forming a separate liquid phase in a liquid-liquid phase transition. A resulting multi-liquid phase mixture (LL-2) may comprise a mostly Organic Composition #1 liquid phase and an aqueous dilute 'salting-out' reagent or mostly phase transition temperature adjustment reagent liquid phase. The previously described liquid-liquid phase transition may be endothermic and may result in the temperature of LL-2 being less than the mean temperature of L-1 and L-4. In some embodiments, step 1A and step 2A may be combined. For example, in some embodiments, Mix #1 may be combined with the Enthalpy Source Heat Exchanger.

2A—Heat Absorbing Heat Exchange: LL-2 may be heat exchanged (Enthalpy Source Heat Exchanger) with a heat source or an application requiring cooling or an enthalpy source or a combination thereof. LL-2 may absorb heat from or 'cool' said heat source or an application requiring cooling or an enthalpy source or a combination thereof, while said heat source or an application requiring cooling or an enthalpy source or a combination thereof may be cooled or supply heat to LL-2. Depending on the liquid state of LL-2, the temperature of LL-2, the temperature of the Enthalpy Heat Source Heat Exchanger, and phase transition properties of LL-2, LL-2 may absorb heat in the Enthalpy Heat Source Heat Exchanger due to an enthalpy of liquid-liquid phase transition, or specific heat capacity due to an enthalpy of phase transition, or specific heat capacity or a combination thereof. LL-2 may exit the Enthalpy Source Heat Exchanger at a greater enthalpy or temperature or a combination thereof state and/or may comprise at least a portion a multi-liquid phase solution (LL-3).

3A—Liquid-Liquid Separation: LL-3 may be separated into two separate liquid streams using a liquid-liquid separation device (LLS-1). One of the two liquid phases may comprise a mostly organic liquid phase (L-3), such as mostly Organic Composition #1. One of the liquid phases may comprise mostly aqueous dilute 'salting-out' reagent or mostly phase transition temperature adjustment reagent solution (L-2).

4A—Forward Osmosis Concentrating: Mostly aqueous dilute 'salting-out' reagent or mostly phase transition temperature adjustment reagent solution (L-2) may be fed into a forward osmosis or osmotically assisted reverse osmosis or a combination thereof system (FO). L-2 may function as a feed solution, while L-9, which may comprise mostly organic Composition #2, may function as a draw solution. A portion of water or other permeable solvent in L-2 may permeate from L-2 to L-9 across a semi-permeable membrane, while 'Salting-out' reagent or phase transition temperature adjustment reagent in L-2 may be rejected by said membrane. FO may concentrate L-2 into a retentate solution comprising a concentrated solution of salting-out reagent or phase transition temperature adjustment reagent (L-4). FO may dilute L-9 into a diluted solution of organic Composition #2 (L-5), which may have been diluted by FO permeate, which may comprise water and/or other solvent permeate.

5A—Mixing Reagents to Form Exothermic Phase Transition: L-3, which may comprise a liquid phase comprising mostly organic Composition #1, may be mixed with a solution comprising mostly water, L-10, in a mixing device, Mix #2, forming LL-1. L-10 may be purified to remove residual organic Composition #2 and/or other potential contaminants from the Regeneration Portion before or during Mix #2. Depending on the liquid-liquid phase transition temperature range, the temperature of L-10 and L-3, and the enthalpy of the liquid-liquid phase transition, LL-1 may comprise a multi-liquid phase mixture, or a multi-liquid phase mixture with some L-3 dissolved in L-10, or a single liquid phase combined solution. In some embodiments, step 5A and step 6A may be combined. For example, in some embodiments, Mix #2 may be combined with the Enthalpy Sink Heat Exchanger.

6A—Heat Releasing Heat Exchange: LL-1 may be heat exchanged with an application requiring heating, a heat sink, or a combination thereof using a heat exchanger (Enthalpy Sink Heat Exchanger). LL-1 may release heat to said application requiring heating, a heat sink, or a combination thereof, while said application requiring heating, a heat sink, or a combination thereof may cool LL-1. Depending on the liquid state of LL-1, the temperature of LL-1, the temperature of the Enthalpy Heat Sink Heat Exchanger, and phase transition properties of LL-1, LL-1 may release heat in the Enthalpy Heat Sink Heat Exchanger due to an enthalpy of liquid-liquid phase transition, or specific heat capacity due to an enthalpy of phase transition, or specific heat capacity or a combination thereof. LL-1 may exit the Enthalpy Sink Heat Exchanger at a lower enthalpy or temperature or a combination thereof state and may comprise at least a portion a single liquid phase combined solution (L-1).

Regeneration Portion:

1B—Preheating Diluted Draw Solution in Heat Exchange: 'Cold' diluted Organic Composition #2 draw solution (L-5) may be preheated in a heat exchange (Heat Exchanger #3) with 'warm' mostly Organic Composition #2 liquid phase (L-7) and 'warm' mostly water or other solvent liquid phase (L-8). The pre-heated L-5 (L-6) which may result from the heat exchange in Heat Exchanger #3 may be near, or at, or below or above a liquid-liquid phase transition temperature range of L-6.

2B—Liquid-Liquid Phase Transition into Multi-Liquid Phase Mixture: L-6 may be further heated by a heat source (Thermal Source). In Thermal Source, L-6 may be heated such that it undergoes a liquid-liquid phase transition into a multi-liquid phase mixture, LL-4. LL-4 may be near, or at, or above a liquid-liquid phase transition temperature range of L-6.

3B—Liquid-Liquid Separation: LL-4 may be separated into non-contiguously separate liquid phases (L-7 and L-8) using a liquid-liquid separation device, LLS-2. L-7 and L-8 may comprise the constituent liquid phases of LL-4. L-7 may comprise mostly Organic Composition #2 and L-8 may comprise mostly water or other solvent or a combination thereof 4B—Cooling Separated Liquid Phases in Heat Exchange: 'Warm' L-7 and L-8 may be heat exchanged with 'Cold' L-5 in a heat exchange (Heat Exchanger #3), which may result in cooler temperature L-7 and L-8 (L-9 and L-10) and warmer temperature L-5 (L-6). L-7 and L-8 may be heat exchanged as separate liquid phases to, for example, prevent L-7 and/or L-8 from dissolving in each other, as they may be cooled below a liquid-liquid phase transition temperature while heat exchanged in Heat Exchanger #3. If desirable, L-9 or L-10 may be further cooled before FO and/or Mix #2. Said further cooling, may include, but is not limited to, one or more or a combination of the following: heat exchange cooling, evaporative cooling, or wet surface air heat exchanger cooling. L-9 may be transferred to step 4A and L-10 may be transferred to Step 5A.

FIG. 10:

Refrigeration Cycle Portion:

1A—Mixing Reagents to Form Endothermic Phase Transition: A solution comprising mostly single liquid phase combined solution (L-1) may be mixed with a solution concentrated in 'salting-out' reagent or phase transition temperature adjustment reagent (L-4) in a mixing device (Mix #1). Said mixing of L-4 and L-1 may result in an endothermic liquid-liquid phase transition into a multi-liquid phase mixture. L-4 may dissolve in the aqueous component of L-1, which may result in Organic Composition #1 becoming at least partially insoluble and/or forming a separate liquid phase in a liquid-liquid phase transition. A resulting multi-liquid phase mixture (LL-2) may comprise a mostly Organic Composition #1 liquid phase and a mostly aqueous dilute 'salting-out' reagent liquid phase or mostly phase transition temperature adjustment reagent liquid phase. The previously described liquid-liquid phase transition may be endothermic and may result in the temperature of LL-2 being less than the mean temperature of L-1 and L-4. In some embodiments, step 1A and step 2A may be combined. For example, in some embodiments, Mix #1 may be combined with the Enthalpy Source Heat Exchanger.

2A—Heat Absorbing Heat Exchange: LL-2 may be heat exchanged (Enthalpy Source Heat Exchanger) with a heat source or an application requiring cooling or an enthalpy source or a combination thereof. LL-2 may absorb heat from or 'cool' said heat source or an application requiring cooling or an enthalpy source or a combination thereof, while said heat source or an application requiring cooling or an enthalpy source or a combination thereof may be cooled or supply heat to LL-2. Depending on the liquid state of LL-2, the temperature of LL-2, the temperature of the Enthalpy Heat Source Heat Exchanger, and phase transition properties of LL-2, LL-2 may absorb heat in the Enthalpy Heat Source Heat Exchanger due to an enthalpy of liquid-liquid phase transition, or specific heat capacity due to an enthalpy of phase transition, or specific heat capacity or a combination thereof. LL-2 may exit the Enthalpy Source Heat Exchanger at a greater enthalpy or temperature or a combination thereof state and/or may comprise at least a portion a multi-liquid phase solution (LL-3).

3A—Liquid-Liquid Separation: LL-3 may be separated into two separate liquid streams using a liquid-liquid separation device (LLS-1). One of the two liquid phases may comprise a mostly organic liquid phase (L-3), such as mostly Organic Composition #1. One of the liquid phases may comprise mostly aqueous dilute 'salting-out' reagent or mostly phase transition temperature adjustment reagent solution (L-2).

4A—Forward Osmosis Concentrating: Mostly aqueous dilute 'salting-out' reagent or mostly phase transition temperature adjustment reagent solution (L-2) may be fed into a forward osmosis or osmotically assisted reverse osmosis or a combination thereof system (FO). L-2 may function as a feed solution, while L-10, which may comprise mostly organic Composition #2, may function as a draw solution. A portion of water or other permeable solvent in L-2 may permeate from L-2 to L-10 across a semi-permeable membrane, while 'salting-out' reagent or phase transition temperature adjustment reagent in L-2 may be rejected by said membrane. FO may concentrate L-2 into a retentate solution comprising a concentrated solution of 'salting-out' reagent or phase transition temperature adjustment reagent (L-4). FO may dilute L-10 into a diluted solution of organic Composition #2 (L-5), which may have been diluted by FO permeate, which may comprise water and/or other solvent permeate.

5A—Mixing Reagents to Form Exothermic Phase Transition: L-3, which may comprise mostly organic Composition #1, may be mixed with a solution comprising mostly water, L-13, in a mixing device, Mix #2, forming LL-1. Depending on the liquid-liquid phase transition temperature range, the temperature of L-13 and L-3, and the enthalpy of the liquid-liquid phase transition, LL-1 may comprise a multi-liquid phase mixture, or a multi-liquid phase mixture with some L-3 dissolved in L-13, or a single liquid phase combined solution. In some embodiments, step 5A and step 6A may be combined. For example, in some embodiments, Mix #2 may be combined with the Enthalpy Sink Heat Exchanger.

6A—Heat Releasing Heat Exchange: LL-1 may be heat exchanged with an application requiring heating, a heat sink, or a combination thereof using a heat exchanger (Enthalpy Sink Heat Exchanger). LL-1 may release heat to said application requiring heating, a heat sink, or a combination thereof, while said application requiring heating, a heat sink, or a combination thereof may cool LL-1. Depending on the liquid state of LL-1, the temperature of LL-1, the temperature of the Enthalpy Heat Sink Heat Exchanger, and phase transition properties of LL-1, LL-1 may release heat in the Enthalpy Heat Sink Heat Exchanger due to an enthalpy of liquid-liquid phase transition, or specific heat capacity due to an enthalpy of phase transition, or specific heat capacity or a combination thereof. LL-1 may exit the Enthalpy Sink Heat Exchanger at a lower enthalpy or temperature or a combination thereof state and may comprise at least a portion a single liquid phase combined solution (L-1).

Regeneration Portion:

1B—Mixing Diluted Draw Solution with Recovered Residual Organic Composition #2 from RO: 'Cold' diluted Organic Composition #2 draw solution (L-5) may be mixed with an aqueous retentate solution (L-12) from 'RO' comprising residual organic Composition #2 recovered from L-11 in a mixing device (Mix #3). Said mixing of L-5 and L-12 in Mix #3 may result in a combined solution of L-5 and L-12 (L-6). If desirable, L-6 may comprise a more dilute concentration of organic Composition #2 compared to L-5. If desirable, L-12 and L-6 may contain liquid-liquid phase transition facilitator reagents, or 'salting-out' reagents, or phase transition temperature adjustment reagents or a combination thereof to, for example, facilitate liquid-liquid phase transition and/or liquid-liquid separation in, for example, step 2B, or 3B, or 4B, or a combination thereof. If desirable, said liquid-liquid phase transition facilitator reagents, or 'salting-out' reagents, or phase transition temperature adjustment reagents or a combination thereof may be rejected by RO in step 6B and may, if desirable, be separate from reagents employed in the Refrigeration Cycle Portion.

2B—Preheating Diluted Draw Solution in Heat Exchange: L-6 may be preheated in a heat exchange (Heat Exchanger #3) with 'warm' mostly Organic Composition #2 liquid phase (L-8) and 'warm' mostly water or other solvent liquid phase (L-9). The preheated L-6 (L-7) which may result from the heat exchange in Heat Exchanger #3, may be near, or at, or below or above a liquid-liquid phase transition temperature range of L-7.

3B—Liquid-Liquid Phase Transition into Multi-Liquid Phase Mixture: L-7 may be further heated by a heat source (Thermal Source). In Thermal Source, L-7 may be heated such that it undergoes a liquid-liquid phase transition into a multi-liquid phase mixture, LL-4. LL-4 may be near, or at, or above a liquid-liquid phase transition temperature range of L-7.

4B—Liquid-Liquid Separation: LL-4 may be separated into non-contiguously separate liquid phases (L-8 and L-9) using a liquid-liquid separation device, LLS-2. L-8 and L-9 may comprise the constituent liquid phases of LL-4. L-8 may comprise mostly Organic Composition #2 and L-9 may comprise mostly water or other solvent or a combination thereof 5B—Cooling Separated Liquid Phases in Heat Exchange: 'Warm' L-8 and L-9 may be heat exchanged with 'Cold' L-6 in a heat exchanger (Heat Exchanger #3), which may result in cooler temperature L-8 and L-9 (L-10 and L-11) and warmer temperature L-6 (L-7). L-8 and L-9 may be heat exchanged as separate liquid phases to, for example, prevent L-8 and/or L-9 from dissolving in each other, as they may be cooled below a liquid-liquid phase transition temperature while heat exchanged in Heat Exchanger #3. If desirable, L-10 or L-11 may be further cooled before FO, RO, and/or Mix #2. Said further cooling, may include, but is not limited to, one or more or a combination of the following: heat exchange cooling, evaporative cooling, or wet surface air heat exchanger cooling. L-10 may be transferred to step 4A and L-11 may be transferred to Step 6B.

6B—Reverse Osmosis or Nanofiltration or Ultrafiltration Purification: L-11 may comprise mostly water or other solvent, although may contain residual reagents, which may include, but are not limited to: residual organic Composition #2 and/or phase transition facilitator reagents, or 'salting-out' reagents, or phase transition temperature adjustment reagents or a combination thereof. Said residual reagents may be separated from water and/or other solvent. For example, L-11 may comprise a feed solution to a membrane-based process, which may include, but is not limited to, reverse osmosis, or nanofiltration, or ultrafiltration, or forward osmosis, or osmotically assisted reverse osmosis, or a combination thereof process (RO). Said residual reagents may be at least in part rejected by said membrane based process. RO may separate L-11 into a water or other solvent permeate (L-13) and a retentate solution comprising a greater concentration of said residual reagents than L-11 (L-12). L-12 may be transferred to step 1B. L-13 may be transferred to step 5A.

FIG. 13:

Refrigeration Cycle Portion:

1A—Mixing Reagents to Form Endothermic Phase Transition: A solution comprising mostly single liquid phase combined solution (L-1) may be mixed with a solution concentrated in 'salting-out' reagent or phase transition temperature adjustment reagent (L-4) in a mixing device (Mix #1). Said mixing of L-4 and L-1 may result in an endothermic liquid-liquid phase transition into a multi-liquid phase mixture. L-4 may dissolves in the aqueous component of L-1, which may result in Organic Composition #1 becoming at least partially insoluble and/or forming a separate liquid phase in a liquid-liquid phase transition. A resulting multi-liquid phase mixture (LL-2) may comprise a mostly Organic Composition #1 liquid phase and a mostly aqueous dilute 'salting-out' reagent liquid phase or mostly phase transition temperature adjustment reagent liquid phase. The previously described liquid-liquid phase transition may be endothermic and may result in the temperature of LL-2 being less than the mean temperature of L-1 and L-4. In some embodiments, step 1A and step 2A may be combined. For example, in some embodiments, Mix #1 may be combined with the Enthalpy Source Heat Exchanger.

2A—Heat Absorbing Heat Exchange: LL-2 may be heat exchanged (Enthalpy Source Heat Exchanger) with a heat source or an application requiring cooling or an enthalpy source or a combination thereof. LL-2 may absorb heat from or 'cool' said heat source or an application requiring cooling or an enthalpy source or a combination thereof, while said heat source or an application requiring cooling or an enthalpy source or a combination thereof may be cooled or supply heat to LL-2. Depending on the liquid state of LL-2, the temperature of LL-2, the temperature of the Enthalpy Heat Source Heat Exchanger, and phase transition properties of LL-2, LL-2 may absorb heat in the Enthalpy Heat Source Heat Exchanger due to an enthalpy of liquid-liquid phase transition, or specific heat capacity due to an enthalpy of phase transition, or specific heat capacity or a combination thereof. LL-2 may exit the Enthalpy Source Heat Exchanger at a greater enthalpy or temperature or a combination thereof state and/or may comprise at least a portion a multi-liquid phase solution (LL-3).

3A—Liquid-Liquid Separation: LL-3 may be separated into two separate liquid streams using a liquid-liquid separation device (LLS-1). One of the two liquid phases may comprise a mostly organic liquid phase (L-3), such as mostly Organic Composition #1. One of the liquid phases may comprise mostly aqueous dilute 'salting-out' reagent or mostly phase transition temperature adjustment reagent solution (L-2).

4A—Forward Osmosis Concentrating: Mostly aqueous dilute 'salting-out' reagent or mostly phase transition temperature adjustment reagent solution (L-2) may be fed into a forward osmosis or osmotically assisted reverse osmosis or a combination thereof system (FO #1). L-2 may function as a feed solution, while L-10, which may comprise mostly organic Composition #2, may function as a draw solution. A portion of water or other permeable solvent in L-2 may permeate from L-2 to L-10 across a semi-permeable membrane, while 'salting-out' reagent or phase transition temperature adjustment reagent in L-2 may be rejected by said membrane. FO #1 may concentrate L-2 into a retentate solution comprising a concentrated solution of 'salting-out' reagent or phase transition temperature adjustment reagent (L-4). FO #1 may dilute L-10 into a diluted solution of organic Composition #2 (L-5), which may have been diluted by FO permeate, which may comprise water and/or other solvent permeate.

5A—FO Mixing Reagents to form Exothermic Phase Transition: L-3, which may comprise a liquid phase comprising mostly organic Composition #1, may comprise a draw solution in a forward osmosis, or osmotically assisted reverse osmosis, or combination thereof process (FO #2). A solution comprising mostly water, L-11 may comprise a feed solution. L-3 may draw water or other permeable solvent from L-11 across a membrane, while said membrane may reject non-permeable residual reagents. During FO #2, L-3 may be diluted to form LL-1 or L-1, which may comprise an exothermic liquid-liquid phase transition. During FO #2, residual reagents in L-11 may be concentrated to form retentate L-12. The present step may enable water to be transferred or returned or recovered from the Regeneration Portion to the Refrigeration Cycle Portion while preventing the contamination of the Refrigeration Cycle Portion with reagents from the Regeneration Portion. Advantageously, the present step may enable water to be transferred or returned or recovered from the Regeneration Portion to the Refrigeration Cycle portion while preventing the contamination of the Refrigeration Cycle Portion with reagents from the Regeneration Portion and utilizing a passive or non-valuable energy consuming process. In the present embodiment, it may be desirable to combine step 5A and step 6A. For example, FO #2 may be integrated with the Enthalpy Sink Heat Exchanger, which may enable L-3 to be cooled at or below its liquid-liquid phase transition temperature range to enable its operation as a draw solution.

6A—Heat Releasing Heat Exchange: LL-1 may be heat exchanged with an application requiring heating, a heat sink, or a combination thereof using a heat exchanger (Enthalpy Sink Heat Exchanger). LL-1 may release heat to said application requiring heating, a heat sink, or a combination thereof, while said application requiring heating, a heat sink, or a combination thereof may cool LL-1. Depending on the liquid state of LL-1, the temperature of LL-1, the temperature of the Enthalpy Heat Sink Heat Exchanger, and phase transition properties of LL-1, LL-1 may release heat in the Enthalpy Heat Sink Heat Exchanger due to an enthalpy of liquid-liquid phase transition, or specific heat capacity due to an enthalpy of phase transition, or specific heat capacity or a combination thereof. LL-1 may exit the Enthalpy Sink Heat Exchanger at a lower enthalpy or temperature or a combination thereof state and may comprise at least a portion a single liquid phase combined solution (L-1).

Regeneration Portion:

1B—Mixing Diluted Draw Solution with Recovered Residual Organic Composition #2 from FO #2: 'Cold' diluted Organic Composition #2 draw solution (L-5) may be mixed with an aqueous retentate solution (L-12) from 'FO #2' comprising residual organic Composition #2 recovered from L-11, in a mixing device (Mix #3). Said mixing of L-5 and L-12 in Mix #3 may result in a combined solution of L-5 and L-12 (L-6). If desirable, L-6 may comprise a more dilute concentration of organic Composition #2 compared to L-5. If desirable, L-12 and L-6 may contain liquid-liquid phase transition facilitator reagents, or 'salting-out' reagents, or phase transition temperature adjustment reagents or a combination thereof to, for example, facilitate liquid-liquid phase transition and/or liquid-liquid separation in, for example, step 2B, or 3B, or 4B, or a combination thereof. If desirable, said liquid-liquid phase transition facilitator reagents, or 'salting-out' reagents, or phase transition temperature adjustment reagents or a combination thereof may be rejected by FO #2 in step 6B and may, if desirable, be separate from reagents employed in the Refrigeration Cycle Portion.

2B—Preheating Diluted Draw Solution in Heat Exchange: L-6 may be preheated in a heat exchange (Heat Exchanger #3) with 'warm' mostly Organic Composition #2 liquid phase (L-8) and 'warm' mostly water or other solvent liquid phase (L-9). The preheated L-6 (L-7) which may result from the heat exchange in Heat Exchanger #3, may be near, or at, or below or above a liquid-liquid phase transition temperature range of L-7.

3B—Liquid-Liquid Phase Transition into Multi-Liquid Phase Mixture: L-7 may be further heated by a heat source (Thermal Source). In Thermal Source, L-7 may be heated such that it undergoes a liquid-liquid phase transition into a multi-liquid phase mixture, LL-4. LL-4 may be near, or at, or above a liquid-liquid phase transition temperature range of L-7.

4B—Liquid-Liquid Separation: LL-4 may be separated into non-contiguously separate liquid phases (L-8 and L-9) using a liquid-liquid separation device, LLS-2. L-8 and L-9 may comprise the constituent liquid phases of LL-4. L-8 may comprise mostly Organic Composition #2 and L-9 may comprise mostly water or other solvent or a combination thereof 5B—Cooling Separated Liquid Phases in Heat Exchange: 'Warm' L-8 and L-9 may be heat exchanged with 'Cold' L-6 in a heat exchanger (Heat Exchanger #3), which may result in cooler temperature L-8 and L-9 (L-10 and L-11) and warmer temperature L-6 (L-7). L-8 and L-9 may be heat exchanged as separate liquid phases to, for example, prevent L-8 and/or L-9 from dissolving in each other, as they may be cooled below a liquid-liquid phase transition temperature while heat exchanged in Heat Exchanger #3. If desirable, L-10 or L-11 may be further cooled before FO, RO, and/or Mix #2. Said further cooling, may include, but is not limited to, one or more or a combination of the following: heat exchange cooling, evaporative cooling, or wet surface air heat exchanger cooling. L-10 may be transferred to step 4A and L-11 may be transferred to Step 5A.

FIG. 11:

Refrigeration Cycle Portion:

1A—Mixing Reagents to Form Endothermic Phase Transition: A solution comprising mostly single liquid phase combined solution (L-2) may be mixed with a solution concentrated in 'salting-out' reagent or phase transition temperature adjustment reagent (L-4) in a mixing device (Mix #2). Said mixing of L-4 and L-2 may result in an endothermic liquid-liquid phase transition into a multi-liquid phase mixture. L-4 may dissolve in the aqueous component of L-2, which may result in Organic Composition #1 becoming at least partially insoluble and/or forming a separate liquid phase in a liquid-liquid phase transition. A resulting multi-liquid phase mixture (LL-1) may comprise a mostly Organic Composition #1 liquid phase and an aqueous dilute 'salting-out' reagent or mostly phase transition temperature adjustment reagent liquid phase. The previously described liquid-liquid phase transition may be endothermic and may result in the temperature of LL-1 being less than the mean temperature of L-2 and L-4. In some embodiments, step 1A and step 2A may be combined. For example, in some embodiments, Mix #2 may be combined with Heat Exchanger #1.

2A—Heat Absorbing Heat Exchange: LL-1 may be heat exchanged (Heat Exchanger #1) with a heat source or an application requiring cooling or an enthalpy source or a combination thereof. LL-1 may absorb heat from or 'cool' said heat source or an application requiring cooling or an enthalpy source or a combination thereof, while said heat source or an application requiring cooling or an enthalpy source or a combination thereof may be cooled or supply heat to LL-1. Depending on the liquid state of LL-1, the temperature of LL-1, the temperature of Heat Exchanger #1, and phase transition properties of LL-1, LL-1 may absorb heat in Heat Exchanger #1 due to an enthalpy of liquid-liquid phase transition, or specific heat capacity due to an enthalpy of phase transition, or specific heat capacity or a combination thereof. LL-1 may exit Heat Exchanger #1 at a greater enthalpy or temperature or a combination thereof state and/or may comprise at least a portion a multi-liquid phase solution (LL-2).

3A—Liquid-Liquid Separation: LL-2 may be separated into two separate liquid streams using a liquid-liquid separation device (LLS-1). One of the two liquid phases may comprise a mostly organic liquid phase (L-5), such as mostly Organic Composition #1. One of the liquid phases may comprise mostly aqueous dilute 'salting-out' reagent or mostly phase transition temperature adjustment reagent solution (L-3).

4A—Forward Osmosis Concentrating: Mostly aqueous dilute 'salting-out' reagent or mostly phase transition temperature adjustment reagent solution (L-3) may be fed into a forward osmosis or osmotically assisted reverse osmosis or a combination thereof system (FO). L-3 may function as a feed solution, while L-13, which may comprise mostly organic Composition #2, may function as a draw solution. A portion of water or other permeable solvent in L-3 may permeate from L-3 to L-13 across a semi-permeable membrane, while 'salting-out' reagent or phase transition temperature adjustment reagent in L-3 may be rejected by said membrane. FO may concentrate L-3 into a retentate solution comprising a concentrated solution of salting-out' reagent or phase transition temperature adjustment reagent (L-4). FO may dilute L-13 into a diluted solution of organic Composition #2 (L-14), which may have been diluted by FO permeate, which may comprise water and/or other solvent permeate.

5A—Heat Exchange to Heat L-5 and L-12 into 'Warm' Temperature Zone: 'Cold' liquid phase comprising mostly Organic Composition #1 (L-5) and a 'cold' liquid phase comprising mostly water or other solvent (L-12) may be heat exchanged (Heat Exchanger #2) with 'warm' mostly single liquid phase combined solution (L-1), which may result in 'warm' L-5 (L-6) and warm L-12 (L-7) and 'cold' L-1 (L-2). L-5 and L-12 may be non-contiguously separate liquid streams during Heat Exchanger #2 to, for example, prevent dissolution of L-5 into L-12 before or during Heat Exchanger #2. L-12 may be purified to remove residual organic Composition #2 and/or other potential contaminants from the Regeneration Portion before or during Heat Exchanger #2 or Mix #1.

6A—Mixing Reagents to Form Exothermic Phase Transition: L-6 may be mixed with L-7 in a mixing device, Mix #1, forming L-8. L-7 may be purified to remove residual organic Composition #2 and/or other potential contaminants from the Regeneration Portion before or during Mix #1. Depending on the liquid-liquid phase transition temperature range, the temperature of L-6 and L-7, and the enthalpy of the liquid-liquid phase transition, L-8 may comprise a multi-liquid phase mixture, or a multi-liquid phase mixture with some L-6 dissolved in L-7, or a single liquid phase combined solution.

7A—Heat Releasing Heat Exchange: L-8 may be heat exchanged with an application requiring heating, a heat sink, or a combination thereof using a heat exchanger (Heat Exchanger #3). L-8 may release heat to said application requiring heating, a heat sink, or a combination thereof, while said application requiring heating, a heat sink, or a combination thereof may cool L-8. Depending on the liquid state of L-8, the temperature of L-8, the temperature of the Heat Exchanger #3, and phase transition properties of L-8, L-8 may release heat in the Heat Exchanger #3 due to an enthalpy of liquid-liquid phase transition, or specific heat capacity due to an enthalpy of phase transition, or specific heat capacity or a combination thereof. L-8 may exit Heat Exchanger #3 at a lower enthalpy or temperature or a combination thereof state and may comprise at least a portion a single liquid phase combined solution (L-1).

8A—Heat Exchange to 'Cool' L-1 into 'Cold' Temperature Zone: 'Warm' mostly single liquid phase combined solution (L-1) may be heat exchanged (Heat Exchanger #2) with a 'cold' liquid phase comprising mostly Organic Composition #1 (L-5) and a 'cold' liquid phase comprising mostly water or other solvent (L-12), which may result in 'warm' L-5 (L-6) and warm L-12 (L-7) and 'cold' L-1 (L-2). L-5 and L-12 may be non-contiguously separate liquid streams during Heat Exchanger #2 to, for example, prevent dissolution of L-5 into L-12 before or during Heat Exchanger #2. L-12 may be purified to remove residual organic Composition #2 and/or other potential contaminants from the Regeneration Portion before or during Heat Exchanger #2 or Mix #1.

Regeneration Portion:

1B—Preheating Diluted Draw Solution in Heat Exchange: 'Cold' diluted Organic Composition #2 draw solution (L-14) may be preheated in a heat exchange (Heat Exchanger #4) with 'warm' mostly Organic Composition #2 liquid phase (L-11) and 'warm' mostly water or other solvent liquid phase (L-10). The pre-heated L-14 (L-9) which may result from the heat exchange in Heat Exchanger #3 may be near, or at, or below or above a liquid-liquid phase transition temperature range of L-9.

2B—Liquid-Liquid Phase Transition into Multi-Liquid Phase Mixture: L-9 may be further heated by a heat source (Thermal Source). In Thermal Source, L-9 may be heated such that it undergoes a liquid-liquid phase transition into a multi-liquid phase mixture, LL-3. LL-3 may be near, or at, or above a liquid-liquid phase transition temperature range of L-9.

3B—Liquid-Liquid Separation: LL-3 may be separated into non-contiguously separate liquid phases (L-10 and L-11) using a liquid-liquid separation device, LLS-2. L-10 and L-11 may comprise the constituent liquid phases of LL-3. L-11 may comprise mostly Organic Composition #2 and L-10 may comprise mostly water or other solvent or a combination thereof 4B—Cooling Separated Liquid Phases in Heat Exchange: 'Warm' L-10 and L-11 may be heat exchanged with 'Cold' L-14 in a heat exchange (Heat Exchanger #4), which may result in cooler temperature L-10 and L-11 (L-12 and L-13) and warmer temperature L-14 (L-9). L-10 and L-11 may be heat exchanged as separate liquid phases to, for example, prevent L-10 and/or L-11 from dissolving in each other, as they may be cooled below a liquid-liquid phase transition temperature while heat exchanged in Heat Exchanger #4. If desirable, L-12 or L-13 may be further cooled before contacting or exchanging with the Refrigeration Cycle Portion. For example, if desirable, L-12 or L-13 may be further cooled before Heat Exchanger #2 or FO. Said further cooling, may include, but is not limited to, one or more or a combination of the following: heat exchange cooling, evaporative cooling, or wet surface air heat exchanger cooling. L-12 may be transferred to step 5A and L-13 may be transferred to Step 4A.

FIG. 12:

Refrigeration Cycle Portion:

1A—Mixing Reagents to Form Endothermic Phase Transition: A solution comprising mostly single liquid phase combined solution (L-2) may be mixed with a solution concentrated in 'salting-out' reagent or phase transition temperature adjustment reagent (L-4) in a mixing device (Mix #2). Said mixing of L-4 and L-2 may result in an endothermic liquid-liquid phase transition into a multi-liquid phase mixture. L-4 may dissolve in the aqueous component of L-2, which may result in Organic Composition #1 becoming at least partially insoluble and/or forming a separate liquid phase in a liquid-liquid phase transition. A resulting multi-liquid phase mixture (LL-1) may comprise a mostly Organic Composition #1 liquid phase and a aqueous dilute 'salting-out' reagent or mostly phase transition temperature adjustment reagent liquid phase. The previously described liquid-liquid phase transition may be endothermic and may result in the temperature of LL-1 being less than the mean temperature of L-2 and L-4. In some embodiments, step 1A and step 2A may be combined. For example, in some embodiments, Mix #2 may be combined with Heat Exchanger #1.

2A—Heat Absorbing Heat Exchange: LL-1 may be heat exchanged (Heat Exchanger #1) with a heat source or an application requiring cooling or an enthalpy source or a combination thereof. LL-1 may absorb heat from or 'cool' said heat source or an application requiring cooling or an enthalpy source or a combination thereof, while said heat source or an application requiring cooling or an enthalpy source or a combination thereof may be cooled or supply heat to LL-1. Depending on the liquid state of LL-1, the temperature of LL-1, the temperature of Heat Exchanger #1, and phase transition properties of LL-1, LL-1 may absorb heat in Heat Exchanger #1 due to an enthalpy of liquid-liquid phase transition, or specific heat capacity due to an enthalpy of phase transition, or specific heat capacity or a combination thereof. LL-1 may exit Heat Exchanger #1 at a greater enthalpy or temperature or a combination thereof state and/or may comprise at least a portion a multi-liquid phase solution (LL-2).

3A—Liquid-Liquid Separation: LL-2 may be separated into two separate liquid streams using a liquid-liquid separation device (LLS-1). One of the two liquid phases may comprise a mostly organic liquid phase (L-5), such as mostly Organic Composition #1. One of the liquid phases may comprise mostly aqueous dilute 'salting-out' reagent or phase transition temperature adjustment reagent solution (L-3).

4A—Forward Osmosis Concentrating: Mostly aqueous dilute 'salting-out' reagent or mostly phase transition temperature adjustment reagent solution (L-3) may be fed into a forward osmosis or osmotically assisted reverse osmosis or a combination thereof system (FO). L-3 may function as a feed solution, while L-15, which may comprise mostly organic Composition #2, may function as a draw solution. A portion of water or other permeable solvent in L-3 may permeate from L-3 to L-15 across a semi-permeable membrane, while 'salting-out' reagent or phase transition temperature adjustment reagent in L-3 may be rejected by said membrane. FO may concentrate L-3 into a retentate solution comprising a concentrated solution of salting-out' reagent or phase transition temperature adjustment reagent (L-4). FO may dilute L-15 into a diluted solution of organic Composition #2 (L-16), which may have been diluted by FO permeate, which may comprise water and/or other solvent permeate.

5A—Heat Exchange to Heat L-5 and L-14 into 'Warm' Temperature Zone: 'Cold' liquid phase comprising mostly Organic Composition #1 (L-5) and a 'cold' liquid phase comprising mostly water or other solvent (L-14) may be heat exchanged (Heat Exchanger #2) with 'warm' mostly single liquid phase combined solution (L-1), which may result in 'warm' L-5 (L-6) and warm L-14 (L-7) and 'cold' L-1 (L-2). L-5 and L-14 may be non-contiguously separate liquid streams during Heat Exchanger #2 to, for example, prevent dissolution of L-5 into L-14 before or during Heat Exchanger #2. L-14 may be purified to remove residual organic Composition #2 and/or other potential contaminants from the Regeneration Portion before or during Heat Exchanger #2 or Mix #1.

6A—Mixing Reagents to Form Exothermic Phase Transition: L-6 may be mixed with L-7 in a mixing device, Mix #1, forming L-8. L-7 may be purified to remove residual organic Composition #2 and/or other potential contaminants from the Regeneration Portion before or during Mix #1. Depending on the liquid-liquid phase transition temperature range, the temperature of L-6 and L-7, and the enthalpy of the liquid-liquid phase transition, L-8 may comprise a multi-liquid phase mixture, or a multi-liquid phase mixture with some L-6 dissolved in L-7, or a single liquid phase combined solution.

7A—Heat Releasing Heat Exchange: L-8 may be heat exchanged with an application requiring heating, a heat sink, or a combination thereof using a heat exchanger (Heat Exchanger #3). L-8 may release heat to said application requiring heating, a heat sink, or a combination thereof, while said application requiring heating, a heat sink, or a combination thereof may cool L-8. Depending on the liquid state of L-8, the temperature of L-8, the temperature of the Heat Exchanger #3, and phase transition properties of L-8, L-8 may release heat in the Heat Exchanger #3 due to an enthalpy of liquid-liquid phase transition, or specific heat capacity due to an enthalpy of phase transition, or specific heat capacity or a combination thereof. L-8 may exit Heat Exchanger #3 at a lower enthalpy or temperature or a combination thereof state and may comprise at least a portion a single liquid phase combined solution (L-1).

8A—Heat Exchange to 'Cool' L-1 into 'Cold' Temperature Zone: 'Warm' mostly single liquid phase combined solution (L-1) may be heat exchanged (Heat Exchanger #2) with a 'cold' liquid phase comprising mostly Organic Composition #1 (L-5) and a 'cold' liquid phase comprising mostly water or other solvent (L-14), which may result in 'warm' L-5 (L-6) and warm L-14 (L-7) and 'cold' L-1 (L-2). L-5 and L-14 may be non-contiguously separate liquid streams during Heat Exchanger #2 to, for example, prevent dissolution of L-5 into L-14 before or during Heat Exchanger #2. L-14 may be purified to remove residual organic Composition #2 and/or other potential contaminants from the Regeneration Portion before or during Heat Exchanger #2 or Mix #1.

Regeneration Portion:

1B—Mixing Diluted Draw Solution with Recovered Residual Organic Composition #2 from RO: 'Cold' diluted Organic Composition #2 draw solution (L-16) may be mixed with an aqueous retentate solution (L-13) from 'RO' comprising residual organic Composition #2 recovered from L-12 in a mixing device (Mix #3). Said mixing of L-16 and L-13 in Mix #3 may result in a combined solution of L-16 and L-13 (L-17). If desirable, L-17 may comprise a more dilute concentration of organic Composition #2 compared to L-16. If desirable, L-13 and L-17 may contain liquid-liquid phase transition facilitator reagents, or 'salting-out' reagents, or phase transition temperature adjustment reagents or a combination thereof to, for example, facilitate liquid-liquid phase transition and/or liquid-liquid separation. If desirable, said liquid-liquid phase transition facilitator reagents, or 'salting-out' reagents, or phase transition temperature adjustment reagents or a combination thereof may be rejected by RO and may, if desirable, be separate from reagents employed in the Refrigeration Cycle Portion.

2B—Preheating Diluted Draw Solution in Heat Exchange: 'Cold' diluted Organic Composition #2 draw solution and RO retentate combined solution (L-17) may be preheated in a heat exchange (Heat Exchanger #4) with 'warm' mostly Organic Composition #2 liquid phase (L-11) and 'warm' mostly water or other solvent liquid phase (L-10). The pre-heated L-17 (L-9) which may result from the heat exchange in Heat Exchanger #3 may be near, or at, or below or above a liquid-liquid phase transition temperature range of L-9.

3B—Liquid-Liquid Phase Transition into Multi-Liquid Phase Mixture: L-9 may be further heated by a heat source (Thermal Source). In Thermal Source, L-9 may be heated such that it undergoes a liquid-liquid phase transition into a multi-liquid phase mixture, LL-3. LL-3 may be near, or at, or above a liquid-liquid phase transition temperature range of L-9.

4B—Liquid-Liquid Separation: LL-3 may be separated into non-contiguously separate liquid phases (L-10 and L-11) using a liquid-liquid separation device, LLS-2. L-10 and L-11 may comprise the constituent liquid phases of LL-3. L-11 may comprise mostly Organic Composition #2 and L-10 may comprise mostly water or other solvent or a combination thereof 5B—Cooling Separated Liquid Phases in Heat Exchange: 'Warm' L-10 and L-11 may be heat exchanged with 'Cold' L-17 in a heat exchange (Heat Exchanger #4), which may result in cooler temperature L-10 and L-11 (L-12 and L-15) and warmer temperature L-17 (L-9). L-10 and L-11 may be heat exchanged as separate liquid phases to, for example, prevent L-10 and/or L-11 from dissolving in each other, as they may be cooled below a liquid-liquid phase transition temperature while heat exchanged in Heat Exchanger #4. If desirable, L-12 or L-15 may be further cooled before contacting or exchanging with the Refrigeration Cycle Portion. For example, if desirable, L-12 or L-15 may be further cooled before RO, or Heat Exchanger #2, or FO. Said further cooling, may include, but is not limited to, one or more or a combination of the following: heat exchange cooling, evaporative cooling, or wet surface air heat exchanger cooling. L-12 may be transferred to step 6B and L-15 may be transferred to Step 4A.

6B—Reverse Osmosis or Nanofiltration or Ultrafiltration Purification: L-12 may comprise mostly water or other solvent, although may contain residual reagents, which may include, but are not limited to: residual organic Composition #2 and/or phase transition facilitator reagents, or 'salting-out' reagents, or phase transition temperature adjustment reagents or a combination thereof. Said residual reagents may be separated from water and/or other solvent. For example, L-12 may comprise a feed solution to a membrane-based process, which may include, but is not limited to, reverse osmosis, or nanofiltration, or ultrafiltration, or forward osmosis, or osmotically assisted reverse osmosis, or a combination thereof process (RO). Said residual reagents may be at least in part rejected by said membrane based process (RO). RO may separate L-12 into a water or other solvent permeate (L-14) and a retentate solution comprising a greater concentration of said residual reagents than L-12 (L-13). L-13 may be transferred to step 1B. L-14 may be transferred to step 5A.

FIG. 14

Refrigeration Cycle Portion:

1A—Mixing Reagents to Form Endothermic Phase Transition: A solution comprising mostly single liquid phase combined solution (L-1) may be mixed with a solution concentrated in 'salting-out' reagent or phase transition temperature adjustment reagent (L-4) in a mixing device (Mix #1). Said mixing of L-4 and L-1 may result in an endothermic liquid-liquid phase transition into a multi-liquid phase mixture. L-4 may dissolves in the aqueous component of L-1, which may result in Organic Composition #1 becoming at least partially insoluble and/or forming a separate liquid phase in a liquid-liquid phase transition. A resulting multi-liquid phase mixture (LL-2) may comprise a mostly Organic Composition #1 liquid phase and a aqueous dilute 'salting-out' reagent or mostly phase transition temperature adjustment reagent liquid phase. The previously described liquid-liquid phase transition may be endothermic and may result in the temperature of LL-2 being less than the mean temperature of L-1 and L-4. In some embodiments, step 1A and step 2A may be combined. For example, in some embodiments, Mix #1 may be combined with the Enthalpy Source Heat Exchanger.

2A—Heat Absorbing Heat Exchange: LL-2 may be heat exchanged (Enthalpy Source Heat Exchanger) with a heat source or an application requiring cooling or an enthalpy source or a combination thereof. LL-2 may absorb heat from or 'cool' said heat source or an application requiring cooling or an enthalpy source or a combination thereof, while said heat source or an application requiring cooling or an enthalpy source or a combination thereof may be cooled or supply heat to LL-2. Depending on the liquid state of LL-2, the temperature of LL-2, the temperature of the Enthalpy Heat Source Heat Exchanger, and phase transition properties of LL-2, LL-2 may absorb heat in the Enthalpy Heat Source Heat Exchanger due to an enthalpy of liquid-liquid phase transition, or specific heat capacity due to an enthalpy of phase transition, or specific heat capacity or a combination thereof. LL-2 may exit the Enthalpy Source Heat Exchanger at a greater enthalpy or temperature or a combination thereof state and/or may comprise at least a portion a multi-liquid phase solution (LL-3).

3A—Liquid-Liquid Separation: LL-3 may be separated into two separate liquid streams using a liquid-liquid separation device (LLS-1). One of the two liquid phases may comprise a mostly organic liquid phase (L-3), such as mostly Organic Composition #1. One of the liquid phases may comprise mostly aqueous dilute 'salting-out' reagent or mostly phase transition temperature adjustment reagent solution (L-2).

4A—Forward Osmosis Concentrating: Mostly aqueous dilute 'salting-out' reagent or mostly phase transition temperature adjustment reagent solution (L-2) may be fed into a forward osmosis or osmotically assisted reverse osmosis or a combination thereof system (FO). L-2 may function as a feed solution, while L-5, which may comprise mostly brine or high osmotic pressure solution, may function as a draw solution. A portion of water or other permeable solvent in L-2 may permeate from L-2 to L-5 across a semi-permeable membrane, while 'Salting-out' reagent or phase transition temperature adjustment reagent in L-2 may be rejected by said membrane. FO may concentrate L-2 into a retentate solution comprising a concentrated solution of salting-out' reagent or phase transition temperature adjustment reagent (L-4). FO may dilute L-5 into a diluted solution (L-6), which may have been diluted by FO permeate, which may comprise water and/or other solvent permeate.

5A—Mixing Reagents to Form Exothermic Phase Transition: L-3, which may comprise a liquid phase comprising mostly organic Composition #1, may be mixed with a solution comprising mostly water, L-7, in a mixing device, Mix #2, forming LL-1. L-7 may be purified to remove potential contaminants before or during Mix #2. Depending on the liquid-liquid phase transition temperature range, the temperature of L-7 and L-3, and the enthalpy of the liquid-liquid phase transition, LL-1 may comprise a multi-liquid phase mixture, or a multi-liquid phase mixture with some L-3 dissolved in L-7, or a single liquid phase combined solution. In some embodiments, step 5A and step 6A may be combined. For example, in some embodiments, Mix #2 may be combined with the Enthalpy Sink Heat Exchanger.

6A—Heat Releasing Heat Exchange: LL-1 may be heat exchanged with an application requiring heating, a heat sink, or a combination thereof using a heat exchanger (Enthalpy Sink Heat Exchanger). LL-1 may release heat to said application requiring heating, a heat sink, or a combination thereof, while said application requiring heating, a heat sink, or a combination thereof may cool LL-1. Depending on the liquid state of LL-1, the temperature of LL-1, the temperature of the Enthalpy Heat Sink Heat Exchanger, and phase transition properties of LL-1, LL-1 may release heat in the Enthalpy Heat Sink Heat Exchanger due to an enthalpy of liquid-liquid phase transition, or specific heat capacity due to an enthalpy of phase transition, or specific heat capacity or a combination thereof. LL-1 may exit the Enthalpy Sink Heat Exchanger at a lower enthalpy or temperature or a combination thereof state and may comprise at least a portion a single liquid phase combined solution (L-1).

FIG. 16:
Refrigeration Cycle Portion:

1A—Mixing Reagents to Form Endothermic Phase Transition: A solution comprising mostly single liquid phase combined solution (L-1) may be mixed with a solution concentrated in 'salting-out' reagent or phase transition temperature adjustment reagent (L-4) in a mixing device (Mix #1). Said mixing of L-4 and L-1 may result in an endothermic liquid-liquid phase transition into a multi-liquid phase mixture. L-4 may dissolves in the aqueous component of L-1, which may result in Organic Composition #1 becoming at least partially insoluble and/or forming a separate liquid phase in a liquid-liquid phase transition. A resulting multi-liquid phase mixture (LL-2) may comprise a mostly Organic Composition #1 liquid phase and a mostly aqueous dilute 'salting-out' reagent liquid phase or mostly phase transition temperature adjustment reagent liquid phase. The previously described liquid-liquid phase transition may be endothermic and may result in the temperature of LL-2 being less than the mean temperature of L-1 and L-4. In some embodiments, step 1A and step 2A may be combined. For example, in some embodiments, Mix #1 may be combined with the Enthalpy Source Heat Exchanger.

2A—Heat Absorbing Heat Exchange: LL-2 may be heat exchanged (Enthalpy Source Heat Exchanger) with a heat source or an application requiring cooling or an enthalpy source or a combination thereof. LL-2 may absorb heat from or 'cool' said heat source or an application requiring cooling or an enthalpy source or a combination thereof, while said heat source or an application requiring cooling or an enthalpy source or a combination thereof may be cooled or supply heat to LL-2. Depending on the liquid state of LL-2, the temperature of LL-2, the temperature of the Enthalpy Heat Source Heat Exchanger, and phase transition properties of LL-2, LL-2 may absorb heat in the Enthalpy Heat Source Heat Exchanger due to an enthalpy of liquid-liquid phase transition, or specific heat capacity due to an enthalpy of phase transition, or specific heat capacity or a combination thereof. LL-2 may exit the Enthalpy Source Heat Exchanger at a greater enthalpy or temperature or a combination thereof state and/or may comprise at least a portion a multi-liquid phase solution (LL-3).

3A—Liquid-Liquid Separation: LL-3 may be separated into two separate liquid streams using a liquid-liquid separation device (LLS-1). One of the two liquid phases may comprise a mostly organic liquid phase (L-3), such as mostly Organic Composition #1. One of the liquid phases may comprise mostly aqueous dilute 'salting-out' reagent or mostly phase transition temperature adjustment reagent solution (L-2).

4A—Forward Osmosis Concentrating: Mostly aqueous dilute 'salting-out' reagent or mostly phase transition temperature adjustment reagent solution (L-2) may be fed into a forward osmosis or osmotically assisted reverse osmosis or a combination thereof system (FO #1). L-2 may function as a feed solution, while L-5, which may comprise Liquid B or brine or high osmotic pressure solution, may function as a draw solution. A portion of water or other permeable solvent in L-2 may permeate from L-2 to L-5 across a semi-permeable membrane, while 'salting-out' reagent or phase transition temperature adjustment reagent in L-2 may be rejected by said membrane. FO #1 may concentrate L-2 into a retentate solution comprising a concentrated solution of 'salting-out' reagent or phase transition temperature adjustment reagent (L-4). FO #1 may dilute L-5 into a diluted solution (L-6), which may have been diluted by FO permeate, which may comprise water and/or other solvent permeate.

5A—FO Mixing Reagents to form Exothermic Phase Transition: L-3, which may comprise a liquid phase comprising mostly organic Composition #1, may comprise a draw solution in a forward osmosis, or osmotically assisted reverse osmosis, or combination thereof process (FO #2). A solution comprising mostly water, L-7, may comprise a feed solution. L-3 may draw water or other permeable solvent from L-7 across a membrane, while said membrane may reject non-permeable residual reagents. During FO #2, L-3 may be diluted to form LL-1 or L-1, which may comprise an exothermic liquid-liquid phase transition. During FO #2, non-permeable reagents in L-7 may be concentrated to form retentate L-8. The present step may enable water to be transferred to the Refrigeration Cycle Portion while preventing the contamination of the Refrigeration Cycle Portion with potential contaminants in L-7. In the present embodiment, it may be desirable to combine step 5A and step 6A. For example, FO #2 may be integrated with the Enthalpy Sink Heat Exchanger, which may enable L-3 to be cooled at or below its liquid-liquid phase transition temperature range to enable its operation as a draw solution.

6A—Heat Releasing Heat Exchange: LL-1 may be heat exchanged with an application requiring heating, a heat sink, or a combination thereof using a heat exchanger (Enthalpy Sink Heat Exchanger). LL-1 may release heat to said application requiring heating, a heat sink, or a combination thereof, while said application requiring heating, a heat sink, or a combination thereof may cool LL-1. Depending on the liquid state of LL-1, the temperature of LL-1, the temperature of the Enthalpy Heat Sink Heat Exchanger, and phase transition properties of LL-1, LL-1 may release heat in the Enthalpy Heat Sink Heat Exchanger due to an enthalpy of liquid-liquid phase transition, or specific heat capacity due to an enthalpy of phase transition, or specific heat capacity or a combination thereof. LL-1 may exit the Enthalpy Sink Heat Exchanger at a lower enthalpy or temperature or a combination thereof state and may comprise at least a portion a single liquid phase combined solution (L-1).

FIG. 17:

Refrigeration Cycle Portion:

1A—Mixing Reagents to Form Endothermic Phase Transition: A solution comprising mostly single liquid phase combined solution (L-2) may be mixed with a solution concentrated in 'salting-out' reagent or phase transition temperature adjustment reagent (L-4) in a mixing device (Mix #2). Said mixing of L-4 and L-2 may result in an endothermic liquid-liquid phase transition into a multi-liquid phase mixture. L-4 may dissolve in the aqueous component of L-2, which may result in Organic Composition #1 becoming at least partially insoluble and/or forming a separate liquid phase in a liquid-liquid phase transition. A resulting multi-liquid phase mixture (LL-1) may comprise a mostly Organic Composition #1 liquid phase and a aqueous dilute 'salting-out' reagent or mostly phase transition temperature adjustment reagent liquid phase. The previously described liquid-liquid phase transition may be endothermic and may result in the temperature of LL-1 being less than the mean temperature of L-2 and L-4.

In some embodiments, step 1A and step 2A may be combined. For example, in some embodiments, Mix #2 may be combined with Heat Exchanger #1.

2A—Heat Absorbing Heat Exchange: LL-1 may be heat exchanged (Heat Exchanger #1) with a heat source or an application requiring cooling or an enthalpy source or a combination thereof. LL-1 may absorb heat from or 'cool' said heat source or an application requiring cooling or an enthalpy source or a combination thereof, while said heat source or an application requiring cooling or an enthalpy source or a combination thereof may be cooled or supply heat to LL-1. Depending on the liquid state of LL-1, the temperature of LL-1, the temperature of Heat Exchanger #1, and phase transition properties of LL-1, LL-1 may absorb heat in Heat Exchanger #1 due to an enthalpy of liquid-liquid phase transition, or specific heat capacity due to an enthalpy of phase transition, or specific heat capacity or a combination thereof. LL-1 may exit Heat Exchanger #1 at a greater enthalpy or temperature or a combination thereof state and/or may comprise at least a portion a multi-liquid phase solution (LL-2).

3A—Liquid-Liquid Separation: LL-2 may be separated into two separate liquid streams using a liquid-liquid separation device (LLS-1). One of the two liquid phases may comprise a mostly organic liquid phase (L-5), such as mostly Organic Composition #1. One of the liquid phases may comprise mostly aqueous dilute 'salting-out' reagent or phase transition temperature adjustment reagent solution (L-3).

4A—Forward Osmosis Concentrating: Mostly aqueous dilute 'salting-out' reagent or mostly phase transition temperature adjustment reagent solution (L-3) may be fed into a forward osmosis or osmotically assisted reverse osmosis or a combination thereof system (FO). L-3 may function as a feed solution, while L-10, which may Liquid B, or brine, or high osmotic pressure solution, may function as a draw solution. A portion of water or other permeable solvent in L-3 may permeate from L-3 to L-10 across a semi-permeable membrane, while 'salting-out' reagent or phase transition temperature adjustment reagent in L-3 may be rejected by said membrane. FO may concentrate L-3 into a retentate solution comprising a concentrated solution of salting-out' reagent or phase transition temperature adjustment reagent (L-4). FO may dilute L-10 into a diluted solution (L-11), which may have been diluted by FO permeate, which may comprise water and/or other solvent permeate.

5A—Heat Exchange to Heat L-5 and L-9 into 'Warm' Temperature Zone: 'Cold' liquid phase comprising mostly Organic Composition #1 (L-5) and a 'cold' liquid phase comprising mostly water or other solvent (L-9) may be heat exchanged (Heat Exchanger #2) with 'warm' mostly single liquid phase combined solution (L-1), which may result in 'warm' L-5 (L-6) and warm L-9 (L-7) and 'cold' L-1 (L-2). L-5 and L-9 may be non-contiguously separate liquid streams during Heat Exchanger #2 to, for example, prevent dissolution of L-5 into L-9 before or during Heat Exchanger #2. L-9 may be purified to remove potential contaminants from the Regeneration Portion before or during Heat Exchanger #2 or Mix #1. Water from L-9 may be exchanged or added to L-5 by means a 'FO #2' system, such as an FO #2 shown in FIG. 5 and/or FIG. 8.

6A—Mixing Reagents to Form Exothermic Phase Transition: L-6 may be mixed with L-7 in a mixing device, Mix #1, forming L-8. L-7 may be purified to remove residual organic Composition #2 and/or other potential contaminants from the Regeneration Portion before or during Mix #1. Depending on the liquid-liquid phase transition temperature range, the temperature of L-6 and L-7, and the enthalpy of the liquid-liquid phase transition, L-8 may comprise a multi-liquid phase mixture, or a multi-liquid phase mixture with some L-6 dissolved in L-7, or a single liquid phase combined solution.

7A—Heat Releasing Heat Exchange: L-8 may be heat exchanged with an application requiring heating, a heat sink, or a combination thereof using a heat exchanger (Heat Exchanger #3). L-8 may release heat to said application requiring heating, a heat sink, or a combination thereof, while said application requiring heating, a heat sink, or a combination thereof may cool L-8. Depending on the liquid state of L-8, the temperature of L-8, the temperature of the Heat Exchanger #3, and phase transition properties of L-8, L-8 may release heat in the Heat Exchanger #3 due to an enthalpy of liquid-liquid phase transition, or specific heat capacity due to an enthalpy of phase transition, or specific heat capacity or a combination thereof. L-8 may exit Heat Exchanger #3 at a lower enthalpy or temperature or a combination thereof state and may comprise at least a portion a single liquid phase combined solution (L-1).

8A—Heat Exchange to 'Cool' L-1 into 'Cold' Temperature Zone: 'Warm' mostly single liquid phase combined solution (L-1) may be heat exchanged (Heat Exchanger #2) with a 'cold' liquid phase comprising mostly Organic Composition #1 (L-5) and a 'cold' liquid phase comprising mostly water or other solvent (L-14), which may result in 'warm' L-5 (L-6) and warm L-9 (L-7) and 'cold' L-1 (L-2). L-5 and L-9 may be non-contiguously separate liquid streams during Heat Exchanger #2 to, for example, prevent dissolution of L-5 into L-9 before or during Heat Exchanger #2. L-9 may be purified to remove potential contaminants from the Regeneration Portion before or during Heat Exchanger #2 or Mix #1.

EXAMPLE FIGURE KEYS

| Label in FIG. | Example FIG. Key FIG. 9 Description |
|---|---|
| L-1 | L-1 may comprise a solution comprising a combination of Organic Composition #1 and aqueous liquid phase. L-1 may comprise at least a portion a single liquid phase combined solution. L-1 may comprise LL-1, except after heat removal from LL-1 in, for example, the Enthalpy Heat Sink Heat Exchanger. Heat removed in the Enthalpy Heat Sink Heat Exchanger may include, but is not limited to, heat from enthalpy of liquid-liquid phase transition and/or heat from specific heat capacity. L-1 is an output of the Enthalpy Sink Heat Exchanger. |
| L-4 | L-4 may comprise a concentrated solution of 'salting-out reagent' or 'concentrate' or 'retentate'. L-4 may also comprise some Organic Composition #1 which may be due to, including, but not limited to, residual from L-3 and/or an incomplete separation in LLS-1 and/or residual Organic Composition #1 dissolved in L-2. L-4 may be generated by 'FO'. |
| Mix #1 | Mix #1 may involve mixing or combining L-1 and L-4 to form a multi-liquid phase solution, LL-2. Said mixing may result in a liquid-liquid phase transition, which may possess an enthalpy of phase transition. Said enthalpy of phase transition may be endothermic or exothermic, although may be endothermic in the present embodiment. |
| LL-2 | LL-2 may comprise a multi-liquid phase mixture, which may have resulted from the mixing of L-1 and L-4. LL-2 may possess a lesser temperature and/or lesser enthalpy than L-4 and L-1. LL-2 may possess said lesser temperature, due to, for example, an endothermic liquid-liquid phase transition in Mix #1. LL-2 may possess a latent endothermic enthalpy of phase transition, which may absorb heat in the Enthalpy Source Heat Exchanger. LL-2 may possess a substantially lower temperature than, for example, 'Return #2', and the heat capacity of this substantially lower temperature may be exploited in the Enthalpy Source Heat Exchanger to cool Return #2 to form Supply #2. |
| Enthalpy Source Heat Exchanger | The Enthalpy Source Heat Exchanger may transfer or exchange heat from one or more heat or enthalpy sources to the refrigeration cycle. If the refrigeration cycle is being employed as a chiller or air conditioner or cooling device, Return #2 may comprise the load or application requiring cooling, and the Enthalpy Source Heat Exchanger may be employed to enable the refrigeration cycle to absorb heat from the load or 'cool' the load. If the refrigeration cycle is being employed as a heat pump or heating device, Return #2 may comprise the enthalpy or heat source, and the Enthalpy Source Heat Exchanger may be employed to enable the refrigeration cycle to absorb heat from this enthalpy or heat source. The Enthalpy Source Heat Exchanger transfers heat from Return #2 to LL-2, which may result in Supply #2 (which may possess a cooler temperature or lower enthalpy than Return #2) and LL-3 (which may possess a higher temperature or greater enthalpy than LL-2). |
| LL-3 | LL-3 may comprise a multi-liquid phase mixture, which may have resulted from LL-2 absorbing heat while heat exchanging in the Enthalpy Source Heat Exchanger. LL-3 may possess a greater temperature or greater enthalpy or both than LL-2. |
| LLS-1 | LLS-1 may comprise a liquid-liquid separation device. LLS-1 may separate LL-3 into constituent liquid phases, which may comprise L-2 and L-3. |

| | |
|---|---|
| L-2 | L-2 may comprise a dilute solution of 'salting-out reagent'. L-2 may comprise one of the liquid phases separated by LLS-1 from multi-liquid phase mixture LL-3. |
| FO | 'FO' may comprise a forward osmosis or an osmotically assisted reverse osmosis or combination thereof process. 'FO' may involve a feed solution comprising L-2, which may be concentrated into a concentrate or retentate, L-4. 'FO' may involve a draw solution comprising 'Organic Composition #2' (L-9) which, during Forward Osmosis, may be diluted by the water and/or other liquid flux through the forward osmosis membrane, which may result in a diluted draw solution (L-5). |
| L-3 | L-3 may comprise a solution comprising mostly 'Organic Composition #1'. L-3 may comprise one of the liquid phases separated by LLS-1 from multi-liquid phase mixture LL-3. |
| Mix #2 | Mix #2 may involve mixing or combining L-3 and L-10 to form a multi-liquid phase solution, LL-1, or at least a portion single liquid phase combined solution, LL-1, or a single liquid phase combined solution, LL-1. L-3 and L-10 may Mix in Mix #2 to form an exothermic or endothermic liquid-liquid phase transition, although in the present embodiment, the liquid-liquid phase transition may form an exothermic phase transition. |
| LL-1 | LL-1 may comprise a mixture or combination of L-3 and L-10. Depending on the temperature of L-3 and L-10, LL-1 may combine to form a single liquid phase combined solution, at least a portion of a single liquid phase combined solution, or a multi-liquid phase mixture. For example, if L-3 and L-10 combine at a temperature less than their liquid-liquid phase transition temperature by a temperature difference greater than the adiabatic temperature change of their enthalpy of phase transition, the LL-1 may comprise a single liquid phase combined solution at a greater temperature than L-3 and/or L-10. For example, if L-3 and L-10 combine at a temperature less than their liquid-liquid phase transition temperature by a temperature difference less than the adiabatic temperature change of their enthalpy of phase transition, the LL-1 may comprise a portion, but not entirely, a single liquid phase combined solution at a greater temperature than L-3 and/or L-10. For example, if L-3 and L-10 combine at a temperature equal to or greater than their liquid-liquid phase transition temperature, the LL-1 may comprise a multi-liquid phase mixture. |
| Enthalpy Sink Heat Exchanger | The Enthalpy Sink Heat Exchanger may transfer or exchange heat from the refrigeration cycle to one or more heat sinks. If the refrigeration cycle is being employed as a chiller or air conditioner or cooling device, Supply #1 may comprise the heat sink or evaporative cooling water supply or air or other heat sink, and the Enthalpy Sink Heat Exchanger may be enable the refrigeration cycle to release or discharge heat into the heat sink. If the refrigeration cycle is being employed as a heat pump or heating device, Supply #1 may comprise the load or application requiring heating, and the Enthalpy Sink Heat Exchanger may enable the refrigeration cycle to supply heat to this load or application requiring heating. The Enthalpy Sink Heat Exchanger transfers heat from LL-1 to Supply #1, which may result in Return #1 (which may possess a hotter temperature or greater enthalpy than Supply #1) and L-1 (which may possess a lesser temperature or lesser enthalpy than LL-1). |
| L-5 | L-5 may comprise a diluted draw solution. L-5 may result from a concentrated draw solution comprising Organic Composition #2 (L-9) drawing water or other solvent from L-2 through a membrane in 'FO'. L-5 may comprise Organic Composition #2 with significantly more water or other solvent dissolved than L-9. L-5 may be at a temperature significantly less than the liquid-liquid phase transition temperature range of L-5. |
| L-6 | L-6 comprises L-5 after heat exchange with L-7 and L-8 in Heat Exchanger #3, which may result in L-6 being at a greater temperature than L-5. L-6 may be at a temperature close to the liquid-liquid phase transition temperature range of L-6. |
| Heat Exchanger #3 | Heat Exchanger #3 may comprise a heat exchanger which transfers heat from the components of the dilute draw solution (L-5) following regeneration and liquid-liquid seperation (L-7 and L-8) to L-5. Heat Exchanger #3 may pre-heat L-5, forming L-6, which may minimize thermal emergy comsumption. Heay Exchanger #3 may enable L-9 and L-10 to be at or near the temperature of the refrugeration cycle, preventing or minimizing heat transfer from the Regeneration Portion inti the Refrigeration Cycle Portion and minimizing losses. Heat Exchanger #3 may minimize energy consumption in the Thermal Source or overall regeneration portion of the process by minimizing the relative proportion of heat required for heating the liquid to the liquid-liquid phase transition temperature and maximizing the relative proportion of heat employed to power or absorbed by the liquid-liquid phase transition from L-6 to LL-4. Heat Exchanger #3 may enable L-7 and L-8 to be cooled while preventing L-7 and L-8 from dissolving in each other, by, for example, ensuring L-7 abd L-8 are non-contiguously separate during cooling. |
| Thermal Source | Thermal Source may comprise a heat exchanger to supply heat to L-6 above the liquid-liquid phase transition temperature of L-6. Thermal Source heats up L-6 to at or above its liquid-liquid phase transition temperature range. |

|   |   |
|---|---|
|   | L-6 may absorb said heat and may undergo an endothermic liquid-liquid phase transition into a multi-liquid phase mixture, LL-4. |
| LL-4 | LL-4 may comprise L-6 following an endothermic phase transition in Thermal Source, due to, for example, heat supplied in Thermal Source. LL-4 may comprising a multi-liquid phase mixture with two or more liquid phases. One of the liquid phases ,ay comprise a solution somproising mostly Organic Composition #2. One of the liquid phases may comprise a solution comprising mostly water or other solvent or a combination thereof. |
| LLS-2 | LLS-2 may comprise a liquid-liquid seperation device. LLS-2 may separate LL-4 into its constituent liquid phases, which may comprise a solution comprising mostly Organic Composotion #2 (L-7) and/or a solution comprising mnostly water or other solvent or a combination thereof (L-8). LLS-2 seperates LL-4 into L-7 and L-8. L-7 and L-8 may comprise non-contiguously separated streams befor Heat Exchanger #3. It may be desirable for L-7 anf L-8 to be non-contiguously separated streams before Heat Exchanger #3 to prevent them from dissolving in each other (which may occur if mixed in HEat Exchanger #3, because Heat Exchanger #3 may cool the L-7 and L-8 to less than their liquid-liquid phase transition |
| L-7 | L-7 may comprise a liquid phase separated from multi-liquid phase mixture, LL-4 by liquid-liquid separation device, LLS-2. L-7 may comprise a solution comprising mostly 'Organic Composition #2'. Before Heat Exchanger #3, L-7 may be at a temperature near, at, or above the liquid-liquid phase transition temperature range of L-6. |
| L-8 | L-8 may comprise a liquid phase separated from multi-liquid phase mixture, LL-4 by liquid-liquid separation device, LLS-2. L-8 may comprise a solution comprising mostly water or other solvent or a combination thereof. L-8 may be at a temperature near, at, or above the liquid-liquid phase transition temperature range of L-6. |
| L-9 | L-9 may comprise L-7 after heat exchanging with L-5 in Heat Exchanger #3. L-9 may be at a substantially lesser temperature than L-7. L-9 may comprise a solution comprising mostly 'Organic Composition #2'. L-9 may comprise a draw solution in 'FO'. |
| L-10 | L-10 may comprise L-8 after heat exchanging with L-5 in Heat Exchanger #3. L-10 may be at a substantially lesser temperature than L-8. L-10 may comprise a solution comprising mostly water or other solvent or a combination thereof. L-10 may comprise regenerated water or other solvent or a combination thereof which may have been previously drawn from or removed from the Refrigeration Cycle Portion in FO. |
| Supply #1 | Supply #1 may comprise a cooler temperature or lower enthalpy or both heat transfer fluid or material than Return #1. Supply #1 may comprise an application requiring heating or a heat sink or an enthalpy sink or a combination thereof, for example, before absorbing heat in a heat exchange. |
| Return #1 | Return #1 may comprise a warmer temperature or greater enthalpy or both heat transfer fluid or material than Supply #1. Return #1 may comprise an application requiring heating or a heat sink or an enthalpy sink or a combination thereof, for example, after absorbing heat in a heat exchange. |
| Supply #2 | Supply #2 may comprise a cooler temperature or lower enthalpy or both heat transfer fluid or material than Return #2. Supply #2 may comprise an application requiring cooling or a heat source or an enthalpy source or a combination thereof, for example, after discharging heat in a heat exchange. |
| Return #2 | Return #2 may comprise a warmer temperature or greater enthalpy or both heat transfer fluid or material than Supply #2. Return #2 may comprise an application requiring cooling or a heat source or an enthalpy source or a combination thereof, for example, before discharging heat in a heat exchange. |

| Example FIG. Key for FIG. 10 | |
|---|---|
| Label in FIG. | Description |
| L-1 | L-1 may comprise a solution comprising a combination of Organic Composition #1 and aqueous liquid phase. L-1 may comprise at least a portion a single liquid phase combined solution. L-1 may comprise LL-1, except after heat removal from LL-1 in, for example, the Enthalpy Heat Sink Heat Exchanger. Heat removed in the Enthalpy Heat Sink Heat Exchanger may include, but is not limited to, heat from enthalpy of liquid-liquid phase transition and/or heat from specific heat capacity. L-1 is an output of the Enthalpy Sink Heat Exchanger. |
| L-4 | L-4 may comprise a concentrated solution of 'salting-out reagent' or 'concentrate' or 'retentate'. The concentrate may be generated by forward osmosis, 'FO'. |
| Mix #1 | Mix #1 may involve mixing or combining L-1 and L-4 to form a multi-liquid phase solution, LL-2. Said mixing may result in a liquid-liquid phase transition, which may possess an enthalpy of phase transition. Said enthalpy of phase transition may be endothermic or exothermic, although may be endothermic in the present embodiment. |
| LL-2 | LL-2 may comprise a multi-liquid phase mixture, which may have resulted from the mixing of L-1 and L-4. LL-2 may possess a lesser temperature and/or lesser enthalpy than L-4 and L-1. LL-2 may possess said lesser |

| | -continued |
|---|---|
| | temperature, due to, for example, an endothermic liquid-liquid phase transition in Mix #1. LL-2 may possess a latent endothermic enthalpy of phase transition, which may absorb heat in the Enthalpy Source Heat Exchanger. LL-2 may possess a substantially lower temperature than, for example, 'Return #2', and the heat capacity of this substantially lower temperature may be exploited in the Enthalpy Source Heat Exchanger to cool Return #2 to form Supply #2. |
| Enthalpy Source Heat Exchanger | The Enthalpy Source Heat Exchanger may transfer or exchange heat from one or more heat or enthalpy sources to the refrigeration cycle. If the refrigeration cycle is being employed as a chiller or air conditioner or cooling device, Return #2 may comprise the load or application requiring cooling, and the Enthalpy Source Heat Exchanger may be employed to enable the refrigeration cycle to absorb heat from the load or 'cool' the load. If the refrigeration cycle is being employed as a heat pump or heating device, Return #2 may comprise the enthalpy or heat source, and the Enthalpy Source Heat Exchanger may be employed to enable the refrigeration cycle to absorb heat from this enthalpy or heat source. The Enthalpy Source Heat Exchanger transfers heat from Return #2 to LL-2, which may result in Supply #2 (which may possess a cooler temperature or lower enthalpy than Return #2) and LL-3 (which may possess a higher temperature or greater enthalpy than LL-2). |
| LL-3 | LL-3 may comprise a multi-liquid phase mixture, which may have resulted from LL-2 absorbing heat while heat exchanging in the Enthalpy Source Heat Exchanger. LL-3 may possess a greater temperature or greater enthalpy or both than LL-2. |
| LLS-1 | LLS-1 may comprise a liquid-liquid separation device. LLS-1 may separate LL-3 into its constituent liquid phases, which may comprise L-2 and L-3. |
| L-2 | L-2 may comprise a dilute solution of 'salting-out reagent'. L-2 may comprise one of the liquid phases separated by LLS-1 from multi-liquid phase mixture LL-3. |
| FO | 'FO' may comprise a forward osmosis or an osmotically assisted reverse osmosis or combination thereof process. 'FO' may involve a feed solution comprising L-2, which may be concentrated into a concentrate or retentate, L-4. 'FO' may involve a draw solution comprising 'Organic Composition #2' (L-10) which, during Forward Osmosis, may be diluted by the water and/or other liquid flux through a forward osmosis membrane, which may result in a diluted draw solution (L-5). |
| L-3 | L-3 may comprise a solution comprising mostly 'Organic Composition #1'. L-3 may comprise one of the liquid phases separated by LLS-1 from multi-liquid phase mixture LL-3. |
| Mix #2 | Mix #2 may involve mixing or combining L-3 and L-13 to form a multi-liquid phase solution, LL-1, or at least a portion single liquid phase combined solution, LL-1, or a single liquid phase combined solution, LL-1. L-3 and L-13 may Mix in Mix #2 to form an exothermic or endothermic liquid-liquid phase transition, although in the present embodiment, the liquid-liquid phase transition may form an exothermic phase transition. |
| LL-1 | LL-1 may comprise a mixture or combination of L-3 and L-13. Depending on the temperature of L-3 and L-13, LL-1 may combine to form a single liquid phase combined solution, at least a portion of a single liquid phase combined solution, or a multi-liquid phase mixture. For example, if L-3 and L-13 combine at a temperature less than their liquid-liquid phase transition temperature by a temperature difference greater than the adiabatic temperature change of their enthalpy of phase transition, the LL-1 may comprise a single liquid phase combined solution at a greater temperature than L-3 and/or L-13. For example, if L-3 and L-13 combine at a temperature less than their liquid-liquid phase transition temperature by a temperature difference less than the adiabatic temperature change of their enthalpy of phase transition, the LL-1 may comprise a portion, but not entirely, a single liquid phase combined solution at a greater temperature than L-3 and/or L-13. For example, if L-3 and L-13 combine at a temperature equal to or greater than their liquid-liquid phase transition temperature, the LL-1 may comprise a multi-liquid phase mixture. |
| Enthalpy Sink Heat Exchanger | The Enthalpy Sink Heat Exchanger may transfer or exchange heat from the refrigeration cycle to one or more heat sinks. If the refrigeration cycle is being employed as a chiller or air conditioner or cooling device, Supply #1 may comprise the heat sink or evaporative cooling water supply or air or other heat sink, and the Enthalpy Sink Heat Exchanger may be enable the refrigeration cycle to release or discharge heat into the heat sink. If the refnigeration cycle is being employed as a heat pump or heating device, Supply #1 may comprise the load or application requiring heating, and the Enthalpy Sink Heat Exchanger may enable the refrigeration cycle to supply heat to this load or application requiring heating. The Enthalpy Sink Heat Exchanger transfers heat from LL-1 to Supply #1, which may result in Return #1 (which may possess a hotter temperature or greater enthalpy than Supply #1) and L-1 (which may possess a lesser temperature or lesser enthalpy than LL-1). |
| L-5 | L-5 may comprise a diluted draw solution. L-5 may result from a concentrated draw solution comprising Organic Composition #2 (L-10) drawing water or other solvent from L-2 through a membrane in 'FO'. L-5 |

| | |
|---|---|
| | may comprise Organic Composition #2 with significantly more water or other solvent dissolved than L-10. L-5 may be at a temperature significantly less than the liquid-liquid phase transition temperature range of L-5. |
| Mix #3 | Mix #3 may involve mixing or combining L-5 and L-12 to form a combined solution (L-6). Mix #3 may involve integrating reverse osmosis retentate (L-12) into the diluted draw solution (L-5) before the draw solution regeneration. L-12 may comprise residual Organic Composition #2 in L-11, which may have been separated or recovered by RO. |
| L-6 | L-6 may comprise a combined solution of L-5 and L-12. L-6 may be at a temperature significantly less than the liquid-liquid phase transition temperature range of L-6. |
| Heat Exchanger #3 | Heat Exchanger #3 may comprise a heat exchanger which transfers heat from the components of the dilute draw solution following regeneration and liquid-liquid separation (L-8 and L-9) to L-6. Heat Exchanger #3 may pre-heat L-6, forming L-7, which may minimize thermal energy consumption. Heat Exchanger #3 may enable L-10 and L-11 to be at or near the temperature of the refrigeration cycle, preventing or minimizing heat transfer from the Regeneration Portion into the Refrigeration Cycle Portion and minimizing energetic losses. |
| L-7 | L-7 comprises L-6 after heat exchange with L-8 and L-9 in Heat Exchanger #3, which may result in L-7 being at a greater temperature than L-6. L-7 may be at a temperature close to the liquid-liquid phase transition temperature range of L-7. |
| Thermal Source | Thermal Source may comprise a heat exchanger to supply heat to L-7 near, at, or above the liquid-liquid phase transition temperature range of L-7. Thermal Source may heat up L-7 to at or above its liquid-liquid phase transition temperature range. L-7 may absorb said heat and may undergo an endothermic liquid-liquid phase transition into a multi-liquid phase mixture, LL-4. |
| LL-4 | LL-4 may comprise L-7 following an endothermic phase transition in Thermal Source, due to, for example, heat supplied in Thermal Source. LL-4 may comprising a multi-liquid phase mixture with two or more liquid phases. One of the liquid phases may comprise a solution comprising mostly Organic Composition #2. One of the liquid phases may comprise a solution comprising mostly water or other solvent or a combination thereof. |
| LLS-2 | LLS-2 may comprise a liquid-liquid separation device. LLS-2 may separate LL-4 into its constituent liquid phases, which may comprise a solution comprising mostly Organic Composition #2 (L-8) and/or a solution comprising mostly water or other solvent or a combination thereof (L-9). LLS-2 separates LL-4 into L-8 and L-9. L-8 and L-9 may comprise non-contiguously separated streams before Heat Exchanger #3. It may be desirable for L-8 and L-9 to be non-contiguously separated streams before Heat Exchanger #3 to prevent them from dissolving in each other (which may occur if mixed in Heat Exchanger #3, because Heat Exchanger #3 may cool the L-8 and L-9 to a temperature less than their liquid-liquid phase transition temperature range). |
| L-8 | L-8 may comprise a liquid phase separated from multi-liquid phase mixture, LL-4 by liquid-liquid separation device, LLS-2. L-8 may comprise a solution comprising mostly 'Organic Composition #2'. Before Heat Exchanger #3, L-8 may be at a temperature near, at, or above the liquid-liquid phase transition temperature range of L-7. |
| L-9 | L-9 may comprise a liquid phase separated from multi-liquid phase mixture, LL-4 by liquid-liquid separation device, LLS-2. L-9 may comprise a solution comprising mostly water or other solvent or a combination thereof. L-9 may be at a temperature near, at, or above the liquid-liquid phase transition temperature range of L-7. |
| L-10 | L-10 may comprise L-8 after heat exchanging with L-6 in Heat Exchanger #3. L-10 may be at a substantially lesser temperature than L-8. L-10 may comprise a solution comprising mostly 'Organic Composition #2'. L-10 may comprise a draw solution in 'FO'. |
| L-11 | L-11 may comprise L-9 after heat exchanging with L-6 in Heat Exchanger #3. L-11 may be at a substantially lesser temperature than L-9. L-11 may comprise a solution comprising mostly water or other solvent or a combination thereof. L-11 may comprise regenerated water or other solvent or a combination thereof which may have been previously drawn from or removed from the Refrigeration Cycle Portion in FO. L-11 may contain residual Organic Composition #2, which may be removed or recovered in, for example, 'RO', before returning said regenerated water to the Refrigeration Cycle Portion. |
| RO | RO may comprise reverse osmosis or nanofiltration or other membrane-based process or separation process or a combination thereof. RO may involve separating residual Organic Composition #2 from L-11. Separating residual Organic Composition #2 may prevent contamination of the Refrigeration Cycle Portion with Organic Composition #2. RO may separate L-11 into a concentrate or retentate stream, which may comprise a portion Organic Composition #2 (L-12), and a permeate stream, which may comprise a mostly water or other solvent (L-13). It may be desirable for the recovery ratio or recovery rate, or the percentage of the mass of L-11 which is in the permeate, to be greater than or equal to, including, but not limited |

| | |
|---|---|
| | to, one or more or a combination of the following: 10%, or 20%, or 30%, or 40%, or 50%, or 60%, or 70%, or 80%, or 90%, or 95%. |
| L-12 | L-12 may comprise retentate or concentrate from RO. L-12 may comprise a solution with residual Organic Composition #2 separated from L-11. |
| L-13 | L-13 may comprise permeate from RO. L-13 may comprise mostly water or other solvent. L-13 may comprise water or other solvent originally transferred from the Refrigeration Cycle Portion to the Regeneration Portion during FO. L-13 may comprise regenerated water or other solvent returned to the Refrigeration Cycle Portion from the Regeneration Portion. L-13 may be mixed with L-3 in Mix #2. |
| Supply #1 | Supply #1 may comprise a cooler temperature or lower enthalpy or both heat transfer fluid or material than Return #1. Supply #1 may comprise an application requiring heating or a heat sink or an enthalpy sink or a combination thereof, for example, before absorbing heat in a heat exchange. |
| Return #1 | Return #1 may comprise a warmer temperature or greater enthalpy or both heat transfer fluid or material than Supply #1. Return #1 may comprise an application requiring heating or a heat sink or an enthalpy sink or a combination thereof, for example, after absorbing heat in a heat exchange. |
| Supply #2 | Supply #2 may comprise a cooler temperature or lower enthalpy or both heat transfer fluid or material than Return #2. Supply #2 may comprise an application requiring cooling or a heat source or an enthalpy source or a combination thereof, for example, after discharging heat in a heat exchange. |
| Return #2 | Return #2 may comprise a warmer temperature or greater enthalpy or both heat transfer fluid or material than Supply #2. Return #2 may comprise an application requiring cooling or a heat source or an enthalpy source or a combination thereof, for example, before discharging heat in a heat exchange. |

| Example FIG. Key for FIG. 13 | |
|---|---|
| Label in FIG. | Description |
| L-1 | L-1 may comprise a solution comprising a combination of Organic Composition #1 and aqueous liquid phase. L-1 may comprise at least a portion a single liquid phase combined solution. L-1 may comprise LL-1, except after heat removal from LL-1 in, for example, the Enthalpy Heat Sink Heat Exchanger. Heat removed in the Enthalpy Heat Sink Heat Exchanger may include, but is not limited to, heat from enthalpy of liquid-liquid phase transition and/or heat from specific heat capacity. L-1 is an output of the Enthalpy Sink Heat Exchanger. |
| L-4 | L-4 may comprise a concentrated solution of 'salting-out reagent' or 'concentrate' or 'retentate'. The concentrate may be generated by forward osmosis, 'FO #1'. |
| Mix #1 | Mix #1 may involve mixing or combining L-1 and L-4 to form a multi-liquid phase solution, LL-2. Said mixing may result in a liquid-liquid phase transition, which may possess an enthalpy of phase transition. Said enthalpy of phase transition may be endothermic or exothermic, although may be endothermic in the present embodiment. |
| LL-2 | LL-2 may comprise a multi-liquid phase mixture, which may have resulted from the mixing of L-1 and L-4. LL-2 may possess a lesser temperature and/or lesser enthalpy than L-4 and L-1. LL-2 may possess said lesser temperature, due to, for example, an endothermic liquid-liquid phase transition in Mix #1. LL-2 may possess a latent endothermic enthalpy of phase transition, which may absorb heat in the Enthalpy Source Heat Exchanger. LL-2 may possess a substantially lower temperature than, for example, 'Return #2', and the heat capacity of this substantially lower temperature may be exploited in the Enthalpy Source Heat Exchanger to cool Return #2 to form Supply #2. |
| Enthalpy Source Heat Exchanger | The Enthalpy Source Heat Exchanger may transfer or exchange heat from one or more heat or enthalpy sources to the refrigeration cycle. If the refrigeration cycle is being employed as a chiller or air conditioner or cooling device, Return #2 may comprise the load or application requiring cooling, and the Enthalpy Source Heat Exchanger may be employed to enable the refrigeration cycle to absorb heat from the load or 'cool' the load. If the refrigeration cycle is being employed as a heat pump or heating device, Return #2 may comprise the enthalpy or heat source, and the Enthalpy Source Heat Exchanger may be employed to enable the refrigeration cycle to absorb heat from this enthalpy or heat source. The Enthalpy Source Heat Exchanger transfers heat from Return #2 to LL-2, which may result in Supply #2 (which may possess a cooler temperature or lower enthalpy than Return #2) and LL-3 (which may possess a higher temperature or greater enthalpy than LL-2). |
| LL-3 | LL-3 may comprise a multi-liquid phase mixture, which may have resulted from LL-2 absorbing heat while heat exchanging in the Enthalpy Source Heat Exchanger. LL-3 may possess a greater temperature or greater enthalpy or both than LL-2. |
| LLS-1 | LLS-1 may comprise a liquid-liquid separation device. LLS-1 may separate LL-3 into its constituent liquid phases, which may comprise L-2 and L-3. |

| | |
|---|---|
| L-2 | L-2 may comprise a dilute solution of 'salting-out reagent'. L-2 may comprise one of the liquid phases separated by LLS-1 from multi-liquid phase mixture LL-3. |
| FO #1 | 'FO #1' may comprise a forward osmosis or an osmotically assisted reverse osmosis or combination thereof process. 'FO #1' may involve a feed solution comprising L-2, which may be concentrated into a concentrate or retentate, L-4. 'FO #1' may involve a draw solution comprising 'Organic Composition #2' (L-10) which, during Forward Osmosis, may be diluted by the water and/or other liquid flux through the forward osmosis membrane, which may result in a diluted draw solution (L-5). |
| L-3 | L-3 may comprise a solution comprising mostly 'Organic Composition #1'. L-3 may comprise one of the liquid phases separated by LLS-1 from multi-liquid phase mixture LL-3. |
| LL-1 | LL-1 may comprise a diluted solution of L-3 or a multi-liquid phase mixture or both. For example, L-3 may have been employed as a draw solution in FO #2. Water or other solvent from L-11 may have permeated one or more membranes in FO #2, which may result in a diluted solution of L-3. L-3 may be cooled using, for example, a heat sink or the enthalpy sink heat exchanger before or during FO #2, to, for example, maximize the solubility of water or osmotic pressure of L-3 or both. FO #2 may be combined with the enthalpy source heat exchanger. |
| Enthalpy Sink Heat Exchanger | The Enthalpy Sink Heat Exchanger may transfer or exchange heat from the refrigeration cycle to one or more heat sinks. If the refrigeration cycle is being employed as a chiller or air conditioner or cooling device, Supply #1 may comprise the heat sink or evaporative cooling water supply or air or other heat sink, and the Enthalpy Sink Heat Exchanger may be enable the refrigeration cycle to release or discharge heat into the heat sink. If the refrigeration cycle is being employed as a heat pump or heating device, Supply #1 may comprise the load or application requiring heating, and the Enthalpy Sink Heat Exchanger may enable the refrigeration cycle to supply heat to this load or application requiring heating. The Enthalpy Sink Heat Exchanger transfers heat from LL-1 to Supply #1, which may result in Return #1 (which may possess a hotter temperature or greater enthalpy than Supply #1) and L-1 (which may possess a lesser temperature or lesser enthalpy than LL-1). |
| L-5 | L-5 may comprise a diluted draw solution. L-5 may result from a concentrated draw solution comprising Organic Composition #2 (L-10) drawing water or other solvent from L-2 through a membrane in 'FO'. L-5 may comprise Organic Composition #2 with significantly more water or other solvent dissolved than L-10. L-5 may be at a temperature significantly less than the liquid-liquid phase transition temperature range of L-5. |
| Mix #3 | Mix #3 may involve mixing or combining L-5 and L-12 to form a combined solution (L-6). Mix #3 may involve integrating forward osmosis or osmotically assisted reverse osmosis (FO #2) retentate (L-12) into the diluted draw solution (L-5) before the draw solution regeneration. L-12 may comprise residual Organic Composition #2 in L-11, which may have been separated or recovered by FO or osmotically assisted RO (FO #2). |
| L-6 | L-6 may comprise a combined solution of L-5 and L-12. L-6 may be at a temperature significantly less than the liquid-liquid phase transition temperature range of L-6. |
| Heat Exchanger #3 | Heat Exchanger #3 may comprise a heat exchanger which transfers heat from the components of the dilute draw solution following regeneration and liquid-liquid separation (L-8 and L-9) to L-6. Heat Exchanger #3 may pre-heat L-6, forming L-7, which may minimize thermal energy consumption. Heat Exchanger #3 may enable L-10 and L-11 to be at or near the temperature of the refrigeration cycle, preventing or minimizing heat transfer from the Regeneration Portion into the Refrigeration Cycle Portion and minimizing energetic losses. |
| L-7 | L-7 comprises L-6 after heat exchange with L-8 and L-9 in Heat Exchanger #3, which may result in L-7 being at a greater temperature than L-6. L-7 may be at a temperature close to the liquid-liquid phase transition temperature range of L-7. |
| Thermal Source | Thermal Source may comprise a heat exchanger to supply heat to L-7 near, at, or above the liquid-liquid phase transition temperature range of L-7. Thermal Source may heat up L-7 to at or above its liquid-liquid phase transition temperature range. L-7 may absorb said heat and may undergo an endothermic liquid-liquid phase transition into a multi-liquid phase mixture, LL-4. |
| LL-4 | LL-4 may comprise L-7 following an endothermic phase transition in Thermal Source, due to, for example, heat supplied in Thermal Source. LL-4 may comprising a multi-liquid phase mixture with two or more liquid phases. One of the liquid phases may comprise a solution comprising mostly Organic Composition #2. One of the liquid phases may comprise a solution comprising mostly water or other solvent or a combination thereof. |
| LLS-2 | LLS-2 may comprise a liquid-liquid separation device. LLS-2 may separate LL-4 into its constituent liquid phases, which may comprise a solution comprising mostly Organic Composition #2 (L-8) and/or a solution comprising mostly water or other solvent or a combination thereof (L-9). LLS-2 separates LL-4 into L-8 and L-9. L-8 and L-9 may comprise non- |

| | |
|---|---|
| | contiguously separated streams before Heat Exchanger #3. It may be desirable for L-8 and L-9 to be non-contiguously separated streams before Heat Exchanger #3 to prevent them from dissolving in each other (which may occur if mixed in Heat Exchanger #3, because Heat Exchanger #3 may cool the L-8 and L-9 to a temperature less than their liquid-liquid phase transition temperature range). |
| L-8 | L-8 may comprise a liquid phase separated from multi-liquid phase mixture, LL-4 by liquid-liquid separation device, LLS-2. L-8 may comprise a solution comprising mostly 'Organic Composition #2'. Before Heat Exchanger #3, L-8 may be at a temperature near, at, or above the liquid-liquid phase transition temperature range of L-7. |
| L-9 | L-9 may comprise a liquid phase separated from multi-liquid phase mixture, LL-4 by liquid-liquid separation device, LLS-2. L-9 may comprise a solution comprising mostly water or other solvent or a combination thereof. may be at a temperature near, at, or above the liquid-liquid phase transition temperature range of L-7. |
| L-10 | L-10 may comprise L-8 after heat exchanging with L-6 in Heat Exchanger #3. L-10 may be at a substantially lesser temperature than L-8. L-10 may comprise a solution comprising mostly 'Organic Composition #2'. L-10 may comprise a draw solution in 'FO'. |
| L-11 | L-11 may comprise L-9 after heat exchanging with L-6 in Heat Exchanger #3. L-11 may be at a substantially lesser temperature than L-9. L-11 may comprise a solution comprising mostly water or other solvent or a combination thereof. L-11 may comprise regenerated water or other solvent or a combination thereof which may have been previously drawn from or removed from the Refrigeration Cycle Portion in FO #1. L-11 may contain residual Organic Composition #2, which may be removed or recovered in, for example, 'FO #2'. Water in L-11 may be returned to the Refrigeration Cycle Portion by FO #2, wherein water may transfer through a membrane from L-11 to L-3, which may result in a retentate (L-12) and diluted L-3 (LL-1). |
| FO #2 | FO #2 may comprise a forward osmosis or osmotically assisted reverse osmosis process. FO #2 may involve passing L-11 across a membrane and L-3 across the opposite side of a membrane. Due to osmotic pressure or hydraulic pressure or both, water or other solvent may pass through the membrane from L-11 to L-3, which may result in diluted L-3 or a multi-liquid phase mixture or both (LL-1) and concentrated L-11 residual reagents (L-12). FO #2 may enable water or other solvent from L-11 to be transferred from L-11 to L-3 while preventing the transfer of non-water or non-solvent residual reagents from L-11 or the Regeneration Portion into L-3 or the Refrigeration Cycle portion. Advantageously, FO #2 may enable at least a portion of the energy for returning water to the Refrigeration Cycle portion from the Regeneration portion, while minimizing contamination of the Refrigeration Cycle portion, to be provided by internal osmotic pressure differences rather than electricity or other potentially more costly energy source. FO #2 may be integrated or combined with the Enthalpy Sink Heat Exchanger. For example, a portion of or all the Enthalpy Sink Heat Exchanger may be placed before or during FO #2.<br>FO #2 may involve separating residual Organic Composition #2 from L-11. Separating residual Organic Composition #2 may prevent contamination of the Refrigeration Cycle Portion with Organic Composition #2. It may be desirable for the recovery ratio or recovery rate, or the percentage of L-11 which is in LL-1, to be greater than or equal to, including, but not limited to, one or more or a combination of the following: 10%, or 20%, or 30%, or 40%, or 50%, or 60%, or 70%, or 80%, or 90%, or 95%.<br>FO #2 may involve mixing or combining L-3 and L-11 to form a multi-liquid phase solution, LL-1, or at least a portion single liquid phase combined solution, LL-1, or a single liquid phase combined solution, LL-1. A portion of L-3 and L-11 may combine in FO #2 to form an exothermic or endothermic liquid-liquid phase transition, although in the present embodiment, the liquid-liquid phase transition may form an exothermic phase transition. |
| L-12 | L-12 may comprise retentate or concentrate from FO #2. L-12 may comprise a solution with residual Organic Composition #2 separated from L-11. |
| Supply #1 | Supply #1 may comprise a cooler temperature or lower enthalpy or both heat transfer fluid or material than Return #1. Supply #1 may comprise an application requiring heating or a heat sink or an enthalpy sink or a combination thereof, for example, before absorbing heat in a heat exchange. |
| Return #1 | Return #1 may comprise a warmer temperature or greater enthalpy or both heat transfer fluid or material than Supply #1. Return #1 may comprise an application requiring heating or a heat sink or an enthalpy sink or a combination thereof, for example, after absorbing heat in a heat exchange. |
| Supply #2 | Supply #2 may comprise a cooler temperature or lower enthalpy or both heat transfer fluid or material than Return #2. Supply #2 may comprise an application requiring cooling or a heat source or an enthalpy source or a combination thereof, for example, after discharging heat in a heat exchange. |
| Return #2 | Return #2 may comprise a warmer temperature or greater enthalpy or both heat transfer fluid or material than Supply #2. Return #2 may comprise an |

| | |
|---|---|
| | application requiring cooling or a heat source or an enthalpy source or a combination thereof, for example, before discharging heat in a heat exchange. |

| Example FIG. Key for FIG. 11 | |
|---|---|
| Label in FIG. | Description |
| L-1 | L-1 may comprise a solution comprising a combination of Organic Composition #1 and aqueous liquid phase. L-1 may comprise at least a portion a single liquid phase combined solution. L-1 may comprise L-8, except after heat removal from L-8 in, for example, the Heat Exchanger #3. Heat removed in the Heat Exchanger #3 may include, but is not limited to, heat from enthalpy of liquid-liquid phase transition and/or heat from specific heat capacity. L-1 is an output of Heat Exchanger #3. |
| Heat Exchanger #2 | Heat Exchanger #2 may involve a heat exchange between 'warm' L-1 and 'cold' L-12 and L-5, which may result in 'cold' L-1 and 'warm' L-12 and L-5. L-12 and L-5 may be heat exchanged with L-1 in Heat Exchanger #2 as non-contiguously separate liquid phases to, for example, prevent L-12 and L-5 from dissolving in each other and/or releasing an enthalpy of phase transition during Heat Exchanger #2. Heat Exchanger #2 may enable two separate temperature zones within the Refrigeration Cycle portion of the process. For example, L-6, L-7, Mix #1, L-8, Heat Exchanger #3, and L-1 may comprise a first temperature zone, while L-2, Mix #2, LL-1, Heat Exchanger #1, LL-2, LLS-1, L-3, L-4, and L-5 may comprise a second temperature zone which may be at a significantly different temperature or temperature range than the first temperature zone. Said significantly different temperature may comprise a temperature difference greater than the adiabatic temperature change of the enthalpy of the liquid-liquid phase transition. Said temperature zones may enable the refrigeration cycle to move heat or pump heat across a temperature difference greater than the adiabatic temperature change of the enthalpy of liquid-liquid phase transition. |
| L-2 | L-2 may comprise L-1 after heat exchange in Heat Exchanger #2. L-2 may be at a significantly different temperature than L-1, such as, for example, a temperature difference greater than the adiabatic temperature change of the liquid-liquid phase transition of Organic Composition #1 and water. |
| Mix #2 | Mix #1 may involve mixing or combining L-2 and L-4 to form a multi-liquid phase solution, LL-1. Said mixing may result in a liquid-liquid phase transition, which may possess an enthalpy of phase transition. Said enthalpy of phase transition may be endothermic or exothermic, although may be endothermic in the present embodiment. |
| L-4 | L-4 may comprise a concentrated solution of 'salting-out reagent' or 'concentrate' or 'retentate'. L-4 may also comprise some Organic Composition #1 which may be due to, including, but not limited to, residual from L-3 and/or an incomplete separation in LLS-1 and/or residual Organic Composition #1 dissolved in L-3. The concentrate may be generated by forward osmosis, 'FO'. |
| LL-1 | LL-1 may comprise a multi-liquid phase mixture, which may have resulted from the mixing of L-2 and L-4 in Mix #2. LL-1 may possess a lesser temperature and/or lesser enthalpy than L-4 and L-2. LL-1 may possess said lesser temperature, due to, for example, an endothermic liquid-liquid phase transition in Mix #2. LL-1 may possess a latent endothermic enthalpy of phase transition, which may absorb heat in Heat Exchanger #1. LL-1 may possess a lesser temperature than LL-2, which may enable the absorption of heat in Heat Exchanger #1 due to specific heat capacity. |
| Heat Exchanger #1 | Heat Exchanger #1 may comprise a heat exchanger between LL-1 and an application requiring cooling or a heat source or enthalpy source. LL-1 may absorb heat in a heat exchange with an application requiring cooling or a heat source or enthalpy source, which may result in a higher temperature and/or enthalpy LL-1 (for example: LL-2) and a lower temperature and/or less enthalpy application requiring cooling or heat source or enthalpy source. |
| LL-2 | LL-2 may comprise the same overall composition as LL-1, except at a higher temperature and/or greater enthalpy. LL-2 may comprise LL-1 after heat exchanging in Heat Exchanger #1. LL-2 may comprise at least a portion a multi-liquid phase mixture. It may be desirable for at least one liquid phase of said multi-liquid phase mixture to comprise mostly Organic Composition #1. It may be desirable for at least one liquid phase of said multi-liquid phase mixture to comprise mostly water or a dilute aqueous solution of 'salting-out' reagent. |
| LLS-1 | LLS-1 may comprise a liquid-liquid separation device. LLS-1 may separate LL-2 into constituent liquid phases, which may comprise L-3 and L-5. |
| L-3 | L-3 may comprise a dilute solution of 'salting-out reagent'. L-3 may comprise an aqueous solution. L-3 may comprise one of the liquid phases separated by LLS-1 from multi-liquid phase mixture LL-2. L-3 may comprise residual Organic Composition #1, which may be due to, for example, an incomplete separation in LLS-1 and/or residual Organic Composition #1 dissolved in L-3. |

| | |
|---|---|
| L-5 | L-5 may comprise a solution comprising mostly 'Organic Composition #1'. L-5 may comprise one of the liquid phases separated by LLS-1 from multi-liquid phase mixture LL-2. L-5 may comprise residual water and/or 'salting-out' reagent, which may be due to, for example, an incomplete separation in LLS-1 and/or residual water and/or 'salting-out' reagent dissolved in L-5. |
| FO | 'FO' may comprise a forward osmosis or an osmotically assisted reverse osmosis or combination thereof process. 'FO' may involve a feed solution comprising L-3, which may be concentrated into a concentrate or retentate, L-4. 'FO' may involve a draw solution comprising 'Organic Composition #2' (L-13) which, during Forward Osmosis, may be diluted by water and/or other liquid flux through the forward osmosis membrane, which may result in a diluted draw solution (L-14). |
| L-6 | L-6 may comprise L-5 after heat exchange in Heat Exchanger #2. L-6 may be at a significantly different temperature than L-5, such as, for example, a temperature difference greater than the adiabatic temperature change of the liquid-liquid phase transition of Organic Composition #1 and water. L-6 may be non-contiguously separate from L-7. |
| L-7 | L-7 may comprise L-12 after heat exchange in Heat Exchanger #2. L-7 may be at a significantly different temperature than L-12, such as, for example, a temperature difference greater than the adiabatic temperature change of the liquid-liquid phase transition of Organic Composition #1 and water. L-7 may be non-contiguously separate from L-6. |
| Mix #1 | Mix #1 may involve mixing or combining L-6 and L-7 to form, including, but not limited to, one or more or a combination of the following: a multi-liquid phase solution, L-8, or at least a portion single liquid phase combined solution, L-8, or a single liquid phase combined solution, L-8. L-6 and L-7 may Mix in Mix #1 to form an exothermic or endothermic liquid-liquid phase transition, although the present embodiment may form an exothermic phase transition. It may be desirable for the adiabatic temperature change of said enthalpy of said liquid-liquid phase transition to be greater than the approach temperature and/or heat exchanger Delta-T of Heat Exchanger #2. |
| L-8 | L-8 may comprise a combination of L-6 and L-7. L-8 may comprise including, but not limited to, one or more or a combination of the following: a multi-liquid phase solution, or at least a portion single liquid phase combined solution, or a single liquid phase combined solution. L-8 may be at a greater temperature and/or greater enthalpy than L-1. |
| Heat Exchanger #3 | Heat Exchanger #3 may involve heat exchanging L-8 with an application requiring heating or a heat sink or a cold source, which may result in a lesser temperature and/or lesser enthalpy L-8 (for example: L-1) and a greater temperature and/or greater enthalpy application requiring heating or a heat sink or a cold source. |
| L-9 | L-9 may comprise L-14 after heat exchange with L-10 and L-11 in Heat Exchanger #4, which may result in L-9 being at a greater temperature than L-14. L-9 may be at a temperature close to the liquid-liquid phase transition temperature range of L-9. |
| Thermal Source | Thermal Source may comprise a heating source or a cooling source. If the Regeneration Portion comprises a LCST, Thermal Source may comprise a heating source or enthalpy source or heat addition heat exchange. If the Regeneration Portion comprises a UCST, Thermal Source may comprise a cooling source or heat sink or heat removal heat exchange. |
| LL-3 | LL-3 may comprise L-9 following an endothermic phase transition in Thermal Source, due to, for example, heat supplied in Thermal Source. LL-3 may comprise a multi-liquid phase mixture with two or more liquid phases. One of the liquid phases may comprise a solution comprising mostly Organic Composition #2. One of the liquid phases may comprise a solution comprising mostly water or other solvent or a combination thereof. |
| LLS-2 | LLS-2 may comprise a liquid-liquid separation device. LLS-2 may separate LL-3 into its constituent liquid phases, which may comprise a solution comprising mostly Organic Composition #2 (L-11) and/or a solution comprising mostly water or other solvent or a combination thereof (L-10). LLS-2 separates LL-3 into L-10 and L-11. L-10 and L-11 may comprise non-contiguously separated streams before Heat Exchanger desirable for L-10 and L-11 to be non-contiguously separated streams before Heat Exchanger #4 to, for example, prevent L-10 and L-11 from dissolving in each other (which may occur if mixed in Heat Exchanger Heat Exchanger #4 may cool L-10 and L-11 to less than their liquid-liquid phase transition temperature range). |
| L-10 | L-10 may comprise a liquid phase separated from multi-liquid phase mixture, LL-3, by a liquid-liquid separation device, LLS-2. L-10 may comprise a solution comprising mostly water or other solvent or a combination thereof. L-10 may be at a temperature near, at, or above the liquid-liquid phase transition temperature range of L-9. |
| L-11 | L-11 may comprise a liquid phase separated from multi-liquid phase mixture, LL-3 by a liquid-liquid separation device, LLS-2. L-11 may comprise a solution comprising mostly 'Organic Composition #2'. Before Heat Exchanger #4, L-11 may be at a temperature near, at, or above the liquid-liquid phase transition temperature range of L-9. |
| Heat Exchanger #4 | Heat Exchanger #4 may comprise a heat exchanger which transfers heat from the components of the dilute draw solution (L-14) following |

| | |
|---|---|
| | regeneration and liquid-liquid separation (L-10 and L-11) to L-14. Heat Exchanger #4 may pre-heat L-14, forming L-9, which may minimize thermal energy consumption. Heat Exchanger #4 may enable L-12 and L-13 to be at or near the temperature of the refrigeration cycle, preventing or minimizing heat transfer from the Regeneration Portion into the Refrigeration Cycle Portion and minimizing energetic losses. Heat Exchanger #4 may minimize energy consumption in the Thermal Source or overall regeneration portion of the process by minimizing the relative proportion of heat required for heating the liquid to the liquid-liquid phase transition temperature and maximizing the relative proportion of heat employed to power or absorbed by the liquid-liquid phase transition from L-9 to LL-3. Heat Exchanger #4 may enable L-10 and L-11 to be cooled while preventing L-10 and L-11 from dissolving in each other, by, for example, ensuring L-10 and L-11 are non-contiguously separate during cooling. |
| L-12 | L-12 may comprise mostly water and/or other solvent which may have at some point passed through a membrane during 'FO' from the Refrigeration Cycle Portion of the process to the Regeneration Portion of the process. L-12 may comprise the returning of said water and/or other solvent to the Refrigeration Cycle Portion following regeneration of said water and/or other solvent in the Regeneration Portion. L-12 may contain residual Organic Composition #2, which may be, if desired, partially or completely removed to, for example, prevent contamination of the Refrigeration Cycle Portion with Organic Composition #2. L-12 (or L-7) may serve a functional role as the water and/or other solvent which may be mixed with L-6 to form a heat of phase transition, such as an exothermic enthalpy of mixing. Said exothermic enthalpy of phase transition may comprise at least a portion of the heat pumped or moved from Heat Exchanger #1 to Heat Exchanger #3. |
| L-13 | L-13 may comprise L-11 after heat exchanging with L-14 in Heat Exchanger #4. L-13 may be at a substantially lesser temperature than L-11. L-13 may comprise a solution comprising mostly 'Organic Composition #2'. L-13 may comprise a draw solution in 'FO'. |
| L-14 | L-14 may comprise a diluted draw solution. L-14 may result from a concentrated draw solution comprising Organic Composition #2 (L-14) drawing water or other solvent from L-3 through a membrane in 'FO'. L-14 may comprise Organic Composition #2 with significantly more water or other solvent dissolved than L-13. L-14 may be at a temperature significantly less than a liquid-liquid phase transition temperature range of L-14. |

| Example FIG. Key for FIG. 12 | |
|---|---|
| Label in FIG. | Description |
| L-1 | L-1 may comprise a solution comprising a combination of Organic Composition #1 and aqueous liquid phase. L-1 may comprise at least a portion a single liquid phase combined solution. L-1 may comprise L-8, except after heat removal from L-8 in, for example, the Heat Exchanger #3. Heat removed in Heat Exchanger #3 may include, but is not limited to, heat from enthalpy of liquid-liquid phase transition and/or heat from specific heat capacity. L-1 may be an output of Heat Exchanger #3. |
| Heat Exchanger #2 | Heat Exchanger #2 may involve a heat exchange between 'warm' L-1 and 'cold' L-14 and L-5, which may result in 'cold' L-1 and 'warm' L-14 and L-5 (L-7 and L-6, respectively). L-14 and L-5 may be heat exchanged with L-1 in Heat Exchanger #2 as non-contiguously separate liquid phases to, for example, prevent L-14 and L-5 from dissolving in each other and/or releasing an enthalpy of phase transition during Heat Exchanger #2. Heat Exchanger #2 may enable two separate temperature zones within the Refrigeration Cycle portion of the process. For example, L-6, L-7, Mix #1, L-8, Heat Exchanger #3, and L-1 may comprise a first temperature zone, while L-2, Mix #2, LL-1, Heat Exchanger #1, LL-2, LLS-1, L-3, L-4, and L-5 may comprise a second temperature zone which may be at a significantly different temperature or temperature range than the first temperature zone. Said significantly different temperature may comprise a temperature difference greater than the adiabatic temperature change of the enthalpy of the liquid-liquid phase transition. Said temperature zones may enable the refrigeration cycle to move heat or pump heat across a temperature difference greater than the adiabatic temperature change of the enthalpy of liquid-liquid phase transition. |
| L-2 | L-2 may comprise L-1 after heat exchange in Heat Exchanger #2. L-2 may be at a significantly different temperature than L-1, such as, for example, a temperature difference greater than the adiabatic temperature change of the liquid-liquid phase transition of Organic Composition #1 and water. |
| Mix #2 | Mix #1 may involve mixing or combining L-2 and L-4 to form a multi-liquid phase solution, LL-1. Said mixing may result in a liquid-liquid phase transition, which may possess an enthalpy of phase transition. Said enthalpy of phase transition may be endothermic or exothermic, although may be endothermic in the present embodiment. |
| L-4 | L-4 may comprise a concentrated solution of 'salting-out reagent' or 'concentrate' or 'retentate'. L-4 may further comprise some Organic |

| | |
|---|---|
| | Composition #1 which may be due to, including, but not limited to, residual from L-3 and/or an incomplete separation in LLS-1 and/or residual Organic Composition #1 dissolved in L-3. The concentrate may be generated by forward osmosis, 'FO'. |
| LL-1 | LL-1 may comprise a multi-liquid phase mixture, which may have resulted from the mixing of L-2 and L-4 in Mix #2. LL-1 may possess a lesser temperature and/or lesser enthalpy than L-4 and L-2. LL-1 may possess said lesser temperature, due to, for example, an endothermic liquid-liquid phase transition in Mix #2. LL-1 may possess a latent endothermic enthalpy of phase transition, which may absorb heat in Heat Exchanger #1. LL-1 may possess a lesser temperature than LL-2, which may enable the absorption of heat in Heat Exchanger #1 due to specific heat capacity. |
| Heat Exchanger #1 | Heat Exchanger #1 may comprise a heat exchanger between LL-1 and an application requiring cooling or a heat source or enthalpy source. LL-1 may absorb heat in a heat exchange with an application requiring cooling or a heat source or enthalpy source, which may result in a higher temperature and/or enthalpy LL-1 (for example: LL-2) and a lower temperature and/or less enthalpy application requiring cooling or heat source or enthalpy source. |
| LL-2 | LL-2 may comprise the same overall composition as LL-1, except at a higher temperature and/or greater enthalpy. LL-2 may comprise LL-1 after heat exchanging in Heat Exchanger #1. LL-2 may comprise at least a portion a multi-liquid phase mixture. It may be desirable for at least one liquid phase of said multi-liquid phase mixture to comprise mostly Organic Composition #1. It may be desirable for at least one liquid phase of said multi-liquid phase mixture to comprise mostly water or a dilute aqueous solution of 'salting-out' reagent. |
| LLS-1 | LLS-1 may comprise a liquid-liquid separation device. LLS-1 may separate LL-2 into constituent liquid phases, which may comprise L-3 and L-5. |
| L-3 | L-3 may comprise a dilute solution of 'salting-out reagent'. L-3 may comprise an aqueous solution or mostly water or other solvent solution. L-3 may comprise one of the liquid phases separated by LLS-1 from multi-liquid phase mixture LL-2. L-3 may comprise residual Organic Composition #1, which may be due to, for example, an incomplete separation in LLS-1 and/or residual Organic Composition #1 dissolved in L-3. |
| L-5 | L-5 may comprise a solution comprising mostly 'Organic Composition #1'. L-5 may comprise one of the liquid phases separated by LLS-1 from multi-liquid phase mixture LL-2. L-5 may further comprise residual water and/or 'salting-out' reagent, which may be due to, for example, an incomplete separation in LLS-1 and/or residual water and/or 'salting-out' reagent dissolved in L-5. |
| FO | 'FO' may comprise a forward osmosis or an osmotically assisted reverse osmosis or combination thereof process. 'FO' may involve a feed solution comprising L-3, which may be concentrated into a concentrate or retentate, L-4. 'FO' may involve a draw solution comprising 'Organic Composition #2' (L-15) which, during Forward Osmosis, may be diluted by water and/or other liquid flux through the forward osmosis membrane, which may result in a diluted draw solution (L-16). |
| L-6 | L-6 may comprise L-5 after heat exchange in Heat Exchanger #2. L-6 may be at a significantly different temperature than L-5, such as, for example, a temperature difference greater than the adiabatic temperature change of the liquid-liquid phase transition of Organic Composition #1 and water. L-6 may be non-contiguously separate from L-7. |
| L-7 | L-7 may comprise L-14 after heat exchange in Heat Exchanger #2. L-7 may be at a significantly different temperature than L-12, such as, for example, a temperature difference greater than the adiabatic temperature change of the liquid-liquid phase transition of Organic Composition #1 and water. L-7 may be non-contiguously separate from L-6. |
| Mix #1 | Mix #1 may involve mixing or combining L-6 and L-7 to form, including, but not limited to, one or more or a combination of the following: a multi-liquid phase solution, L-8, or at least a portion single liquid phase combined solution, L-8, or a single liquid phase combined solution, L-8. L-6 and L-7 may Mix in Mix #1 to form an exothermic or endothermic liquid-liquid phase transition, although the present embodiment may form an exothermic phase transition. It may be desirable for the adiabatic temperature change of said enthalpy of said liquid-liquid phase transition to be greater than the approach temperature and/or heat exchanger Delta-T of Heat Exchanger #2. |
| L-8 | L-8 may comprise a combination of L-6 and L-7. L-8 may comprise including, but not limited to, one or more or a combination of the following: a multi-liquid phase solution, or at least a portion single liquid phase combined solution, or a single liquid phase combined solution. L-8 may be at a greater temperature and/or greater enthalpy than L-1. |
| Heat Exchanger #3 | Heat Exchanger #3 may involve heat exchanging L-8 with an application requiring heating or a heat sink or a cold source, which may result in a lesser temperature and/or lesser enthalpy L-8 (for example: L-1) and a greater temperature and/or greater enthalpy application requiring heating or a heat sink or a cold source. |

| | |
|---|---|
| L-9 | L-9 may comprise L-17 after heat exchange with L-10 and L-11 in Heat Exchanger #4, which may result in L-9 being at a greater temperature than L-17. L-9 may be at a temperature close to the liquid-liquid phase transition temperature range of L-9. |
| Thermal Source | Thermal Source may comprise a heating source or a cooling source. If the Regeneration Portion comprises a LCST, Thermal Source may comprise a heating source or enthalpy source or heat addition heat exchange. If the Regeneration Portion comprises a UCST, Thermal Source may comprise a cooling source or heat sink or heat removal heat exchange. |
| LL-3 | LL-3 may comprise L-9 following an endothermic phase transition in Thermal Source, due to, for example, heat supplied in Thermal Source. LL-3 may comprise a multi-liquid phase mixture with two or more liquid phases. One of the liquid phases may comprise a solution comprising mostly Organic Composition #2. One of the liquid phases may comprise a solution comprising mostly water or other solvent or a combination thereof. |
| LLS-2 | LLS-2 may comprise a liquid-liquid separation device. LLS-2 may separate LL-3 into its constituent liquid phases, which may comprise a solution comprising mostly Organic Composition #2 (L-11) and/or a solution comprising mostly water or other solvent or a combination thereof (L-10). LLS-2 separates LL-3 into L-10 and L-11. L-10 and L-11 may comprise non-contiguously separated streams before Heat Exchanger desirable for L-10 and L-11 to be non-contiguously separated streams before Heat Exchanger #4 to, for example, prevent L-10 and L-11 from dissolving in each other (which may occur if mixed in Heat Exchanger Heat Exchanger #4 may cool L-10 and L-11 to less than their liquid-liquid phase transition temperature range). |
| L-10 | L-10 may comprise a liquid phase separated from multi-liquid phase mixture, LL-3, by a liquid-liquid separation device, LLS-2. L-10 may comprise a solution comprising mostly water or other solvent or a combination thereof. L-10 may be at a temperature near, at, or above the liquid-liquid phase transition temperature range of L-9. |
| L-11 | L-11 may comprise a liquid phase separated from multi-liquid phase mixture, LL-3 by a liquid-liquid separation device, LLS-2. L-11 may comprise a solution comprising mostly 'Organic Composition #2'. Before Heat Exchanger #4, L-11 may be at a temperature near, at, or above the liquid-liquid phase transition temperature range of L-9. |
| Heat Exchanger #4 | Heat Exchanger #4 may comprise a heat exchanger which transfers heat from the components of the dilute draw solution (L-17) following regeneration and liquid-liquid separation (L-10 and L-11) to L-17. Heat Exchanger #4 may pre-heat L-17, forming L-9, which may minimize thermal energy consumption. Heat Exchanger #4 may enable L-12 and L-15 to be at or near the temperature of the refrigeration cycle, preventing or minimizing heat transfer from the Regeneration Portion into the Refrigeration Cycle Portion and minimizing energetic losses. Heat Exchanger #4 may minimize energy consumption in the Thermal Source or overall Regeneration Portion of the process by minimizing the relative proportion of heat employed for heating the liquid to the liquid-liquid phase transition temperature and maximizing the relative proportion of heat employed to power or absorbed by the liquid-liquid phase transition from L-9 to LL-3. Heat Exchanger #4 may enable L-10 and L-11 to be cooled while preventing L-10 and L-11 from dissolving in each other, by, for example, ensuring L-10 and L-11 are non-contiguously separate during cooling. |
| L-12 | L-12 may comprise mostly water and/or other solvent which may have at some point passed through a membrane during 'FO' from the Refrigeration Cycle Portion of the process to the Regeneration Portion of the process. L-12 may contain residual Organic Composition #2, which may be, if desired, partially or completely removed using, for example, 'RO', to, for example, prevent contamination of the Refrigeration Cycle Portion with Organic Composition #2. L-12 may comprise a feed solution to 'RO'. |
| RO | RO may comprise reverse osmosis or nanofiltration or other membrane-based process or separation process or a combination thereof. RO may involve separating residual Organic Composition #2 from L-12. Separating residual Organic Composition #2 may prevent contamination of the Refrigeration Cycle Portion with Organic Composition #2. RO may separate L-12 into a concentrate or retentate stream, which may comprise a portion Organic Composition #2 (L-13), and a permeate stream, which may comprise a mostly water or other solvent (L-14). It may be desirable for the recovery ratio or recovery rate, or the percentage of the mass of L-12 which is in the permeate, to be greater than or equal to, including, but not limited to, one or more or a combination of the following: 10%, or 20%, or 30%, or 40%, or 50%, or 60%, or 70%, or 80%, or 90%, or 95%. |
| L-13 | L-13 may comprise retentate or concentrate from RO. L-13 may comprise a solution with residual Organic Composition #2 separated from L-12. |
| L-14 | L-14 may comprise permeate from RO. L-14 may comprise mostly water or other solvent. L-14 may comprise a lesser concentration of Organic Composition #2 than L-12. L-14 may comprise water or other solvent originally transferred from the Refrigeration Cycle Portion to the Regeneration Portion during FO. L-14 may comprise regenerated water or other solvent returned to the Refrigeration Cycle Portion from the |

| | |
|---|---|
| | Regeneration Portion. L-14 (or L-7) may serve a functional role as the water and/or other solvent which may be mixed with L-6 to form a heat of phase transition, such as an exothermic enthalpy of mixing. Said exothermic enthalpy of phase transition may comprise at least a portion of the heat pumped or moved from Heat Exchanger #1 to Heat Exchanger #3. |
| L-15 | L-15 may comprise L-11 after heat exchanging with L-17 in Heat Exchanger #4. L-15 may be at a substantially lesser temperature than L-11. L-15 may comprise a solution comprising mostly 'Organic Composition #2'. L-15 may comprise a draw solution in 'FO'. |
| L-16 | L-16 may comprise a diluted draw solution. L-16 may result from a concentrated draw solution comprising Organic Composition #2 (L-15) drawing water or other solvent from L-3 through a membrane in 'FO'. L-16 may comprise Organic Composition #2 with significantly more water or other solvent dissolved than L-15. L-16 may be at a temperature significantly less than a liquid-liquid phase transition temperature range of L-16. |
| Mix #3 | Mix #3 may involve mixing or combining L-13 and L-16 to form a combined solution (L-17). Mix #3 may involve integrating reverse osmosis retentate (L-13) into the diluted draw solution (L-16) before the draw solution regeneration. L-13 may comprise residual Organic Composition #2 in L-12, which may have been separated or recovered by RO. |
| L-17 | L-17 may comprise a combined solution of L-13 and L-16. L-17 may be at a temperature significantly less than the liquid-liquid phase transition temperature range of L-17. L-17 may possess a lesser mass concentration of residual Organic Composition #2 and a greater mass concentration of water or other solvent than L-16. L-17 may possess more favorable liquid-liquid phase transition properties than L-16. |

| Example FIG. Key FIG. 14 | |
|---|---|
| Label in FIG. | Description |
| L-1 | L-1 may comprise a solution comprising a combination of Organic Composition #1 and aqueous liquid phase. L-1 may comprise at least a portion a single liquid phase combined solution. L-1 may comprise LL-1, except after heat removal from LL-1 in, for example, the Enthalpy Heat Sink Heat Exchanger. Heat removed in the Enthalpy Heat Sink Heat Exchanger may include, but is not limited to, heat from enthalpy of liquid-liquid phase transition and/or heat from specific heat capacity. L-1 is an output of the Enthalpy Sink Heat Exchanger. |
| L-4 | L-4 may comprise a concentrated solution of 'salting-out reagent' or 'concentrate' or 'retentate'. L-4 may also comprise some Organic Composition #1 which may be due to, including, but not limited to, residual from L-3 and/or an incomplete separation in LLS-1 and/or residual Organic Composition #1 dissolved in L-2. L-4 may be generated by 'FO'. |
| Mix #1 | Mix #1 may involve mixing or combining L-1 and L-4 to form a multi-liquid phase solution, LL-2. Said mixing may result in a liquid-liquid phase transition, which may possess an enthalpy of phase transition. Said enthalpy of phase transition may be endothermic or exothermic, although may be endothermic in the present embodiment. |
| LL-2 | LL-2 may comprise a multi-liquid phase mixture, which may have resulted from the mixing of L-1 and L-4. LL-2 may possess a lesser temperature and/or lesser enthalpy than L-4 and L-1. LL-2 may possess said lesser temperature, due to, for example, an endothermic liquid-liquid phase transition in Mix #1. LL-2 may possess a latent endothermic enthalpy of phase transition, which may absorb heat in the Enthalpy Source Heat Exchanger. LL-2 may possess a substantially lower temperature than, for example, 'Return #2', and the heat capacity of this substantially lower temperature may be exploited in the Enthalpy Source Heat Exchanger to cool Return #2 to form Supply #2. |
| Enthalpy Source Heat Exchanger | The Enthalpy Source Heat Exchanger may transfer or exchange heat from one or more heat or enthalpy sources to the refrigeration cycle. If the refrigeration cycle is being employed as a chiller or air conditioner or cooling device, Return #2 may comprise the load or application requiring cooling, and the Enthalpy Source Heat Exchanger may be employed to enable the refrigeration cycle to absorb heat from the load or 'cool' the load. If the refrigeration cycle is being employed as a heat pump or heating device, Return #2 may comprise the enthalpy or heat source, and the Enthalpy Source Heat Exchanger may be employed to enable the refrigeration cycle to absorb heat from this enthalpy or heat source. The Enthalpy Source Heat Exchanger transfers heat from Return #2 to LL-2, which may result in Supply #2 (which may possess a cooler temperature or lower enthalpy than Return #2) and LL-3 (which may possess a higher temperature or greater enthalpy than LL-2). |
| LL-3 | LL-3 may comprise a multi-liquid phase mixture, which may have resulted from LL-2 absorbing heat while heat exchanging in the Enthalpy Source Heat Exchanger. LL-3 may possess a greater temperature or greater enthalpy or both than LL-2. |

| | |
|---|---|
| LLS-1 | LLS-1 may comprise a liquid-liquid separation device. LLS-1 may separate LL-3 into constituent liquid phases, which may comprise L-2 and L-3. |
| L-2 | L-2 may comprise a dilute solution of 'salting-out reagent'. L-2 may comprise one of the liquid phases separated by LLS-1 from multi-liquid phase mixture LL-3. L-2 may comprise a feed solution into 'FO'. |
| L-5 | L-5 may comprise a draw solution in 'FO'. L-5 may comprise a concentrated brine or other solution with a large osmotic pressure. L-5 may desirably have an osmotic pressure greater than L-2 or L-4. Alternatively, L-5 may have an osmotic pressure near, at, or less than the osmotic pressure of L-4, and FO may comprise an osmotically assisted reverse osmosis system. L-5 may comprise, for example, including, but not limited to, one or more or a combination of the following: sugar water, concentrate, juice concentrate, syrup concentrate, malt concentrate, beverage concentrate, seawater, brackish water, saline water, evaporation pond brine, brine from hypersaline lake, brine from saline aquifer, saline brine from underground, reverse osmosis brine, evaporator brine, cryodesalination brine, or frack water brine. |
| FO | 'FO' may comprise a forward osmosis or an osmotically assisted reverse osmosis or combination thereof process. 'FO' may involve a feed solution comprising L-2, which may be concentrated into a concentrate or retentate, L-4. 'FO' may involve a draw solution comprising 'Brine' (L-5) which, during Forward Osmosis, may be diluted by the water and/or other liquid flux through a 'FO' membrane, which may result in a diluted draw solution or 'Dilute Brine' (L-6). |
| L-6 | L-6 may comprise diluted draw solution (for example: diluted L-5) following forward osmosis or osmotically assisted reverse osmosis in 'FO'. L-6 may be returned to the original source of L-5. Alternatively, L-6 may comprise a valuable byproduct, for example, which may include, but is not limited to, one or more or a combination of the following: a feedstock for a beverage, or a feedstock for brewery, or feedstock to a fermentation process, or a drilling fluid feedstock, or a antifreeze solution. The water permeating into L-5 during 'FO' to form L-6 may comprise a similar or the same mass of water added to the process in L-7. |
| L-3 | L-3 may comprise a solution comprising mostly 'Organic Composition #1'. L-3 may comprise one of the liquid phases separated by LLS-1 from multi-liquid phase mixture LL-3. |
| L-7 | L-7 may comprise freshwater input. Freshwater input may undergo treatment to remove or minimize potential contaminants or foulants. If necessary, said treatment may be conducted, for example, before Mix #2. |
| Mix #2 | Mix #2 may involve mixing or combining L-3 and L-7 to form a multi-liquid phase solution, LL-1, or at least a portion single liquid phase combined solution, LL-1, or a single liquid phase combined solution, LL-1. L-3 and L-7 may Mix in Mix #2 to form an exothermic or endothermic liquid-liquid phase transition, although in the present embodiment, the liquid-liquid phase transition may form an exothermic phase transition. |
| LL-1 | LL-1 may comprise a mixture or combination of L-3 and L-7. Depending on the temperature of L-3 and L-7, LL-1 may combine to form a single liquid phase combined solution, at least a portion of a single liquid phase combined solution, or a multi-liquid phase mixture. For example, if L-3 and L-7 combine at a temperature less than their liquid-liquid phase transition temperature by a temperature difference greater than the adiabatic temperature change of their enthalpy of phase transition, the LL-1 may comprise a single liquid phase combined solution at a greater temperature than L-3 and/or L-7. For example, if L-3 and L-7 combine at a temperature less than their liquid-liquid phase transition temperature by a temperature difference less than the adiabatic temperature change of their enthalpy of phase transition, the LL-1 may comprise a portion, but not entirely, a single liquid phase combined solution at a greater temperature than L-3 and/or L-7. For example, if L-3 and L-7 combine at a temperature equal to or greater than their liquid-liquid phase transition temperature, the LL-1 may comprise a multi-liquid phase mixture. |
| Enthalpy Sink Heat Exchanger | The Enthalpy Sink Heat Exchanger may transfer or exchange heat from the refrigeration cycle to one or more heat sinks. If the refrigeration cycle is being employed as a chiller or air conditioner or cooling device, Supply #1 may comprise the heat sink or evaporative cooling water supply or air or other heat sink, and the Enthalpy Sink Heat Exchanger may be enable the refrigeration cycle to release or discharge heat into the heat sink. If the refrigeration cycle is being employed as a heat pump or heating device, Supply #1 may comprise the load or application requiring heating, and the Enthalpy Sink Heat Exchanger may enable the refrigeration cycle to supply heat to this load or application requiring heating. The Enthalpy Sink Heat Exchanger transfers heat from LL-1 to Supply #1, which may result in Return #1 (which may possess a hotter temperature or greater enthalpy than Supply #1) and L-1 (which may possess a lesser temperature or lesser enthalpy than LL-1). |
| Supply #1 | Supply #1 may comprise a cooler temperature or lower enthalpy or both heat transfer fluid or material than Return #1. Supply #1 may comprise an application requiring heating or a heat sink or an enthalpy sink or a combination thereof, for example, before absorbing heat in a heat exchange. |

| | -continued |
|---|---|
| Return #1 | Return #1 may comprise a warmer temperature or greater enthalpy or both heat transfer fluid or material than Supply #1. Return #1 may comprise an application requiring heating or a heat sink or an enthalpy sink or a combination thereof, for example, after absorbing heat in a heat exchange. |
| Supply #2 | Supply #2 may comprise a cooler temperature or lower enthalpy or both heat transfer fluid or material than Return #2. Supply #2 may comprise an application requiring cooling or a heat source or an enthalpy source or a combination thereof, for example, after discharging heat in a heat exchange. |
| Return #2 | Return #2 may comprise a warmer temperature or greater enthalpy or both heat transfer fluid or material than Supply #2. Return #2 may comprise an application requiring cooling or a heat source or an enthalpy source or a combination thereof, for example, before discharging heat in a heat exchange. |

| Example FIG. Key FIG. 15 | |
|---|---|
| Label in FIG. | Description |
| L-1 | L-1 may comprise a solution comprising a combination of Organic Composition #1 and aqueous liquid phase. L-1 may comprise at least a portion a single liquid phase combined solution. L-1 may comprise LL-1, except after heat removal from LL-1 in, for example, the Enthalpy Heat Sink Heat Exchanger. Heat removed in the Enthalpy Heat Sink Heat Exchanger may include, but is not limited to, heat from enthalpy of liquid-liquid phase transition and/or heat from specific heat capacity. L-1 is an output of the Enthalpy Sink Heat Exchanger. |
| L-4 | L-4 may comprise a concentrated solution of 'salting-out reagent' or 'concentrate' or 'retentate'. L-4 may also comprise some Organic Composition #1 which may be due to, including, but not limited to, residual from L-3 and/or an incomplete separation in LLS-1 and/or residual Organic Composition #1 dissolved in L-2. L-4 may be generated by 'FO'. |
| Mix #1 | Mix #1 may involve mixing or combining L-1 and L-4 to form a multi-liquid phase solution, LL-2. Said mixing may result in a liquid-liquid phase transition, which may possess an enthalpy of phase transition. Said enthalpy of phase transition may be endothermic or exothermic, although may be endothermic in the present embodiment. |
| LL-2 | LL-2 may comprise a multi-liquid phase mixture, which may have resulted from the mixing of L-1 and L-4. LL-2 may possess a lesser temperature and/or lesser enthalpy than L-4 and L-1. LL-2 may possess said lesser temperature, due to, for example, an endothermic liquid-liquid phase transition in Mix #1. LL-2 may possess a latent endothermic enthalpy of phase transition, which may absorb heat in the Enthalpy Source Heat Exchanger. LL-2 may possess a substantially lower temperature than, for example, 'Return #2', and the heat capacity of this substantially lower temperature may be exploited in the Enthalpy Source Heat Exchanger to cool Return #2 to form Supply #2. |
| Enthalpy Source Heat Exchanger | The Enthalpy Source Heat Exchanger may transfer or exchange heat from one or more heat or enthalpy sources to the refrigeration cycle. If the refrigeration cycle is being employed as a chiller or air conditioner or cooling device, Return #2 may comprise the load or application requiring cooling, and the Enthalpy Source Heat Exchanger may be employed to enable the refrigeration cycle to absorb heat from the load or 'cool' the load. If the refrigeration cycle is being employed as a heat pump or heating device, Return #2 may comprise the enthalpy or heat source, and the Enthalpy Source Heat Exchanger may be employed to enable the refrigeration cycle to absorb heat from this enthalpy or heat source. The Enthalpy Source Heat Exchanger transfers heat from Return #2 to LL-2, which may result in Supply #2 (which may possess a cooler temperature or lower enthalpy than Return #2) and LL-3 (which may possess a higher temperature or greater enthalpy than LL-2). |
| LL-3 | LL-3 may comprise a multi-liquid phase mixture, which may have resulted from LL-2 absorbing heat while heat exchanging in the Enthalpy Source Heat Exchanger. LL-3 may possess a greater temperature or greater enthalpy or both than LL-2. |
| LLS-1 | LLS-1 may comprise a liquid-liquid separation device. LLS-1 may separate LL-3 into constituent liquid phases, which may comprise L-2 and L-3. |
| L-2 | L-2 may comprise a dilute solution of 'salting-out reagent'. L-2 may comprise one of the liquid phases separated by LLS-1 from multi-liquid phase mixture LL-3. L-2 may comprise a feed solution into 'FO'. |
| L-5 | Liquid B or L-5 may comprise a draw solution in 'FO'. L-5 may comprise a solution with a large osmotic pressure. L-5 may desirably have an osmotic pressure greater than L-2 or L-4. Alternatively, L-5 may have an osmotic pressure near, at, or less than the osmotic pressure of L-4, and FO may comprise an osmotically assisted reverse osmosis system. L-5 may comprise, for example, including, but not limited to, one or more or a combination of the following: sugar water, concentrate, juice concentrate, syrup concentrate, malt concentrate, beverage concentrate, seawater, |

-continued

| | |
|---|---|
| FO | 'FO' may comprise a forward osmosis or an osmotically assisted reverse osmosis or combination thereof process. 'FO' may involve a feed solution comprising L-2, which may be concentrated into a concentrate or retentate, L-4. 'FO' may involve a draw solution comprising 'Liquid B' (L-5) which, during Forward Osmosis, may be diluted by the water and/or other liquid flux through a 'FO' membrane, which may result in a diluted draw solution or 'Dilute Liquid B' (L-6). |
| L-6 | Dilute Liquid B or L-6 may comprise diluted draw solution (for example: diluted L-5) following forward osmosis or osmotically assisted reverse osmosis in 'FO'. L-6 may be returned to the original source of L-5. Alternatively, L-6 may comprise a valuable byproduct, for example, which may include, but is not limited to, one or more or a combination of the following: a feedstock for a beverage, or a feedstock for brewery, or feedstock to a fermentation process, or a drilling fluid feedstock, or a antifreeze solution. The water permeating into L-5 during 'FO' to form L-6 may comprise a similar or the same mass of water added to the process in L-7. |
| L-3 | L-3 may comprise a solution comprising mostly 'Organic Composition #1'. L-3 may comprise one of the liquid phases separated by LLS-1 from multi-liquid phase mixture LL-3. |
| L-7 | Liquid A or L-7 may comprise solvent or membrane permeable solvent input, which may include, but is not limited to, water, ammonia, organic solvent, inorganic solvent, or a combination thereof. Liquid A or L-7 input may undergo treatment to remove or minimize potential contaminants or foulants. If necessary, said treatment may be conducted, for example, before Mix #2. |
| Mix #2 | Mix #2 may involve mixing or combining L-3 and L-7 to form a multi-liquid phase solution, LL-1, or at least a portion single liquid phase combined solution, LL-1, or a single liquid phase combined solution, LL-1. L-3 and L-7 may Mix in Mix #2 to form an exothermic or endothermic liquid-liquid phase transition, although in the present embodiment, the liquid-liquid phase transition may form an exothermic phase transition. |
| LL-1 | LL-1 may comprise a mixture or combination of L-3 and L-7. Depending on the temperature of L-3 and L-7, LL-1 may combine to form a single liquid phase combined solution, at least a portion of a single liquid phase combined solution, or a multi-liquid phase mixture. For example, if L-3 and L-7 combine at a temperature less than their liquid-liquid phase transition temperature by a temperature difference greater than the adiabatic temperature change of their enthalpy of phase transition, the LL-1 may comprise a single liquid phase combined solution at a greater temperature than L-3 and/or L-7. For example, if L-3 and L-7 combine at a temperature less than their liquid-liquid phase transition temperature by a temperature difference less than the adiabatic temperature change of their enthalpy of phase transition, the LL-1 may comprise a portion, but not entirely, a single liquid phase combined solution at a greater temperature than L-3 and/or L-7. For example, if L-3 and L-7 combine at a temperature equal to or greater than their liquid-liquid phase transition temperature, the LL-1 may comprise a multi-liquid phase mixture. |
| Enthalpy Sink Heat Exchanger | The Enthalpy Sink Heat Exchanger may transfer or exchange heat from the refrigeration cycle to one or more heat sinks. If the refrigeration cycle is being employed as a chiller or air conditioner or cooling device, Supply #1 may comprise the heat sink or wet surface air heat exchanger or evaporative cooling water supply or air or other heat sink, and the Enthalpy Sink Heat Exchanger may be enable the refrigeration cycle to release or discharge heat into the heat sink. If the refrigeration cycle is being employed as a heat pump or heating device, Supply #1 may comprise the load or application requiring heating, and the Enthalpy Sink Heat Exchanger may enable the refrigeration cycle to supply heat to this load or application requiring heating. The Enthalpy Sink Heat Exchanger transfers heat from LL-1 to Supply #1, which may result in Return #1 (which may possess a hotter temperature or greater enthalpy than Supply #1) and L-1 (which may possess a lesser temperature or lesser enthalpy than LL-1). |
| Supply #1 | Supply #1 may comprise a cooler temperature or lower enthalpy or both heat transfer fluid or material than Return #1. Supply #1 may comprise an application requiring heating or a heat sink or an enthalpy sink or a combination thereof, for example, before absorbing heat in a heat exchange. |
| Return #1 | Return #1 may comprise a warmer temperature or greater enthalpy or both heat transfer fluid or material than Supply #1. Return #1 may comprise an application requiring heating or a heat sink or an enthalpy sink or a combination thereof, for example, after absorbing heat in a heat exchange. |
| Supply #2 | Supply #2 may comprise a cooler temperature or lower enthalpy or both heat transfer fluid or material than Return #2. Supply #2 may comprise an application requiring cooling or a heat source or an enthalpy source or a combination thereof, for example, after discharging heat in a heat exchange. |
| Return #2 | Return #2 may comprise a warmer temperature or greater enthalpy or both heat transfer fluid or material than Supply #2. Return #2 may comprise an |

| | application requiring cooling or a heat source or an enthalpy source or a combination thereof, for example, before discharging heat in a heat exchange. |
|---|---|
| Example FIG. Key FIG. 16 | |
| Label in FIG. | Description |
| L-1 | L-1 may comprise a solution comprising a combination of Organic Composition #1 and aqueous liquid phase. L-1 may comprise at least a portion a single liquid phase combined solution. L-1 may comprise LL-1, except after heat removal from LL-1 in, for example, the Enthalpy Heat Sink Heat Exchanger. Heat removed in the Enthalpy Heat Sink Heat Exchanger may include, but is not limited to, heat from enthalpy of liquid-liquid phase transition and/or heat from specific heat capacity. L-1 is an output of the Enthalpy Sink Heat Exchanger. |
| L-4 | L-4 may comprise a concentrated solution of 'salting-out reagent' or 'concentrate' or 'retentate'. L-4 may also comprise some Organic Composition #1 which may be due to, including, but not limited to, residual from L-3 and/or an incomplete separation in LLS-1 and/or residual Organic Composition #1 dissolved in L-2. L-4 may be generated by 'FO #1'. |
| Mix #1 | Mix #1 may involve mixing or combining L-1 and L-4 to form a multi-liquid phase solution, LL-2. Said mixing may result in a liquid-liquid phase transition, which may possess an enthalpy of phase transition. Said enthalpy of phase transition may be endothermic or exothermic, although may be endothermic in the present embodiment. |
| LL-2 | LL-2 may comprise a multi-liquid phase mixture, which may have resulted from the mixing of L-1 and L-4. LL-2 may possess a lesser temperature and/or lesser enthalpy than L-4 and L-1. LL-2 may possess said lesser temperature, due to, for example, an endothermic liquid-liquid phase transition in Mix #1. LL-2 may possess a latent endothermic enthalpy of phase transition, which may absorb heat in the Enthalpy Source Heat Exchanger. LL-2 may possess a substantially lower temperature than, for example, 'Return #2', and the heat capacity of this substantially lower temperature may be exploited in the Enthalpy Source Heat Exchanger to cool Return #2 to form Supply #2. |
| Enthalpy Source Heat Exchanger | The Enthalpy Source Heat Exchanger may transfer or exchange heat from one or more heat or enthalpy sources to the refrigeration cycle. If the refrigeration cycle is being employed as a chiller or air conditioner or cooling device, Return #2 may comprise the load or application requiring cooling, and the Enthalpy Source Heat Exchanger may be employed to enable the refrigeration cycle to absorb heat from the load or 'cool' the load. If the refrigeration cycle is being employed as a heat pump or heating device, Return #2 may comprise the enthalpy or heat source, and the Enthalpy Source Heat Exchanger may be employed to enable the refrigeration cycle to absorb heat from this enthalpy or heat source. The Enthalpy Source Heat Exchanger transfers heat from Return #2 to LL-2, which may result in Supply #2 (which may possess a cooler temperature or lower enthalpy than Return #2) and LL-3 (which may possess a higher temperature or greater enthalpy than LL-2). |
| LL-3 | LL-3 may comprise a multi-liquid phase mixture, which may have resulted from LL-2 absorbing heat while heat exchanging in the Enthalpy Source Heat Exchanger. LL-3 may possess a greater temperature or greater enthalpy or both than LL-2. |
| LLS-1 | LLS-1 may comprise a liquid-liquid separation device. LLS-1 may separate LL-3 into constituent liquid phases, which may comprise L-2 and L-3. |
| L-2 | L-2 may comprise a dilute solution of 'salting-out reagent'. L-2 may comprise one of the liquid phases separated by LLS-1 from multi-liquid phase mixture LL-3. L-2 may comprise a feed solution into 'FO #1'. |
| L-5 | Liquid B or L-5 may comprise a draw solution in 'FO #1'. L-5 may comprise a solution with a large osmotic pressure. L-5 may desirably have an osmotic pressure greater than L-2 or L-4. Alternatively, L-5 may have an osmotic pressure near, at, or less than the osmotic pressure of L-4, and FO #1 may comprise an osmotically assisted reverse osmosis system. L-5 may comprise, for example, including, but not limited to, one or more or a combination of the following: sugar water, concentrate, juice concentrate, syrup concentrate, malt concentrate, beverage concentrate, seawater, brackish water, saline water, evaporation pond brine, brine from hypersaline lake, brine from saline aquifer, saline brine from underground, or frack water brine. |
| FO #1 | 'FO #1' may comprise a forward osmosis or an osmotically assisted reverse osmosis or combination thereof process. 'FO #1' may involve a feed solution comprising L-2, which may be concentrated into a concentrate or retentate, L-4. 'FO #1' may involve a draw solution comprising 'Brine' (L-5) which, during Forward Osmosis, may be diluted by the water and/or other liquid flux through a 'FO #1' membrane, which may result in a diluted draw solution or 'Dilute Brine' (L-6). |

| | |
|---|---|
| L-6 | Dilute Liquid B or L-6 may comprise diluted draw solution (for example: diluted L-5) following forward osmosis or osmotically assisted reverse osmosis in 'FO #1'. L-6 may be returned to the original source of L-5. Alternatively, L-6 may comprise a valuable byproduct, for example, which may include, but is not limited to, one or more or a combination of the following: a feedstock for a beverage, or a feedstock for brewery, or feedstock to a fermentation process, or a drilling fluid feedstock, or a antifreeze solution. The water permeating into L-5 during 'FO #1' to form L-6 may comprise a similar or the same mass of water added to the process in L-7. |
| L-3 | L-3 may comprise a solution comprising mostly 'Organic Composition #1'. L-3 may comprise one of the liquid phases separated by LLS-1 from multi-liquid phase mixture LL-3. |
| L-7 | Liquid A or L-7 may comprise solvent or membrane permeable solvent input, which may include, but is not limited to, water, ammonia, organic solvent, inorganic solvent, or a combination thereof. Liquid A or L-7 may comprise freshwater or brackish water or seawater or wastewater or water with impurities. |
| FO #2 | FO #2 may comprise a forward osmosis or osmotically assisted reverse osmosis process. FO #2 may involve passing L-7 across a membrane and L-3 across the opposite side of a membrane. Due to osmotic pressure or hydraulic pressure or both, water or other solvent may pass through the membrane from L-7 to L-3, which may result in diluted L-3 or a multi-liquid phase mixture or both (LL-1) and concentrated L-7 residual reagents (L-8). FO #2 may enable water or other solvent from L-7 to be transferred from L-7 to L-3 while preventing the transfer of non-water or non-solvent residual reagents from L-7. FO #2 may be integrated or combined with the Enthalpy Sink Heat Exchanger. For example, a portion of or all the Enthalpy Sink Heat Exchanger may be placed before or during FO #2. FO #2 may be, if desired, cooled or heated during operation.<br>FO #2 may involve preventing contaminants in L-7 from entering the refrigeration cycle. It may be desirable for the recovery ratio or recovery rate, or the percentage of L-7 which is in LL-1, to be greater than or equal to, including, but not limited to, one or more or a combination of the following: 10%, or 20%, or 30%, or 40%, or 50%, or 60%, or 70%, or 80%, or 90%, or 95%.<br>FO #2 may involve mixing or combining L-3 and L-7 to form a multi-liquid phase solution, LL-1, or at least a portion single liquid phase combined solution, LL-1, or a single liquid phase combined solution, LL-1. A portion of L-3 and L-7 may combine in FO #2 to form an exothermic or endothermic liquid-liquid phase transition, although in the present embodiment, the liquid-liquid phase transition may form an exothermic phase transition. |
| L-8 | L-8 or Retentate Liquid A may comprise the retentate from FO #2. L-8 or Retentate Liquid A may comprise a more concentrated solution of non-water or non-solvent reagents or reagents which may be impermeable to a membrane in FO #2. |
| LL-1 | LL-1 may comprise a mixture or combination of L-3 and L-7 permeate from FO #2. Depending on the temperature of L-3 and L-7, LL-1 may combine to form a single liquid phase combined solution, at least a portion of a single liquid phase combined solution, or a multi-liquid phase mixture. For example, if L-3 and L-7 combine at a temperature less than their liquid-liquid phase transition temperature by a temperature difference greater than the adiabatic temperature change of their enthalpy of phase transition, the LL-1 may comprise a single liquid phase combined solution at a greater temperature than L-3 and/or L-7. For example, if L-3 and L-7 combine at a temperature less than their liquid-liquid phase transition temperature by a temperature difference less than the adiabatic temperature change of their enthalpy of phase transition, the LL-1 may comprise a portion, but not entirely, a single liquid phase combined solution at a greater temperature than L-3 and/or L-7. For example, if L-3 and L-7 combine at a temperature equal to or greater than their liquid-liquid phase transition temperature, the LL-1 may comprise a multi-liquid phase mixture. |
| Enthalpy Sink Heat Exchanger | The Enthalpy Sink Heat Exchanger may transfer or exchange heat from the refrigeration cycle to one or more heat sinks. If the refrigeration cycle is being employed as a chiller or air conditioner or cooling device, Supply #1 may comprise the heat sink or wet surface air heat exchanger or evaporative cooling water supply or air or other heat sink, and the Enthalpy Sink Heat Exchanger may be enable the refrigeration cycle to release or discharge heat into the heat sink. If the refrigeration cycle is being employed as a heat pump or heating device, Supply #1 may comprise the load or application requiring heating, and the Enthalpy Sink Heat Exchanger may enable the refrigeration cycle to supply heat to this load or application requiring heating. The Enthalpy Sink Heat Exchanger transfers heat from LL-1 to Supply #1, which may result in Return #1 (which may possess a hotter temperature or greater enthalpy than Supply #1) and L-1 (which may possess a lesser temperature or lesser enthalpy than LL-1). |
| Supply #1 | Supply #1 may comprise a cooler temperature or lower enthalpy or both heat transfer fluid or material than Return #1. Supply #1 may comprise an |

| | |
|---|---|
| Return #1 | application requiring heating or a heat sink or an enthalpy sink or a combination thereof, for example, before absorbing heat in a heat exchange. Return #1 may comprise a warmer temperature or greater enthalpy or both heat transfer fluid or material than Supply #1. Return #1 may comprise an application requiring heating or a heat sink or an enthalpy sink or a combination thereof, for example, after absorbing heat in a heat exchange. |
| Supply #2 | Supply #2 may comprise a cooler temperature or lower enthalpy or both heat transfer fluid or material than Return #2. Supply #2 may comprise an application requiring cooling or a heat source or an enthalpy source or a combination thereof, for example, after discharging heat in a heat exchange. |
| Return #2 | Return #2 may comprise a warmer temperature or greater enthalpy or both heat transfer fluid or material than Supply #2. Return #2 may comprise an application requiring cooling or a heat source or an enthalpy source or a combination thereof, for example, before discharging heat in a heat exchange. |

| Example FIG. Key for FIG. 17 | |
|---|---|
| Label in FIG. | Description |
| L-1 | L-1 may comprise a solution comprising a combination of Organic Composition #1 and aqueous liquid phase. L-1 may comprise at least a portion a single liquid phase combined solution. L-1 may comprise L-8, except after heat removal from L-8 in, for example, the Heat Exchanger #3. Heat removed in the Heat Exchanger #3 may include, but is not limited to, heat from enthalpy of liquid-liquid phase transition and/or heat from specific heat capacity. L-1 is an output of Heat Exchanger #3. |
| Heat Exchanger #2 | Heat Exchanger #2 may involve a heat exchange between 'warm' L-1 and 'cold' L-9 and L-5, which may result in 'cold' L-1 and 'warm' L-9 (L-7) and 'warm' L-5 (L-6). L-9 and L-5 may be heat exchanged with L-1 in Heat Exchanger #2 as non-contiguously separate liquid phases to, for example, prevent L-9 and L-5 from dissolving in each other and/or releasing an enthalpy of phase transition during Heat Exchanger #2. Heat Exchanger #2 may enable two separate temperature zones within the Refrigeration Cycle portion of the process. For example, L-6, L-7, Mix #1, L-8, Heat Exchanger #3, and L-1 may comprise a first temperature zone, while L-2, Mix #2, LL-1, Heat Exchanger #1, LL-2. LLS-1, L-3, L-4, L-5, and L-9 may comprise a second temperature zone which may be at a significantly different temperature or temperature range than the first temperature zone. Said significantly different temperature may comprise a temperature difference greater than the adiabatic temperature change of the enthalpy of the liquid-liquid phase transition. Said temperature zones may enable the refrigeration cycle to move heat or pump heat across a temperature difference greater than the adiabatic temperature change of the enthalpy of liquid-liquid phase transition. |
| L-2 | L-2 may comprise L-1 after heat exchange in Heat Exchanger #2. L-2 may be at a significantly different temperature than L-1, such as, for example, a temperature difference greater than the adiabatic temperature change of the liquid-liquid phase transition of Organic Composition #1 and water. |
| Mix #2 | Mix #1 may involve mixing or combining L-2 and L-4 to form a multi-liquid phase solution, LL-1. Said mixing may result in a liquid-liquid phase transition, which may possess an enthalpy of phase transition. Said enthalpy of phase transition may be endothermic or exothermic, although may be endothermic in the present embodiment. |
| L-4 | L-4 may comprise a concentrated solution of 'salting-out reagent' or 'concentrate' or 'retentate'. L-4 may also comprise some Organic Composition #1 which may be due to, including, but not limited to, residual from L-3 and/or an incomplete separation in LLS-1 and/or residual Organic Composition #1 dissolved in L-3. The concentrate may be generated by forward osmosis, 'FO'. |
| LL-1 | LL-1 may comprise a multi-liquid phase mixture, which may have resulted from the mixing of L-2 and L-4 in Mix #2. LL-1 may possess a lesser temperature and/or lesser enthalpy than L-4 and L-2. LL-1 may possess said lesser temperature, due to, for example, an endothermic liquid-liquid phase transition in Mix #2. LL-1 may possess a latent endothermic enthalpy of phase transition, which may absorb heat in Heat Exchanger #1. LL-1 may possess a lesser temperature than LL-2, which may enable the absorption of heat in Heat Exchanger #1 due to specific heat capacity. |
| Heat Exchanger #1 | Heat Exchanger #1 may comprise a heat exchanger between LL-1 and an application requiring cooling or a heat source or enthalpy source. LL-1 may absorb heat in a heat exchange with an application requiring cooling or a heat source or enthalpy source, which may result in a higher temperature and/or enthalpy LL-1 (for example: LL-2) and a lower temperature and/or less enthalpy application requiring cooling or heat source or enthalpy source. |
| LL-2 | LL-2 may comprise the same overall composition as LL-1, except at a higher temperature and/or greater enthalpy. LL-2 may comprise LL-1 after heat exchanging in Heat Exchanger #1. LL-2 may comprise at least a portion a multi-liquid phase mixture. It may be desirable for at least one liquid phase of said multi-liquid phase mixture to comprise mostly Organic |

| | |
|---|---|
| | Composition #1. It may be desirable for at least one liquid phase of said multi-liquid phase mixture to comprise mostly water or a dilute aqueous solution of 'salting-out' reagent. |
| LLS-1 | LLS-1 may comprise a liquid-liquid separation device. LLS-1 may separate LL-2 into constituent liquid phases, which may comprise L-3 and L-5. |
| L-3 | L-3 may comprise a dilute solution of 'salting-out reagent'. L-3 may comprise an aqueous solution. L-3 may comprise one of the liquid phases separated by LLS-1 from multi-liquid phase mixture LL-2. L-3 may comprise residual Organic Composition #1, which may be due to, for example, an incomplete separation in LLS-1 and/or residual Organic Composition #1 dissolved in L-3. |
| L-5 | L-5 may comprise a solution comprising mostly 'Organic Composition #1'. L-5 may comprise one of the liquid phases separated by LLS-1 from multi-liquid phase mixture LL-2. L-5 may comprise residual water and/or 'salting-out' reagent, which may be due to, for example, an incomplete separation in LLS-1 and/or residual water and/or 'salting-out' reagent dissolved in L-5. |
| FO | 'FO' may comprise a forward osmosis or an osmotically assisted reverse osmosis or combination thereof process. 'FO' may involve a feed solution comprising L-3, which may be concentrated into a concentrate or retentate, L-4. 'FO' may involve a draw solution comprising 'Liquid B' (L-10) which, during Forward Osmosis, may be diluted by the water and/or other liquid flux through a 'FO' membrane, which may result in a diluted draw solution or 'Dilute Liquid B' (L-11). |
| L-6 | L-6 may comprise L-5 after heat exchange in Heat Exchanger #2. L-6 may be at a significantly different temperature than L-5, such as, for example, a temperature difference greater than the adiabatic temperature change of the liquid-liquid phase transition of Organic Composition #1 and water. L-6 may be non-contiguously separate from L-7. |
| L-7 | L-7 may comprise L-9 after heat exchange in Heat Exchanger #2. L-7 may be at a significantly different temperature than L-9, such as, for example, a temperature difference greater than the adiabatic temperature change of the liquid-liquid phase transition of Organic Composition #1 and water. L-7 may be non-contiguously separate from L-6. |
| Mix #1 | Mix #1 may involve mixing or combining L-6 and L-7 to form, including, but not limited to, one or more or a combination of the following: a multi-liquid phase solution, L-8, or at least a portion single liquid phase combined solution, L-8, or a single liquid phase combined solution, L-8. L-6 and L-7 may Mix in Mix #1 to form an exothermic or endothermic liquid-liquid phase transition, although the present embodiment may form an exothermic phase transition. It may be desirable for the adiabatic temperature change of said enthalpy of said liquid-liquid phase transition to be greater than the approach temperature and/or heat exchanger Delta-T of Heat Exchanger #2. |
| L-8 | L-8 may comprise a combination of L-6 and L-7. L-8 may comprise including, but not limited to, one or more or a combination of the following: a multi-liquid phase solution, or at least a portion single liquid phase combined solution, or a single liquid phase combined solution. L-8 may be at a greater temperature and/or greater enthalpy than L-1. |
| Heat Exchanger #3 | Heat Exchanger #3 may involve heat exchanging L-8 with an application requiring heating or a heat sink or a cold source, which may result in a lesser temperature and/or lesser enthalpy L-8 (for example: L-1) and a greater temperature and/or greater enthalpy application requiring heating or a heat sink or a cold source. |
| L-9 | Liquid A or L-9 may comprise solvent or membrane permeable solvent input, which may include, but is not limited to, water, ammonia, organic solvent, inorganic solvent, or a combination thereof. Liquid A or L-7 input may undergo treatment to remove or minimize potential contaminants or foulants. If necessary, said treatment may be conducted, for example, before Mix #2. |
| L-10 | Liquid B or L-10 may comprise a draw solution in 'FO'. L-10 may comprise a solution with a large osmotic pressure. L-10 may desirably have an osmotic pressure greater than L-2 or L-4. Alternatively, L-10 may have an osmotic pressure near, at, or less than the osmotic pressure of L-4, and FO may comprise an osmotically assisted reverse osmosis system. L-10 may comprise, for example, including, but not limited to, one or more or a combination of the following: sugar water, concentrate, juice concentrate, syrup concentrate, malt concentrate, beverage concentrate, seawater, brackish water, saline water, evaporation pond brine, brine from hypersaline lake, brine from saline aquifer, saline brine from underground, or frack water brine. |
| L-11 | Dilute Liquid B or L-11 may comprise diluted draw solution (for example: diluted L-5) following forward osmosis or osmotically assisted reverse osmosis in 'FO'. L-11 may be returned to the original source of L-10. Alternatively, L-11 may comprise a valuable byproduct, for example, which may include, but is not limited to, one or more or a combination of the following: a feedstock for a beverage, or a feedstock for brewery, or feedstock to a fermentation process, or a drilling fluid feedstock, or a | antifreeze solution. The water permeating into L-10 during 'FO' to form L-11 may comprise a similar or the same mass of water added to the process from L-9.

Example Compositions

Example Organic Composition #1 may include, but is not limited to, one or more or a combination of the following:
Glycol ethers
Glycol ether polymers
   Polyethylene Glycol Dimethyl Ether
   Polyethylene Glycol Monomethyl Ether
Glycol Polymers
   Polypropylene Glycol
   Polyethylene Glycol
   Polymers Combining PEG and PPG
   PEG-PPG-PEG
   PPG-PEG-PPG
   'Rand' Polymers
Ionic Liquids
Ethers
   Glycol Ethers
   Butoxyethanol
   Diethylene Glycol Hexyl Ether
Organic reagents
Organic reagents which are liquid at or near room temperature
Reagents which possess a liquid-liquid phase transition in water
Reagents which possess a liquid-liquid phase transition in a solvent Example Organic Composition #2 may include, but is not limited to, one or more or a combination of the following:
Glycol ethers
Glycol ether polymers
   Polyethylene Glycol Dimethyl Ether
   Polyethylene Glycol Monomethyl Ether
Glycol Polymers
   Polypropylene Glycol
   Polyethylene Glycol
   Polymers Combining PEG and PPG
     PEG-PPG-PEG
     PPG-PEG-PPG
     'Rand' Polymers
Ionic Liquids
Ethers
   Glycol Ethers
   Butoxyethanol
   Diethylene Glycol Hexyl Ether
Organic reagents
Organic reagents which are liquid at or near room temperature
Reagents which possess a liquid-liquid phase transition in water
Salt brine solutions
Antifreeze solutions
Draw solutions described herein
Externally regenerated draw solutions
Greater osmotic pressure solution
Naturally occurring greater osmotic pressure solution
Reagents which possess a liquid-liquid phase transition in a solvent Example Salts or Salting-Out Reagents: ionic compounds, organic compounds, ammonium sulfate, potassium sulfate, dipotassium phosphate, tripotassium phosphate, monopotassium phosphate, calcium chloride, sodium chloride, glycerol, PEGs, PEG ethers, ammonia, carbon dioxide, potassium carbonate, sodium sulfate, ammonium nitrate, ammonium carbonate, ammonium bicarbonate, ammonium sesquicarbonate, ammonium carbamate, or a combination thereof.

Notes

Note: It may be desirable for Organic Composition #2 to possess a greater osmotic pressure or a greater phase transition temperature or a combination thereof compared to Organic Composition #1.

Note: It may be desirable for Organic Composition #2 to possess a greater osmotic pressure or a greater phase transition temperature or a combination thereof in a solution with water compared to Organic Composition #1.

Note: It may be desirable for the adiabatic temperature change of the liquid-liquid phase transition to be greater than the approach temperature difference or required heat transfer delta-T or both of, for example, 'Heat Exchanger #2' in, for example, FIGS. 11 and 12. It may be desirable for the enthalpy of phase transition in 'Mix #2' in FIGS. 11 and 12 to possess an adiabatic temperature change greater than the approach temperature difference or required heat transfer delta-T or both of, for example, 'Heat Exchanger #2'.

Note: In some embodiments, Organic Composition #1 may be the same composition as Organic Composition #2.

Note: Favorable Properties for Liquid-Liquid Phase Transition may include, but are not limited to, one or more or a combination of the following properties: liquid-liquid phase transition temperature range, liquid-liquid phase transition temperature, composition of the constituent liquid phases, water concentration in mostly non-water liquid phase, residual non-water reagent concentration in mostly water liquid phase, enthalpy of liquid-liquid phase transition, toxicity, volatility, flammability, cost, corrosion inhibitors, degradation inhibitors, antiscalants, anti-foulants, anti-biofoulants, oxygen scavengers, pH buffers, density, hydrophobicity, hydrophilicity, surface tension, self-attraction forces, repelling forces, coalescing properties, viscosity, density, density difference between liquid phases, hydrophobicity, hydrophilicity, surface tension, self-attraction forces, repelling forces, coalescing properties, viscosity, or a combination thereof.

Note: Liquid-liquid phase transition facilitator reagents or liquid-liquid phase transition separation facilitator reagents or salting-out reagents or phase transition temperature adjustment reagents may include, but are not limited to, salts, or inorganics, or organics, or other reagents which may improve one or more or a combination of properties which enable or facilitate liquid-liquid phase transition. Said properties may include, but are not limited to, liquid-liquid phase transition temperature range, liquid-liquid phase transition temperature, composition of the constituent liquid phases, water concentration in mostly non-water liquid phase, residual non-water reagent concentration in mostly water liquid phase, enthalpy of liquid-liquid phase transition, toxicity, volatility, flammability, cost, corrosion inhibitors, degradation inhibitors, antiscalants, anti-foulants, anti-biofoulants, oxygen scavengers, pH buffers, density, hydrophobicity, hydrophilicity, surface tension, self-attraction forces, repelling forces, coalescing properties, viscosity, or a combination thereof.

Note: Liquid-liquid phase separation facilitator reagents or liquid-liquid phase transition facilitator reagents or salting-out reagents or phase transition temperature adjustment reagents may include, but are not limited to, salts, or inorganics, or organics, or other reagents which may improve one or more or a combination of properties which enable or facilitate liquid-liquid phase separation. Said properties may include, but are not limited to, density, hydrophobicity, hydrophilicity, surface tension, self-attraction forces, repelling forces, coalescing properties, viscosity, or a combination thereof.

Note: By using FO, the present invention can employ a wider range of organic Composition #1 reagents, including organic Composition #1 which require significantly greater salt concentrations/salt osmotic pressure to be 'salted out' or undergo a phase transition temperature adjustment which results in a multi-liquid phase mixture or greater phase separation. Benefits may include, but are not limited to, refrigeration cycles producing or pumping heat across larger temperature differences and/or greater Enthalpy of mixing or enthalpy of phase transition organic Composition #1 reagents and/or greater heat pumping capacity per a unit of liquid flow rate or a combination thereof.

Note: Liquid streams in the present invention may be stored in liquid storage vessel(s). For example, one or more liquid streams in the present invention may be stored in liquid storage vessels to enable desynchronized operation of different sections of the process. For example, one or more Regeneration Portion streams may be stored in liquid storage tanks to enable the Refrigeration Cycle Portion to operate while the Regeneration Portion may not be operating. For example, one or more Regeneration Portion streams may be stored in liquid storage tanks to enable the Refrigeration Cycle Portion to temporarily or instantaneously or both operate at higher output or capacity than the rate which it is regenerating in the regeneration portion. For example, one or more Refrigeration Cycle Portion streams may be stored in liquid storage tanks to enable the Regeneration Portion to operate while the Regeneration Portion may not be operating.

Note: Before or while starting operation where the hot and cold temperature zones are the same temperature, it may be desirable to employ an external source of heat or cold to cool and/or heat the respective regions to near the temperatures desired for the temperature zones. When the refrigeration cycle operates after the temperatures in the temperature zones have been adjusted to the desired temperatures, the refrigeration cycle may sustain said the temperature of said temperature zones while pumping heat. Alternatively, or additionally, the desired temperature zones may be generated by temporarily not or minimally or insufficiently supplying heat to an enthalpy source heat exchanger, or temporarily not or minimally or insufficiently supplying heat to an enthalpy sink heat exchanger, or a combination thereof. The duration of said 'temporary' may be until one or more desired temperature zones are achieved.

Note: The present invention may enable the generation of useful energy or work (e.g. cooling or heating) from the enthalpy of mixing of high osmotic pressure solutions and low osmotic pressure solutions. For example, the present invention may enable the powering of a refrigeration cycle for heating or cooling using seawater as a draw solution and freshwater as an input stream. For example, the present invention may enable the powering of a refrigeration cycle for heating or cooling from the enthalpy of mixing of high osmotic pressure solutions and low osmotic pressure solutions without the need to first convert the enthalpy of mixing of said high osmotic pressure solution and low osmotic pressure solution into electricity or mechanical work.

Note: In some saline lakes or hypersaline lakes, water levels are receding due to droughts, diversions of water flow, or other potential causes. The present invention enables water to be added to these saline lakes or hypersaline lakes, while, in the process, generating useful or valuable heating or cooling. For example, water levels in the Dead Sea have been declining for many years, causing environmental and economic challenges. The Israeli and Jordanian governments have made proposals to ship water from desalination plants, Mediterranean water, Red Sea Water, Sea of Galilee Water, or other water sources to the Dead Sea and add said water to address the Dead Seas declining water levels. With the present invention, said water can be added to the Dead Sea, and, in the process of added or introducing or contacting or mixing said water, supply/power the cooling or heating needs of nearby resorts, buildings, industry, and/or other applications requiring cooling or heating.

Note: Phase transition temperature may be adjusted by adjusting properties other than or in addition to concentration adjustment. For example, phase transition temperature may be adjusted by adjusting magnetic properties, especially if reagents with magnetically influenced solubility properties or phase transition properties are employed. For example, phase transition temperature may be adjusted by adjusting the presence of light or certain wavelengths of liquid or a combination thereof, especially if reagents with light-influenced solubility properties or phase transition properties are employed.

Example Liquid-Liquid Phase Transitioning Reagents include, but are not limited to, one or more or a combination of the following:
   Glycol ethers
   Glycol ether polymers
      Polyethylene Glycol Dimethyl Ether
      Polyethylene Glycol Monomethyl Ether
   Glycol Polymers
      Polypropylene Glycol
      Polyethylene Glycol
      Polymers Combining PEG and PPG
         PEG-PPG-PEG
         PPG-PEG-PPG
         'Rand' Polymers
   Ionic Liquids
   Ethers
      Glycol Ethers
      Butoxyethanol
      Diethylene Glycol Hexyl Ether
   Reagents with a liquid-liquid phase transition in water
   Reagents with a liquid-liquid phase transition in a solvent Summary Description Summary of Liquid Phase Only Refrigeration Cycle:

The present embodiment pertains to a configuration of a 'liquid-phase only' refrigeration cycle.

The present embodiment operates using a liquid solution which exhibits a liquid-liquid phase transition. A solution liquid-liquid phase transitions from a combined single liquid phase to a two liquid phase mixture above a liquid-liquid phase transition temperature. Below said liquid-liquid phase transition temperature, a two liquid phase mixture reversibly liquid-liquid phase transitions into a combined single liquid phase solution. When a solution liquid-liquid phase transitions from a single liquid phase to two liquid phases, the solution absorbs heat (i.e. an endothermic phase transition). When a solution liquid-liquid phase transitions from a two liquid phases to one liquid phase, the solution releases heat (i.e. an exothermic phase transition). The amount of heat absorbed by an endothermic liquid-liquid phase transition may be the same as the amount of heat released by an exothermic liquid-liquid phase transition with the same solution and temperature ranges. The amount of heat absorbed or released during a liquid-liquid phase transition is referred to herein as 'the enthalpy of phase transition' or 'enthalpy of liquid-liquid phase transition'.

A liquid-liquid phase transitioning solution may comprise an organic component (also described as organic reagent or organic) and an aqueous component. When a solution comprises a single liquid phase combined solution, the organic component may dissolved in the aqueous component. When a solution comprises a two liquid phase mixture, an organic component and an aqueous component may be separate liquid phases, respectively.

A liquid-liquid phase transition temperature range may be adjusted by adjusting the concentration of salt in the solution. Increasing the concentration of salt may decrease a liquid-liquid phase transition temperature range. Above a certain concentration of salt (depending on the type of salt, the composition of the organic component, and the concentration of the organic component), an organic component may become nearly or completely insoluble or may form a separate liquid phase (e.g. may be salted out). A liquid phase only refrigeration cycle may work by adjusting the concentration of a salt or other reagent with similar phase transition temperature adjustment or 'salting-out' properties or characteristics such that an exothermic liquid-liquid phase transition is engineered to occur at a greater temperature and an endothermic liquid-liquid phase transition is engineered to occur at a lesser temperature.

BRIEF DESCRIPTION OF THE FIGURES

Figure 23:
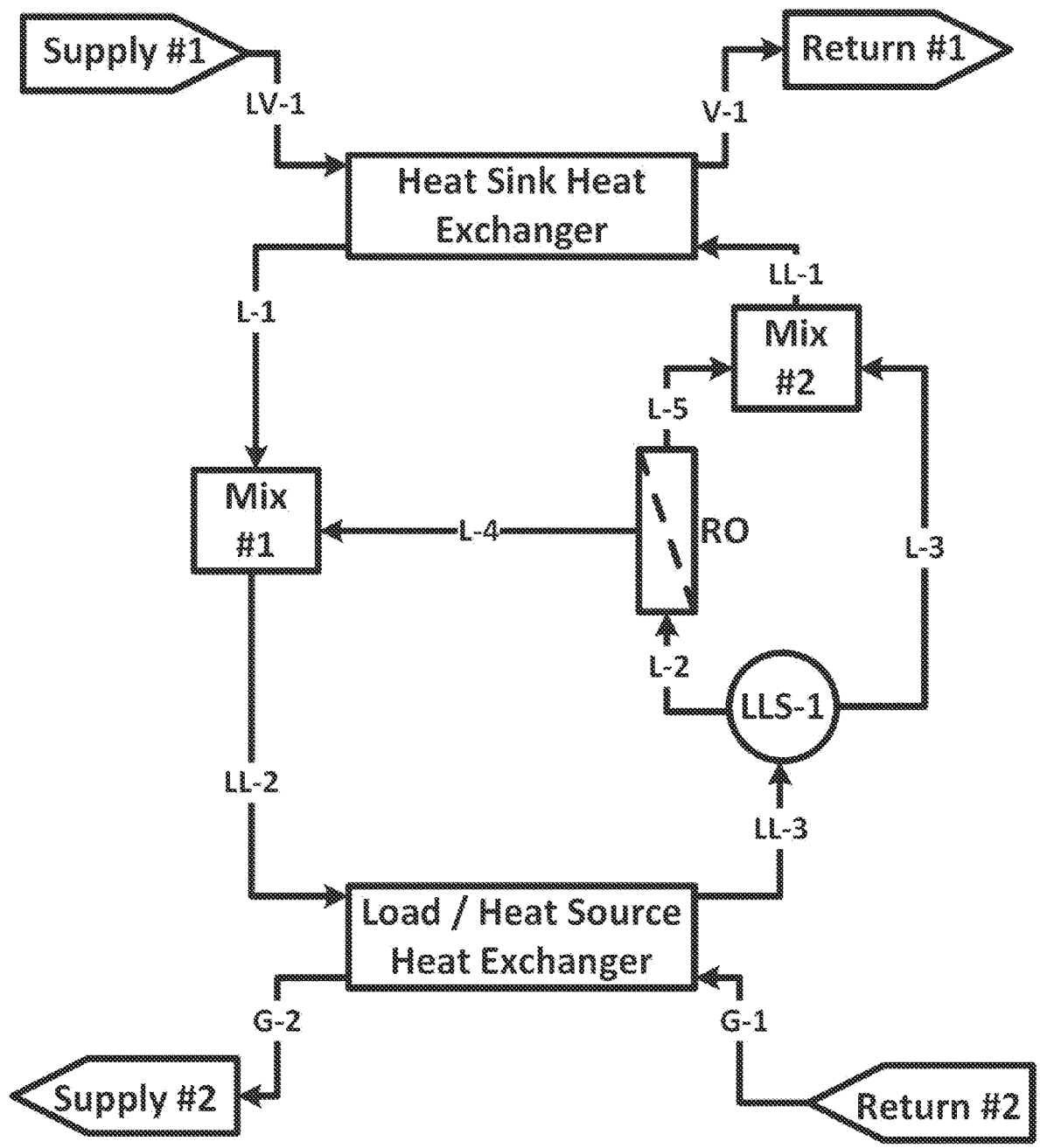
FIG. 23.

FIG. 23: FIG. 23 shows a liquid phase only refrigeration cycle functioning as a heat transfer liquid for a conventional vapor compression refrigeration cycle chiller (only the evaporator side of a conventional vapor compression refrigeration cycle is shown—shown as LV-1 and V-1). Unlike chilled water heat transfer, the liquid phase only refrigeration cycle acts as a second refrigeration cycle, providing an additional cooling compared to a heat transfer liquid without the liquid phase only refrigeration cycle. The objective is to reduce the energy consumption of or stress on the conventional vapor compression refrigeration cycle by enabling it to generate a smaller temperature difference for the same cooling (for every 1° F. or 0.56° K reduction in temperature difference in a vapor compression refrigeration cycle, the energy efficiency of the vapor compression refrigeration cycle increases by 2%).

Figure 24:
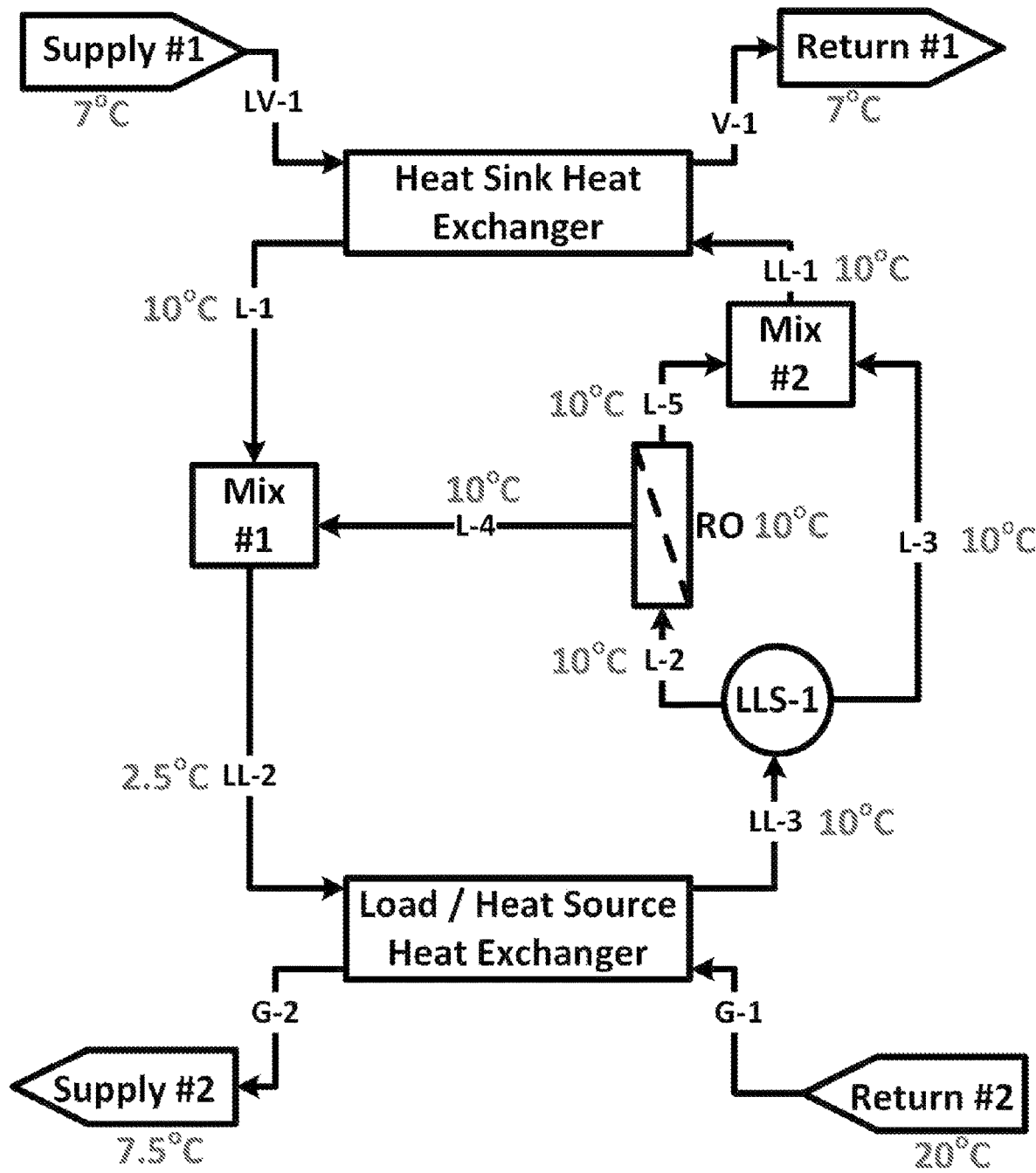
FIG. 24: Same as FIG. 23, except with example stream temperatures shown.

FIG. 24: Same as FIG. 24, except with example stream temperatures shown. Unlike chilled water heat transfer, the liquid phase only refrigeration cycle acts as a second refrigeration cycle, providing an additional 7.5° K of cooling compared to a heat transfer liquid without the liquid phase only refrigeration cycle, which translates into a 27% increase in energy efficiency for the vapor compression refrigeration cycle (for every 1° F. or 0.56° K reduction in temperature difference in a vapor compression refrigeration cycle, the energy efficiency of the vapor compression refrigeration cycle increases by 2%).

Figure 25:
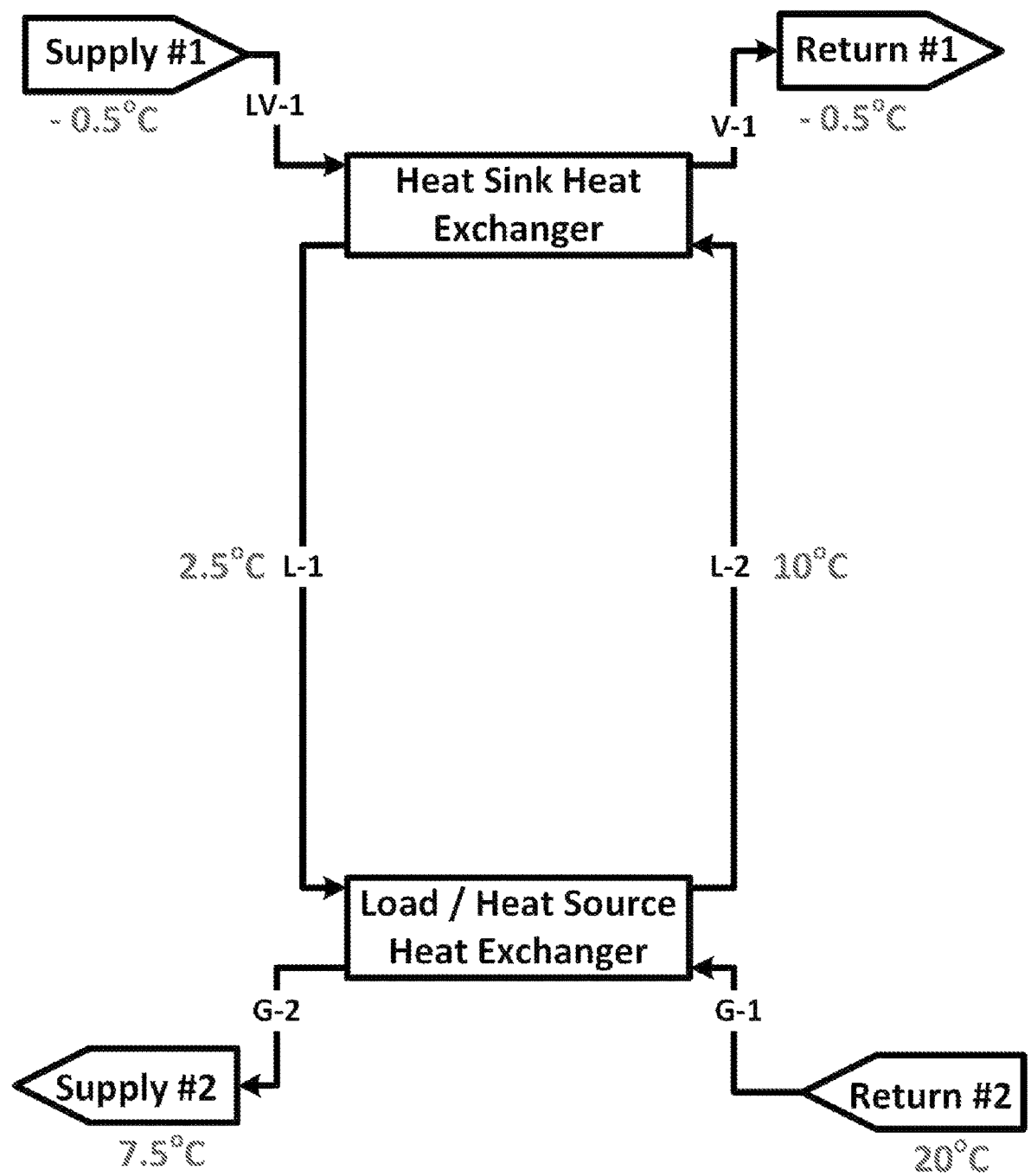
FIG. 25: A figure of a chilled water loop provided for reference to show the significantly greater temperature internal difference required to achieve the same resulting temperatures as FIG. 24.

FIG. 25: A figure of a conventional chilled water loop achieving the same temperatures as FIG. 24. In FIG. 25, to achieve a Supply #2 temperature of 7.5° C., the vapor compression refrigeration cycle evaporator temperature (LV-1 and V-1) needs to be −0.5° C., or 7.5° K less than the temperature in FIG. 24, which translates into significantly greater electricity consumption/lower energy efficiency/lower Coefficient of Performance than the embodiments shown in FIG. 23 and FIG. 24.

FIGS. 23 and 24 Summary:

FIG. 23 and FIG. 24 show a liquid-liquid phase transition refrigeration cycle acting as a second refrigeration cycle and a substitute for a heat transfer liquid (e.g. replacement of water). The purposes of the liquid phase only refrigeration cycle in FIGS. 23 and 24 may be to:

Increasing the energy efficiency of a vapor compression refrigeration cycle in a chiller by integrating a more energy efficient refrigeration cycle (the liquid phase only refrigeration cycle)

Supplying cooling as a non-volatile liquid

Supplying cooling with less liquid flow rate or greater energy density

In FIGS. 23 and 24, the liquid-liquid phase transition refrigeration cycle is employed to absorb heat from the 'Load/Heat Source Heat Exchanger' at a lower temperature (cooling Return #2 to produce Supply #2) and pump/release this heat in the 'Heat Sink Heat Exchanger' (supplying heat to Supply #1 to produce Return #2). In FIGS. 23 and 24, the 'Load/Heat Source Heat Exchanger' is cooling Return #2, which may comprise a gas requiring cooling. For example, 'Heat Sink Heat Exchanger' may comprise a liquid to air heat exchanger, such as an air handler unit in a building. In FIGS. 23 and 24, the 'Heat Sink Heat Exchanger' may comprise a Direct Expansion (DX) heat exchanger, which heat exchanges a liquid gas phase transition refrigerant (i.e. LV-1 and L-1) with a liquid (i.e. LL-1 and L-1).

FIGURE KEY

| Label in FIG. | Example FIG. Key for FIG. 23 and FIG. 24 |
|---|---|
| LL-1 | LL-1 comprises a two liquid phase mixture comprising a mixture of organic liquid phase (L-3) and freshwater permeate (L-5). LL-1 may be at its liquid-liquid phase transition temperature and may remain a two liquid phase mixture until it is cooled in the heat sink heat exchanger.<br>Stream Summary:<br>Two liquid phase mixture, 10° C., less than 1 PPT salt conc.,<br>6.22 Liters Per Minute (LPM) |
| Heat Sink Heat Exchanger | The Heat Sink Heat Exchanger cools LL-1 by heat exchanging it with a heat sink. During cooling inside the Heat Sink Heat Exchanger, LL-1 liquid-liquid phase transitions into a single liquid phase combined solution. In FIG. 1 and FIG. 2, the Heat Sink Heat Exchanger comprises a direct expansion (DX) heat exchanger, because the side of the heat exchanger connected to the vapor |

| Label in FIG. Example | FIG. Key for FIG. 23 and FIG. 24 |
|---|---|
| | compression refrigeration cycle (acting as the vapor compression refrigeration cycle's evaporator) involves vaporizing refrigerant from a liquid into a gas. |
| L-1 | L-1 comprises mostly a single liquid phase combined solution. L-1 comprises the same overall composition as LL-1, except L-1 has undergone an exothermic liquid-liquid phase transition from two liquid phases to a single liquid phase due to cooling in the Heat Sink Heat Exchanger.<br>Stream Summary:<br>Single liquid phase combined solution, 10° C., less than 1 PPT salt conc.,<br>5.83 Liters Per Minute (LPM) |
| L-4 | L-4 comprises reverse osmosis retentate. L-4 comprises a relatively concentrated salt solution.<br>Stream Summary:<br>Aqueous salt solution, 10° C., 52.26 grams per liter Dipotassium Phosphate,<br>1.94 Liters Per Minute (LPM) |
| Mix #1 | Mix #1 may be a mixing device which combines L-1 and L-4 to form a multi-liquid phase mixture, LL-2. During mixing of L-1 and L-4, L-4 dissolves in the aqueous component of L-1, 'kicking-out' or 'salting-out' most of the organic liquid phase. The liquid-liquid phase transition of this 'salting-out' of the organic phase may be an endothermic liquid-liquid phase transition. In the present example flowsheet, the enthalpy of phase transition of this liquid-liquid phase transition may absorb 27 kJ of heat per kg of total solution. In the present example flowsheet, the baseline specific heat capacity of the liquid (without the specific heat capacity enhancement due to a liquid-liquid phase transition) is 3.6 J/g° C. Based on the previously described values, LL-2 possesses a temperature 7.5° C. less than the mean temperature of L-1 and L-4. |
| LL-2 | LL-2 comprises a two liquid phase mixture comprising a mixture of organic liquid phase and dilute aqueous salt solution liquid phase following an endothermic liquid-liquid phase transition in Mix #1. LL-2 may be above its liquid-liquid phase transition temperature. In the present example flowsheet, LL-2 may remain a multi-liquid phase solution through heat exchanging in the Load/Heat Source Heat Exchanger.<br>LL-2 may comprise a multi-liquid phase mixture if L-3 and L-5 are mixed near, at, or above its liquid-liquid phase transition temperature range in Mix #2 (which is shown in). LL-2 may comprise a multi-liquid phase mixture with partial dissolution of L-3 in L-5 if L-3 and L-5 are mixed at a temperature at or less than their liquid-liquid phase transition temperature range. LL-2 may comprise a single liquid phase combined solution if L-3 and L-5 are mixed at a temperature less than their liquid-liquid phase transition temperature range by more than the adiabatic temperature change of their enthalpy of liquid-liquid phase transition.<br>Stream Summary:<br>Two liquid phase mixture comprising a mostly organic liquid phase and a mostly aqueous salt solution liquid phase, 2.5° C., 17.42 grams per liter Dipotassium Phosphate in aqueous liquid phase,<br>7.78 Liters Per Minute (LPM) |
| Load/Heat Source Heat Exchanger | The Load/Heat Source Heat Exchanger heat exchanges LL-2 with G-1, cooling G-1 to form G-2 and heating LL-2 to form LL-3. In FIG.s 1 and 2, The Load/Heat Source Heat Exchanger comprises a liquid-gas heat exchanger, which may be, for example, an air handler heat Exchanger in a HVAC system. |
| LL-3 | LL-3 comprises a two liquid phase mixture comprising a mixture of organic liquid phase and dilute aqueous salt solution liquid phase following heat exchanging/providing 'cooling' in the Load/Heat Source Heat Exchanger. LL-2 may be above its liquid-liquid phase transition temperature.<br>LL-3 Stream Summary:<br>Two liquid phase mixture comprising a mostly organic liquid phase and a mostly aqueous salt solution liquid phase, 10° C., 17.42 grams per liter Dipotassium Phosphate in aqueous liquid phase,<br>7.78 Liters Per Minute (LPM) |
| LLS-1 | LLS-1 comprises a liquid-liquid separation device, such as a decanter. LLS-1 separates LL-3 into two separate liquid streams, L-2 and L-3, which may comprise the constituent liquid phases of LL-3. |
| L-2 | L-2 comprises a relatively dilute aqueous salt solution, which may have been one of the liquid phases separated from LL-3 in LLS-1. L-2 comprises the feed solution for 'RO'.<br>Stream Summary:<br>Aqueous salt solution, 10° C., 17.42 grams per liter Dipotassium Phosphate,<br>5.83 Liters Per Minute (LPM) |
| RO | 'RO' comprises a reverse osmosis unit. 'RO' converts a feed solution (L-2) into a retentate stream (L-4) and a permeate stream (L-5). |
| L-5 | L-5 comprises a freshwater permeate stream produced by 'RO' from feed solution L-2.<br>Stream Summary:<br>Water, 10° C., less than 1 PPT salt conc.,<br>3.89 Liters Per Minute (LPM)<br>L-3 L-3 comprises a mostly organic liquid phase, which may have been one of the liquid phases separated from LL-3 in LLS-1.<br>Organic liquid phase, 10° C., less than 1 PPT salt conc.,<br>1.94 Liters Per Minute (LPM) |

| Label in FIG. | Example FIG. Key for FIG. 23 and FIG. 24 |
|---|---|
| Mix #2 | Mix #2 may be a mixing device which combines L-3 and L-5 to form a multi-liquid phase mixture or single liquid phase solution or both, LL-2. |
| LV-1 (Supply #1) | LV-1 is part of a vapor compression refrigeration cycle heat exchanging with the liquid phase only refrigeration cycle in the 'Heat Sink Heat Exchanger'. LV-1 comprises a refrigerant at a liquid state or a liquid-vapor Mix state before it enters the 'Heat Sink Heat Exchanger', where it will absorb heat while expanding/evaporating. |
| V-1 (Return #1) | V-1 is part of a vapor compression refrigeration cycle heat exchanging with the liquid phase only refrigeration cycle in the 'Heat Sink Heat Exchanger'. V-1 comprises refrigerant at a vapor state following absorbing heat via expansion/evaporation in the 'Heat Sink Heat Exchanger'. |
| G-1 (Return #2) | G-1 comprises a warm air stream requiring cooling entering the 'Load/Heat Source Heat Exchanger'. G-1 may be cooled during a heat exchange with the 'Load/Heat Source Heat Exchanger', forming G-2. |
| G-2 | G-2 comprises a cool air stream exiting the 'Load/Heat Source Heat (Supply #2) Exchanger'. |

FIG. 23 and FIG. 24 Step-by-Step Description:

Heat Absorbing Liquid-Liquid Phase Transition: A combined single liquid phase solution comprising organic and freshwater (L-1) is mixed with a concentrated salt water retentate stream (L-4) in a mixing device (Mix #1). L-4 dissolves in the aqueous component of L-1, resulting in most of the organic component of L-1 forming a separate liquid phase in a liquid-liquid phase transition. The resulting multi-liquid phase mixture (LL-2) may comprise a mostly organic liquid phase and a mostly dilute salt water aqueous phase. The previously described liquid-liquid phase transition may be endothermic and may resulting in the temperature of LL-2 being significantly lower than the mean temperature of L-1 and L-4.

Absorbing Heat from 'Load' in Heat Exchanger: LL-2 is heat exchanged to cool a thermal load. For example, LL-2 is heat exchanged with warm air (G-1) in a liquid-gas heat exchanger ('Load/Heat Source Heat Exchanger'), which results in cooled air (G-2) and warmer multi-liquid phase mixture (LL-3).

Liquid-Liquid Separation: LL-3 is separated into two separate liquid streams using a liquid-liquid separation device (LLS-1), such as a decanter. One of the two liquid phases may comprise a mostly organic liquid phase (L-3). One of the liquid phases may comprise mostly aqueous dilute salt solution (L-2).

Reverse Osmosis Separation: L-2 is fed into a reverse osmosis unit as a feed solution. L-2 is separated into a retentate stream comprising a concentrated salt solution (L-4) and a mostly freshwater permeate stream (L-5).

Mixing Freshwater and Organic Liquid Phases: L-5 is mixed with L-3 using a mixing device (Mix #2), forming LL-1. Because L-5 is almost salt-free, the liquid-liquid phase transition temperature of the solution is significantly greater than in LL-3. Depending on the liquid-liquid phase transition temperature range, the temperature of L-5 and L-3, and the enthalpy of the liquid-liquid phase transition, LL-1 may be a multi-liquid phase mixture, or a multi-liquid phase mixture with some L-3 dissolved in L-5, or a single liquid phase combined solution. In FIG. 24, the LL-1 comprises a multi-liquid phase mixture.

Releasing Heat to Heat Sink in Heat Exchanger: LL-1 is heat exchanged in the 'Heat Sink Heat Exchanger' to release heat into a heat sink. In FIG. 24, LL-1 releases heat while being cooled due to a liquid-liquid phase transition from a multi-liquid phase mixture to a single liquid phase solution. In FIG. 24, LL-1 is heat exchanged with a refrigerant at a liquid state or liquid-vapor state in the 'Heat Sink Heat Exchanger', resulting in a single liquid phase combined solution (L-1) and a refrigerant at a vapor state (V-1).

Notes

Note: Enthalpy of Phase transition of the example liquid-liquid phase transition provided by FIG. 24 may be 27 kJ/kg.

Note: Baseline specific heat capacity of the example liquid-liquid phase transition composition in FIG. 24 (specific heat capacity of the liquid without the enthalpy of phase transition of the water+organic) is 3.6 J/g° C., which is used to determine the adiabatic temperature change due to the liquid-liquid phase transition.

Note: Liquid storage may be employed to store the liquid streams. This may enable the reverse osmosis unit or a vapor compression refrigeration cycle or both to continue running to recharge the storage tanks even when cooling is not required. Similarly, the storage tanks may provide cooling while the reverse osmosis unit, or a vapor compression refrigeration cycle or both is/are off.

Note: In a heat pump configuration, the 'Heat Sink Heat Exchanger' may comprise the heat exchanger heat exchanging with the 'load'.

Note: Pumps and/or energy recovery devices may not be shown in the figures, although may be included in any reaL-life construction of the systems shown in FIG. 23 and FIG. 24.

Note: The present figures show a refrigeration cycle in a specific use case. The refrigeration cycle may be employed in other use cases or temperature ranges than those shown or described herein.

Organic Solvent Nanofiltration Refrigeration Cycle Example Embodiments

Summary of Example Embodiments

The present invention may comprise a liquid-phase heat pump, refrigeration cycle, or a heat/'cool' transfer process. The present invention may enable a refrigeration cycle or heat pump by, for example, enabling an endothermic liquid phase transition to occur at a relatively lower temperature and an exothermic phase transition to occur at a relatively higher temperature. The present invention may enable heat transfer with a liquid-liquid enthalpy of phase transition or an adjustable liquid-liquid enthalpy of phase transition. The temperature at which a portion or most of the enthalpy of phase transition occurs may be adjustable, by, for example, adjusting the concentration or composition of the working fluids using, for example, one or more devices for concentration or composition adjustment. Changes or adjustment in the composition and/or system conditions of working fluids in the present invention may enable a change in phase transition temperature or phase transition conditions.

An Example LCST Embodiment for a refrigeration cycle may comprise:
 Heat Exchanger
 Liquid-Liquid Separation
 Nanofiltration (for example: may be organic solvent nanofiltration) or Reverse Osmosis or Forward Osmosis or Osmotically Assisted Nanofiltration
 Mixing
 Heat Exchanger
 Triggering/initiating an endothermic phase transition through the addition of a permeate stream to a combined solution. Said endothermic phase transition may be triggered through adding a permeate stream, which may comprise mostly 'small molecular weight reagent', to a single liquid phase mixture, which may result in an endothermic phase transition, which may result in the formation of a multi-liquid phase mixture.

An Example UCST Embodiment for a refrigeration cycle process may comprise:
 Heat Exchanger:
 Liquid-Liquid Separation:
 Nanofiltration (for example: may be organic solvent nanofiltration):
 Mixing
 Heat Exchanger
 Triggering/initiating an endothermic phase transition through the addition of a permeate stream to a combined solution. Said endothermic phase transition may be triggered through adding a permeate stream, which may comprise mostly 'small molecular weight reagent', to a single liquid phase mixture, which may result in an endothermic phase transition, which may result in the formation of a multi-liquid phase mixture.

To adjust phase transition temperature range or enable a liquid-liquid phase transition or initiate a liquid-liquid phase transition or a combination thereof, one or more of the following may be employed:
 Membrane Based Process
 Vaporization (for example: may be distillation, membrane distillation, evaporation)
 Precipitation
 Gas Pressurization
 Gas Depressurization
 System Pressurization
 System Depressurization
 Mechanical Pressurization
 Mechanical Depressurization
 Addition of Permeate
 Addition of Condensate
 Addition of Concentrate
 Addition of Precipitate
 Addition of a Regenerable or Regenerated Composition or Reagent Process reagents may be stored and/or dispatchable and/or rapidly dispatchable, enabling, for example, cooling or heating to be desynchronized from when electricity or heat or other energy source is consumed to power process. For example, one or more reagents may be stored in a tank, and rapidly dispatched when liquid-liquid phase transition temperature range adjustment is needed. For example, the rate of regeneration of one or more reagents may be slower than the rate which the system can instantaneous dispatch said one or more reagents.

Example Embodiment for Phase Transition Temperature Adjustment which May Contain Multiple Concentration Adjustable Reagents in Either or Both or One or More or a Combination of Liquid Phases:

In some embodiments, the LCST or UCST liquid may phase transition into a non-aqueous phase or organic phase and a mostly water phase or an aqueous phase. Two or more liquid phases may be reversibly transformed into a single liquid phase solution. The temperature of phase transition may be adjusted using, for example reversible adjustments in concentration, or composition, or system conditions or temperature. Said non-aqueous phase may be organic or inorganic or a combination of organics and inorganics and may comprise a mixture of reagents of different molecular weights.

For example, said non-aqueous phase may comprise a mixture or solution of a reagent with high solubility in water or a defined aqueous solution, and a reagent with relatively lower solubility in water or a defined aqueous solution or limited solubility in water or a defined aqueous solution. The reagent with high solubility in water may be defined as a reagent which is one or more or a combination of the following: fully miscible in water, fully miscible in water over a greater range of temperatures, soluble in water over a greater range of temperatures, soluble in water over a desired range of temperatures, soluble in a defined aqueous solution, soluble in a defined aqueous solution over a greater range of temperatures, or soluble in a defined aqueous solution over a desired range of temperatures. A defined aqueous solution may be defined as an aqueous solution with a specified solute or solutes and/or a specified range of concentrations of a solute or solutions. A defined aqueous solution may comprise an aqueous solution or a solution comprising mostly water or a solution comprising a greater concentration of water than another solution, or a solution comprising a greater concentration of water than said reagent with lower solubility in water or a solution comprising a greater concentration of water than said reagent with high solubility in water. A reagent with relatively lower solubility in water (or a defined aqueous solution) may be defined as a reagent which is one or more or a combination of the following: partially miscible in water, miscible in water over a smaller range of temperatures, soluble in water over a smaller range of temperatures, less soluble or limited solubility in water over a desired range of temperatures, insoluble or low or limited solubility in a defined aqueous solution, soluble in a defined aqueous solution over a smaller range of temperatures, or less soluble or limited solubility in a defined aqueous solution over a desired range of temperatures. It may be advantageous for the low solubility reagent and high solubility reagent to be mutually soluble or miscible in each other.

Phase transition temperature may be adjusted by adjusting the relative concentration of one or more reagents. For example, it may be desirable for the reagent with high solubility in water and the reagent with low solubility in water to be of different molecular weights or have different vapor pressures or have other different intrinsic properties, which may enable, for example, concentration adjustment, and/or a concentration adjustment resulting phase transition temperature adjustment, when desired. For example, if the reagent with high solubility in water and the reagent with low solubility in water are of different molecular weights, their relative concentration may be adjusted using, for example, organic solvent nanofiltration. For example, if the reagent with high solubility in water and the reagent with low solubility in water are of volatilities or vapor pressures, their relative concentration may be adjusted using, for example, a liquid-vapor or vapor-liquid phase transition method, such as distillation. Experimentally, the inventor has demonstrated, for example, that increasing the relative concentration of high solubility reagent compared to low solubility reagent in some LCST liquid compositions increases the LCST. Experimentally, the inventor has demonstrated, for example, reducing the relative concentration of high solubility reagent compared to low solubility reagent in some LCST liquid compositions decreases the LCST. Similarly, adjusting the relative concentration of reagents in the aqueous liquid phase may enable liquid-liquid phase transition temperature range temperature adjustment. For example, if the aqueous phase contains a salt or an organic compound or an inorganic compound or a combination thereof, the concentration of said reagents and the phase transition temperature range may be adjusted using, for example, a membrane-based process, such as reverse osmosis, forward osmosis or membrane distillation, or a liquid-vapor phase transition process, such as distillation or evaporation or pervaporation, or a precipitation based process or a combination thereof. Experimentally, the inventor has demonstrated, for example, that increasing the relative concentration of salt in the aqueous phase (if the aqueous phase contains salt) in some LCST liquid compositions decreases the LCST.

An example composition which employs a reagent with high water solubility and a reagent with low water solubility may comprise for example, one or more or a combination of the following:

A high water solubility reagent which may comprise a relatively larger molecular weight reagent or combination of reagents (for example, which may include, but is not limited to, one or more or a combination of the following: Polyethylene Glycol Dimethyl Ether 500, Polyethylene Glycol Dimethyl Ether 250, Polyethylene Glycol Monomethyl Ether 350, Polyethylene Glycol Monomethyl Ether 550)

A low water solubility reagent or solvent or a combination thereof which may comprise a relatively smaller molecular weight reagent or combination of reagents (for example, which may include, but is not limited to, one or more or a combination of the following: 2-Butoxyethanol, 2-Ethoxyethanol, Propylene Glycol n-Propyl Ether, Glycol Ether)

Salt or Salts (for example, may include, but is not limited to, sodium chloride, potassium chloride, calcium chloride, ammonium chloride, ammonium sulfate, sodium sulfate, potassium sulfate) or a Reagent with a high solubility in water and relatively low or limited solubility in one or more other reagents (for example, may include, but is not limited to, glycerol, urea, PEG 200, PEG 400, PEG 600, Dextrose, Maltodextrin)

Organic Solvent or a Reagent with a high solubility in the primarily organic phase and relatively low or limited solubility in the aqueous phase or aqueous phase reagents (for example, may include, but is not limited to, ethyl acetate, methyl acetate, propyl acetate, dimethyl ether, diethyl ether, dimethoxymethane, diethoxymethane, diethoxymethane, ethylene glycol diacetate, propylene glycol diacetate, Ethylene Glycol Diacetate Propylene Glycol Diacetate Dipropylene Glycol Dimethyl Ether (DPE) 2-Heptanone Propylene glycol monomethyl ether acetate Propylene Carbonate Cyclohexanone Dipropylene Glycol n-Butyl Ether (DPnB) Tri(propylene glycol) butyl ether, mixture of isomers (TPnB) Propylene glycol n-butyl ether (PnB) Dipropylene Glycol n-Propyl Ether (DPnP), n-butanol) Water Said composition may possess a LCST phase transition temperature range, at or above which the liquid may phase transition into two liquid phases which may comprise, for example, a primarily organic liquid phase and a primarily aqueous liquid phase. The primarily organic liquid phase may comprise a combination of high water solubility reagent and low water solubility reagent, and may contain minority concentrations of, for example, water and/or other aqueous liquid phase components. The primarily aqueous liquid phase may comprise a combination of water and salt or other reagent with high affinity for water relative to the primarily organic liquid phase, and may contain minority concentrations of, for example, high water solubility organic and/or low solubility organic. In said example composition, increasing the concentration of high water solubility reagent relative to low water solubility reagent may result in an increase in LCST and decreasing the concentration of high water solubility reagent relative to low water solubility reagent may result in a decrease in LCST. In said example composition, increasing the concentration of a salt or salts or a reagent with a high solubility in water and relatively low or limited solubility in the organic phase reagents may result in a decrease in LCST and decreasing the concentration of a salt or salts or a reagent with a high solubility in water and relatively low or limited solubility in the organic phase reagents may result in an increase in LCST.

Phase transition temperature may be adjusted by, for example, adjusting the relative concentration of one or more reagents by one or more or a combination of methods described herein. For example, with the example composition described in the present embodiment, the phase transition temperature may be adjusted by, for example, including, but not limited to, adjusting the relative concentration of the high water solubility reagent relative to the low water solubility reagent, adjusting the concentration of salt or reagent with high affinity for water relative to the organic phase, adjusting the concentration of water or a combination thereof.

The relative concentration of high solubility reagent to relatively low solubility reagent may be designed for specific concentration ranges depending on the method or methods employed for phase transition temperature adjustment. If the phase transition temperature is adjusted by adjusting the relative concentration of the high water solubility reagent relative to the low water solubility reagent, said concentration may adjusted by size based separation (such as, for example, a membrane based process) or a vapor-liquid or liquid-vapor phase transition concentration adjustment process. For size-based concentration adjustment process, it may be desirable for the large molecular weight reagent to be at a concentration sufficiently low relative to smaller molecular weight reagent such that it can be practically concentrated using the desired size based separation method. Size based separation methods, such as membrane-based processes for size based separation, may have limitations of the osmotic pressure and viscosity at which they can function. For example, with the example composition described, it may be desirable for the concentration of the larger molecular weight reagent to be less than 35 wt % based on the osmotic pressure limitations of 2017 organic solvent nanofiltration membranes. As technologies for organic solvent nanofiltration advance, the maximum concentration of a retentate in an organic solvent nanofiltration process may increase. Furthermore, other technologies or techniques, such as osmotically assisted nanofiltration, or osmotically assisted organic solvent nanofiltration, or ultra-high pressure nanofiltration, or forward osmosis, or DTRO, or other separation techniques, or a combination thereof may be employed. For vapor-liquid or liquid-vapor phase transition concentration adjustment processes, the concentration of the higher volatility or vapor pressure reagent relative to the lower volatility or vapor pressure reagent may employed in concentrating. For example, with a composition at least one reagent possessing volatility, distillation or pervaporation or evaporation or membrane distillation may be conducted to increase the concentration of, for example, the high water solubility reagent.

Phase transition temperature may be adjusted by adjusting the concentration of salt or reagent with high affinity for water relative to the organic phase. Concentration of said salt or reagent with high affinity for water relative to the organic phase may be adjusted using, for example, including, but not limited to, one or more or a combination of the following: membrane based process, size based separation process, a liquid-vapor based separation process, a vapor-liquid based separation process, precipitation or a combination thereof.

Phase transition temperature may be adjusted by adjusting the concentration of organic solvent or a reagent with a high solubility in the primarily organic phase and relatively low or limited solubility in the aqueous phase or aqueous phase reagents. Concentration of said reagent may be adjusted using, for example, including, but not limited to, one or more or a combination of the following: membrane based process, size based separation process, a liquid-vapor based separation process, a vapor-liquid based separation process, precipitation or a combination thereof.

In the case of the example composition, the high water solubility reagent and the low water solubility reagent may tend to 'follow' each other. The reagents 'following' each other may mean a significant portion or most of the high water solubility reagent and low water solubility reagent in the liquid system will be in the same liquid phase. For example, if two liquid phases form, a large portion of or most of the high water solubility reagent and low water solubility reagent may be present in the same liquid phase, which may comprise an organic liquid phase.

For example, the non-aqueous phase may comprise a mixture of a reagent with high water solubility and a reagent with low water solubility, and said high water solubility reagent may comprise a 'large molecular weight reagent' and said high water solubility reagent may comprise a 'small molecular weight reagent'. In an example embodiment, an increase in concentration of said 'large molecular weight reagent' relative to said 'small molecular weight reagent' may result in, for example, including, but not limited to, one or more or a combination of the following: a relatively greater lower critical solution temperature (LCST), a relatively lower upper critical solution temperature (UCST), the ability to dissolve in an aqueous phase, the ability to dissolve in an associated aqueous phase, increased solubility in an aqueous phase, or the ability to dissolve in an associated aqueous phase.

Phase transitioning liquids may comprise entirely organic reagents or may entirely be non-aqueous. Temperature driven phase transition or concentration driven phase transitioning or both may occur due to formulations of different properties. For example, one liquid phase may comprise polar organic solvents while another aqueous phase may comprise non-polar solvents or less polar solvents or selectively polar solvents or a combination. Phase transitioning may be driven by intrinsic properties other than or in addition to polarity, for example, which may include organics with different functional groups or structures.

A simple example of an organic solvent only phase transitioning liquid may comprise for example:
Non-polar organic solvent (for example, which may include, but is not limited to: octane, heptane, hexane, butane, toluene, silicon oils, fluorocarbons, oils, mineral oil, hydrocarbon)
Polar organic solvent or non-water reagent which may independently have limited solubility or be non-soluble in said non-polar organic solvent (for example, which may include, but are not limited to: propylene carbonate, ethylene glycol, methanol, ethanol, isopropanol, acetone, ammonia, acetonitrile, DMSO, THF, butanol)
Organic Solvent with solubility in both polar and non-polar organic solvent (for example, which may include, but are not limited to: polyethylene glycol dimethyl ether, polyethylene glycol monomethyl ether, 2-butoxyethanol, glycol ethers, acetone, diglyme, methyl formate)

Advantageously, an organic-only phase transitioning liquid may be a liquid which can operate in environments where water or aqueous systems may be incompatible. For example, said organic-only phase transitioning liquid may be a dielectric liquid, enabling use with, for example, direct contact with electronic devices. Advantageously, an organic only phase transitioning liquid (which may possess, for example, a LCST or UCST or both or a more gradual phase transition, or a combination thereof) may enable significantly greater heat transfer rates and effective heat capacity relative to other dielectric fluids, while maintaining the benefits of a dielectric fluid. This may enable, for example, heat transfer rates approaching or near or at or greater than water or anti-freeze water, while employing a liquid with dielectric properties. This may enable enhanced performance or smaller size or lower cost or greater lifespan of, for example, high power electronics (for example, including, but not limited to, transmission stations, power converters, inverters, transformer stations, transformers) which require dielectric liquids for heat transfer fluids.

Phase transitioning may be driven by, for example, adjustments in concentration of one or more reagents, adjustments in temperature, or a combination thereof.

In some embodiments, the aqueous phase may not contain water or substantially less water. For example, the aqueous phase may also or alternatively refer to a 1) mostly inorganic liquid phase; or 2) a more polar liquid phase; or both. For example, the 'aqueous phase' or 'inorganic phase' or 'polar phase' may comprise mostly liquid ammonia or highly concentrated aqueous ammonia or highly concentrated amine, or ionic liquid, or imine, or polar organic solvent or water or a mixture thereof Phase Transition Temperature Adjustment: Phase transition temperature may be adjusted by adjusting the concentration of one or more reagents relative to one or more other reagents in the solution. The phase transition temperature which may be adjusted may be, including, but not limited to, a LCST or UCST or both solution. Phase transition temperature adjustment may be conducted for various purposes, which may include, but are not limited to, for example, one or more or a combination of the following: adjust temperature of phase transition to align with temperature of cold source, adjust temperature of phase transition to align with temperature of heat source, adjust temperature of phase transition to align with temperature of surroundings or environment, adjust temperature of phase transition to align with a desired temperature or temperature range, to create liquid phase refrigeration cycle, to induce a phase transition, to adjust composition, or other purposes. To enable or facilitate phase transition temperature adjustment, it may be advantageous for one or more reagents in the solution to possess different properties which may enable adjustments in concentration to enable, for example, said liquid-liquid phase transition temperature range adjustment or phase transition temperature adjustment.

For example, if the concentration of one or more reagents may be adjusted using size-based separation method, the molecular weight or hydration radius or a combination thereof of one or more reagents may be different from one or more other reagents. It may be desirable for the molecular weights or hydration radius difference between one or more reagents to be sufficiently large to enable separation using, for example, a size-based separation or semi-permeable membrane.

For example, one or more reagents may exhibit differences in vapor pressure at a given temperature. Vapor pressure differences may be exploited to adjust the concentration of one or more reagents by using a vapor-liquid or liquid-vapor phase transition method for concentration adjustment, which may including, but are not limited to, one or more or a combination of the following: distillation, evaporation, membrane distillation, pervaporation, vapor gap membrane, mechanical vapor compression distillation, vacuum distillation, pressurization of a gas, or depressurization of a gas. For example, the concentration of one or more reagents may be adjusted by removing a portion of water using a liquid-vapor phase transition method, which may increasing the concentration of one or more non-volatile or relatively lower volatility reagents or components.

For example, the concentration of one or more dissolved or soluble gases in a solution may be adjusted by adjusting the solubility or concentration of said one or more gases. For example, the concentration or solubility of one or more gases may be adjusted by, including, but not limited to, adjusting the partial pressure of one or more gases, the total pressure of the system, the solution temperature, adjusting solution pH, or a combination thereof. For example, the concentration of a dissolved gas may be increased by increasing the pressure of the dissolved gas in the presence of a solution in accordance with, for example, the concepts presented by Henry's Law or physical solubility. For example, the dissolved concentration of $CO_2$ in certain UCST and LCST liquid solutions has been experimentally demonstrated by the inventor to influence the phase transition temperature. For example, in one example experiment, increasing the pressure of $CO_2$ in the headspace (which may have resulted in an increase in the dissolved concentration of $CO_2$), increased the UCST phase transition temperature or liquid-liquid phase transition temperature range temperature of a Propylene Carbonate-Water-Polypropylene Glycol UCST solution. For example, the concentration of ammonia in solution also may influence phase transition temperature. Ammonia may be regenerated from solution or the concentration of ammonia may be adjusted, for example, using distillation or vacuum distillation or partial pressure adjustment or temperature adjustment, and may, if desired, be stored, for example, including, but not limited to, one or more or a combination of the following: as an aqueous ammonia solution, a solution containing dissolved ammonia, a concentrated ammonia solution or as compressed gas or as a liquid. Gas pressure adjustment—adjusting solubility by adjusting the partial pressure of a soluble gas and/or the concentration of a soluble gas. The concentration of a dissolved may be, for example, decreased by, for example, including, but not limited to, reducing the partial pressure of a dissolved gas, or degassing the dissolved gas, introducing another gas, or employing a stripping gas, introducing an antisolvent, or heating up the solution. Soluble gases may include, but are not limited to, one or more or a combination of the following: CO, $NH_3$, $O_2$, $N_2$, ethyl acetate, methyl formate, formic acid, volatile organic compound, dimethyl ether, methyl ether, diethyl ether, acetaldehyde, dimethoxymethane, diethoxymethane, methylamine, ethylamine, triethylamine, MEA, TEA, DEA, amines, sulfurous compounds, hydrogen sulfide, sulfur dioxide, nitrogen compounds, nitric oxide, nitrous oxide, phosphoric compounds, halogenated compounds, acids, bases, other gases described herein, or other volatile reagents described herein.

For example, the concentration of one or more reagents may be adjusted by inducing precipitation of one or more reagents. Precipitation may be facilitated by, for example, including, but not limited to, one or more or a combination of the following: 'solventing-out', 'salting out', increasing the concentration of one or more other reagents, increasing the concentration of an antisolvent liquid, increasing the concentration of an antisolvent soluble gas, changing pressure, adjusting temperature, cooling, heating, precipitating reaction, light, or magnetic field. Precipitate may be removed. One or more reagents which comprise the precipitate may be introduced into the solution to reverse or otherwise adjust composition or phase transition temperature.

For example, the concentration of one or more reagents may be adjusted by reacting one or more reagents with another reagent. It may be desirable for said reaction to be reversible in some fashion. For example, one or more reagents in a solution may comprise, for example, an amine or ammonia or basic compound. Said solution may further comprise an acid gas reacted with said amine or ammonia, such as, for example, $CO_2$ or $H_2S$ or $SO_2$. The liquid-liquid phase transition temperature range or phase transition temperature may be adjusted by, for example, including, but not limited to, one or more or a combination of the following: adjusting the concentration of an acidic compound relative to a basic compound, adjusting the concentration of an acidic compound, adjusting the concentration of a basic compound, precipitating a portion of the acidic compound-basic compound salt, or dissolving acidic compound-basic compound salt. For example, the liquid-liquid phase transition temperature range temperature may be adjusted by absorbing $CO_2$ into a solution containing an amine or ammonia, increasing the $CO_2$ loading. Similarly, the liquid-liquid phase transition temperature range temperature may be adjusted by desorbing or removing $CO_2$ from said solution or reducing the concentration of $CO_2$, using, for example, including, but not limited to, one or more or a combination of the following: thermal desorption, antisolvent desorption, vacuum stripping, dilution, or a stripping gas. It is important to note that pH may be reversibly adjusted by adjusting the relative concentration of a acidic and basic reagents, which may be useful, for example, in pH sensitive phase transition temperature liquid systems or embodiments with membrane concentration adjustment. For example, the liquid-liquid phase transition temperature range temperature may be adjusted by facilitating or inducing precipitation through, for example, including, but not limited to, dissolving $CO_2$ or increasing the partial pressure of $CO_2$ in a solution comprising ammonia or amine, which may result in the precipitation of a portion of $CO_2$-rich salt or the precipitation or salting out of other reagents. Precipitation may also be induced by other methods, such as, including, but not limited to, increasing the concentration of one or more other reagents or cooling the solution or heating the solution. Concentration of liquid-liquid phase transition temperature range temperature may be adjusted by adjusted the concentration of basic compound, which may involve the evaporation or concentrating.

It may be desirable for concentration or liquid-liquid phase transition temperature range temperature adjustments to be reversible. Reversibility may involve, for example, the re-introduction of previously separated reagents. Reversibility may involve, for example, returning the concentration or composition to a previous state. Reversibility may involve the ability to return to a previous concentration or composition state at relatively low economic or energetic cost. Reversibility may involve adding lost reagents or removing excess reagents with relatively low economic or energetic cost. Relatively low economic or energetic cost may involve a cost which is less than the added value created by the heat transfer system compared to competing heat transfer systems in the same application.

For example, the concentration of one or more reagents may be adjusted by adding reagents or reagents mixtures which were previously separated or equivalent or similar in composition to reagents or reagent mixtures which may be separated. For example, concentration may be adjusted by adding, including, but not limited to, permeate or permeate equivalent or condensate or precipitate.

Embodiments may employ methods to recover or makeup lost reagents (if, for example, there are lost reagents). For example, some embodiments may involve the evaporation of water, which may require makeup water to be added at some point.

Practical or Rapid Concentration or Composition and/or Liquid-liquid phase transition temperature range Temperature Adjustment: It may be desirable to be able to quickly adjust the phase transition temperature or liquid-liquid phase transition temperature range temperature in a liquid system. For example, it may be desirable to quickly adjust the phase transition temperature or liquid-liquid phase transition temperature range temperature in response to, for example, a significant heat release or significant heat absorption event, such as charging of a car battery, acceleration of an vehicle, or a power surge. An example method for rapid concentration or liquid-liquid phase transition temperature range temperature adjustment may involve storage of one or more reagents or combinations of reagents which may be rapidly introduced or added to or mixed with a liquid system when said liquid-liquid phase transition temperature range temperature adjustment is required. For example, stored reagents may comprise concentrate or permeate or condensate which may be rapidly added to adjust concentration and/or liquid-liquid phase transition temperature range temperature and/or to initiate a liquid-liquid phase transition. An electronic system or mechanical system or a combination thereof to monitor the concentration of reagents in the liquid system and the amount of storage liquids may be employed. Stored reagents may comprise previously regenerated reagents, such as reagents or reagent mixtures recovered or regenerated from the liquid system. Stored reagents may comprise reagents which may not have been previously derived from or regenerated from the liquid system. Another potential benefit of stored reagents is it may enable a lower capacity or lower cost concentration adjustment or regeneration device by enabling regeneration to also occur while a significant temperature adjustment is not occurring, allowing for a longer timeframe for concentration adjustment. This may mean, for example, the ability to have a smaller or lower cost concentration adjustment or regeneration device or devices, such as, including, but not limited to, membrane unit or distillation unit or evaporation unit. These units may regenerate 'stored liquid' or 'stored liquids' over time. Said regeneration devices may involve slower liquid-liquid phase transition temperature range or phase transition temperature adjustment or removal of excess reagents or regeneration of 'stored liquids' or 'stored reagents' or 'stored reagent mixtures' in a liquid-liquid phase transition temperature range temperature or phase transition temperature neutral way. For example, a phase transition neutral means of reagent regeneration may involve removing or regenerating particular reagent or reagents while maintaining the same or similar ratio of reagents or relative concentration of reagents in the liquid system or UCST or LCST liquid phases or a combination thereof. For example, a phase transition neutral or system operations neutral means of reagent regeneration or 'stored liquid' regeneration may involve regenerating said reagents or 'stored liquid' from 'spillover' or excess liquid exiting the liquid system due to, for example, previously added reagents for phase transition temperature adjustment. Regenerating from 'spillover' or excess liquid may enable regeneration without or while minimally impacting the heat transfer liquid system and may enable a lower cost and/or smaller regeneration device or devices. Regenerating from 'spillover' or excess liquid may enable, for example, regenerating under specific times or occasions when it is most advantageous to regeneration, for example, when a vehicle is parked or charging or when electricity or energy prices are inexpensive.

Adjustment of concentration or phase transition temperature may be conducted using, including, but not limited to, one or more or a combination of the methods described thereof Sensors, monitoring or measuring techniques, analytical devices, other equipment or methods, or a combination thereof may be employed to measure or monitor or adjust, for example, including, but not limited to, one or more or a combination of the following: phase transition temperature, enthalpy of phase transition, contamination (if any), the concentration of one or more reagents, the mass of liquid, pressure, system temperatures, viscosity, relative volume of phase transition phases in a multi-liquid phase mixture, total volume of liquid, flow rate, or leaks or losses.

Liquid-liquid phase transition temperature range adjustment may use, for example, membrane concentrating or distillation or evaporation or gas pressurization or precipitation or permeate addition or condensate addition or precipitate addition or a combination thereof.

Additional Example compositions for a LCST system, may include, but are not limited to:
- large MW organic, small MW organic, salt, water
- large MW organic, small MW organic, glycerol (or similar compound), water (Glycerol or similar low molecular weight organic as an alternative to salt)
- Water, 2-Butoxyethanol, PEG 400 (adjusting LCST by adjusting concentration of large MW organic which is more soluble in aqueous phase than organic phase)
- DI Water, DPE, PEGDMM 350 (Reagent with ultra-low LCST with reagent with ultra-high solubility, both of which are mutually soluble. PEGDMM 350 increases the liquid-liquid phase transition temperature range temperature with greater concentration. At lower concentrations, PEGDME 350 may follow DPE.)

Non-Polar Organic, Polar Organic, Organic Soluble in Both Non-Polar and Polar Organic:

Additional Example compositions for a LCST system, may include, but are not limited to:
- Water, Propylene Carbonate, PnP, PEG 400 (Adjust liquid-liquid phase transition temperature range by adjusting concentration of large MW organic with higher solubility in water)

Figure 26:
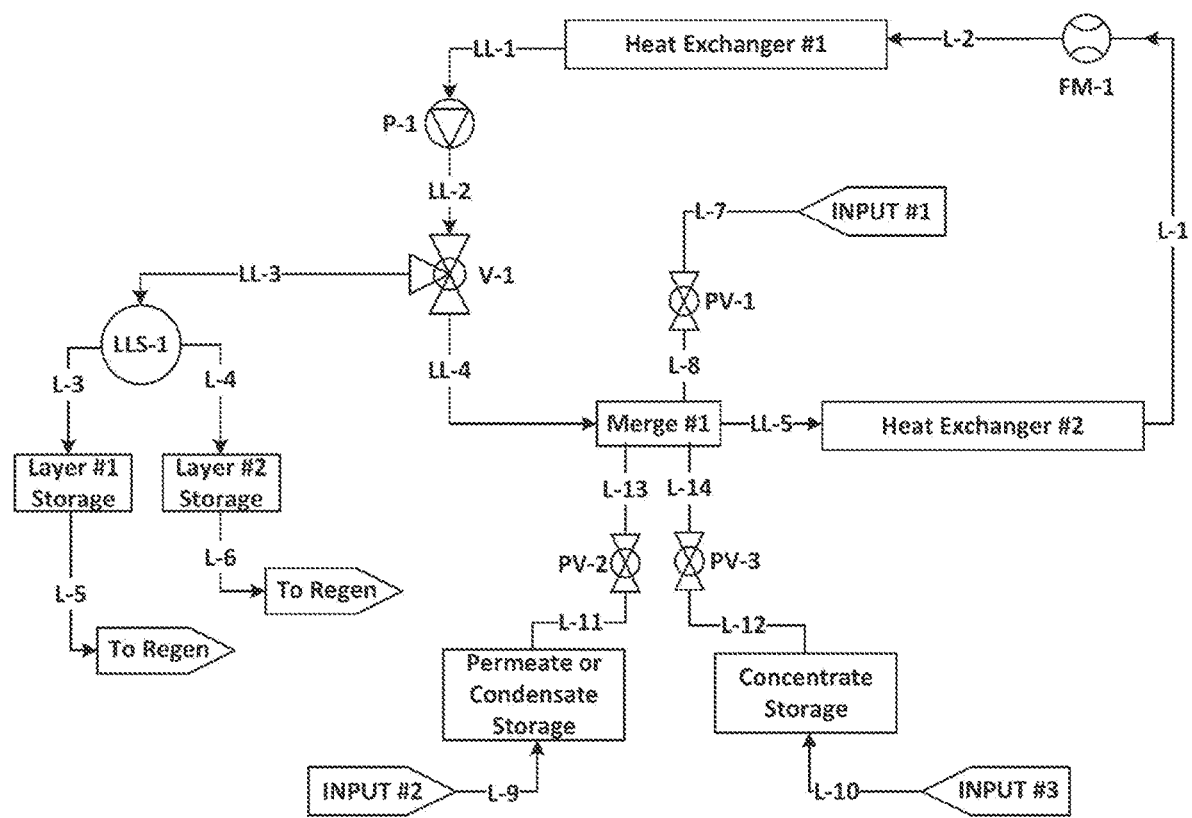
FIG. 26: Embodiment with Liquid-Liquid Separation of Multi-Liquid Phase Mixture of Excess or Spillover Liquid (which may be produced due to reagents added for, for example, phase transition temperature adjustment) and Batch Reagent Regeneration.

Non-Polar Organic, Polar Organic, Organic Soluble in Both Non-Polar and Polar Organic:

Example Configurations for Some Heat Transfer and Refrigeration Cycle Embodiments Example FIG. 26 Key

| ID | Description |
|---|---|
| L-1 | Single liquid phase combined solution post heat exchanger and transferred to flow meter (FM-1). |
| L-2 | Single liquid phase combined solution transferred from flow meter to heat exchanger. |
| L-3 | Liquid phase separated from LL-3 using one or more liquid-liquid separation devices (LL-1). Liquid phase or 'layer' may be separated using liquid separation methods known in the art. L-2 may be transferred to 'Layer #1 Storage'. L-2 may be a partially separated, or nearly completely separated, or practically completely separated liquid phase or 'layer.' |
| L-4 | Liquid phase separated from LL-3 using one or more liquid-liquid separation devices (LL-1). Liquid phase or 'layer' may be separated using liquid separation methods known in the art. L-3 may be transferred to 'Layer #2 Storage'. L-3 may be a partially separated, or nearly completely separated, or practically completely separated liquid phase or 'layer.' |
| L-5 | Liquid Phase #1 or Layer #1 transported to a regeneration step and/or return to the heat transfer system. L-5 may be transferred to one or more or multiple or different regeneration steps or may undergo regeneration using different methods depending on, for example, location or preference or desired characteristics. Liquid may be regenerated in a different location than the present system if desired and/or may be transferred to a different location if desired. Alternatively or additionally, L-5 may be returned directly to heat transfer system as 'Input #1' or an intermediary storage tank or both. |
| L-6 | Liquid Phase #2 or Layer #2 transported to a regeneration step and/or return to the heat transfer system. L-6 may be transferred to one or more or multiple or different regeneration steps or may undergo regeneration using different methods depending on, for example, location or preference or desired characteristics. Liquid may be regenerated in a different location than the present system if desired and/or may be transferred to a different location if desired. Alternatively or additionally, L-6 may be returned directly to heat transfer system as 'Input #1' or an intermediary storage tank or both. |
| L-7 | Liquid #1 or Layer #1 or Liquid #2 or Layer #2 may be returned or transferred to the Heat Transfer System and may bypass a regeneration step. L-7 may comprise said transferred liquid or liquids or may comprise other reagents. L-7 may be transferred to a Pump and/or Valve (PV-1). |
| L-8 | L-7 Transferred from PV-1 to Merge #1, transferring it to the heat transfer system. |
| L-9 | Permeate or Condensate or a Combination Thereof Input Transferred to Permeate or Condensate Storage. The permeate or condensate may be regenerated in a system located separately from the heat transfer system or as an integrated component of the heat transfer system. |
| L-10 | Concentrate Input Transferred to Concentrate Storage. The concentrate may be regenerated in a system located separately from the heat transfer system or as an integrated component of the heat transfer system. |
| L-11 | Permeate or Condensate transferred from Permeate or Condensate Storage to Pump and/or Valve (PV-2). |
| L-12 | Concentrate transferred from Concentrate Storage to Pump and/or Valve (PV-3). |
| L-13 | Permeate transferred from Pump and/or Valve to heat transfer system. |
| L-14 | Concentrate transferred from Pump and/or Valve to heat transfer system. |
| LL-1 | Multi-liquid phase mixture post heat exchanger |
| LL-2 | Multi-liquid phase mixture post circulation pump |

-continued

| ID | Description |
| --- | --- |
| LL-3 | Excess Liquid or Spillover Liquid, which may comprise a multi-liquid phase mixture. Phase transition temperature may be adjusted by, for example, adjusting concentration, which may be conducted, by, for example, adding concentrate or permeate to the UCST or LCST or both heat transfer liquid or liquid system. If reagents are added, eventually, the volume of liquid in the system may begin to reach or exceed the volumetric capacity of the heat transfer system. If desired, liquid may be removed from the heat transfer system to, for example, including, but not limited to, one or more or a combination of the following: facilitate phase transition temperature adjustment, reduce the volume of liquid in the system to reduce the amount of liquid added required to adjust phase transition temperature, or to remove excess liquid beyond the capacity of the heat transfer system. Said liquid which may be removed from the heat transfer system may be defined as spillover liquid or excess liquid or excess spillover, even if said liquid does not exceed the volumetric capacity of the system or may not be 'excess' or 'spillover'. |
| LL-4 | Multi-liquid phase mixture post excess spillover removal (if any excess spillover is removed). |
| LL-5 | Multi-Liquid phase mixture or single liquid phase combined solution following 'Merge #1' |
| P-1 | Liquid circulation pump. May be employed to circulate liquids or fluids within the system. Similar to or as with other devices or other equipment in the present embodiment and other embodiments, other pumps and/or other equipment may be employed or required in the process, which may or may not be shown in the figure. |
| V-1 | Device to control or monitor or pump or release or a combination thereof liquid in the system. V-1 may be employed to control liquid volume or other aspects of liquid flow in the system. V-1 may simply comprise a valve and/or pump which allows liquid to leave the system when there is excess volume, or pumps or releases liquid when advantageous or monitors liquid level or monitors liquid flow rate or a combination thereof |
| FM-1 | Liquid flow meter to measure and/or control the flow rate of liquid in the system. |
| Heat Exchanger #1 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Heat Exchanger #2 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| LLS-1 | Liquid-Liquid Separation device. May be employed to partially or nearly completely separate a multi-liquid phase mixture into its constituent liquid phases. LLS-1 may separate multi-liquid phase mixture, LL-3, into its constituent liquid phases, which may comprise, for example, 'Layer #1' and 'Layer #2'. One or more or a combination of liquid-liquid separation devices may be employed. |
| Layer #1 Storage | Storage for Liquid Phase |
| Layer #2 Storage | Storage for Liquid Phase |
| PV-1 | Pump and/or Valve which may be employed to control or regulate the transfer of liquid phase #2 or layer #2 or liquid phase #1 or layer #1 or both or another composition or reagent osr a combination thereof into the heat transfer system or into regeneration step. |
| PV-2 | Pump and/or Valve which may be employed to control or regulate the transfer of permeate and/or condensate into the heat transfer system. Permeate and/or condensate may be transferred into the heat transfer system during, for example, a phase transition temperature adjustment. |
| PV-3 | Pump and/or Valve which may be employed to control or regulate the transfer of concentrate into the heat transfer system. Concentrate may be transferred into the heat transfer system during, for example, a phase transition temperature adjustment. |
| Permeate or Condensate Storage | Storage for Permeate. |
| Concentrate Storage | Storage for Concentrate. |
| Merge #1 | Device for adding reagents or mixing or both. Merge #1 may be combined with V-1 to create, for example, a combined liquid level and composition or phase transition temperature adjustment device. |

Figure 27:
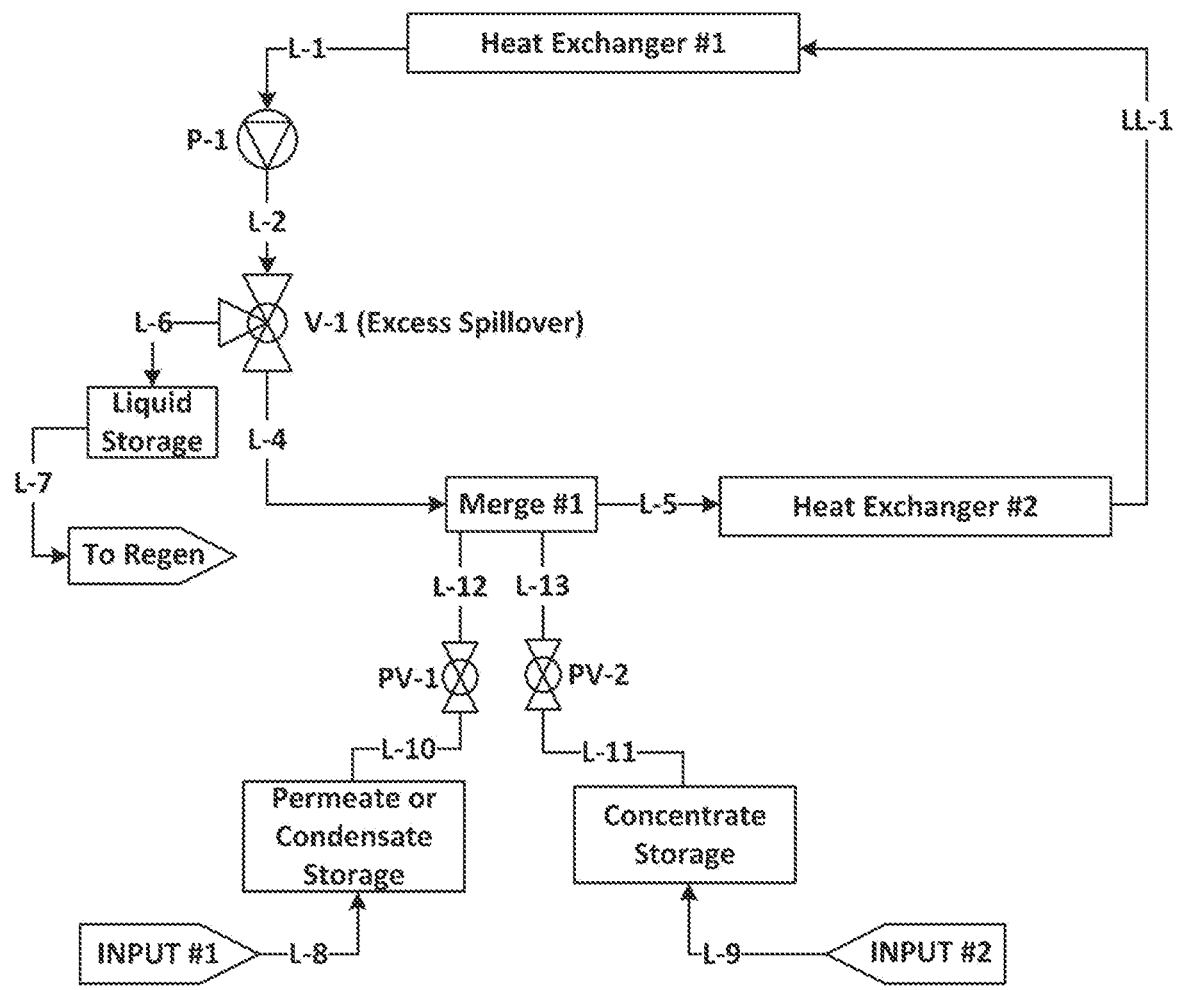
FIG. 27: Embodiment with Batch Based Regeneration of Excess or Spillover Liquid

Example FIG. 27 Key

| ID | Description |
|---|---|
| L-1 | Single liquid phase combined solution post heat exchanger |
| L-2 | Single liquid phase combined solution post circulation pump |
| L-3 | |
| L-4 | Single liquid phase combined solution post excess spillover removal (if any excess spillover is removed). |
| L-5 | Single liquid phase combined solution or multi-liquid phase mixture post 'Merge #1' and transferred to Heat Exchanger #2. Depending on if the composition and! or temperature is adjusted in 'Merge #1', L-5 may comprise a single liquid phase or a multi-liquid phase mixture. It is important to note, depending on the application, the system may undergo many cycles before the system requires phase transition temperature adjustment. |
| L-6 | Excess Liquid or Spillover Liquid, which may comprise a single liquid phase combined solution. Phase transition temperature may be adjusted by, for example, adjusting concentration, which may be conducted, by, for example, adding concentrate or permeate to the UCST or LCST or both heat transfer liquid or liquid system. If reagents are added, eventually, the volume of liquid in the system may begin to reach or exceed the volumetric capacity of the heat transfer system. If desired, liquid may be removed from the heat transfer system to, for example, including, but not limited to, one or more or a combination of the following: facilitate phase transition temperature adjustment, reduce the volume of liquid in the system to reduce the amount of liquid added required to adjust phase transition temperature, or to remove excess liquid beyond the capacity of the heat transfer system. Said liquid which may be removed from the heat transfer system may be defined as spillover liquid or excess liquid or excess spillover, even if said liquid does not exceed the volumetric capacity of the system or may not be 'excess' or 'spillover'. |
| L-7 | Liquid Phase from Liquid Storage transferred to a regeneration step. L-7 may be transferred to one or more or multiple or different regeneration steps or may undergo regeneration using different methods depending on, for example, location or preference or desired characteristics. Liquid may be regenerated in a different location than the present system if desired and/or may be transferred to a different location if desired. |
| L-8 | Permeate or Condensate or a Combination Thereof Input Transferred to Permeate or Condensate Storage. The permeate or condensate may be regenerated in a system located separately from the heat transfer system or as an integrated component of the heat transfer system. |
| L-9 | Concentrate Input Transferred to Concentrate Storage. The concentrate may be regenerated in a system located separately from the heat transfer system or as an integrated component of the heat transfer system. |
| L-10 | Permeate or Condensate transferred from Permeate or Condensate Storage to Pump and/or Valve (PV-1). |
| L-11 | Concentrate transferred from Concentrate Storage to Pump and/or Valve (PV-2). |
| L-12 | Permeate transferred from Pump and/or Valve to heat transfer system. |
| L-13 | Concentrate transferred from Pump and/or Valve to heat transfer system. |
| P-1 | Liquid circulation pump. May be employed to circulate liquids or fluids within the system. Similar to or as with other devices or other equipment in the present embodiment and other embodiments, other pumps and/or other equipment may be employed or required in the process, which may or may not be shown in the figure. |
| V-1 | Device to control or monitor or pump or release or a combination thereof liquid in the system. V-1 may be employed to control liquid volume or other aspects of liquid flow in the system. V-1 may simply comprise a valve and/or pump which allows liquid to leave the system when there is excess volume, or pumps or releases liquid when advantageous or monitors liquid level or monitors liquid flow rate or a combination thereof |
| Heat Exchanger #1 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Heat Exchanger #2 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Liquid Storage | Storage for liquid exiting the heat transfer system. 'Liquid Storage', as well as other storage regions/tanks, may be employed to, for example, including, but not limited to, one or more or a combination of the following: |

| ID | Description |
|---|---|
| | enable rapid adjustments in concentration without the regeneration step being a limiting step, enable more efficient regeneration, enable lower CAPEX and/or OPEX regeneration devices or regeneration, or enable regeneration to occur over a longer timescale than, for example, a practically instantaneous phase transition temperature adjustment. |
| PV-1 | Pump and/or Valve which may be employed to control or regulate the transfer of permeate and/or condensate into the heat transfer system. Permeate and/or condensate may be transferred into the heat transfer system during, for example, a phase transition temperature adjustment. |
| PV-2 | Pump and/or Valve which may be employed to control or regulate the transfer of concentrate into the heat transfer system. Concentrate may be transferred into the heat transfer system during, for example, a phase transition temperature adjustment. |
| Permeate or Condensate Storage | Storage for permeate or condensate, which may comprise permeate or condensate, regenerated permeate or condensate, permeate or condensate equivalent, or a combination thereof. |
| Concentrate Storage | Storage for concentrate, which may comprise concentrate, regenerated concentrate, concentrate equivalent, or a combination thereof. |
| Merge #1 | Device for adding reagents or mixing or both. Merge #1 may be combined with V-1 to create, for example, a combined liquid level and composition or phase transition temperature adjustment device. |

Figure 28:
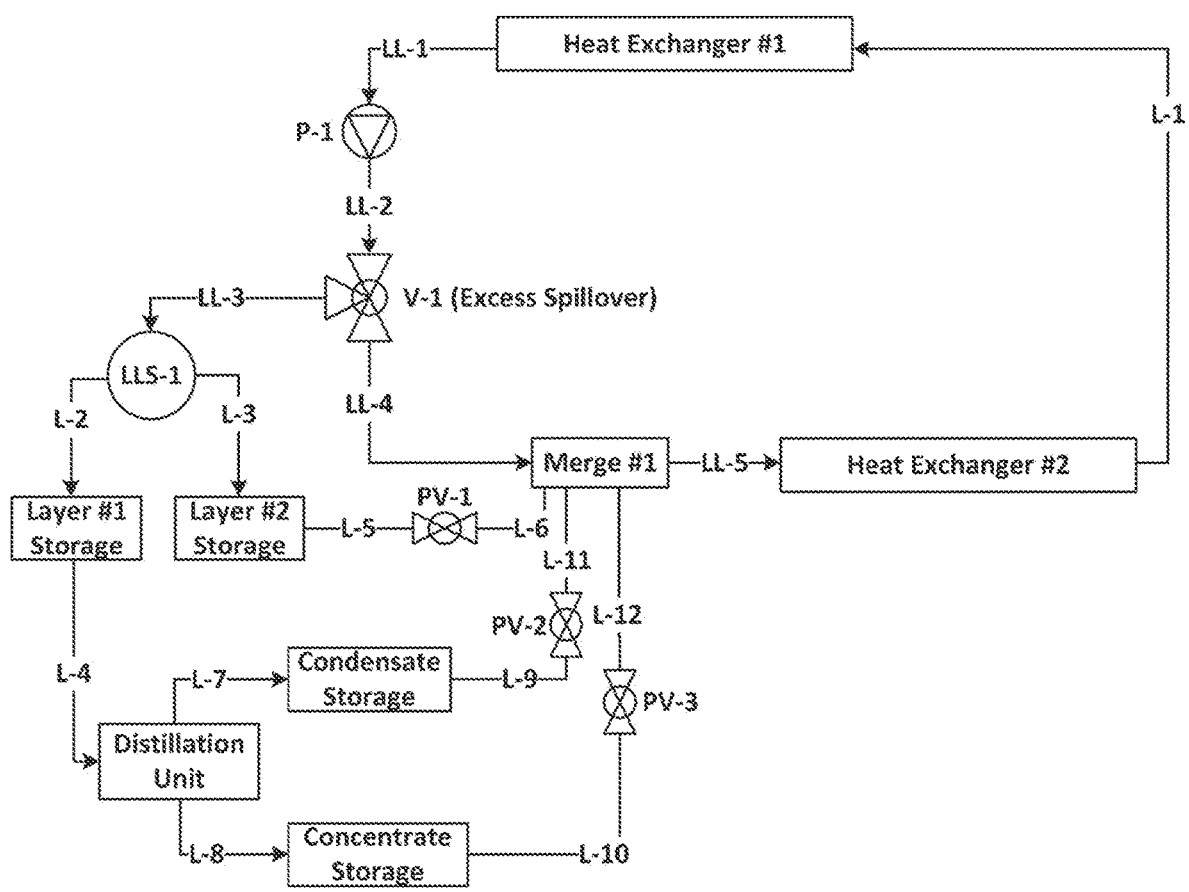
FIG. 28: Heat Transfer and/or Refrigeration Cycle Embodiment with Liquid-Liquid Separation of, for example, Excess Liquid or Spillover, and Distillation Based Regeneration of Phase Transition Temperature Adjustment Reagents or Compositions

Example FIG. 28 Key

| ID | Description |
|---|---|
| L-1 | Single liquid phase combined solution post heat exchanger. |
| L-2 | Liquid phase separated from LL-3 using one or more liquid-liquid separation devices (LL-1). Liquid phase or 'layer' may be separated using liquid separation methods known in the art. L-2 may be transferred to 'Layer #1 Storage'. L-2 may be a partially separated, or nearly completely separated, or practically completely separated liquid phase or 'layer.' |
| L-3 | Liquid phase separated from LL-3 using one or more liquid-liquid separation devices (LL-1). Liquid phase or 'layer' may be separated using liquid separation methods known in the art. L-3 may be transferred to 'Layer #2 Storage'. L-3 may be a partially separated, or nearly completely separated, or practically completely separated liquid phase or 'layer.' |
| L-4 | Liquid Phase #1 or Layer #1 liquid transferred from Layer #1 Storage to Distillation Unit. |
| L-5 | Liquid Phase #2 or Layer #2 transferred from Layer #2 Storage to PV-1 |
| L-6 | Liquid Phase #2 or Layer #2 transferred from Pump and/or Valve to heat transfer system. |
| L-7 | Condensate produced by 'Distillation Unit' transferred to Condensate Storage. |
| L-8 | Concentrate produced by 'Distillation Unit' transferred to Concentrate Storage. |
| L-9 | Condensate transferred from Condensate Storage to Pump and/or Valve (PV-2). |
| L-10 | Concentrate transferred from Concentrate Storage to Pump and/or Valve (PV-3). |
| L-11 | Permeate transferred from Pump and/or Valve to heat transfer system. |
| L-12 | Concentrate transferred from Pump and/or Valve to heat transfer system. |
| LL-1 | Multi-liquid phase mixture post heat exchanger |
| LL-2 | Multi-liquid phase mixture post circulation pump |
| LL-3 | Excess Liquid or Spillover Liquid, which may comprise a multi-liquid phase mixture. Phase transition temperature may be adjusted by, for example, adjusting concentration, which may be conducted, by, for example, adding concentrate or permeate to a liquid-liquid phase transitioning liquid composition or liquid system. If reagents are added, eventually, the volume of liquid in the system may begin to reach or exceed the volumetric capacity of the heat transfer system. If desired, liquid may be removed from the heat transfer system to, for example, including, but not limited to, one or more or a combination of the following: facilitate phase transition temperature adjustment, reduce the volume of liquid in the system to reduce the amount of liquid added required to adjust phase transition temperature, or to remove excess liquid beyond the capacity of the heat transfer system. Said liquid which may be removed from the heat transfer system may be defined as spillover liquid or excess liquid or excess spillover, even if said liquid does not exceed the volumetric capacity of the system or may not be 'excessv'or 'spillover'. |

| ID | Description |
|---|---|
| LL-4 | Multi-liquid phase mixture post excess spillover removal (if any excess spillover is removed). |
| LL-5 | Multi-Liquid phase mixture or single liquid phase combined solution following 'Merge #1' |
| P-1 | Liquid circulation pump. May be employed to circulate liquids or fluids within the system. Similar to or as with other devices or other equipment in the present embodiment and other embodiments, other pumps and/or other equipment may be employed or required in the process, which may or may not be shown in the figure. |
| V-1 | Device to control or monitor or pump or release or a combination thereof liquid in the system. V-1 may be employed to control liquid volume or other aspects of liquid flow in the system. V-1 may simply comprise a valve and/or pump which allows liquid to leave the system when there is excess volume, or pumps or releases liquid when advantageous or monitors liquid level or monitors liquid flow rate or a combination thereof |
| Heat Exchanger #1 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Heat Exchanger #2 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| LLS-1 | Liquid-Liquid Separation device. May be employed to partially or nearly completely separate a multi-liquid phase mixture into its constituent liquid phases. LLS-1 may separate multi-liquid phase mixture, LL-3, into its constituent liquid phases, which may comprise, for example, 'Layer #1' and 'Layer #2'. One or more or a combination of liquid-liquid separation devices may be employed. |
| Layer #1 Storage | Storage for Liquid Phase #1. |
| Layer #2 Storage | Storage for Liquid Phase #2. |
| Distillation Unit | Separation device for regenerating concentrate and/or condensate or an equivalent thereof for use in, for example, phase transition temperature adjustment. For example, the Distillation Unit may comprise one or more devices which employ one or more principles of distillation for separation and/or other separation devices. |
| PV-1 | Pump and/or Valve which may be employed to control or regulate the transfer of liquid phase #2 or layer #2 into the heat transfer system or into regeneration step. |
| PV-2 | Pump and/or Valve which may be employed to control or regulate the transfer of permeate into the heat transfer system. Permeate may be transferred into the heat transfer system during, for example, a phase transition temperature adjustment. |
| PV-3 | Pump and/or Valve which may be employed to control or regulate the transfer of concentrate into the heat transfer system. Concentrate may be transferred into the heat transfer system during, for example, a phase transition temperature adjustment. |
| Condensate Storage | Storage for Condensate. |
| Concentrate Storage | Storage for Concentrate. |
| Merge #1 | Device for adding reagents or mixing or both. Merge #1 may be combined with V-1 to create, for example, a combined liquid level and composition or phase transition temperature adjustment device. |

Example FIG. 28 Description: FIG. 28 may show an embodiment for heat transfer or refrigeration cycle or a combination thereof employing liquid-liquid phase transitioning liquids. When phase transition temperature requires adjustment, FIG. 28 may show an example embodiment wherein the phase transition temperature may be adjusted by adjusting the concentration of one or more reagents. Concentration adjustments or regeneration of compositions involved with concentration adjustment or both may occur within the core heat transfer or refrigeration cycle liquid loop or with liquids or reagents outside or removed from the core heat transfer liquid loop or both. FIG. 28 may involve a phase transition temperature adjustment system which may advantageously enable rapid phase transition temperature adjustment without or while minimally being inhibited by the rate of concentration adjustment using a separation method and/or without or while minimally interfering with the core heat transfer loop of the heat transfer system or the refrigeration cycle. Phase transition temperature may be adjusted in the present embodiment by, for example, adjusting the concentration of one or more reagents in the liquid system by adding regenerable permeate or concentrate liquid or other potentially regenerable reagents or reagent compositions to the working fluids or heat transfer liquids in the heat transfer loop. Permeate or condensate may, for example, comprise compositions which contain a lower concentration of one or more reagents relative to the liquids in the heat transfer loop or refrigeration cycle. Concentrate may, for example, comprise compositions which contain a greater concentration of one or more reagents relative to the heat transfer liquids in the heat transfer loop or refrigeration cycle. When a liquid composition or other reagents are added, the total volume of the liquid in the heat transfer loop may increase or temporarily increase. If the volume increase exceeds the total volumetric capacity of the heat transfer loop, liquid may be displaced from the heat transfer loop, which may be referred to as spillover or excess liquid. Liquid may also intentionally be removed from the heat transfer loop even if the heat transfer system is operating at liquid volumes below total volumetric capacity—said liquid may also be referred to spillover or excess liquid. In the present embodiment, spillover or excess liquid may be, at least in part, regenerated into concentrate and/or condensate to be employed in, for example, adjusting phase transition temperature. An example means of regenerating concentrate and/or condensate may comprise concentrating one or more reagents using a distillation based separation method (for example, which may include, but are not limited to, one or more or a combination of the following: distillation, vapor compression distillation, vacuum distillation, membrane distillation, pervaporation, evaporation, sweeping gas evaporation, multi-stage flash distillation, azeotropic distillation, extractive distillation), which may result in one or more concentrates, while forming one or more condensates lean in said one or more reagents. Said 'concentrate' may be employed as the 'concentrate' solution and said 'condensate' may be employed as said 'condensate' solution. Condensate and/or concentrate may be stored and added when concentration adjustment is desired.

FIG. 28 may involve excess spillover comprising a multi-liquid phase mixture. FIG. 28 may separate the multi-liquid phase mixture into two constituent liquid phases using a liquid-liquid separation method. In FIG. 28, one of the two separated liquid phases may undergo regeneration into a concentrate and/or condensate solution using a separation method. Said regeneration method may involve concentrating one or more reagents present in said one of the two separated liquid phases, which may form a concentrate, while the remaining liquid, which may be lean in said one or more reagents, may be considered the condensate. In FIG. 28, the other of the two separated liquid phases may be transferred to a separate storage container, where it may be returned to heat transfer loop or heat transfer working fluid, for example, when desired, when advantageous, or as a reagent composition employed in phase transition property and/or phase transition temperature adjustment. Said other of the two separated liquid phases may also or instead be employed in a separation or treatment method. It may be important to note that, if desired, both or either separated liquid phases may undergo some form of regeneration or form some form of condensate and/or concentrate.

Embodiments may employ systems for monitoring concentration of one or more reagents, or the total liquid mass or volume or level, or the viscosity, or the phase transition temperature, or a combination thereof to determine the appropriate amounts of reagent compositions to add to the heat transfer loop or heat transfer system to result in the desired phase transition temperature adjustment and/or phase transition properties. Said systems may also take into account liquid or reagents exiting the system during these calculations.

Figure 29:
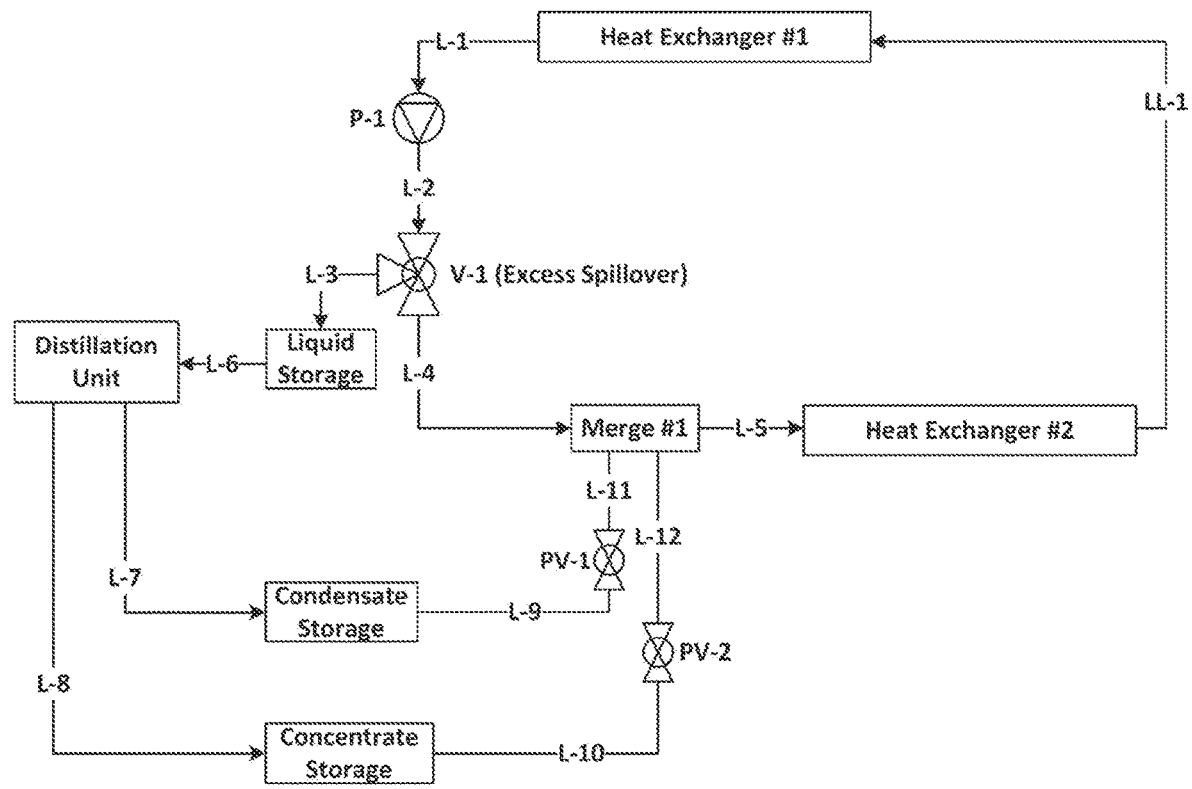
FIG. 29: Heat Transfer and/or Refrigeration Cycle Embodiment with Excess Liquid or Spillover and Distillation Based Regeneration of Phase Transition Temperature Adjustment Reagents or Compositions

Example FIG. 29 Key

| ID | Description |
|---|---|
| L-1 | Single liquid phase combined solution post heat exchanger |
| L-2 | Single liquid phase combined solution post circulation pump |
| L-3 | Excess Liquid or Spillover Liquid, which may comprise a single liquid phase combined solution. Phase transition temperature may be adjusted by, for example, adjusting concentration, which may be conducted, by, for example, adding concentrate or permeate to the UCST or LCST or both heat transfer liquid or liquid system. If reagents are added, eventually, the volume of liquid in the system may begin to reach or exceed the volumetric capacity of the heat transfer system. If desired, liquid may be removed from the heat transfer system to, for example, including, but not limited to, one or more or a combination of the following: facilitate phase transition temperature adjustment, reduce the volume of liquid in the system to reduce the amount of liquid added required to adjust phase transition temperature, or to remove excess liquid beyond the capacity of the heat transfer system. Said liquid which may be removed from the heat transfer system may be defined as spillover liquid or excess liquid or excess spillover, even if said liquid does not exceed the volumetric capacity of the system or may not be 'excess' or 'spillover'. |
| L-4 | Single liquid phase combined solution post excess spillover removal (if any excess spillover is removed). |
| L-5 | Single liquid phase combined solution or multi-liquid phase mixture post 'Merge #1' and transferred to Heat Exchanger #2. Depending on if the composition and/or temperature is adjusted in 'Merge #1', L-5 may comprise a single liquid phase or a multi-liquid phase mixture. It is important to note, depending on the application, the system may undergo many cycles before the system requires phase transition temperature adjustment. |
| L-6 | Single liquid phase combined solution or multi-liquid phase mixture post liquid storage and transferred to Distillation Unit. |
| L-7 | Distillation condensate transferred to Condensate Storage. May comprise a single liquid stream or multiple liquid streams or multiple streams or a mixture depending on, for example, including, but not limited to, one or more or a combination of the following: the composition, temperature of operation, type of distillation employed, desired compositions, or a combination thereof. |

| ID | Description |
| --- | --- |
| L-8 | Distillation concentrate transferred to Concentrate Storage. May comprise a single liquid stream or multiple liquid streams or multiple streams or a mixture depending on, for example, including, but not limited to, one or more or a combination of the following: the composition, temperature of operation, type of distillation employed, desired compositions, or a combination thereof. |
| L-9 | Condensate transferred from condensate storage to PV-1. |
| L-10 | Concentrate transferred from condensate storage to PV-2. |
| L-11 | Condensate transferred from PV-1 to Merge #1. |
| L-12 | Concentrate transferred from PV-1 to Merge #1. |
| LL-1 | Two or more liquid phase multi-liquid phase mixture. LL-1 may form as a multi-liquid phase mixture due to, for example, temperature change over the course of Heat Exchanger #2 resulting in a phase transition which may occur due to the temperature of the liquid(s) passing through a phase transition temperature. |
| P-1 | Liquid circulation pump. May be employed to circulate liquids or fluids within the system. Similar to or as with other devices or other equipment in the present embodiment and other embodiments, other pumps and/or other equipment may be employed or required in the process, which may or may not be shown in the figure. |
| V-1 | Device to control or monitor or pump or release or a combination thereof liquid in the system. V-1 may be employed to control liquid volume or other aspects of liquid flow in the system. V-1 may simply comprise a valve and/or pump which allows liquid to leave the system when there is excess volume, or pumps or releases liquid when advantageous or monitors liquid level or monitors liquid flow rate or a combination thereof |
| Heat Exchanger #1 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Heat Exchanger #2 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Liquid Storage | Storage for liquid exiting the heat transfer system. 'Liquid Storage', as well as other storage regions/tanks, may be employed to, for example, including, but not limited to, one or more or a combination of the following: enable rapid adjustments in concentration without the regeneration step being a limiting step, enable more efficient regeneration, enable lower CAPEX and/or OPEX regeneration devices or regeneration, or enable regeneration to occur over a longer timescale than, for example, a practically instantaneous phase transition temperature adjustment. |
| Distillation Unit | Separation device for regenerating concentrate and/or condensate or an equivalent thereof for use in, for example, phase transition temperature adjustment. For example, the Distillation Unit may comprise one or more devices which employ one or more principles of distillation for separation and/or other separation devices. |
| PV-1 | Storage for condensate, which may comprise condensate, regenerated condensate, condensate equivalent, or a combination thereof. |
| PV-2 | Storage for concentrate, which may comprise concentrate, regenerated concentrate, concentrate equivalent, or a combination thereof. |
| Permeate or Condensate Storage | Storage for Condensate and/or Permeate. |
| Concentrate Storage | Storage for Concentrate. |
| Merge #1 | Device for adding reagents or mixing or both. Merge #1 may be combined with V-1 to create, for example, a combined liquid level and composition or phase transition temperature adjustment device. |

Example FIG. 29 Description: FIG. 29 may show an embodiment for heat transfer or refrigeration cycle or a combination thereof employing liquid-liquid phase transitioning liquids. When phase transition temperature requires adjustment, FIG. 29 may show an example embodiment wherein the phase transition temperature may be adjusted by adjusting the concentration of one or more reagents. Concentration adjustments or regeneration of compositions involved with concentration adjustment or both may occur within the core heat transfer liquid loop or core refrigeration cycle loop or with liquids or reagents outside or removed from the core heat transfer liquid loop or both. FIG. 29 may involve a phase transition temperature adjustment system which may advantageously enable rapid phase transition temperature adjustment without or while minimally being inhibited by the rate of concentration adjustment using a separation method and/or without or while minimally interfering with the core heat transfer loop of the heat transfer system. Phase transition temperature may be adjusted in the present embodiment by, for example, adjusting the concentration of one or more reagents in the liquid system by adding regenerable permeate or concentrate liquid or other potentially regenerable reagents or reagent compositions to the refrigeration cycle liquids in the refrigeration cycle and/or heat transfer liquids in the heat transfer loop. Permeate or condensate may, for example, comprise compositions which contain a lower concentration of one or more reagents relative to a concentrate. Concentrate may, for example, comprise compositions which contain a greater concentration of one or more reagents relative to a permeate. When a liquid composition or other reagents are added, the total volume of the liquid in the heat transfer loop may increase or temporarily increase. If the volume increase exceeds the total volumetric capacity of the heat transfer loop, liquid may be displaced from the heat transfer loop, which may be referred to as spillover or excess liquid. Liquid may also intentionally be removed from the heat transfer loop even if the heat transfer system is operating at liquid volumes below total volumetric capacity—said liquid may also be referred to spillover or excess liquid. In the present embodiment, spillover or excess liquid may be, at least in part, regenerated into concentrate and/or condensate to be employed in, for example, adjusting phase transition temperature. An example means of regenerating concentrate and/or condensate may comprise concentrating one or more reagents using a distillation based separation method (for example, which may include, but are not limited to, one or more or a combination of the following: distillation, vapor compression distillation, vacuum distillation, membrane distillation, pervaporation, evaporation, sweeping gas evaporation, multi-stage flash distillation, azeotropic distillation, extractive distillation), which may result in one or more concentrates, while forming one or more condensates lean in said one or more reagents. Said 'concentrate' may be employed as the 'concentrate' solution and said 'condensate' may be employed as said 'condensate' solution. Condensate and/or concentrate may be stored and added when concentration adjustment is desired.

FIG. 29 may involve excess spillover comprising a single liquid phase combined solution. Regenerating permeate or concentrate from a single liquid phase combined solution may result in a condensate or concentrate or both comprising a multi-liquid phase mixture. If desired, the single liquid phase combined solution may undergo phase transition and liquid-liquid separation before condensate and/or concentrate regeneration. If, for example, a multi-liquid phase mixture forms in the condensate and/or concentrate during or after a regeneration step, the multi-liquid phase mixture may be separated into its constituent liquid phases if desired, for example, before, during or after storage or addition to 'Merge #1'.

Embodiments may employ systems for monitoring concentration of one or more reagents, or the total liquid mass or volume or level, or the viscosity, or the phase transition temperature, or a combination thereof to determine the appropriate amounts of reagent compositions to add to the heat transfer loop or heat transfer system to result in the desired phase transition temperature adjustment and/or phase transition properties. Said systems may also take into account liquid or reagents exiting the system during these calculations.

Figure 30:
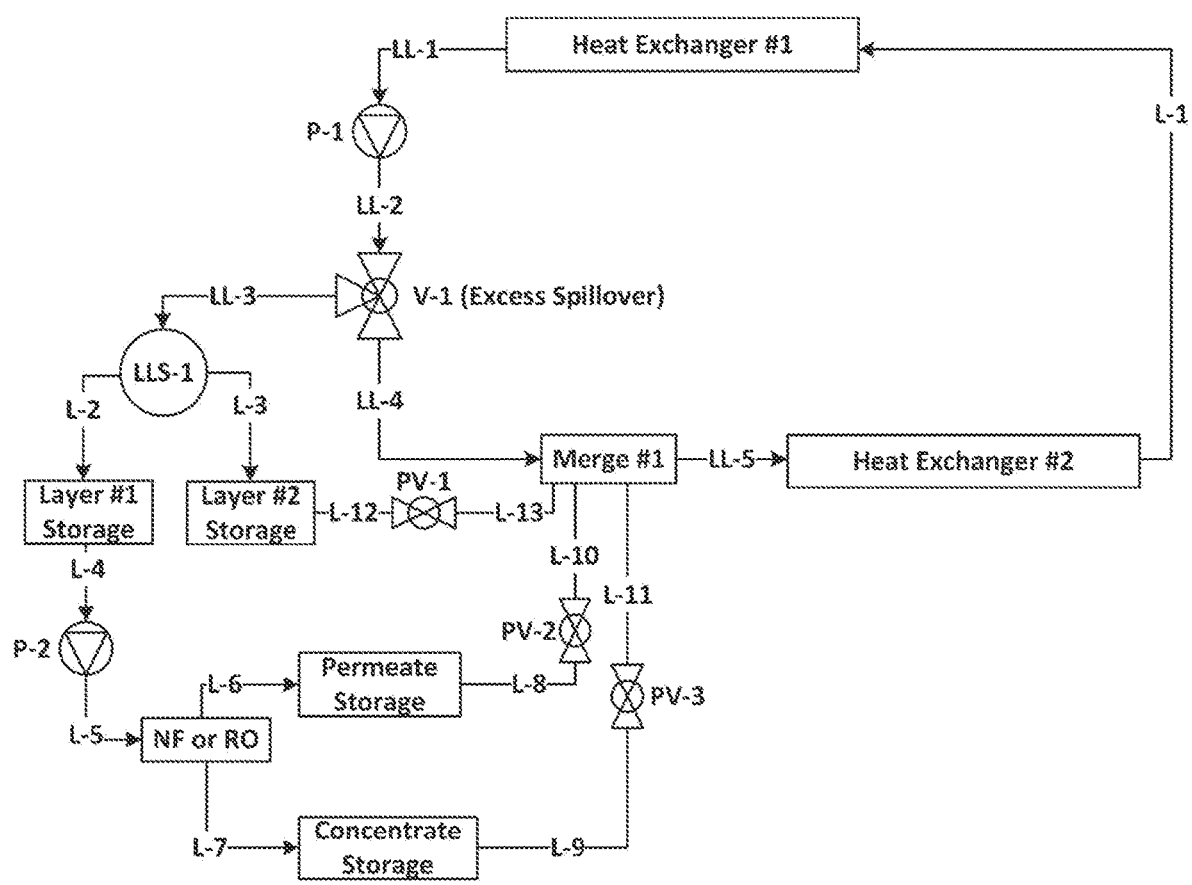
FIG. 30: Heat Transfer and/or Refrigeration Cycle Embodiment with Liquid-Liquid Separation of, for example, Excess Liquid or Spillover and Membrane Based Regeneration of Phase Transition Temperature Adjustment Reagents or Compositions

Example FIG. 30 Key

| ID | Description |
|---|---|
| L-1 | Single liquid phase combined solution post heat exchanger. |
| L-2 | Liquid phase separated from LL-3 using one or more liquid-liquid separation devices (LL-1). Liquid phase or 'layer' may be separated using liquid separation methods known in the art. L-2 may be transferred to 'Layer #1 Storage'. L-2 may be a partially separated, or nearly completely separated, or practically completely separated liquid phase or 'layer.' |
| L-3 | Liquid phase separated from LL-3 using one or more liquid-liquid separation devices (LL-1). Liquid phase or 'layer' may be separated using liquid separation methods known in the art. L-3 may be transferred to 'Layer #2 Storage'. L-3 may be a partially separated, or nearly completely separated, or practically completely separated liquid phase or 'layer.' |
| L-4 | Liquid Phase #1 or Layer #1 liquid transferred from Layer #1 Storage to High Pressure Pump (P-2). |
| L-5 | Liquid Phase #1 or Layer #1 liquid pressurized by High Pressure Pump (P-2) and transferred as, for example, a feed solution to 'INF or RO'. |
| L-6 | Permeate produced by 'INF or RO' transferred to Permeate Storage. |
| L-7 | Concentrate produced by 'INF or RO' transferred to Concentrate Storage. |
| L-8 | Permeate transferred from Permeate Storage to Pump and/or Valve (PV-2). |
| L-9 | Concentrate transferred from Concentrate Storage to Pump and/or Valve (PV-3). |
| L-10 | Permeate transferred from Pump and/or Valve to heat transfer system. |
| L-11 | Concentrate transferred from Pump and/or Valve to heat transfer system. |
| L-12 | Liquid Phase #2 or Layer #2 transferred from Layer #2 Storage to PV-1 |
| L-13 | Liquid Phase #2 or Layer #2 transferred from Pump and/or Valve to heat transfer system. |
| LL-1 | Multi-liquid phase mixture post heat exchanger |
| LL-2 | Multi-liquid phase mixture post circulation pump |
| LL-3 | Excess Liquid or Spillover Liquid, which may comprise a multi-liquid phase mixture. Phase transition temperature may be adjusted by, for example, adjusting concentration, which may be conducted, by, for example, adding concentrate or permeate to the UCST or LCST or both heat transfer liquid or liquid system. If reagents are added, eventually, the volume of liquid in the system may begin to reach or exceed the volumetric |

-continued

| ID | Description |
|---|---|
| | capacity of the heat transfer system. If desired, liquid may be removed from the heat transfer system to, for example, including, but not limited to, one or more or a combination of the following: facilitate phase transition temperature adjustment, reduce the volume of liquid in the system to reduce the amount of liquid added required to adjust phase transition temperature, or to remove excess liquid beyond the capacity of the heat transfer system. Said liquid which may be removed from the heat transfer system may be defined as spillover liquid or excess liquid or excess spillover, even if said liquid does not exceed the volumetric capacity of the system or may not be 'exces' or 'spillover'. |
| LL-4 | Multi-liquid phase mixture post excess spillover removal (if any excess spillover is removed). |
| LL-5 | Multi-Liquid phase mixture or single liquid phase combined solution following 'Merge #1' |
| P-1 | Liquid circulation pump. May be employed to circulate liquids or fluids within the system. Similar to or as with other devices or other equipment in the present embodiment and other embodiments, other pumps and/or other equipment may be employed or required in the process, which may or may not be shown in the figure. |
| P-2 | High Pressure Liquid Pump to, for example, Pressurize a Feed Stream for a size based separation process or a pressure driven separation process or a membrane based separation process. The high pressure pump may be interconnected with one or more pressure recovery devices, which, for example, may be employed before, during, or after a membrane separation unit. Similar to other equipment or methods, pressure recovery devices are not shown in the figure, although may be employed. |
| V-1 | Device to control or monitor or pump or release or a combination thereof liquid in the system. V-1 may be employed to control liquid volume or other aspects of liquid flow in the system. V-1 may simply comprise a valve and/or pump which allows liquid to leave the system when there is excess volume, or pumps or releases liquid when advantageous or monitors liquid level or monitors liquid flow rate or a combination thereof. |
| Heat Exchanger #1 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Heat Exchanger #2 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| LLS-1 | Liquid-Liquid Separation device. May be employed to partially or nearly completely separate a multi-liquid phase mixture into its constituent liquid phases. LLS-1 may separate multi-liquid phase mixture, LL-3, into its constituent liquid phases, which may comprise, for example, 'Layer #1' and 'Layer #2'. One or more or a combination of liquid-liquid separation devices may be employed. |
| Layer #1 Storage | Storage for Liquid Phase #1. |
| Layer #2 Storage | Storage for Liquid Phase #2. |
| NF or RO | Nanofiltration or Reverse Osmosis or Other Separation Process or a Combination Thereof for Reagent(s) or Composition Regeneration. Liquids or reagents may be regenerated into concentrate or permeate or other compositions which may, for example, advantageously be added to the heat transfer system to adjust phase transition temperature when phase transition temperature is desired. |
| PV-1 | Pump and/or Valve which may be employed to control or regulate the transfer of liquid phase #2 or layer #2 into the heat transfer system or into regeneration step. |
| PV-2 | Pump and/or Valve which may be employed to control or regulate the transfer of permeate into the heat transfer system. Permeate may be transferred into the heat transfer system during, for example, a phase transition temperature adjustment. |
| PV-3 | Pump and/or Valve which may be employed to control or regulate the transfer of concentrate into the heat transfer system. Concentrate may be transferred into the heat transfer system during, for example, a phase transition temperature adjustment. |
| Permeate Storage | Storage for Permeate. |
| Concentrate Storage | Storage for Concentrate. |

-continued

| ID | Description |
|---|---|
| Merge #1 | Device for adding reagents or mixing or both. Merge #1 may be combined with V-1 to create, for example, a combined liquid level and composition or phase transition temperature adjustment device. |

Example FIG. 30 Description: FIG. 30 may show an embodiment for heat transfer or refrigeration cycle or a combination thereof employing liquid-liquid phase transitioning liquids. When phase transition temperature requires adjustment, FIG. 30 may show an example embodiment wherein the phase transition temperature may be adjusted by adjusting the concentration of one or more reagents. Concentration adjustments or regeneration of compositions involved with concentration adjustment or both may occur within the core heat transfer liquid loop or refrigeration cycle, or with liquids or reagents outside or removed from the core heat transfer liquid loop or refrigeration cycle, or both. FIG. 30 may involve a phase transition temperature adjustment system which may advantageously enable phase transition temperature adjustment without or while minimally being inhibited by the rate of concentration adjustment using a separation method and/or without or while minimally interfering with the core heat transfer loop of the heat transfer system or temperature zones or a refrigeration cycle. Phase transition temperature may be adjusted in the present embodiment by, for example, adjusting the concentration of one or more reagents in the liquid system by adding regenerable permeate or concentrate liquid or other potentially regenerable reagents or reagent compositions to the liquid compositions in the heat transfer loop or refrigeration cycle. When a liquid composition or other reagents are added, the total volume of the liquid in the heat transfer loop may increase or temporarily increase. If the volume increase exceeds the total volumetric capacity of the heat transfer loop, liquid may be displaced from the heat transfer loop, which may be referred to as spillover or excess liquid. Liquid may also intentionally be removed from the heat transfer loop even if the heat transfer system is operating at liquid volumes below total volumetric capacity—said liquid may also be referred to spillover or excess liquid. In the present embodiment, spillover or excess liquid may be, at least in part, regenerated into concentrate and/or permeate to be employed in, for example, adjusting phase transition temperature. An example means of regenerating concentrate and/or permeate may comprise concentrating one or more reagents using a size based separation method, such as nanofiltration, organic solvent nanofiltration, or reverse osmosis, in a retentate, while forming a permeate liquid lean in said one or more reagents. Said 'retentate' may be employed as the 'concentrate' solution and said 'permeate liquid' may be employed as said 'permeate' solution. Permeate and/or concentrate may be stored and added when concentration adjustment is desired.

FIG. 30 may involve excess spillover comprising a multi-liquid phase mixture. In the present embodiment, FIG. 30 may separate the multi-liquid phase mixture into two constituent liquid phases using a liquid-liquid separation method. In FIG. 30, one of the two separated liquid phases may undergo regeneration into a concentrate and/or permeate solution using a separation method. Said regeneration method may involve concentrating one or more reagents present in said one of the two separated liquid phases, which may form a concentrate, while the remaining liquid, which may be lean in said one or more reagents, may be considered the permeate. In FIG. 30, the other of the two separated liquid phases may be transferred to a separate storage container, where it may be returned to heat transfer loop or heat transfer working fluid, for example, when desired, when advantageous, or as a reagent composition employed in phase transition property and/or phase transition temperature adjustment. Said other of the two separated liquid phases may also or instead be employed in a separation or treatment method. It may be important to note that, if desired, both or either separated liquid phases may undergo some form of regeneration or form some form of permeate and/or concentrate.

Embodiments may employ systems for monitoring concentration of one or more reagents, or the total liquid mass or volume or level, or the viscosity, or the phase transition temperature, or a combination thereof to determine the appropriate amounts of reagent compositions to add to the heat transfer loop or heat transfer system to result in the desired phase transition temperature adjustment and/or phase transition properties. These systems may also take into account liquid or reagents exiting the system during these calculations.

Figure 31:
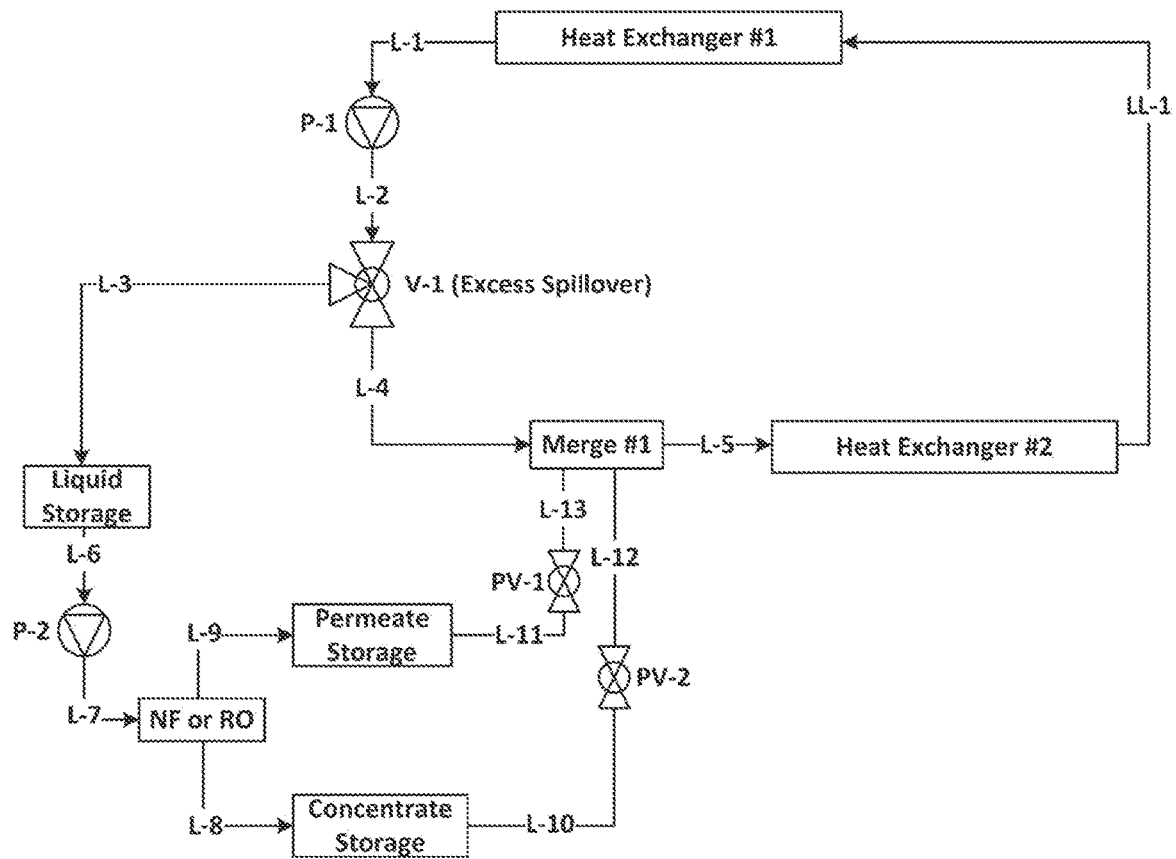
FIG. 31: Heat Transfer and/or Refrigeration Cycle Embodiment with Excess Liquid or Spillover and Membrane Based Regeneration of Phase Transition Temperature Adjustment Reagents or Compositions

Example FIG. 31 Key

| ID | Description |
|---|---|
| L-1 | Single liquid phase combined solution post heat exchanger |
| L-2 | Single liquid phase combined solution post circulation pump |
| L-3 | Excess Liquid or Spillover Liquid, which may comprise a single liquid phase combined solution. Phase transition temperature may be adjusted by, for example, adjusting concentration, which may be conducted, by, for example, adding concentrate or permeate to the UCST or LCST or both heat transfer liquid or liquid system. If reagents are added, eventually, the volume of liquid in the system may begin to reach or exceed the volumetric capacity of the heat transfer system. If desired, liquid may be removed from the heat transfer system to, for example, including, but not limited to, one or more or a combination of the following: facilitate phase transition temperature adjustment, reduce the volume of liquid in the system to reduce the amount of liquid added required to adjust phase transition temperature, or to remove excess liquid beyond the capacity of the heat transfer system. Said liquid which may be removed from the heat transfer system may be defined as |

-continued

| ID | Description |
|---|---|
| | spillover liquid or excess liquid or excess spillover, even if said liquid does not exceed the volumetric capacity of the system or may not be 'excess' or 'spillover'. |
| L-4 | Single liquid phase combined solution post excess spillover removal (if any excess spillover is removed). |
| L-5 | Single liquid phase combined solution or multi-liquid phase mixture post 'Merge #1' and transferred to Heat Exchanger #2. Depending on if the composition and/or temperature is adjusted in 'Merge #1', L-5 may comprise a single liquid phase or a multi-liquid phase mixture. It is important to note, depending on the application, the system may undergo many cycles before the system required phase transition temperature adjustment. |
| L-6 | Single liquid phase combined solution or multi-liquid phase mixture post liquid storage and transferred to high pressure pump (P-2). |
| L-7 | Single liquid phase combined solution or multi-liquid phase mixture post high pressure pump (P-2) transferred to separation process, such as a membrane based process (for example: NF or RO). |
| L-8 | Concentrate solution produced by separation process, for example: NF or RO. L-8 may be transferred to, for example, a concentrate storage tank. |
| L-9 | Permeate solution produced by separation process, for example: NF or RO. L-9 may be transferred to, for example, a permeate storage tank. |
| L-10 | Concentrate solution transferred from a concentrate storage vessel or storage tank. Transferred to a pump or valve or a combination thereof (PV-2). |
| L-11 | Permeate solution transferred from a permeate storage vessel or storage tank. Transferred to a pump or valve or a combination thereof (PV-1). |
| L-12 | Concentrate transferred from a pump or valve or a combination thereof (PV-2) and transferred to Merge #1. |
| L-13 | Permeate transferred from a pump or valve or a combination thereof (PV-1) and transferred to Merge #1. |
| LL-1 | Two or more liquid phase multi-liquid phase mixture. LL-1 may form as a multi-liquid phase mixture due to, for example, temperature change over the course of Heat Exchanger #2 resulting in a phase transition which may occur due to the temperature of the liquid(s) passing through a phase transition temperature. |
| P-1 | Liquid circulation pump. May be employed to circulate liquids or fluids within the system. Similar to or as with other devices or other equipment in the present embodiment and other embodiments, other pumps and/or other equipment may be employed or required in the process, which may or may not be shown in the figure. |
| P-2 | High Pressure Liquid Pump to, for example, Pressurize a Feed Stream for a size based separation process or a pressure driven separation process or a membrane based separation process. The high pressure pump may be interconnected with one or more pressure recovery devices, which, for example, may be employed before, during, or after a membrane separation unit. Similar to other equipment or methods, pressure recovery devices are not shown in the figure, although may be employed. |
| V-1 | Device to control or monitor or pump or release or a combination thereof liquid in the system. V-1 may be employed to control liquid volume or other aspects of liquid flow in the system. V-1 may simply comprise a valve and/or pump which allows liquid to leave the system when there is excess volume, or pumps or releases liquid when advantageous or monitors liquid level or monitors liquid flow rate or a combination thereof |
| Heat Exchanger #1 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Heat Exchanger #2 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Liquid Storage | Storage for liquid exiting the heat transfer system. 'Liquid Storage', as well as other storage regions/tanks, may be employed to, for example, including, but not limited to, one or more or a combination of the following: enable rapid adjustments in concentration without the regeneration step being a limiting step, enable more efficient regeneration, enable lower CAPEX and/or OPEX regeneration devices or regeneration, or enable regeneration to occur over a longer timescale than, for example, a practically instantaneous phase transition temperature adjustment. |
| NF or RO | Nanofiltration or Reverse Osmosis or Other Separation Process or a Combination Thereof for Reagent(s) or Composition Regeneration. Liquids or reagents may be regenerated into concentrate or permeate or other compositions which may, for example, advantageously be added to the heat |

-continued

| ID | Description |
|---|---|
| | transfer system to adjust phase transition temperature when phase transition temperature is desired. |
| PV-1 | Pump and/or Valve to control the permeate addition (if employed) during concentration or liquid-liquid phase transition temperature range adjustment. |
| PV-2 | Pump and/or Valve to control the concentrate addition (if employed) during concentration or liquid-liquid phase transition temperature range adjustment. |
| Permeate Storage | Storage for permeate, which may comprise permeate, regenerated permeate, permeate equivalent, or a combination thereof. |
| Concentrate Storage | Storage for concentrate, which may comprise concentrate, regenerated concentrate, concentrate equivalent, or a combination thereof. |
| Merge #1 | Device for adding reagents or mixing or both. Merge #1 may be combined with V-1 to create, for example, a combined liquid level or composition or phase transition temperature adjustment or a combination thereof device. |

Example FIG. 31 Description: FIG. 31 may show an embodiment for heat transfer or refrigeration cycle or a combination thereof employing liquid-liquid phase transitioning liquids. When phase transition temperature requires adjustment, FIG. 31 may show an example embodiment wherein the phase transition temperature may be adjusted by adjusting the concentration of one or more reagents. Concentration adjustments or regeneration of compositions involved with concentration adjustment or both may occur within the core heat transfer liquid loop or with liquids or reagents outside or removed from the core heat transfer liquid loop or both. FIG. 31 may involve a phase transition temperature adjustment system which may advantageously enable rapid phase transition temperature adjustment without or while minimally being inhibited by the rate of regeneration by a membrane based process or distillation process or pressure adjustment process or gas pressure adjustment process or another concentration adjustment method or a combination thereof. Phase transition temperature may be adjusted in the present embodiment by, for example, adjusting the concentration of one or more reagents in the liquid system by adding regenerable permeate or concentrate liquid or other potentially regenerable reagents or reagent compositions to the working fluids or heat transfer liquids in the heat transfer loop or refrigeration cycle liquids. Permeate or condensate may, for example, comprise compositions which contain a lower concentration of one or more reagents relative to the heat transfer liquids in the heat transfer loop. Concentrate may, for example, comprise compositions which contain a greater concentration of one or more reagents relative to the heat transfer liquid sin the heat transfer loop. When a liquid composition or other reagents are added, the total volume of the liquid in the heat transfer loop may increase or temporarily increase. If the volume increase exceeds the total volumetric capacity of the heat transfer loop, liquid may be displaced from the heat transfer loop or refrigeration cycle, which may be referred to as spillover or excess liquid. Liquid may also intentionally be removed from the heat transfer loop or refrigeration cycle even if the system is operating at liquid volumes below total volumetric capacity—said liquid may also be referred to spillover or excess liquid. In the present embodiment, spillover or excess liquid may be, at least in part, regenerated into concentrate and/or permeate to be employed in, for example, adjusting phase transition temperature. An example means of regenerating concentrate and/or permeate may comprise concentrating one or more reagents using a size based separation method, such as nanofiltration, organic solvent nanofiltration, or reverse osmosis, in a retentate, while forming a permeate liquid lean in said one or more reagents. Said 'retentate' may be employed as the 'concentrate' solution and said 'permeate liquid' may be employed as said 'permeate' solution. Permeate and/or concentrate may be stored and added when concentration adjustment is desired.

FIG. 31 may involve excess spillover comprising a single liquid phase combined solution. Regenerating permeate or concentrate from a single liquid phase combined solution may result in a permeate or concentrate or both comprising a multi-liquid phase mixture. If desired, the single liquid phase combined solution may undergo phase transition and liquid-liquid separation before permeate and/or concentrate regeneration. If, for example, a multi-liquid phase mixture forms in the permeate and/or concentrate during or after a regeneration step, the multi-liquid phase mixture may be separated into its constituent liquid phases if desired, for example, before, during or after storage or addition to 'Merge #1'.

Embodiments may employ systems for monitoring concentration of one or more reagents, or the total liquid mass or volume or level, or the viscosity, or the phase transition temperature, or a combination thereof to determine the appropriate amounts of reagent compositions to add to the heat transfer loop or heat transfer system to result in the desired phase transition temperature adjustment and/or phase transition properties. Said systems may also take into account liquid or reagents exiting the system during these calculations.

Example FIG. 32 Key

| ID | Description |
|---|---|
| L-1 | Single liquid phase combined solution post heat exchanger |
| L-2 | Single liquid phase combined solution post circulation pump |
| L-3 or LL-3 | Single liquid phase combined solution or two or more liquid phase multi-liquid phase mixture following gas infusion apparatus. If the system is left at a constant pressure, wherein, for example, no additional gas is removed or added or dissolved and/or the concentration or partial |

Figure 32A:
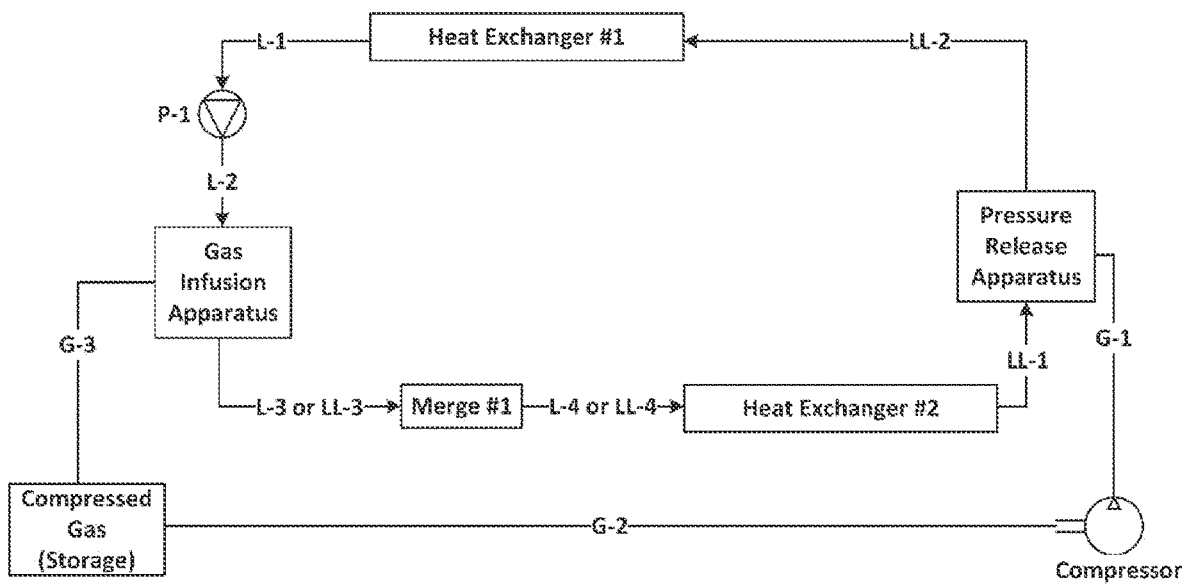
FIG. 32A: Heat Transfer and/or Refrigeration Cycle Embodiment with Pressure Based Phase Transition Temperature Adjustment. 32A shows constant pressure operation.
Figure 32B:
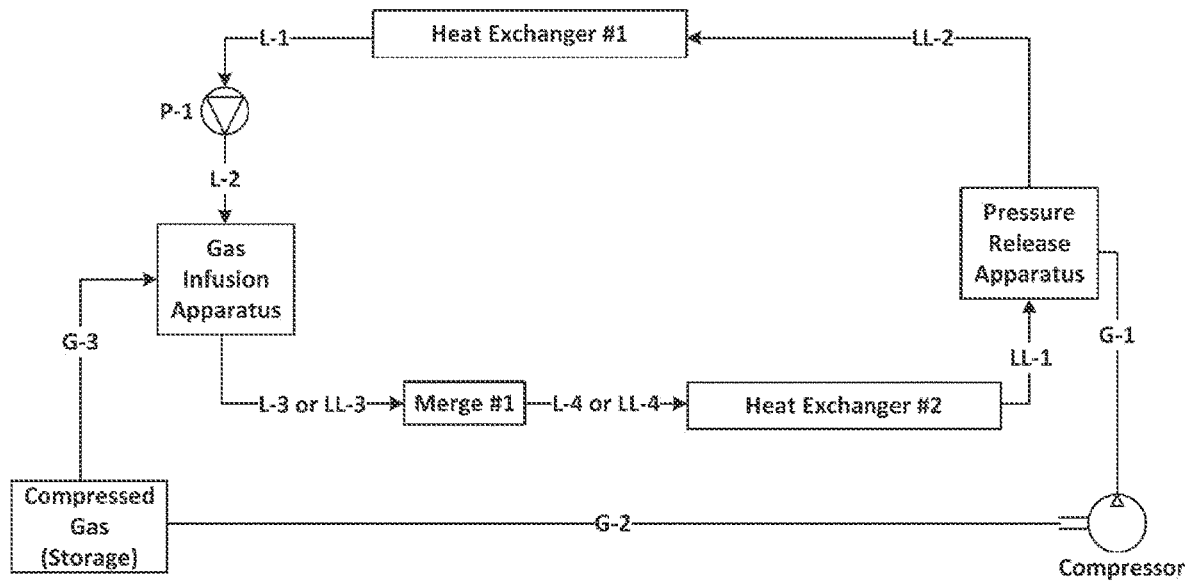
FIG. 32B: Heat Transfer and/or Refrigeration Cycle Embodiment with Pressure Based Phase Transition Temperature Adjustment. 32B shows system pressurizing.
Figure 32C:
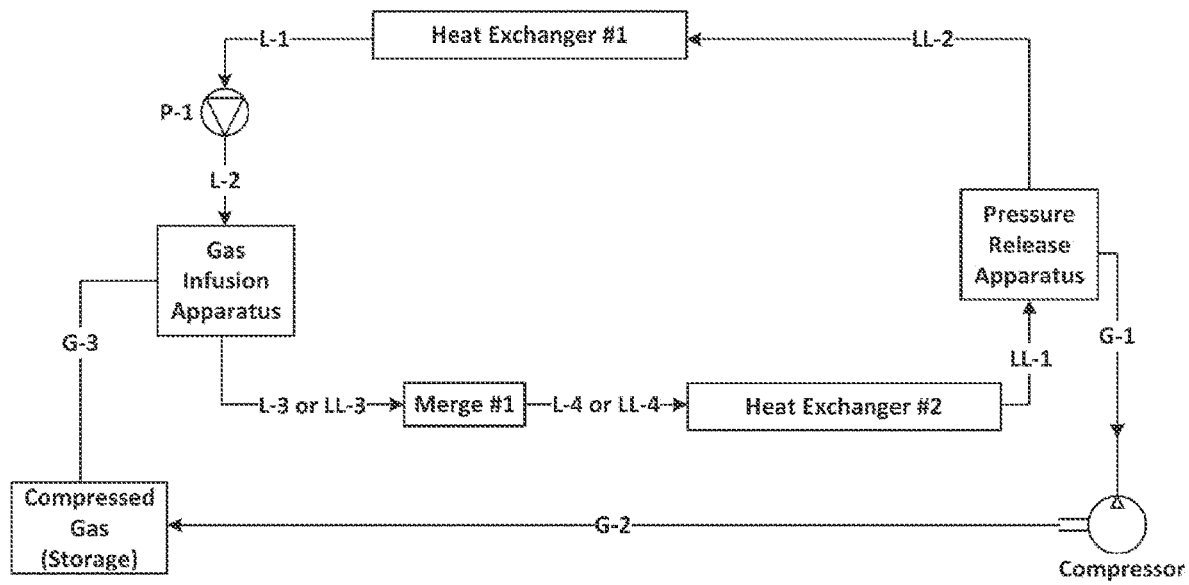
FIG. 32C: Heat Transfer and/or Refrigeration Cycle Embodiment with Pressure Based Phase Transition Temperature Adjustment. 32C shows system depressurizing.

| ID | Description |
|---|---|
| | pressure of dissolved gas remains constant (as may be shown in, for example, FIG. 32A), the phase transition temperature of the solution may remain constant. A multi-liquid phase mixture may form, for example, if the concentration of dissolved gas or the partial pressure of dissolved gas changes in the Gas Infusion Apparatus or the Pressure Release Apparatus (the Gas Infusion Apparatus or the Pressure Release Apparatus may be combined into a single device or compound device if desired) and if said concentration or partial pressure changes are sufficient to change the phase transition temperature of the solution such that a multi-liquid phase mixture forms. Alternatively or additionally, if a temperature change occurs which may be sufficient to pass through one or more phase transition temperatures of the solution, a multi-liquid phase mixture may form. |
| L-4 or LL-4 | Single liquid phase combined solution or two or more liquid phase multi-liquid phase mixture following 'Merge #1'. |
| LL-1 | Two or more liquid phase multi-liquid phase mixture. LL-1 may form as a multi-liquid phase mixture due to, for example, temperature change over the course of Heat Exchanger #2 resulting in a phase transition which may occur due to the temperature of the liquid(s) passing through a phase transition temperature. |
| LL-2 | Two or more liquid phase multi-liquid phase mixture following pressure release apparatus. If the embodiment undergoes pressure release or the concentration or partial pressure of one or more gases or dissolved gases is reduced (as may be shown in FIG. 32C), the temperature of phase transition may change. Depending on the temperature of the liquids and the adjusted phase transition temperature, LL-2 may be a multi-liquid phase mixture or a single liquid phase combined solution. If the solution is under constant partial pressure or the concentration of dissolved gas is constant (as may be shown, in, for example, FIG. 32A), LL-2 may remain a multi-liquid phase mixture and the Pressure Release Apparatus may be bypassed. |
| Gas Infusion Apparatus | Apparatus employed to introduce or add or pressurize or dissolve or infuse one or more gases into the solution, or headspace, or liquid system, or end-to-end system. In the present embodiment, phase transition temperature may be adjusted by adjusting the concentration of one or more dissolved gases or the pressure of the system or both. The Gas Infusion Apparatus may be a device employed to adjust the phase transition temperature when, for example, the phase transition temperature needs to be adjusted, by, for example, adjusting the concentration of said one or more dissolved gases. The Gas Infusion Apparatus may add soluble gases or pressurize soluble gases into the solution, which may result in an adjustment of phase transition temperature. The Gas Infusion Apparatus may be combined with other devices, such as, for example, the Pressure Release Apparatus or 'Merge #1' or Compressor or both. If combined with the Pressure Release Apparatus, a single device or combined device may be employed to regulate or adjust or increase or decrease the phase transition temperature for the liquid system. |
| Pressure Release Apparatus | Apparatus employed to remove, reduce pressure of, reduce partial pressure of, release pressure of, or separate one or more gases from the solution, or headspace, or liquid system, or end-to-end system. The present device may be combined with one or more other devices. For example, the Pressure Release Apparatus device may be combined with the Gas Infusion Apparatus. The combined apparatus may be referred to, for example, a Pressure Adjustment Apparatus or Device. |
| G-1 | Gas Removed or Released from the Heat Transfer System using the Pressure Release Apparatus. In FIGS. 32A and 32B, gas is not being removed or released. In FIG. 32C, gas is being removed or released. |
| G-2 | Compressed Gas Removed or Released from the Heat Transfer System following the Compressor and being Transferred o the Compressed Gas Storage. |
| G-3 | Compressed Gas from the Compressed Gas Storage being added to the Heat Transfer System using the Gas Infusion Apparatus. |
| Compressor | Compresses Gases, such as Gases Removed from the System. Compressed gases may be transferred to a compressed gas storage tank to, for example, enable the gas to be used or added in the future for, for example, future phase transition temperature adjustment. |
| Compressed Gas Storage | Storage unit, such as a tank or adsorbent material or both, which may be employed to storage compressed gases which may be later added to or displaced to or employed in the heat transfer system to, for example, adjust phase transition temperature |
| P-1 | Liquid circulation pump. May be employed to circulate liquids or fluids within the system. Similar to or as with other devices or other equipment in the present embodiment and other embodiments, other pumps and/or other equipment may be employed or required in the process, which may or may not be shown in the figure. |
| Merge #1 | Device or steps for adding or merging or removing reagents or working fluids to or with or from the heat transfer system and/or mixing reagents or working fluids. Merge #1 may also be employed before Heat |

| ID | Description |
|---|---|
| | Exchanger #1, Pressure Release Apparatus, Gas Infusion Apparatus, or other devices or steps. |
| Heat Exchanger #1 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |
| Heat Exchanger #2 | Heat Exchanger to transfer heat to or from the working fluid or fluids of the heat transfer system. Depending on if the phase transitioning liquid is LCST or UCST or both and if the system is transferring heat to an application requiring heat or if the system is transferring cold to an application requiring cold, the present heat exchanger may be transferring heat to or from the liquid or working fluid. |

Example FIG. 32 Description: FIG. 32 may show an embodiment for heat transfer or refrigeration cycle or a combination thereof employing liquid-liquid phase transitioning liquids. When phase transition temperature requires adjustment, FIG. 32 may show an example embodiment wherein the phase transition temperature may be adjusted by adjusting the pressure of the system. In some embodiments, the pressure adjustment may be conducted by adjusting the pressure of a gas in the head space of the heat transfer system, enabling the total pressure of the heat transfer system to change. In some embodiments, the pressure adjustment may be conducted by employ a hydraulic or mechanical means of pressurization. In some embodiments, the pressure adjustment may be conducted by osmotic means, such as, for example, including, but not limited to, one or more or a combination of the following: forward osmosis or pressure retarded osmosis. In some embodiments, pressure adjustment may be conducted by a combination of the methods described thereof. Advantageously, phase transition temperature adjustment using pressure may enable reduced complexity, as it may reduce or eliminate the requirement to add or remove liquid from the heat transfer system. Pressure adjustment may result in phase transition temperature adjustment by one or more or a combination of the following ways:

Pressure Adjustment to Adjust the Concentration of a Soluble Gas: According to the intrinsic properties of gases (such as, for example, Henry's Law), the solubility of a gas in a liquid is dependent on the gas partial pressure and temperature. The solubility and/or concentration of a gas in a liquid may be adjusted by adjusting the partial pressure of said gas and the temperature of the liquid. By controlling and/or adjusting the pressure and/or temperature of an at least partially soluble gas, the present embodiment may adjust the concentration of a dissolved gas in the liquid system. The inventor has demonstrated the concentration of some common soluble gases, such as carbon dioxide, ammonia, and amines, influences the phase transition temperature in both UCST and LCST liquid systems and that adjusting the concentration of the dissolved gas can increase or decrease a LCST or UCST or both. Pressure or temperature adjustment may be conducted by one or more or a combination of methods known in the art for, for example, including, but not limited to, for example, one or more or a combination of the following: changing the pressure of a gas, or infusing or dissolving a gas, or desorbing or removing a dissolved gas, or maintaining pressure, or heat input, or cooling, or monitoring the methods thereof. It may be desirable for liquid to be added or removed from the heat transfer system. For example, liquid may be removed to, for example, facilitate the dissolution of soluble gases or desorption of soluble gases while minimally impacting the core heat transfer system. For example, liquid pre-enriched or pre-leaned (for example: pre-desorbed) may be added to the heat transfer system to, for example, adjust the concentration of one or more dissolved gases. It may be desirable for dissolved gas or molecules that were originally gas or comprise gas under standard conditions to be introduced to or removed from the heat transfer system using other methods instead or in addition to gas pressurization. For example, a gas may be introduced or added to the heat transfer system by introducing or contacting a gas enriched adsorbent or absorbent media to the liquid solution. For example, a dissolved gas may be removed from the heat transfer system by introducing or contacting a gas lean adsorbent or absorbent media to the liquid solution. For example, a dissolved gas may be removed from the heat transfer system by introducing a relatively 'gas-lean' absorbent or adsorbent media to the heat transfer system liquid system or gas occupied head space (if any).

Pressure Adjustment to Adjust the Solubility Properties (including, but not limited to, phase transition properties) of one or more pressure sensitive molecules. Pressure sensitive molecules may include, but are not limited to, molecules or groups of molecules which have one or more properties (such as, for example, which may include, but are not limited to, one or more or a combination of the following: solubility, polarity, morphology, viscosity, functional groups, color, phase transition temperature, partial pressure, or affinity for other molecules).

Figure 33:
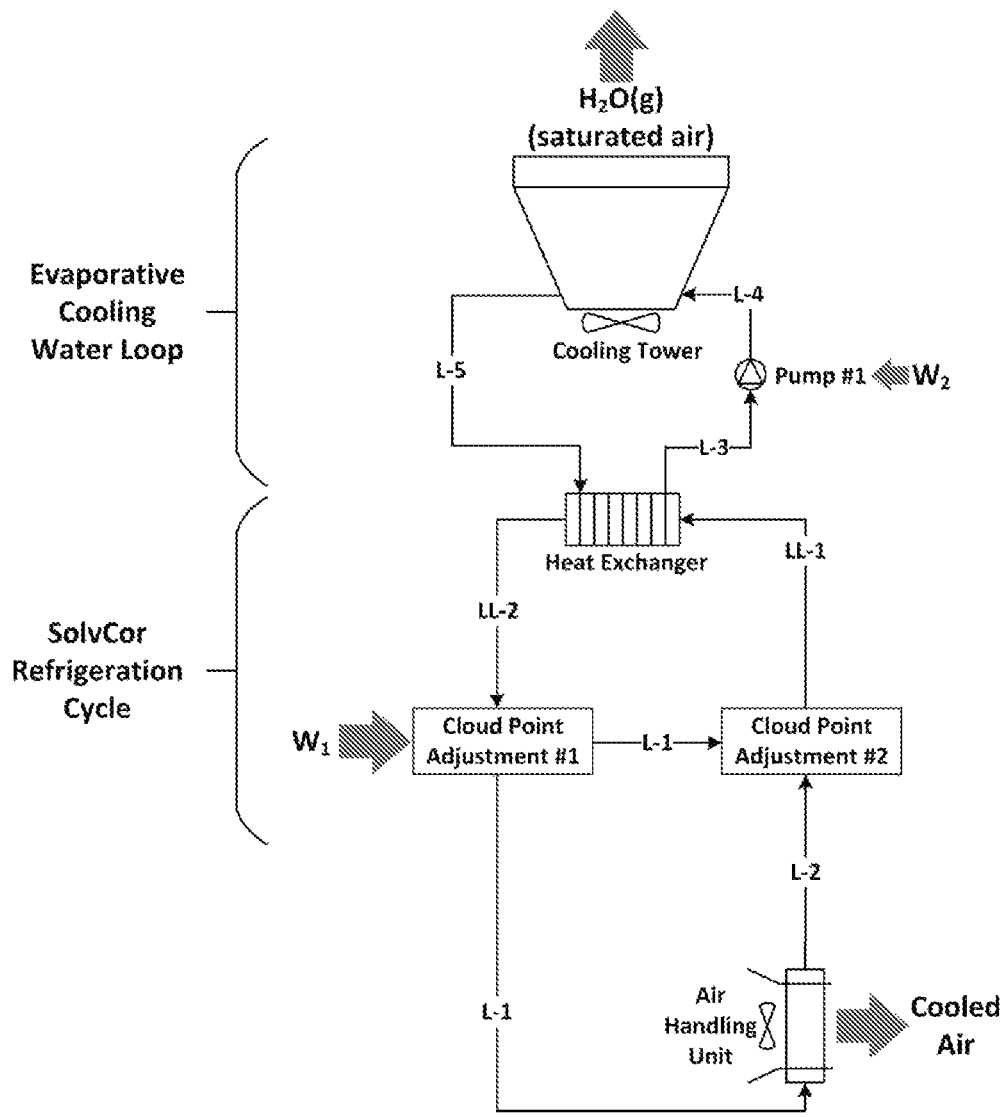
FIG. 33.

FIG. 33 may show an example simplified liquid phase refrigeration cycle chiller or heat pump. Please note an entire heat exchanger may be eliminated relative to a conventional chiller process, potentially further enhancing efficiency through reducing heat exchanger losses. The refrigeration cycle liquid-liquid phase transition working fluid may in and of itself be employed as the heat transfer liquid, which potentially eliminates the need for a heat exchange between the refrigeration cycle and a heat transfer loop.

Example Exemplary Embodiments

A refrigeration cycle comprising: [wherein the phase transition temperature or the solubility of the non-aqueous phase or organic phase is adjusted by adjusting the relative concentration of Large MW reagent to Small MW reagent]

A refrigeration cycle comprising: [wherein the solubility of the non-aqueous phase or organic phase is adjusted by adjusting the relative concentration of Large MW reagent to Small MW reagent]

Large MW reagent may possess greater solubility in water or affinity for water. Large MW reagent may be soluble in water with greater salt concentrations or greater concentrations of phase transition temperature adjustment reagent than, for example, Small MW reagent.

Large MW reagent may possess lesser solubility in water or affinity for water. Large MW reagent may be insoluble in water with lesser salt concentrations or lesser concentrations of phase transition temperature adjustment reagent than, for example, Small MW reagent.

Small MW reagent may possess greater solubility in water or affinity for water. Small MW reagent may be soluble in water with greater salt concentrations or greater concentrations of phase transition temperature adjustment reagent than, for example, Large MW reagent.

Small MW reagent may possess lesser solubility in water or affinity for water. Small MW reagent may be insoluble in water with lesser salt concentrations or lesser concentrations of phase transition temperature adjustment reagent than, for example, Large MW reagent.

Example Applications List

Applications may include, but are not limited to, one or more or a combination of the following: Battery thermal management, Automotive battery cooling, vehicle battery cooling, Grid Energy Storage battery cooling, Aerospace battery cooling, Non Transport Power Aerospace, VTOL, Rail, DieseL-Hybrids, Drones, HVAC, Refrigeration Cycle, Industrial Chillers, Residential Cooling, Building HVAC, storage thermal management, space cooling, Heat Transfer, Replacement for HVAC 'Chilled Water' Loops, Computer Cooling, Server Cooling, PC Cooling, Autonomous Vehicle "AI Brain" Cooling, AI Chip Cooling, Data Center (Complete Offering or Retrofits), Power Generation, District Heating/Cooling, Printing, 3D Printing, Thermal Storage, Internal Combustion Engine, Polymer Production, LNG Train, Cryogenic Cooling, Cooling, $CO_2$ Capture, Gas Separation, Gold mine cooling, mine cooling, subsurface mine cooling Compressor Cooling, Organ Cooling, Biological Separations, Biotech cooling, pharmaceutical cooling, chillers, waste heat transport, ocean thermal energy storage, ocean thermal energy convention, cooling transfer, deicing surfaces, heating or cooling surfaces, extractions, distillation, separations, applications for coolants, applications for heat transfer fluids.

Polar organic solvent which may possess solubility with organic solvent and limited solubility in water (for example, which may include, but are not limited to: propylene carbonate, ethyl acetate, ethylene glycol diacetate, propylene glycol diacetate, dimethyl ether, dimethoxymethane, esters, ethers)

Internal Liquid Phase Heat Pump or Liquid-Liquid Phase Transition Heat Pump in the Gas Separation Applications SUMMARY: The present embodiments may comprise the first internal heat pump gas separation technology. Embodiments may involve pumping or otherwise transferring at the least a portion of the heat released during the absorption of a gas or from low temperature heat sources or from waste heat to, for example, the desorption of a gas or desorber, for example, to supplement or fully power the thermal duty of gas desorption.

Some embodiments may involve change in solubility parameters between different stages of the process, for example, between the absorption of gas or absorption stage and the desorption of gas or desorption stage. Said solubility parameters may include, but not limited to, equilibrium solubility of a gas at a given temperature, equilibrium solubility of a gas at a given pressure, solubility, solubility properties, gas solubility properties, equilibrium swing in the partial pressure, gas solubility, or gas solubility properties.

Advantageously, some embodiments may enable precise control over solubility parameters and solubility of organic phases or aqueous phases and whether there are multiple liquid phases or a single liquid phase in a composition. Said control over solubility parameters may be conducted, for example, by adjusting the relative concentration or total amounts of two or more organic reagents, instead of or in addition to changes in temperature, $CO_2$ loading, and/or absorbent concentration.

Advantageously, the working fluids which may enable the pumping or transferring of heat may also function to change solubility parameters between the gas absorption and gas desorption stages of the process. Internally, said working fluids may simultaneously pump heat from to the desorption stage, while also creating more favorable solubility parameters and characteristics for desorption. For example, said working fluids may including, but not limited to, one or more or a combination of the following: increase the partial pressure of desorbed gas, reduce the temperature requirement of gas desorption, reduce the energetic duty for gas desorption, reduce the vapor pressure of water during gas desorption, reduce the partial pressure of ammonia during gas desorption, or reduce the partial pressure of non-desired desorbed gases during gas desorption.

Some embodiments of the present invention comprise a liquid system which comprises: 1) absorbing heat before or during gas absorption via an endothermic phase transition; 2) adjusting the phase transition temperature of the liquid system by adjusting, for example, compositions, properties, and/or conditions of the liquid system; 3) releasing heat before or during gas desorption via an exothermic phase transition. The process may be reversible and steps 1-3 repeated. The process may effectively pump heat from the absorber to the desorber. Adjustment of phase transition temperature may be conducted by adjusting, including but not limited to, one or more or a combination of the following: compositions, properties, or conditions of the liquid system. Adjustment may be conducted by one or more or a combination of separation methods, for example, including, but not limited to, membrane-based process, distillation, filtration, centrifugation, or coalescer. Adjustment may be conducted by increasing or decreasing the concentration of one or more reagents or introducing or removing the presence of one or more reagents. Said adjustment may be reversed between absorption and desorption stages. For example, in some example embodiments, after absorption, the phase transition temperature of the liquid system may be adjusted using a membrane-based process, which may concentrate some reagents and may form a permeate stream. For example, after desorption and before absorption, said permeate may be added or returned to the liquid system to adjust the liquid system phase transition temperature.

Some embodiments may pump heat through one or more liquid-liquid, liquid-solid, liquid-gas, or solid-gas, or a combination thereof phase transitions. Embodiments may involve adjusting composition or conditions to facilitate endothermic phase transition where, for example, relatively low value heat is available (for example, low value heat may include, but is not limited to: gas absorption, flue gas heat, flue gas latent heat, compressor waste heat, condenser water heat, waste heat) and/or adjusting composition or conditions to facilitate exothermic phase transition where, for example, potentially higher value heat or higher temperature heat is required or to facilitate desorption. Adjustments may be reversible.

Adjusting phase transition temperature or one or more composition or conditions adjustments which may influence phase transition temperature may require work input. The energy input for phase transition temperature adjustment to enable heat to move from a relatively colder heat source to a relatively warmer heat sink. In some embodiments, said work may be provided in the form of electricity to power, for example, a pump, a compressor, a separation device, or a combination thereof. Said work may enable, for example, concentration or composition adjustments in one or more phases, for example, which may involve employing a membrane based process or dialysis.

Advantageously, as a liquid-liquid system, phase transition temperature may be adjusted by adjusting the concentration and/or ratio of specific reagents using a membrane based process, such as, including but not limited to, organic solvent nanofiltration, reverse osmosis, nanofiltration, ultra-filtration or a combination thereof. In embodiments employing chemical absorbents, such as embodiments employing absorbents for acid gas or $CO_2$ capture, an absorption solution containing absorbents may comprise an aqueous solution with absorbents dissolved and reagents which may undergo hydrophilic-hydrophic or miscible-immiscible or soluble-partially soluble or soluble-insoluble phase transition may comprise phase transition reagents. Phase transition temperature may be adjusted by adjusting the concentration of one or more reagents in the absorbent solution or aqueous solution or absorbent rich phase and/or adjusting the concentration of one or more reagents in the phase transition reagents rich phase or organic-rich phase and/or adjusting the concentration of one or more reagents in one or more combined solutions and/or combinations thereof. Composition may be adjusted, for example, in one or more separate liquid phases (which may be, for example, before mixing said liquid phases), or in combined solutions (which may, for example, result in, facilitate, or be before or during a phase transition).

For example, an example liquid system may comprise an absorption solution which may contain chemical absorbent ('absorption solution'), a relatively large molecular weight organic reagent (for example: >100 g/mole, or >150 g/mole, or >200 g/mole or >250 g/mol) which may exhibit relatively high solubility or miscible solubility in the absorption solution ('Large MW reagent'), and a relatively low molecular weight organic reagent which exhibits an LCST or UCST or limited solubility or insolubility in the absorption solution ('Low MW reagent') (for example: <100 g/mole, or <150 g/mole, or <200 g/mole or <250 g/mol). Other reagents may be employed to permanently or temperature adjust phase transition temperature, such as residual lower MW organic solvents or salts ('additives'). In said example liquid system, the Large MW reagent and the Low MW reagent may follow each other in liquid phases (for example: if there are two separate liquid phases, one of the liquid phases may contain both Low MW reagent and Large MW reagent). Example Large MW reagents may include, but are not limited to, one or more or a combination of the following: ether polymers, polyethylene glycol, polyethylene glycol ethers, polyethylene glycol monomethyl ether, polyethylene glycol dimethyl ether, polypropylene glycol, or polypropylene glycol ethers. Example Low MW reagents may include, but are not limited to, low molecular weight ethers, esters, alcohols, aldehydes, 2-Butoxyethanol, Propylene Glycol Propyl Ether, dipropylene glycol butyl ether, tripropylene glycol butyl ether, Dipropylene Glycol Dimethyl Ether, Propylene Glycol Diacetate, Propylene Glycol Phenyl Ether, Tripropylene Glycol n-Butyl Ether, Dipropylene Glycol n-Butyl Ether, Propylene Glycol n-Butyl Ether, Dipropylene Glycol n-Propyl Ether, Propylene Glycol n-Propyl Ether, Dipropylene Glycol Methyl Ether Acetate, Propylene Glycol Methyl Ether Acetate, Tripropylene Glycol Methyl Ether, Dipropylene Glycol Methyl Ether, Propylene Glycol Methyl Ether, Diethylene Glycol Butyl Ether, Ethylene glycol diacetate, Ethylene glycol n-butyl ether, diethylene glycol n-butyl ether, triethylene glycol mono n-butyl ether, diethylene glycol methyl ether, triethylene glycol mono methyl ether, ethylene glycol phenyl ether. In said example liquid system, a liquid phase comprising mostly 'Low MW Reagent' and 'Large MW Reagent' may be separate from a liquid phase comprising mostly desired gas-rich absorption solution (for example: $CO_2$ Rich). Said liquid phase comprising mostly 'Low MW Reagent' and 'Large MW Reagent' may be rich in 'Low MW Reagent' relative to 'Large MW Reagent.' To, for example, increase LCST phase transition temperature, the concentration of Large MW Reagent may be increased relative to 'Low MW Reagent' using organic solvent nanofiltration, which may result in a retentate liquid comprising a high concentration of Large MW Reagent and permeate liquid, which may comprise mostly Low MW Reagent. Said retentate liquid may exhibit higher solubility or a higher LCST temperature in said absorption solution compared to said liquid lean in Large MW Reagent. Said retentate liquid may be mixed with said gas-rich absorption solution, which may result in exothermic dissolution to form, for example, a single liquid phase combined solution, and may facilitate or drive or power or supplement the heat duty of gas desorption or enable a shift in the equilibrium partial pressure of $CO_2$. The phase transition temperature of said single liquid phase combined solution may be decreased, for example, at a later step after gas desorption, by, for example, mixing said Low MW Reagent permeate with said combined solution. Said mixing may result in an endothermic phase transition, which may involve forming two liquid phases. One liquid phase may comprise mostly 'Low MW Reagent' and 'Large MW Reagent' and the other liquid phase may comprise mostly gas lean absorption solution. The two liquid phases may be separated using one or more liquid-liquid separation devices. Gas may be absorbed in the gas lean absorption solution, which may result in a gas rich absorption solution, which may be returned to the first step. Said liquid phase may comprising mostly 'Low MW Reagent' and 'Large MW Reagent' may be returned to the first step.

In acid gas separation system and potentially other gas separation systems, the concentration of gas relative to absorbent in solution may also have a partial influence on the phase transition temperature of a liquid system and phase transitioning properties. For example, the LCST temperature of a LCST liquid system may be decreased with increasing $CO_2$-loading or $CO_2$ concentration in an aqueous solution. For example, the UCST temperature of a UCST liquid system may be increased with increasing $CO_2$-loading or $CO_2$ concentration in an aqueous solution.

Embodiments described herein may involve enabling an equilibrium partial pressure swing between absorption and desorption stages by adjusting the concentration or composition of one or more reagents between, for example, absorption and desorption. For example, concentration adjustment may comprise adjusting the relative concentration of one or more organic solvents or polymers. Said example adjustment of the relative concentration of one or more organic solvents or polymers may involve a concentration adjustment between absorption and desorption which enables said organic solvents or polymers to be soluble during desorption and/or enable increased equilibrium $CO_2$ partial pressure or reduced water vapor partial pressure during desorption. Said example adjustment of the relative concentration of one or more organic solvents or polymers may involve a concentration adjustment between desorption and absorption which enables said organic solvents or polymers to be partially soluble, less soluble or insoluble before or during absorption and/or enable reduced equilibrium $CO_2$ partial pressure during absorption.

For example, concentration adjustment may comprise adjusting the concentration of a reagent in an aqueous absorption solution. For example, said concentration adjustment may involve adjusting the concentration of one or more organic reagents or polymers or surfactants or salts such that one or more reagents are insoluble during absorption and soluble during desorption or vise versa. For example, said concentration adjustment may involve adjusting the concentration of one or more organic reagents or polymers or surfactants or salts such that the UCST or LCST is different between absorption and desorption, equilibrium swing facilitating to absorption, desorption, or both. Said equilibrium swing may involve forming a solution with a higher equilibrium partial pressure or lower equilibrium partial pressure of desired gas compared to a solution before said equilibrium swing at the same temperature.

Notably, the present invention has multiple significant advantages over prior art gas separation technologies from OPEX, CAPEX, and thermodynamic perspectives. These advantages may include, but are not limited to, one or more or a combination of the following:

OPEX:
    Liquid Phase Heat Pump:
        More energy efficient
            Liquids are practically incompressible
            No external heat pump (and no associated heat exchanger losses or Delta T) required
            Lower water vapor pressure and ammonia vapor pressure in the desorber
            Potentially reduced ammonia slip in the desorber
        Working fluids are internal to the technology and function in the gas separation process. No need for an external heat exchangers and associated cost and delta-T losses. Lack of delta-T losses
        Heat is absorbed or recovered or pumped from absorber and can also be absorbed or recovered or pumped from other heat sources or enthalpy sources as well
    Equilibrium swing reagent
        Smaller temperature difference between the absorber and desorber
        Reagents and activities which result in a heat pump may also result in chemical equilibrium swing—no additional methods may be required CAPEX
    No external heat exchangers beyond those typically employed in $CO_2$ capture
    Reagents are part of $CO_2$ capture working fluids
    Reduced energy consumption and scale in stripper—lower heat exchanger cost
    Significantly less or no external cooling required before, during, or after the absorber
    Low cost reagents
    No degradation of reagents Example Benefits:

OPEX:
    Pumping heat from absorber to desorber with internal liquids—highly energy efficient heat pump due to intrinsic efficiency of heat pump and/or smaller temperature difference due to liquids being part of the $CO_2$ capture working fluids (no external heat exchanger between the heat pump and the $CO_2$ capture system required)
    Smaller temperature difference between absorber and desorber
        Chemical Equilibrium Swing: Temperature difference between absorber and desorber may be decreased due to, for example, lesser solubility of $CO_2$ during desorption in the presence of dissolved organic and greater solubility of $CO_2$ in the absorber due to lesser concentration of dissolved organic.
    Does not require external heat exchangers
    Reagents are compatible with ammonia and amines and other absorbents employed in $CO_2$ capture
    Internal—liquids and working fluids are within the process, no losses due to heat exchange, no additional masses to heat or cool CAPEX:
    No external heat exchangers beyond those typically employed in $CO_2$ capture
    Reagents are part of $CO_2$ capture working fluids
    Reduced energy consumption and scale in stripper—lower heat exchanger cost
    Significantly less or no external cooling required before, during, or after the absorber An operating principle of some embodiments described herein may include the principle of absorbing heat in an endothermic phase transition, adjusting the phase transition temperature (for example: by adjusting the concentration or composition of one or more phases), and releasing heat in an exothermic phase transition.

Phase transition may be a liquid phase transition
    The adjusting may involve adjusting the concentration or composition of one or more reagents in one or more liquid phases or one or more liquid phases when the liquid phases are at least partially separated
    Adjusting may be reversible. Adjusting may be conducted using, including, but not limited to, membrane-based process, concentrating one or more reagents, diluting one or more reagents, reverse osmosis, nanofiltration, organic solvent nanofiltration
    Endothermic phase transition may occur, for example, where it may be most advantageous to the process operation. For example, the endothermic phase transition may occur before a gas absorption solution enters an absorption unit, enabling, for example, a cooler absorption solution. For example, the endothermic phase transition may occur before a rich solution enters a desorber unit, enabling, for example, a higher temperature entering the desorption unit, which may facilitate desorption or contribute to desorption energy requirements.

One or more embodiments of the present invention shift the equilibrium partial pressure of desired gas, transfer or pump heat, or adjust water vapor partial pressure, or adjust the partial pressure of other reagents, or a combination thereof by adjusting the ratio of high MW high solubility organic compound to low MW low solubility organic compound in solution. Concentration or ratio or composition adjustment may be conducted in the organic phase, in the aqueous phase, or in a combined solution of the aqueous and organic components. The greater the ratio between high MW high solubility compound and low MW low solubility compound, the more likely the organic components will have a greater LCST and/or miscible solubility in a higher salt concentration or ionic strength solution. The relative concentration or ratio of the reagents are adjusted within the process to make the organic phase soluble where desirable or favorable and partially soluble or insoluble where desirable or favorable or biphasic or separated where desirable or favorable. For example, in an embodiment where it may be desirable for the organic phase (e.g. Low MW low solubility compound+High MW high solubility compound) to be low solubility or become biphasic or phase transition to become biphasic before or during absorption, it may be desirable to add Low MW low solubility compound or Low MW low solubility compound permeate to a $CO_2$-lean solution containing Large MW high solubility reagent before absorption, which may reduce the LCST or may otherwise reduce the solubility in the solution. For example, in an embodiment where it may be desirable for the organic phase to phase transition from solution after absorption (for example: an embodiment where it is advantageous to have a the organic phase dissolved in the absorber, for example, due to, including, but not limited to, faster absorption kinetics, lower desired gas partial pressure, lower $CO_2$ partial pressure during absorption, lower ammonia slip, or lower water vapor partial pressure), the organic phase may be soluble in the absorber due to a relatively high ratio of Large MW high solubility compound to Low MW low solubility compound. After absorption, Low MW low solubility compound may be added to the desired gas rich solution, which may result in the formation of a biphasic system before or after a cross heat exchanger. By adding Low MW low solubility compound, the ratio Large MW high solubility compound to Low MW low solubility compound may be reduced, which may reduce the LCST or reduce the solubility, which may result in a biphasic solution, which may contain a mostly organic liquid phase and a mostly aqueous liquid phase.

It is important to note the Low MW low solubility compound and Large MW high solubility compound may tend to follow each-other when in an aqueous salt solution together. For example, if a biphasic solution forms, the pre-dominantly organic liquid phase may contain most of the Low MW low solubility compound and Large MW high solubility compound.

An example version of an example embodiment may employ aqueous ammonia as an absorbent (which may be employed, for example to absorb $CO_2$ or acid gases), 2-Butoxyethanol as the 'low solubility' or Low MW reagent, and polyethylene glycol monomethyl ether 350, or 550, or 750 or polyethylene glycol dimethyl ether 250 or 500 as the 'high solubility' or Large MW reagent. For the present example description Polyethylene Glycol Monomethyl Ether 350 (PEGMME 350) is provided as the example Large MW reagent.

Note that 2-Butoxyethanol exhibits an LCST in a solution comprising water and itself. 2-Butoxyethanol's solubility is greatly reduced or the nearly insoluble with increasing concentration of most salts. 2-Butoxyethanol, on its own, may exhibit limited solubility in an aqueous salt solution at a significantly lower salt concentration than PEGMME 350.

Liquid-Liquid Separation: A multi-liquid phase mixture may be separated into its individual liquid phases, which may comprise a $CO_2$-lean aqueous ammonia solution phase and an organic liquid phase comprising a relatively low ratio of large MW high solubility reagent to low molecular weight low solubility reagent. The two liquid phases may be separated using one or more or a combination of liquid-liquid separation devices, which may include, but are not limited to, centrifuges, decanters, or coalescers. In this specific example of a version of the present embodiment, the large MW high solubility reagent may comprise Polyethylene Glycol Monomethyl Ether 350 and the low MW low solubility reagent may comprise 2-Butoxyethanol. For purposes of example, the low ratio of large MW high solubility reagent to low molecular weight low solubility reagent organic phase of the present description may comprise 4.5 grams of PEGMME 350 for every 10 grams of 2-Butoxyethanol.

A low ratio of large MW high solubility reagent to low molecular weight low solubility reagent may comprise less than 20 wt % or less than 30 wt % or less than 40 wt % or less than 50 wt % or less than 60 wt % of PEGMME 350 and/or greater than 40 wt % or greater than 50 wt % or greater than 60 wt % or greater than 70 wt % or greater than 80 wt % or greater than 90 wt % of 2-Butoxyethanol. A low ratio of large MW high solubility reagent to low molecular weight low solubility reagent may comprise a less than 0.7:1 ratio of PEGMME 350:2-Butoxyethanol. It is important to note that what constitutes a low ratio of large MW high solubility reagent to low molecular weight low solubility reagent may vary depending on the specific compositions and the properties of the reagents. For example, a low ratio organic phase comprising PEGMME 350:Propylene Glycol Propyl Ether combination may contain a greater ratio than PEGMME 350:2-Butoxyethanol due to, for example, the lower affinity for water of Propylene Glycol Propyl Ether relative to 2-Butoxyethanol.

$CO_2$ Absorption: $CO_2$ in a gas stream may be absorbed in a $CO_2$-lean aqueous ammonia solution (may comprise, for example, 4-15 wt % $NH_3$, although present embodiment provides 6.8 wt % $NH_3$ as an example), in which $CO_2$-Lean may comprise, for example, a $CO_2$-Loading of 0.15-0.35 (although the present description provides 0.25 $CO_2$ loading as an example). $CO_2$ absorption may result in the formation of a $CO_2$-rich aqueous ammonia solution, which may comprise, for example, a $CO_2$-Loading of 0.35-0.6 (although the present description provides 0.5 $CO_2$ loading as an example). There may be residual organic reagents or additives in the absorption solution (for example: less than 15 wt %).

Organic Solvent Nanofiltration: Said low ratio of large MW high solubility reagent to low molecular weight low solubility reagent organic phase may be concentrated using organic solvent nanofiltration, which may result in a retentate liquid comprising a high ratio of large MW high solubility reagent to low MW low solubility reagent and may result in a permeate stream comprising low MW low solubility reagent. Said retentate liquid comprising a high ratio of large MW high solubility reagent to low MW low solubility reagent may comprise, for example, 7 grams of PEGMME 350 for every 10 grams of 2-Butoxyethanol.

A high ratio of large MW high solubility reagent to low molecular weight low solubility reagent may comprise greater than 20 wt % or greater than 30 wt % or greater than 40 wt % or greater than 50 wt % or greater than 60 wt % or greater than 70 wt % of PEGMME 350 and/or less than 40 wt % or less than 50 wt % or less than 60 wt % or less than 70 wt % or less than 80 wt % or less than 90 wt % of 2-Butoxyethanol. A high ratio of large MW high solubility reagent to low molecular weight low solubility reagent may comprise a greater than 0.7:1 ratio of PEGMME 350:2-Butoxyethanol. It is important to note that what constitutes a high ratio of large MW high solubility reagent to low molecular weight low solubility reagent may vary depending on the specific compositions and the properties of the reagents. For example, a high ratio organic phase comprising PEGMME 350:Propylene Glycol Propyl Ether combination may contain a greater ratio than PEGMME 350:2-Butoxyethanol due to, for example, the lower affinity for water of Propylene Glycol Propyl Ether relative to 2-Butoxyethanol.

Cross Exchanger, Mixing, and Desorption: $CO_2$-rich aqueous ammonia solution and organic solvent nanofiltration retentate may be passed through a cross heat exchanger, which may result in pre-heated streams. Said pre-heated $CO_2$-rich aqueous ammonia solution may be mixed, which may dissolve together to form a combined single liquid phase $CO_2$-rich solution. Said mixing or dissolution may be exothermic, which may result in a greater temperature of the combined solution relative to the two liquids before mixing. Said combined solution may possess, including, but not limited to, one or more or a combination of the following: a lower partial pressure of water vapor relative to the aqueous absorption solution at the same temperature, a lower partial pressure of ammonia relative to the aqueous absorption solution at the same temperature, a greater partial pressure of carbon dioxide relative to the aqueous absorption solution at the same temperature. Said combined solution may undergo desorption in the desorber, which may result in the formation of desorbed $CO_2$ and $CO_2$-Lean combined solution.

Cross Exchanger and Mixing: Said $CO_2$-Lean combined solution may heat exchanged in a cross exchanger. Permeate solution produced by organic solvent nanofiltration (which may comprise, for example, a less than 0.1:1 ratio of PEGDMM 350 to 2-Butoxyethanol) may be mixed with said $CO_2$-Lean combined solution, which may result in an endothermic phase transition and/or a multi-liquid phase mixture or biphasic mixture. Said endothermic phase transition may be advantageous due to, including, but not limited to, pre-cooling the absorption solution and/or enabling recovered heat to be transferred to the desorber. Said multi-liquid phase mixture or biphasic mixture may be transferred to step '1)'.

Example Definitions desired gas laden gas stream: Comprises a gas stream which contains a desired gas a one of its components. Generally, the desired gas laden gas stream may contain other components than desired gas, and desired gas may be separated from said other components using one or more or a combination of embodiments described herein.

non-desired desorbed gases: Gases other than the desired gas or desired gases which may form during desorption. For example, in $CO_2$ capture, may be undesirable to desorb water and/or ammonia in the $CO_2$ gas stream because of, for example, the additional energy required to volatilize water and/or ammonia and the fact that these components may ultimately be condensed in the condenser. Water and/or ammonia may desorb anyway, however reducing the partial pressure of water and/or ammonia relative to ammonia during desorption may be desirable as it may reduce the energy requirement per a unit of $CO_2$ desorbed and the amount of vapors condensed in the condenser.

desired gas: Desired gas comprises the gas or gases (or liquid or liquids or other fluid or fluids) which the present invention aims to separate from a gas or liquid or fluid mixture. The reagent or reagents which may comprise desired gases in a system may be also referred to as desired gases, even if they are not at a gaseous state.

desired gas lean or practically free gas stream: A gas stream (or other fluid stream) from which desired gas has been at least in part removed or separated.

partially soluble: A reagent or phase or liquid phase which is less than 50 wt % soluble, or less than 40 wt % soluble, or less than 30 wt % soluble, or less than 20 wt % soluble, or less than 15 wt % soluble, or less than 10 wt % soluble, or greater than 0.1 wt % soluble in another liquid or liquid phase. Alternatively a reagent or phase or liquid phase which, in the amount in a given point in the system, does not fully dissolve or part of which does not dissolve in another liquid phase, which may result in two or more liquid phases.

low solubility, less soluble, or insoluble: A reagent or phase or liquid phase which is less than 50 wt % soluble, or less than 40 wt % soluble, or less than 30 wt % soluble, or less than 20 wt % soluble, or less than 15 wt % soluble, or less than 10 wt % soluble, or less than 5 wt % soluble in another liquid or liquid phase. Alternatively a reagent or phase or liquid phase which, in the amount and conditions in a given point in the system, does not fully dissolve or part of which does not dissolve in another liquid phase, which may result in two or more liquid phases.

high solubility, highly soluble, or soluble: A reagent or phase or liquid phase which is greater than 50 wt % soluble, or greater than 40 wt % soluble, or greater than 30 wt % soluble, or greater than 20 wt % soluble, or greater than 15 wt % soluble, or greater than 1 Owt % soluble, or greater than 5 wt % soluble in another liquid or liquid phase. Alternatively a reagent or phase or liquid phase which, in the amount and conditions in a given point in the system, fully dissolves, which may result in a single liquid phase combined solution.

Large MW Reagent: A reagent or a combination of reagents which may exhibit one or more or a combination of properties: a molecular weight greater than 150 grams per mole, solubility in water, a molecular weight larger than the molecular weight of Low MW reagent, a molecular structure such that it can at least in part be separated from Low MW reagent using a membrane based process, solubility in Low MW reagent, independent solubility in a salt solution which Low MW reagent is insoluble or partially soluble in, a reagent or reagents which at least in part follow Low MW reagent if Low MW reagent forms a separate liquid phase, a reagent or reagents which have a partition coefficient between Low MW reagent and a salt water solution wherein at least a portion of Large MW reagent is partitions into Low MW reagent, a reagent which in an organic phase with Low MW Reagent increases LCST or increase solubility in an aqueous salt solution when the ratio of Large MW reagent to Low MW Reagent increases, a reagent which in an organic phase with Low MW Reagent decreases LCST or decreases solubility in an aqueous salt solution when the ratio of Large MW reagent to Low MW Reagent decreases Low MW Reagent or Small MW Reagent: A reagent or a combination of reagents which may exhibit one or more or a combination of properties: molecular weight less than 200 grams per mole, a viscosity of less than 15 cP, a molecular weight smaller than the molecular weight of Large MW reagent, a molecular structure such that it can be at least in part separated from Large MW reagent using a membrane based process, solubility in Large MW reagent, independently partially soluble or insoluble in a salt solution which Large MW reagent is independently soluble in, a reagent which in an organic phase with Large MW Reagent decreases LCST or decreases solubility in an aqueous salt solution when the ratio of Low MW reagent to Large MW Reagent increases, a reagent which in an organic phase with Large MW Reagent increases LCST or increases solubility in an aqueous salt solution when the ratio of Low MW reagent to Large MW Reagent decreases Additives: Reagents which may be employed to alter the solubility or phase transition characteristics of the liquid system at low concentrations (for example, less than 15 wt %). For example, propylene glycol may be employed at low concentrations to, for example, enable a lower ratio of 'High MW reagent' to 'low MW reagent', which may enable relatively lower energy consumption during organic solvent nanofiltration. Other additives may include other reagents described herein. Examples may include, but are not limited to, low molecular weight organic reagents with high solubility in aqueous solution or organic solution or both, a salt, or a combination thereof.

Rich: Description of relative concentration. A rich solution or stream contains a greater concentration of a particular reagent or type of reagent relative to another solution or stream within the process. A comparable stream to reference 'rich' may be another stream of similar composition, except with a lower concentration of said particular reagent or type of reagent.

Lean: Description of relative concentration. A lean solution or stream contains a lean concentration of a particular reagent or type of reagent relative to another solution or stream within the process. A comparable stream to reference 'lean' may be another stream of similar composition, except with a greater concentration of said particular reagent or type of reagent.

Organic Phase: A phase or liquid phase comprising greater than 40 wt %, or greater than 50 wt % or greater than 60 wt % of organic reagents.

Aqueous Phase: A phase or liquid phase comprising greater than 40 wt %, or greater than 50 wt % or greater than 60 wt % of water or inorganic salts or inorganic components or a combination thereof Single liquid phase combined solution: Comprises a solution which may have originated from two or more separate liquid phases, some of which may be organic liquid phase(s) and some of which may be aqueous liquid phase(s). It may also indicate components of said single liquid phase combined solution may phase separate into two or more liquid phases at another or at a later stage in the process and said phase separation may also be reversible internally.

Figure 34:
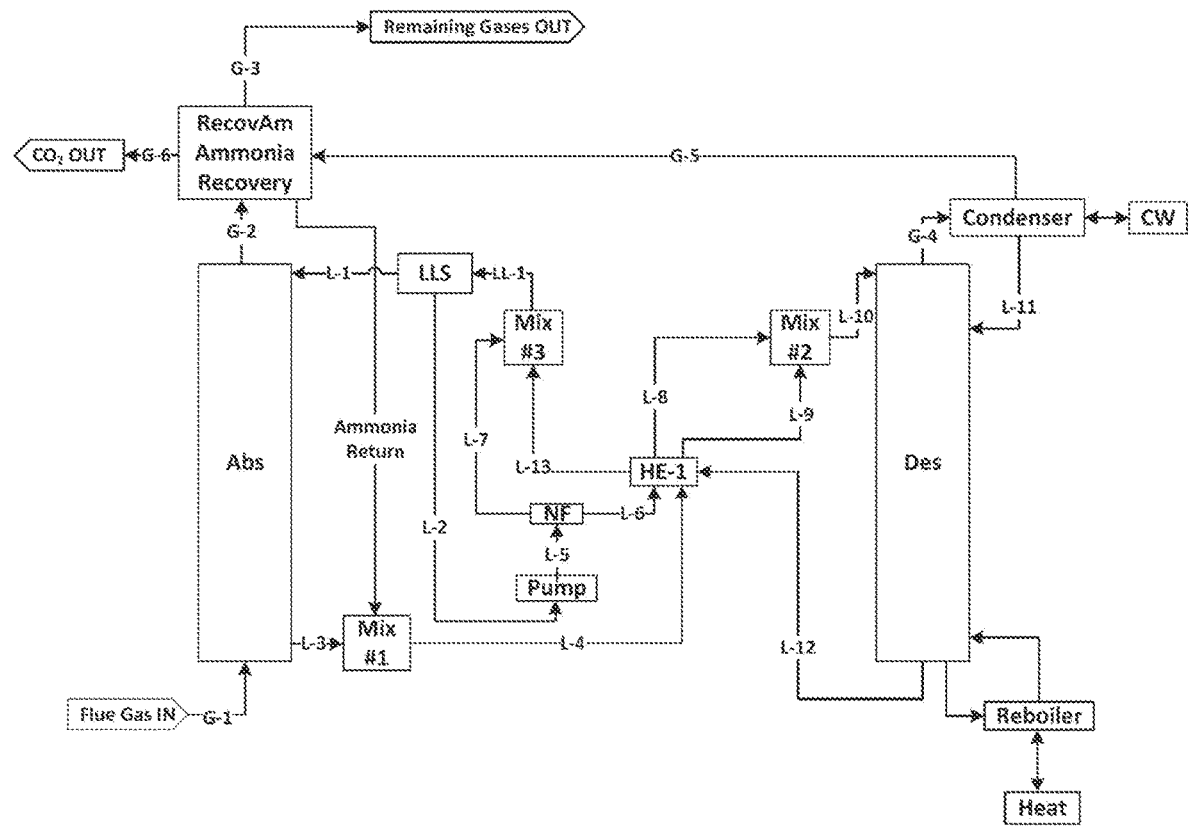
FIG. 34: Gas separation embodiment with liquid-liquid phase transition internal heat pump and/or organic solvent nanofiltration or other concentration adjustment or membrane-based process before a cross heat exchanger.

FIG. 34: Embodiment for gas separation with organic solvent nanofiltration or other concentration adjustment or membrane based process before a cross heat exchanger. The present embodiment may enable less total liquid to be heat exchanged in cross exchanger, which may enable less total specific heat capacity heating and cooling requirement. The present embodiment enables an organic liquid phase to be soluble during desorption and comprise a separate liquid phase prior to absorption, which may be separated before absorption. The present embodiment may employ aqueous ammonia as an absorbent (although other absorbents or combination of absorbents may be employed) if $CO_2$ or other gas is being separated. If aqueous ammonia is employed as an absorbent, ammonia recovery may be employed, such as, for example, RecovAm. The present embodiment may pump heat from the absorber (or waste heat source or a combination thereof) to the desorber or recover heat from the pre-cooling of absorption solution and pump it to the desorber or a combination thereof in an internal liquid phase heat pump.

Figure 35:
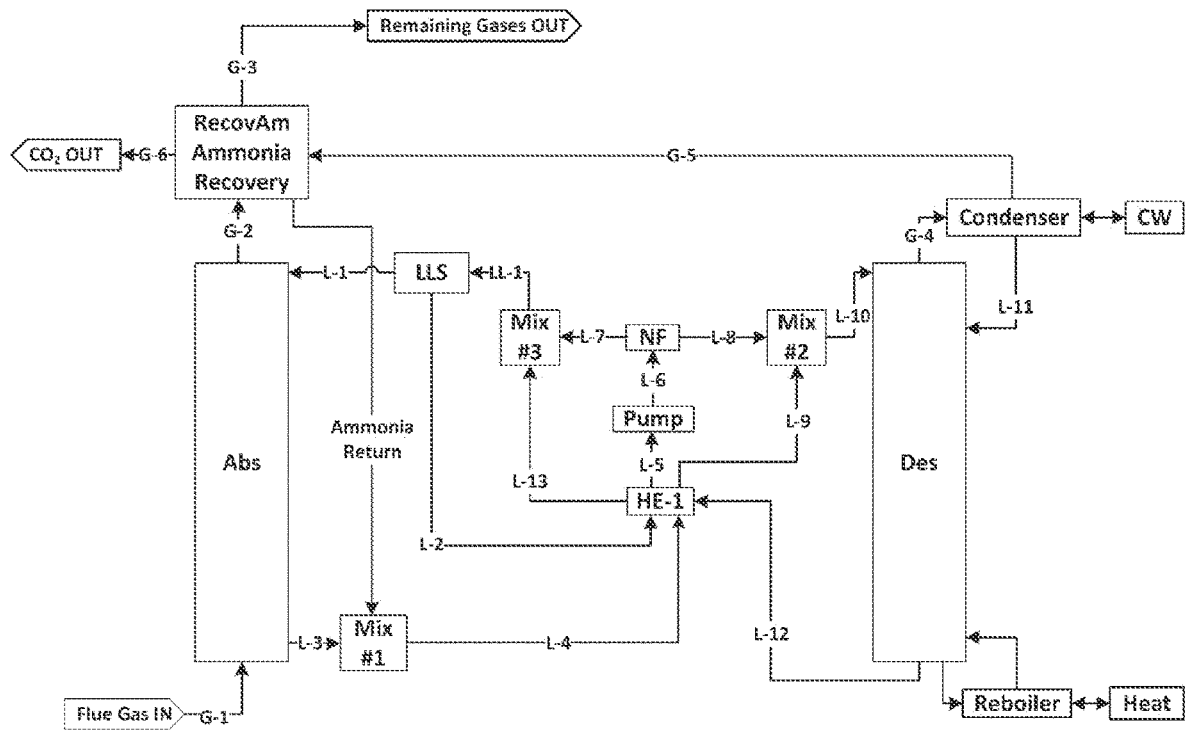
FIG. 35: Gas separation embodiment with liquid-liquid phase transition internal heat pump and/or organic solvent nanofiltration or other concentration adjustment or membrane-based process after a cross heat exchanger.

FIG. 35: An example embodiment with organic solvent nanofiltration after cross exchanger. By preheating feed solution before the membrane, energy consumption in the pump may be reduced relative to version separating before cross exchanger due to, for example, lower viscosity, or low concentration polarization, or low osmotic pressure, or a combination thereof. Heat may be recovered from L-7 in cross exchanger before transferring L-7 to Mix #3.

Figure 36:
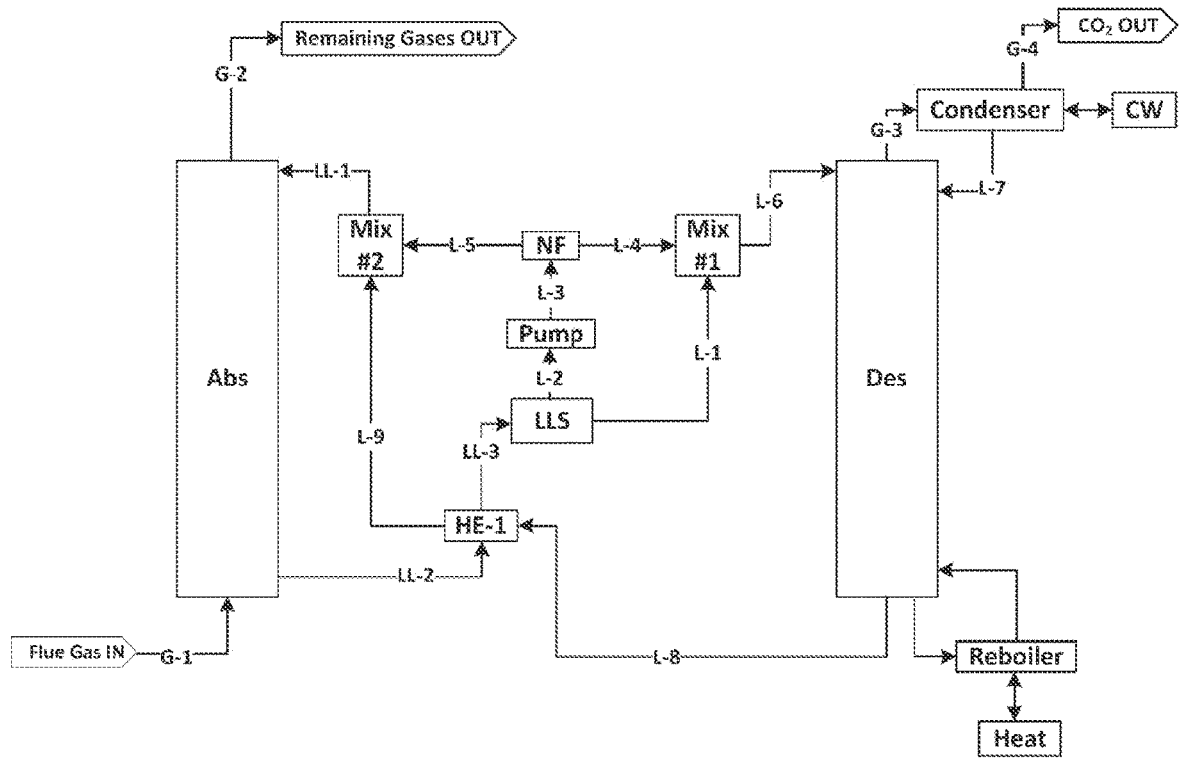
FIG. 36: Gas separation embodiment with liquid-liquid phase transition internal heat pump where the organic phase and the aqueous phase are in a biphasic or multi-liquid phase mixture before, during, or after, or a combination thereof absorption.

FIG. 36: An example embodiment where the organic phase and the aqueous phase are in a biphasic or multi-liquid phase mixture before, during, or after, or a combination thereof absorption.

Figure 37:
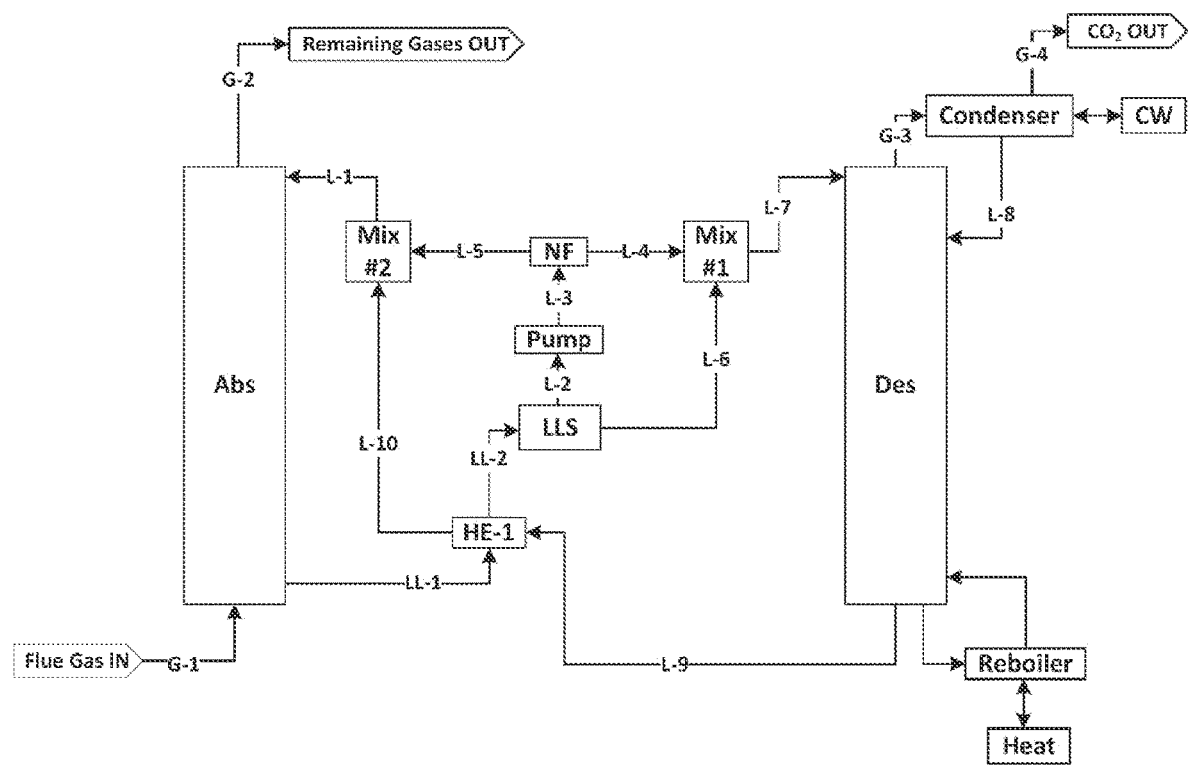
FIG. 37: Liquid-liquid phase transition heat pump gas separation embodiment where liquid-liquid phase change may occur in the absorber and may be in part triggered or facilitated by or driven by heat released and/or solubility changes due to the increased concentration of one or more gases or gas derivatives in solution.

FIG. 37: An example gas separation embodiment with internal heat pump. The present embodiment may incorporate an internal heat pump moving heat from the absorber to the desorber comprising, for example, endothermic liquid phase transition in the absorber (absorbing heat [and/or other forms of energy] generated during gas absorption in the absorber), phase transition temperature adjustment, and exothermic phase transition before or during the desorber. Liquid phase change may occur in the absorber and may be in part triggered or facilitated by or driven by heat released and/or solubility changes due to the increased concentration of one or more gases or gas derivatives in solution.

Figure 38:
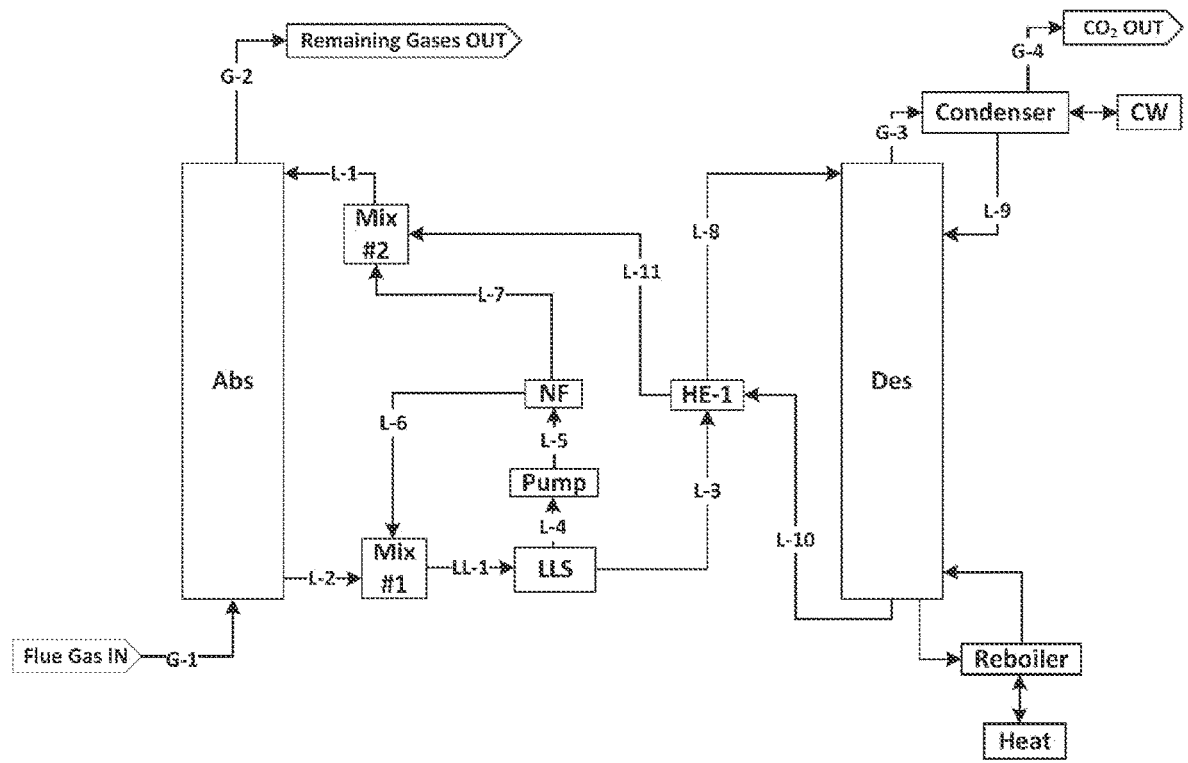
FIG. 38: Liquid-liquid phase transition heat pump gas separation embodiment wherein a combined single liquid phase solution is employed throughout gas absorption.

FIG. 38A: An example gas separation embodiment wherein a combined organic solvent-aqueous solution is employed throughout gas absorption (which, along with other embodiments herein, may involve any desired gas, which may also include water vapor or $CO_2$). The solution may undergo a liquid-liquid phase transition following absorption through the addition of, for example, Low MW Reagent and/or in a cross exchanger. The present embodiment may enable the organic phase to remain in dissolved in solution throughout absorption, while enabling phase transition of the organic phase after absorption using the addition of Low MW Reagent permeate. Advantageously, the present embodiment may enable control over when the organic phase is soluble or insoluble or a combined single liquid phase or a separate liquid phase from the aqueous solution. Said control may enable advantageously the ability for organic phase to be soluble or a separate liquid phase when desirable or to favorably shift the equilibrium or kinetics of the process to facilitate, for example, gas separation or vapor separation. The present embodiment may employ chemical absorbents or may employ physical solvents or a combination thereof (for example: a version of the embodiment with only chemical reaction between desired gases and the liquid phase). In a physical solvent version of the present embodiment, the combined organic phase-aqueous solution in the absorber may have an appreciably lower equilibrium partial pressure of a desired gas (for example, including, but not limited to, water vapor) than one of the liquid phases which form following a liquid-liquid phase transition (for example: a mostly water aqueous liquid phase). Note that it may be advantageous for the organic phase to be dissolved throughout absorption, for example, which may include but are not limited to, one or more or a combination of the following: reduced complexity and handling issues as solution remains at the same state throughout absorption, lower partial pressure and/or other superior absorption characteristics throughout the absorber profile (not just section of the absorber comprising a combined, single liquid phase solution), faster absorption kinetics throughout entire absorption column.

Difference between 38A and 38B, 38A—phase transition occurs before cross exchanger; 38B—phase transition occurs within or after cross exchanger. From an energy balance perspective, 38A's endothermic phase transition before the cross exchanger may enable a lower temperature of the liquid transferred to the absorber, which may be more advantageous heat recovery. Also, less specific heat capacity is required to be heated up or cooled down in 38A compared to 38B.

Example Embodiment 38B: An example gas separation embodiment wherein a combined organic solvent-aqueous solution is employed throughout gas absorption (which, along with other embodiments herein, may involve any desired gas, which may also include water vapor). The solution may undergo a liquid-liquid phase transition following absorption through the addition of, for example, Low MW Reagent and/or in a cross exchanger. The present embodiment may employ chemical absorbents or may employ physical solvents or a combination thereof (for example: a version of the embodiment with only chemical reaction between desired gases and the liquid phase). In a physical solvent version of the present embodiment, the combined organic phase-aqueous solution in the absorber may have an appreciably lower equilibrium partial pressure of a desired gas (for example, including, but not limited to, water vapor) than one of the liquid phases which form following a liquid-liquid phase transition (for example: a mostly water aqueous liquid phase).

Difference between 5A and 5B, 5A—phase transition occurs before cross exchanger; 5B—phase transition occurs within or after cross exchanger.

Example Embodiment 39 (above): Example desorber configuration to productively employ heat of phase transition in gas desorption. The present embodiment may involve heat exchanging higher temperature solution from exothermic phase transition (this solution may be gas-rich or gas-loaded) with lower desired gas loading solution in the desorber. The gas-rich solution may then be fed into the desorption column.

Example Embodiment 40 (above): Example desorber configuration to productively employ heat of phase transition in gas desorption. Desorber may involve a first flashing stage to flash gas from higher temperature solution from exothermic phase transition. Further gas desorption from the solution remaining after flashing may be conducted, for example, in a desorber with heat input from a reboiler. The present embodiment may enable lower reboiler duty, from, for example, the heat supplied by the heat supplied by the internal heat pump.

Figure 39:
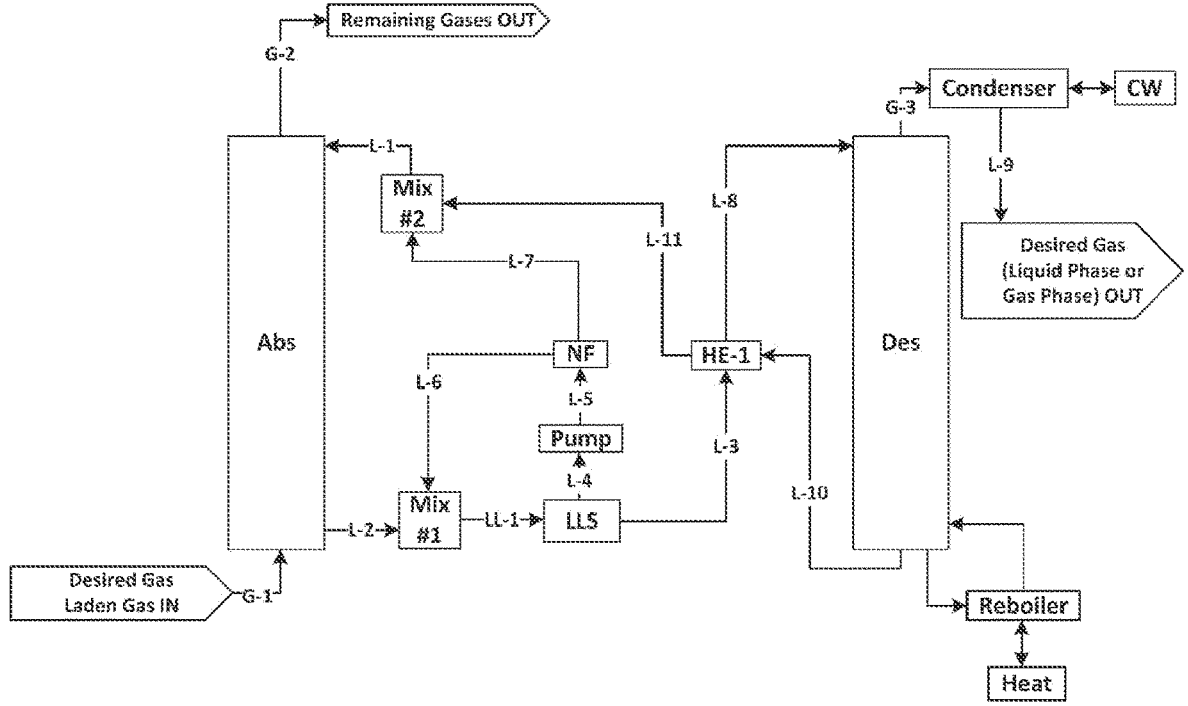
FIG. 39: A gas separation embodiment wherein the desired gases may primarily concentrate in an organic phase during the formation of a multi-liquid phase mixture or biphasic mixture and/or may condense into a liquid phase output or a combination thereof.

FIG. 39: The present embodiment involves a desired gas separation embodiment wherein the desired gases may primarily concentrate in an organic phase during the formation of a multi-liquid phase mixture or biphasic mixture or may condense into a liquid phase output or a combination thereof. The present embodiment may employ a UCST phase transition liquid system, where, for example, the composition may comprise CST reagent, 'low solubility reagent', and water. Phase transition or the UCST may be controlled by changing the concentration of CST reagent in solution. A trend, for example, may be the greater the concentration of CST reagent in the aqueous phase, the lower the UCST or the greater the likelihood 'low solubility reagent' or organic phase will be fully soluble. Similarly, for example, the lesser the concentration of CST reagent in the aqueous phase, the greater the UCST or the lesser the likelihood 'low solubility reagent' or organic phase will be fully soluble. The 'low solubility reagent' may be an organic reagent. Absorption may occur as a combined single liquid phase solution, which may result in a desired gas rich single liquid phase solution. After absorption, permeate, which may comprise mostly of water or aqueous solution, may be added to the desired gas rich single liquid phase solution, which may result in a phase transition into a multi-liquid phase mixture, which may comprise a desired gas rich organic phase and an aqueous phase containing a lean concentration of CST reagent. Said organic phase and aqueous phase may be separated using one or more or a combination of liquid-liquid separation devices. The desired gas rich organic phase may undergo fractional distillation or desorption or membrane distillation or another separation method, which may result in a desired gas lean organic phase. It is important to note said desired gas may be a volatile chemical, while the 'low solubility reagent' may be a high boiling point or low vapor pressure reagent. Said desired gas lean organic phase may be mixed with CST reagent rich retentate aqueous solution, which may result in a desired gas lean single liquid phase combined solution, which may be employed in desired gas absorption. By absorbing desired gas in the single liquid phase combined solution, a greater amount of desired gas may be absorbed per a unit of organic in solution and/or the lower the equilibrium partial pressure desired gas in the desired gas lean solution. The partial pressure and concentration of desired gas may be increased by phase transitioning into two liquid phases and the desired gas may favor the organic phase over the aqueous phase, which may result in a greater concentration of desired gas in the organic phase than the aqueous phase. A higher concentration of desired gas in the organic phase may enable lower energy consumption related to desired gas desorption and less specific heat capacity energy consumption heating and cooling the liquid due to, for example, the less volume of fluid and the lower specific heat capacity of organics compared to water. The present embodiment may be employed, among other desired gas separation application described herein, as a method for separating volatile organics or acid gases or combinations thereof and may comprise physical absorbents.

Figure 40:
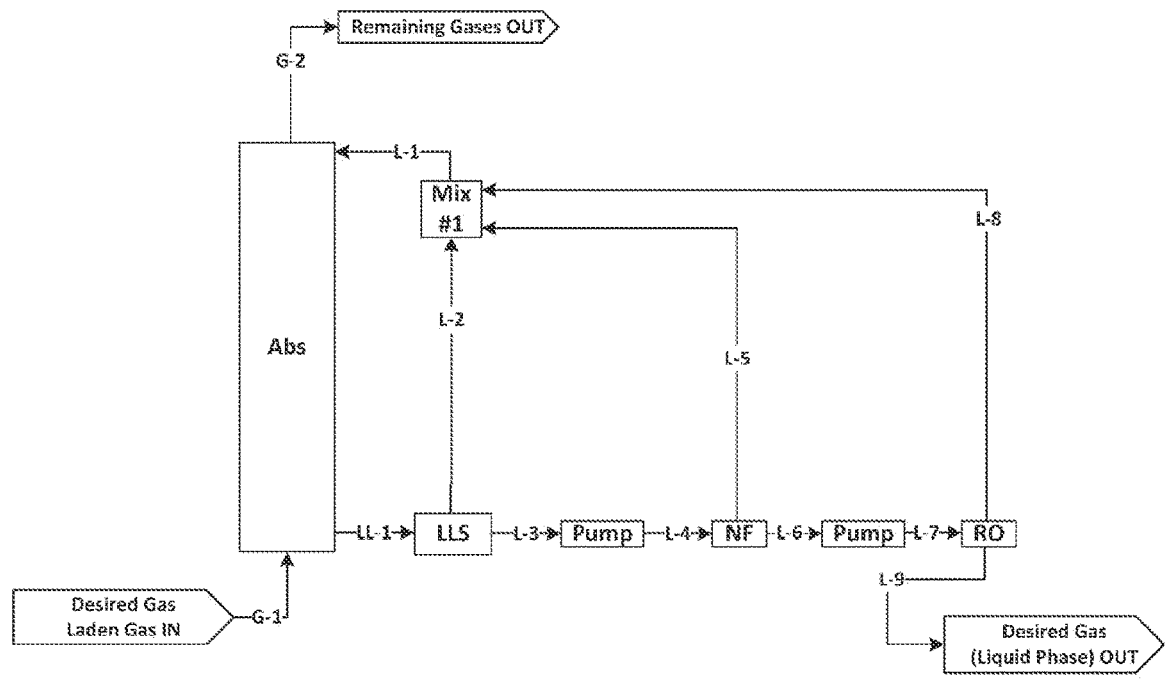
FIG. 40: Liquid-liquid phase transition heat pump gas separation embodiment configured to separate condensable gases, or highly soluble gases, or gases which can be separated with physical solvents, or a combination thereof.
Figure 41:
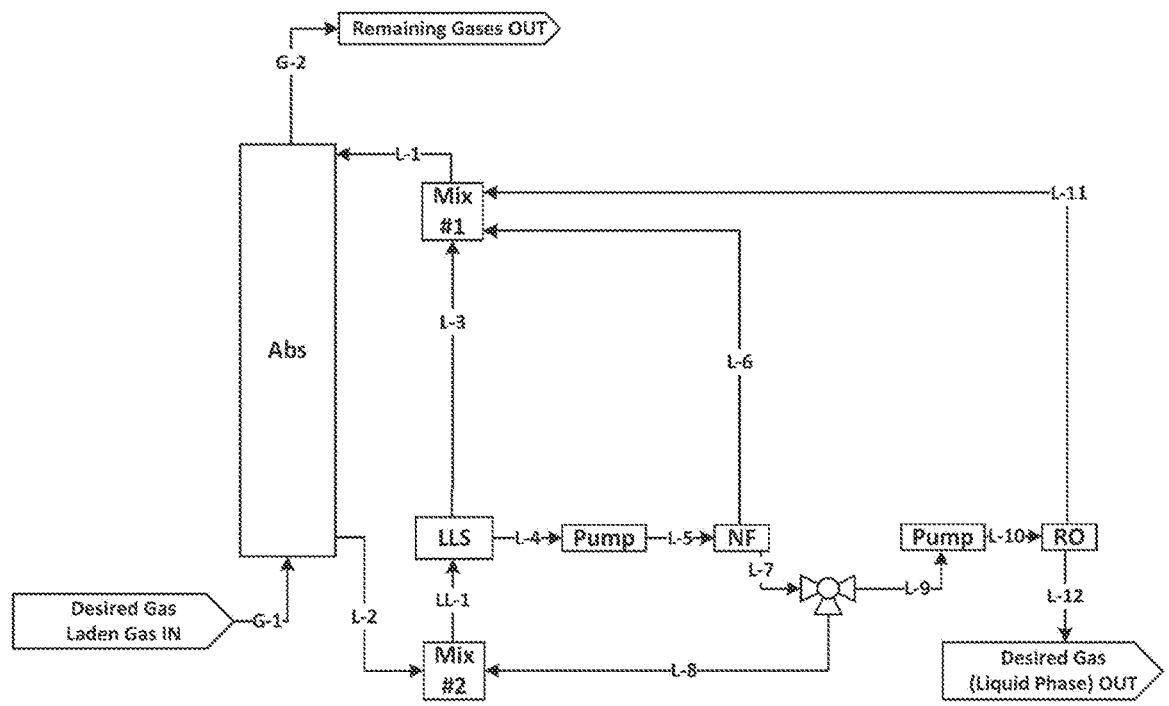
FIG. 41: Liquid-liquid phase transition heat pump gas separation embodiment configured to separate condensable gases, or highly soluble gases, or gases which can be separated with physical solvents, or a combination thereof.

FIG. 40 and FIG. 41:

Note: Alternatively, the 'absorber' may comprise a forward osmosis unit, wherein the combined single liquid phase water lean solution may function as a draw solution, and a feed solution comprising, for example, industrial wastewater or water requiring concentrating or solution concentrated for zero liquid discharge. The osmotic pressure of the draw solution may be significant due to, for example, the high molar concentration of 'low solubility reagent', which may be sufficiently large in molecular weight to be rejected by a forward osmosis membrane. For example, propylene carbonate and/or ethylene glycol diacetate and/or Triacetin may function as 'low solubility reagents'. Propylene carbonate has a molecular weight of ~102 g/mole and ethylene glycol diacetate has a molecular weight of ~146.14 g/mole and Tracetin has a molecular weight of 218.2 g/mole, all three of which are greater molecular weights than the molecular weight cut-off of common forward osmosis membranes (which are generally 100 g/mole)

The present embodiment involves a desired gas separation embodiment wherein the desired gas may comprise, for example, including, but not limited to, water or ammonia. The present embodiment may comprise, for example, a process for separating water vapor from gas streams or liquid streams, such as water vapor from air, flue gas, or other gas stream or extracting water from a separate liquid stream, such as, for example, waste water, using, for example, membrane distillation or vapor gas membrane. In accordance with Raoult's Law and standard trends with partial vapor pressure, the vapor pressure of a component in a solution may decrease if the mole fraction of the said component decreases. The present embodiment may involve absorbing, for example, water vapor, in an organic phase-aqueous phase single liquid phase combined solution. The dissolved organic phase may enable a lower equilibrium partial pressure of water vapor at a given temperature compared to a liquid comprising just water, which may be in accordance with the trends described by Raoult's Law. Said lower equilibrium partial pressure of water vapor may enable greater water vapor absorption efficiency or reduced cooling energy requirement (Cooling may be employed to facilitate water vapor absorption. It is important to note that the temperature of cooling required, if any, may be higher than the temperature required by a system condensing water directly from the air, enabling potentially less work energy consumption). As shown in FIG. 40, the increase in desired gas concentration (for example: water) may increase the UCST of the liquid system and may result in a UCST phase transition into two or more liquid phases during absorption due to, for example, including, but not limited to, diluting the concentration of CST reagent and/or the cooling supplied during absorption. As shown in FIG. 41, a portion of NF permeate (L-8) may be internally recirculated or recycled and added to the desired gas rich single liquid phase combined solution exiting the absorber, which may result in the formation of a multi-liquid phase mixture, wherein one liquid phase may comprise mostly aqueous phase and another liquid phase may comprise mostly organic phase. Said multi-liquid phase mixture may be separated, at least in part, into its constituent liquid phases. Said organic phase may be recycled internally and may be dissolved in the retentate aqueous streams before absorption. Said aqueous phase may be desired gas rich and lean in CST reagent (for example: may contain a larger mole fraction or mass % of water than the retentate solution exiting the NF module [L-6]) and may be concentrated using a nanofiltration unit. Desired gas recovery or water recovery in the present embodiments may be conducted by separating the desired gas in a liquid phase from the CST reagent using nanofiltration and residual low solubility reagent and CST reagent using reverse osmosis and/or other further purification steps. Retentate streams from nanofiltration and/or reverse osmosis may be recycled internally (L-6 and L-11). Desired gas output may comprise a liquid phase of desired gas at greater than 90% or greater than 95% or greater than 99% purity.

Figure 42:
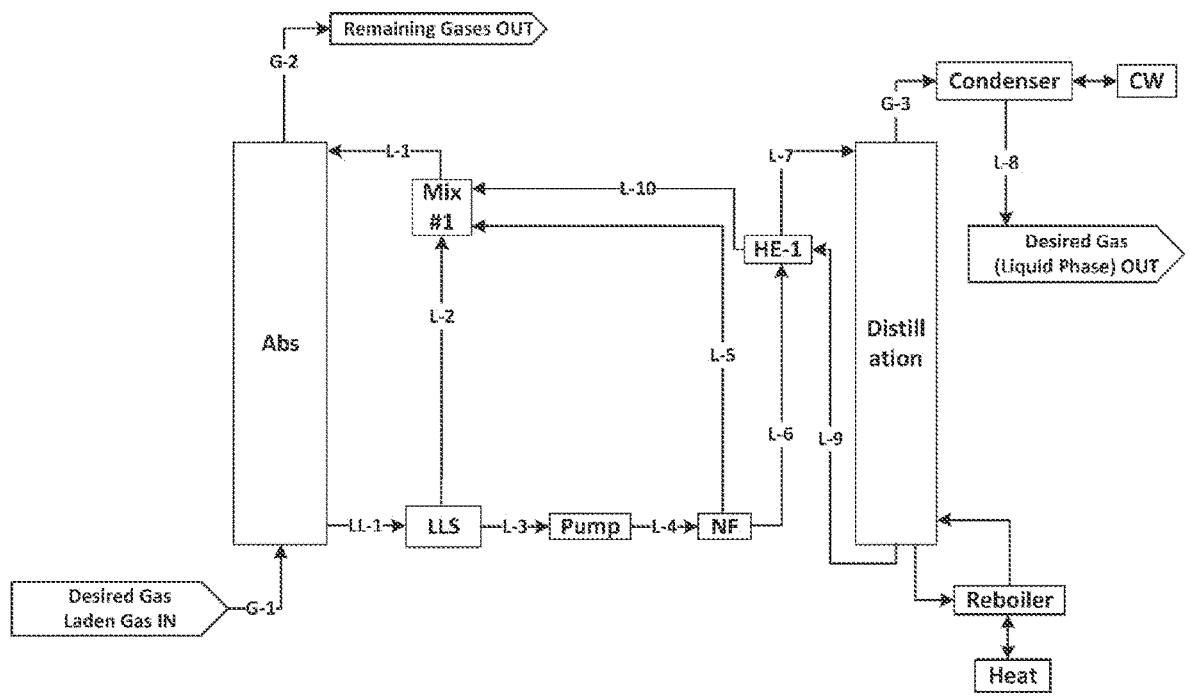
FIG. 42: A liquid-liquid phase transition gas separation embodiment employing distillation or desorption to separate desired gas or regenerate the gas separation solution or a combination thereof.

FIG. 42 (above): FIG. 42 is similar to FIG. 40 and FIG. 43 and the absorption section and NF section may be structured similar to FIG. 40 or 41. FIG. 42 may be differentiated in that it may employ distillation or desorption to separate desired gas. Desired gas may exit the process as a liquid, a compressed gas, a gas, a supercritical fluid, a solid, or a combination thereof.

DESCRIPTION OF FIGURES

FIG. 1 Example Step-by-Step Description:
Note: In versions of the present embodiment employing other acid gas absorbents than ammonia, it may be desirable to not include an ammonia abatement cycle (in FIG. 34, 'RecovAm' is provided as an example ammonia abatement cycle. It is important to note that other ammonia abatement cycles may be employed or other emissions abatement cycles may be employed).
Note: $CO_2$ may be provided as an example desired gas. Ammonia may be provided as an example absorbent.
Endothermic Phase Transition into Two Liquid Phases: A 'warm' solution which may comprise $CO_2$-Lean aqueous ammonia rich in Large MW organic reagent dissolved (L-13) exits the $CO_2$ desorption unit and is heat exchanged in a cross exchanger (RE-1), forming a 'cool' solution of the same composition (L-14). L-14 is mixed (Mix #3) with permeate produced by organic solvent nanofiltration comprising Low MW organic reagent (L-7), which may result in a reduction in the liquid-liquid phase transition temperature range temperature of the composition and may result in an endothermic phase transition with the formation of a two liquid phase mixture (LL-1). LL-1 may be at a lower temperature than L-14 due to, for example, said endothermic phase transition.

Liquid-Liquid Separation: LL-1 may be separated using one or more liquid-liquid separation devices (LLS, for example, may include, but is not limited to, a coalescer and/or decanter) into its constituent liquid phases, which may result in a $CO_2$-Lean aqueous ammonia solution stream (L-1) and Large MW reagent—Lean concentration organic phase stream (L-2).

$CO_2$ Absorption: $CO_2$ or other acid gases may be absorbed in a $CO_2$-Lean aqueous ammonia solution (L-1), which may result in the formation of a $CO_2$Rich aqueous ammonia solution (L-3) and $CO_2$-Lean, ammonia-rich remaining flue gases (G-2). Ammonia may be recovered from G-2 using RecovAm and/or another ammonia recovery method, forming, for example, ammonia-ultra-lean remaining flue gases (G-3) and an 'ammonia return' stream. 'Ammonia return' stream is mixed with L-3, resulting in L-4. $CO_2$Rich aqueous ammonia solution (L-4) may be heat exchanged in a cross exchanger (RE-1), forming pre-heated $CO_2$Rich aqueous ammonia solution (L-9).

Pumping/Pressurization of NF or RO Feed: Large MW—Lean $CO_2$ Evolution® Reagent stream (L-2) may be pressurized using a pump ('Pump'), which may result in a pressurized Large MW reagent—Lean organic phase stream (L-5).

NF or RO or Organic Solvent Nanofiltration Separation: L-5 may be employed as a feed solution into a Reverse Osmosis or Nanofiltration or Organic Solvent Nanofiltration membrane process unit ('NF'). NF may separate L-5 into a permeate stream comprising Low MW organic reagent (L-7) and a retentate stream, which may be rich in Large MW organic reagent (L-6).

Exothermic Phase Transition into Two Liquid Phases: L-6 may be heat exchanged in a cross exchanger (RE-1), which may result in a pre-heated solution of the same composition (L-8). Pre-heated $CO_2$Rich aqueous ammonia solution (L-9) may be mixed (Mix #2) with L-8, which may result in exothermic dissolution and the formation of $CO_2$Rich aqueous ammonia with Large MW reagent—Rich organic phase dissolved (L-10). L-10 may be warmer than L-8 and L-9, for example, due to said exothermic dissolution.

$CO_2$ Desorption: $CO_2$ may be flashed from L-10 in a stage within the desorption column, which may form a portion of the desorbed $CO_2$ (G-4) and a partially $CO_2$-Lean solution. $CO_2$ may be further desorbed (G-4) using, for example, heat supplied by a reboiler as the liquid passes through the desorption column, which may result in the formation of $CO_2$ lean solution which exits desorption column (L-12). L-12 may be heat exchanged in a cross exchanger and may be transferred to step 1 (L-13). At least a portion of water vapor and ammonia vapor may be condensed from desorbed $CO_2$ (G-4) using, for example, a condenser (Condenser, L-11). The remaining $CO_2$ following condensing (G-5) may be further scrubbed of aqueous ammonia or water vapor using one or more methods, which may include, but are not limited to, by RecovAm or scrubbing methods known in the art.

Figure 43:
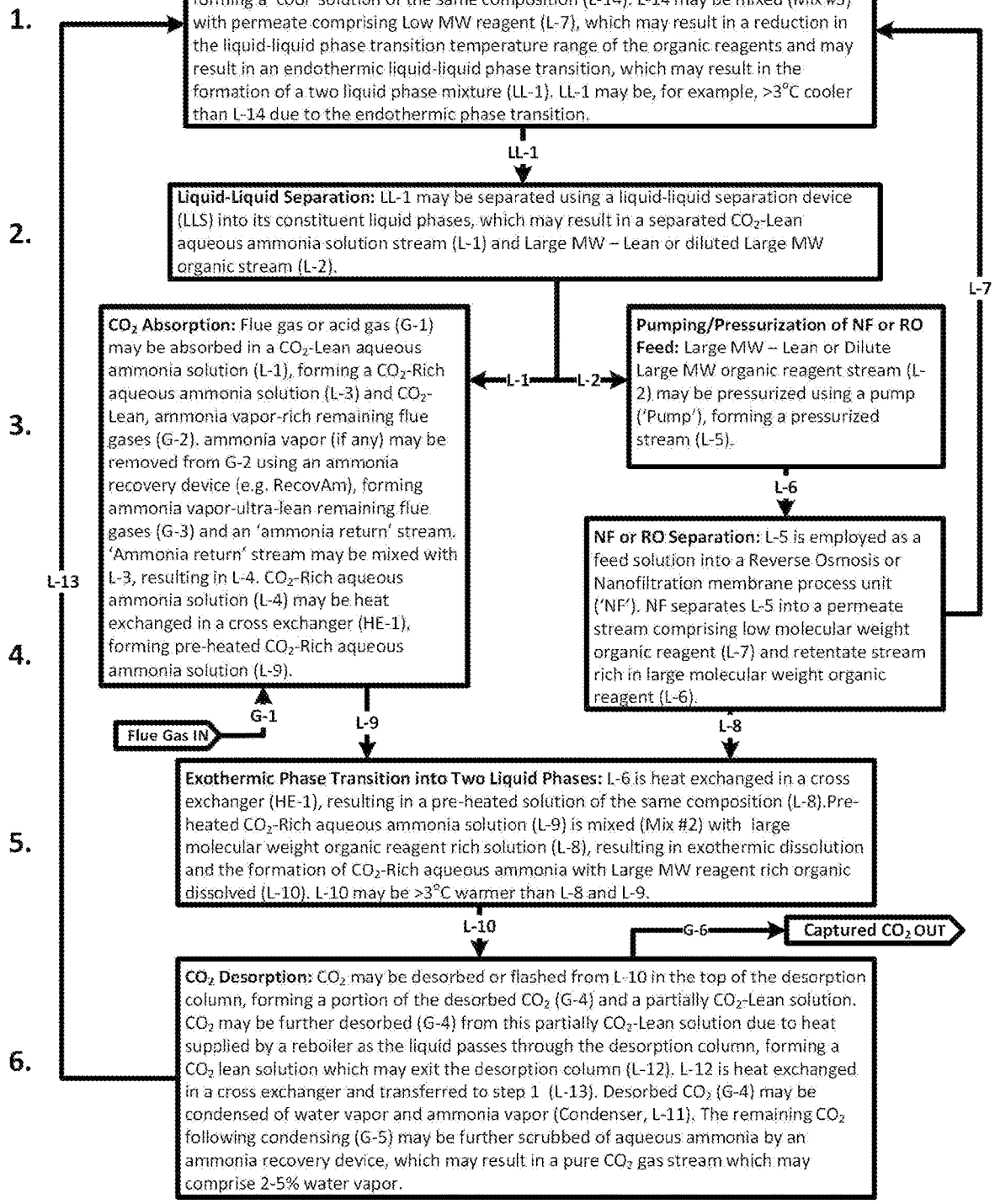
FIG. 43: Example gas separation embodiment step-by-step description flowchart for FIG. 34.

FIG. 43: Example gas separation embodiment step-by-step description flowchart for FIG. 34. Please note that ammonia is provided as an example absorbent, other absorbents may be employed instead of or in addition to ammonia. Please note 'RecovAm' is provided as an example emissions abatement cycle, other emissions abatement or absorbent vapor emissions abatement cycles may be employed instead of or in addition to 'RecovAm'.

| ID | Stream Summary |
|---|---|
| G-1 | Flue Gas |
| G-2 | Remaining Gases, Ammonia-Rich |
| G-3 | Remaining Gases, Ammonia-Ultra-Lean |
| G-4 | Desorbed $CO_2$ (water vapor rich, pre-condenser) |
| G-5 | Desorbed $CO_2$ (water vapor lean, post-condenser) |
| G-6 | Desorbed $CO_2$ (ammonia-free) |
| LL-1 | Two Liquid Phase Mixture Resulting from Endothermic Mixing |
| L-1 | $CO_2$ Lean Aqueous Ammonia - Carbon Dioxide |
| L-2 | Large MW Reagent - Lean Concentration Organic Phase |
| L-3 | $CO_2$ Rich Aqueous Ammonia - Carbon Dioxide |
| L-4 | L-3 with Ammonia Return Stream Added |
| L-5 | L-2 Pressurized (Post Pump, comprises NF Feed) |
| L-6 | NF Retentate - Large MW Reagent - Rich Concentration Organic Phase |
| L-7 | NF Permeate - Low MW Reagent - Rich Organic Phase |
| L-8 | L-6 Pre-Heated (Post Cross Exchanger [HE-1]) |
| L-9 | L-4 Pre-Heated (Post Cross Exchanger [HE-1]) |
| L-10 | $CO_2$ Rich Combined Single Liquid Phase Solution Comprising Organic Phase Dissolved in $CO_2$- Rich Aqueous Ammonia |
| L-11 | Condensed Vapors in Condenser |
| L-12 | $CO_2$ Lean Solution to Cross Exchanger |
| L-13 | Pre-Cooled L-12 (Post-Cross Exchanger [HE-1]) |

Example FIG. 34 Key (Above)

FIG. 38A Example Step-by-Step Description:

Gas Absorption: A desired gas in a desired gas laden gas stream (G-1) may be absorbed in a desired gas-lean single liquid phase combined solution (L-1), which may result in the formation of a desired gas-rich single liquid phase combined solution (L-2) and desired gas lean or practically free gas stream (G-2).

Mix #1 Phase Transition: Desired gas-rich single liquid phase combined solution (L-2), which may comprise Large MW Reagent—Rich organic phase dissolved in an aqueous solution, may be mixed (Mix #1) with permeate comprising Low MW Reagent (L-7), which may result in a phase transition into multi-liquid phase or biphasic liquid mixture (LL-1). Said phase transition may be endothermic or exothermic.

Liquid-Liquid Separation: LL-1 may be separated, for example, at least in part, into its constituent liquid phases, which may comprising a Large MW Reagent—Lean organic phase (L-5) and a desired gas rich aqueous phase (L-4), using, for example one or more multi-liquid phase separation devices (for example, which may include, but are not limited to, decanter or coalescer or a combination thereof).

Desired Gas Desorption: L-4 may be cross heat exchanged with liquid exiting the desorber (L-11), which may result in a preheated desired gas rich aqueous phase (L-9). L-9 may enter a desorber, where desired gas may be desorbed (G-3), which may result in the forming a desired gas lean aqueous phase (L-11). If the desired gas comprises a non-condensable desired gas (for example: $CO_2$), it may be desirable to condense condensable gases, such as, for example, water or ammonia, in the condenser. G-4 may comprise at least partially separated desired gas.

Note: If, for example, the desired gas is condensable or separable as a liquid (for example: water or volatile organic compound), it may be desirable to separate said desired gas using a membrane-based process (for example: reverse osmosis or nanofiltration or a combination thereof) rather than or in addition to desorption or distillation.

Organic Solvent Nanofiltration: L-5 may be pressurized using a pump (Pump, L-6). L-6 may function as a pressurized Large MW Reagent Lean feed solution to an organic solvent nanofiltration unit (NF). NF may separate L-6 into a Large MW Reagent Rich retentate solution (L-8) and a permeate stream comprising Low MW Reagent (L-7).

Organic Phase-Aqueous Phase Dissolution: L-11 may be heat exchanged in a cross exchanger (RE-1), which may result in a pre-cooled stream of the same composition L-12. L-12 may be mixed (Mix #2) with L-8, which may result in dissolution and formation of a combined, desired gas lean single liquid phase solution L-1. Said dissolution may be exothermic or endothermic.

| ID | Stream Summary |
|---|---|
| G-1 | Desired Gas Laden Gas Stream |
| G-2 | Remaining Gases |
| G-3 | Desorbed Desired Gas |
| G-4 | Desorbed Desired Gas (post condenser, if a portion of vapors need to be condensed) |
| L-1 | Desired Gas - Lean Combined Single Liquid Phase Solution |
| L-2 | Desired Gas - Rich Combined Single Liquid Phase Solution |
| LL-1 | Multi-Liquid Phase Mixture Comprising a Liquid Phase Rich in Desired Gas and a Liquid Phase Lean in Desired Gas (one liquid phase may be an organic phase and only liquid phase may be an aqueous phase) |
| L-3 | Desired Gas Rich Aqueous Phase |
| L-4 | Large MW Reagent Lean Organic Phase |
| L-5 | L-4 Pressurized (Post Pump, comprises NF Feed) |
| L-6 | NF Permeate - Comprises Low MW Reagent |
| L-7 | NF Retentate - Large MW Reagent - Rich |
| L-8 | L-3 Pre-Heated (Post Cross Exchanger [HE-1]) |
| L-9 | Condensed Liquid from Condenser (if the gas stream requires condensation of non-desired gases) |

-continued

| ID | Stream Summary |
|---|---|
| L-10 | Desired Gas Rich Aqueous Phase |
| L-11 | L-10 Post-Heat Exchanger, Pre-Cooled |

FIG. 39 Example Step-by-Step Description

Desired Gas Absorption: Desired gas in a desired gas laden gas stream (G-1) may be absorbed into a desired gas lean combined solution (L-1), which may result in the formation of a desired gas rich combined solution (L-2) and may result in desired gas lean remaining gases (G-2). It may be noted said combined solution may comprise an aqueous phase rich in CST reagent dissolved with an organic phase comprising 'low solubility reagent'.

Permeate Addition and Mixing Phase Transition: Permeate solution (L-6), which may comprise mostly water, may be mixed (Mix #1) with L-2, which may result in the formation of a multi-liquid phase mixture (LL-1). Said multi-liquid phase mixture may comprise an aqueous phase which may be lean in CST reagent and an organic phase which may be rich in desired gas.

Liquid-Liquid Separation: LL-1 may be separated using one or more or a combination of liquid-liquid separation devices into, at least in part, its constituent liquid phases, which may include, for example, an aqueous phase which may be lean in CST reagent (L-4) and an organic phase which may be rich in desired gas (L-3).

Desorption or Distillation: L-3 may be cross exchanged in a heat exchanger (RE-1) with, for example, solution exiting the desorber or distillation unit, which may result in a solution of the same composition as L-3 except at a higher temperature (L-8). Desired gas may be desorbed or distilled from L-8, which may result in the formation of desired gas liquid (L-9) or desired gas output as a gas, and may also result in an organic phase lean in desired gas (L-10). L-10 may be passed though a heat exchanger (RE-1) to, for example, cool L-10 and pre-heat L-3. Cooled L-10 (which may undergo further cooling after the cross exchanger) may be labeled as L-11.

Membrane Based Process Concentrating: L-4 may be pumped to form a high pressure liquid stream of the same composition as L-4 (L-5). L-5 may be employed as a feed solution into one or more membrane based separation units (for example: Nanofiltration or NF), which may result in the formation of a retentate stream comprising a higher concentration (e.g. rich concentration) of CST reagent (L-7) and may result in a permeate stream (L-6), which may comprise mostly water.

Mixing Organic and Aqueous Phases for Combined Dissolution: L-7 and L-11 may be mixed (Mix #2) which may result in the formation of a combined single liquid phase desired gas lean solution (L-1). L-7, which may comprise aqueous phase, and L-11, which may comprise organic phase, may be soluble or mutually soluble because, for example, the concentration of CST reagent in L-7 is greater than in L-4 and/or the lower concentration of desired gas relative to LL-1.

FIG. 41 Example Step-by-Step Description

Note: Alternatively, L-11 may be recycled to Mix #2 instead of or in addition to recycling a portion of L-7 (e.g. instead of L-8). This may be more energetically favorable as membrane permeate may not need to be recirculated (an thus pass through a membrane again).

Desired Gas Absorption: Desired gas in a desired gas laden gas stream (G-1) may be absorbed into a desired gas lean combined solution (L-1), which may result in the formation of a desired gas rich combined solution (L-2) and may result in desired gas lean remaining gases (G-2). It may be noted said combined solution may comprise an aqueous phase rich in CST reagent dissolved with an organic phase comprising 'low solubility reagent'. Said phase rich in CST reagent may become more dilute in CST reagent during, for example, absorption or forward osmosis (if the absorption step is, for example, replaced with a forward osmosis unit).

Permeate Addition and Mixing Phase Transition: A portion of permeate solution (L-8), which may comprise mostly water and may contain residual 'Low Solubility Reagent', may be mixed (Mix #2) with L-2, which may result in the formation of a multi-liquid phase mixture (LL-1). Said multi-liquid phase mixture may comprise an aqueous phase which may be lean in CST reagent and an organic phase which may be rich in desired gas.

Liquid-Liquid Separation: LL-1 may be separated using one or more or a combination of liquid-liquid separation devices into, at least in part, its constituent liquid phases, which may include, for example, an aqueous phase which may be lean in CST reagent and may be rich in desired gas (L-4) and an organic phase (which may comprise mostly 'low solubility reagent') (L-3).

CST Reagent Concentrating: L-4 may be pumped to form a high pressure liquid stream of the same composition as L-4 (L-5). L-5 may be employed as a feed solution into one or more membrane based separation units (for example: Nanofiltration or NF), which may result in the formation of a retentate stream comprising a higher concentration (e.g. rich concentration) of CST reagent (L-6) and may result in a permeate stream (L-7), which may comprise mostly water and residual 'Low Solubility Reagent'.

Residual Removal Concentrating: L-7 may be split into two streams, one stream which may be recycled and mixed internally with Mix #2 (L-8) and another stream which may be transferred to further concentrating Remaining L-7 (L-9) may be pumped to form a high pressure liquid stream of the same composition as L-9 (L-10). L-10 may be employed as a feed solution to a reverse osmosis unit, which may result in the formation of a retentate stream (L-11), which may be rich in residual 'low solubility reagent', or any salts which may be employed, and/or water and may result in the formation of a permeate stream, which may comprise mostly or near pure water or desired gas (L-12).

Mixing Organic and Aqueous Phase Retentate Solutions: L-3 and/or L-6 and/or L-11 may be mixed (Mix #1) which may result in the formation of a combined single liquid phase desired gas lean solution (L-1). L-6, which may comprise aqueous phase rich in CST reagent, and L-3, which may comprise mostly low solubility reagent organic phase, and L-11, which may comprise residual low solubility reagent in an aqueous solution (which may be a single liquid phase or may be two or more liquid phases) may be soluble or mutually soluble because, for example, the concentration of CST reagent in L-6 may be greater than in L-4 and/or the lower concentration of desired gas relative to LL-1.

Example Notes

Note: Ammonia may be provided as an example absorbent reagent. Other absorbent reagents may be employed in addition to or instead of ammonia. Other absorbent reagents may include, but are not limited to, one or more or a combination of the following: amines, alkalis, alkaline earths, $CO_2$ capture absorbents, acid gas absorbents, or absorbents, other absorbents described herein, or other absorbents described in the art.

Note: Embodiments may absorb using a membrane contactor and/or a vapor gap membrane. For example, an ammonia laden waste water stream may be passed through a vapor gas membrane, and ammonia may be recovered from said ammonia laden waste water stream by forming an ammonia vapor phase in the vapor gas membrane, which may be, for example, at least in part absorbed by an absorption solution.

Note: A gas or gas absorbed in the process may comprise, including, but not limited to, one or more or a combination of the following: an at least partially soluble gas, an acid gas, or a basic gas.

Note: Gases separated using the present invention may include any gas which may be at least partially soluble in a liquid or partially condensable. Gases may include, but are not limited to, acid gases, basic gases, inert gases, condensable gases, or a combination thereof.

Note: It is notable that in some embodiments, the heat pump may be reversed to form a heat engine. In heat engine embodiments, for example, one or more devices that may be otherwise employed in phase transition temperature adjustment or separations may be reversed or developed into reverse versions of said devices. For example, the a membrane separation stages may be transformed into energy generation stages, which generate electricity using, for example, Pressure Retarded Osmosis or Reverse Electrodialysis, and/or provide useful work, such as forward osmosis desalination.

Note: $CO_2$ may be provided as an example desired gas.

Note: Phase transition temperature or concentration may be or may also be adjusted by adjusting the concentration of one or more additive reagents. Additives or additive reagents may include, but are not limited to, residual organic compounds, residual salts, residual inorganic compounds, residual reagents, or other reagents which at a relatively low concentration (for example: less than 15 wt %) have a significant influence on the LCST or UCST or phase transition temperature or liquid phase distribution or layering properties or phase separation properties or distribution of reagents in liquid phases or a combination thereof.

Note: Membrane based process energy recovery devices and other methods for improving efficiency or reducing cost of separations or membrane based separations known in the art may be employed.

Note: Phase transition temperature or phase transition properties may also be adjusted by adjusting the concentration of one or more reagents in an aqueous phase. For example, by increasing the concentration of one or more reagents in an aqueous phase, the solubility of a mostly organic phase may become soluble or may become more soluble or may become less soluble or may become insoluble. For example, by increasing the concentration of a salt in an aqueous solution, an organic phase may become less soluble or the phase transition temperature may be increased (for example: UCST) or decreased (for example: LCST). For example, by increasing the concentration of an organic compound (which may be soluble independently in an aqueous phase) in an aqueous solution, an organic phase may become more soluble or the phase transition temperature may be decreased (for example: UCST) or increased (for example: LCST). For example, by decreasing or diluting the concentration of a salt in an aqueous solution, an organic phase may become more soluble or the phase transition temperature may be decreased (for example: UCST) or increased (for example: LCST). For example, by decreasing or diluting the concentration of an organic compound (which may be soluble independently in an organic phase) in an aqueous solution, an organic phase may become less soluble or the phase transition temperature may be increased (for example: UCST) or decreased (for example: LCST).

Note: Triethylamine LCST

Note: The present invention may be employed to separate or recover ammonia. For example, FIG. 5A may be employed to separation ammonia from gas streams. For example, the partial pressure of ammonia may be lower in the absorption solution of FIG. 5A, due to, for example, the lower concentration of ammonia resulting from, for example, the dissolved organic phase. The partial pressure or concentration of ammonia may be increased following absorption by phase transitioning the solution into an organic phase and an aqueous phase, of which the aqueous phase may contain a higher concentration of ammonia.

Note: The present invention may be employed to separate or recover water from, for example, gas or liquid streams. For example, FIG. 5A may be employed to separation water vapor from gas streams. For example, the partial pressure of water vapor may be lower in the absorption solution of FIG. 5A, due to, for example, the lower concentration of water resulting from, for example, the dissolved organic phase. The partial pressure or concentration of water may be increased following absorption by phase transitioning the solution into an organic phase and an aqueous phase, of which the aqueous phase may contain a higher concentration of water. Alternatively, water may be, for example, at least in part, separated from the aqueous phase using a membrane-based process, such as reverse osmosis or nanofiltration.

Additional Definitions

The upper or lower critical solution temperature may also be referred to as a liquid-liquid phase transition temperature range which is generally the point at which a liquid system undergoes a change such as a change in the composition of a phase and/or number of phases, which may also be referred to as switching, e.g., thermal switching, or a transition, e.g., liquid phase transition, or phase change, e.g., liquid phase change, or clouding-out, e.g. the solution clouding-out, or a combination thereof. A UCST phase transition into two or more liquid phases may also be referred to as a 'cooling' liquid-liquid phase transition temperature range or UCST ranges or liquid-liquid phase transition temperature range temperature range or phase transition temperature range. A LCST phase transition into two or more liquid phases may also be referred to as a 'heating' liquid-liquid phase transition temperature range or liquid-liquid phase transition temperature range temperature range or phase transition temperature range. Alternatively, phase transition solutions may be referred to as solutions exhibiting 'condition sensitive solubility change' or 'phase transition temperature'. 2) A liquid mixture with more than one liquid phase may be referred to as, including, but not limited to, a multiphasic liquid solution, multiphase liquid solution, multiphase solution, multi-liquid phase solution, biphasic solution, a 'cloudy' solution, multiphasic liquid mixture, multiphase mixture, multiphase liquid mixture, a multi-liquid phase mixture, biphasic mixture, biphasic liquid mixture, bilayer mixture, multilayer mixture, multi-liquid phase state, multiphase liquid state, or a combination thereof 3) The dissolution of one or more liquid phases in one or more other liquid phases to form a combined single liquid phase solution or a solution with a different number or composition or both of liquid phases may be referred to as 'combining' or 'dissolution' or 'mutually dissolve' or 'dissolve' or 'combine' or 'mixing.' 4) The mixture of two or more separate liquid phases may also occur without or with minimal dissolution of the liquid phases, which may be referred to as 'mixing' or 'combining' or 'merging' or forming one or more of the example descriptors in '2)'. 5) Physical absorbents, media which absorbs one or more gases via physical phenomena or physical interactions, may be referred to as a physical solvent, solvent, physical absorbent solvent, liquid, or a combination thereof. 6) A 'desired gas' may comprise, for example, a gas is desired to dissolve in the physical solvent or a gas that is desired to be separated from one or more other gases. In some instances, one or more dissolved gases may comprise the desired gas or gases. 7) Separation of one or more liquid phases from one or more other liquid phases in a mixture comprising two or more liquid phases may be referred to as, including, but not limited to, liquid-liquid separation, or separation of liquid phases, or liquid phase separation, phase separation, separating said liquid phases, or a combination thereof. 8) 'Permeate' or permeate liquid may comprise liquid which passes through one or more semi-permeable membranes or was not or was minimally rejected by one or more semipermeable membranes. 'Permeate equivalent liquid' or liquid equivalent to permeate may comprise a liquid with similar composition or characteristics to one or more permeate liquids, however may not have originated, in whole or in part, from a permeate solution resulting from the separation of one or more or a combination of reagents in a liquid system using a semipermeable membrane. 9) 'CST Reagent', 'UCST Reagent' or 'UCST Forming Reagent', 'LCST Forming Reagent' or 'LCST reagent': May comprise A) a reagent which exhibits decreasing osmotic pressure with increasing temperature in a solution consisting of water and said CST reagent, B) a reagent which possesses greater affinity for said low solubility reagent relative to water with increasing temperature, C) a reagent which is soluble in solvent or water under certain conditions, D) one or more combinations of A to D.

'LCST binder reagent': Although all LCST reducing reagents may reduce LCST of one or more liquid systems with increasing concentration of the LCST reducing reagent, not all reagents which reduce LCST may be considered LCST reducing reagents. An 'LCST reducing reagent' may be more soluble in one or more 'LCST reagent solvents' than one or more 'LCST reagents'. On the other hand, reagents which may decrease LCST with increasing concentration and may be more soluble or appreciably more soluble in the one or more 'LCST reagents' than one or more 'LCST reagent solvents', may be classified as a 'LCST binder reagent'.

For example, given an example liquid system comprising polypropylene glycol 425 (PPG 425), propylene carbonate, water, and 5 wt % sodium chloride: PPG 425 may be classified as an 'LCST reagent', 'Propylene Carbonate' may be classified as a 'LCST binder reagent', water may be classified as a 'LCST reagent solvent', and sodium chloride may be classified as a 'LCST reducing reagent'. PPG 425 may be classified as a LCST reagent, as, for example, in a solution water and sodium chloride in, it may form a LCST phase transition. Propylene Carbonate may be classified as a 'LCST binder reagent' as, for example, it may predominantly dissolve in a phase more concentrated in PPG 425 in a LCST phase transition where PPG 425 is the LCST reagent. Additionally, for example, in a mixture of water only (water comprising an example LCST reagent solvent) or water and sodium chloride only, propylene carbonate may lack a LCST phase transition. Water may be classified as an 'LCST reagent solvent' as, for example, the 'LCST reagent' may form a LCST phase transition in a solution comprising LCST reagent dissolved in water. Sodium chloride may be classified as a 'LCST reducing reagent' as, for example, sodium chloride may be more soluble in the 'LCST reagent solvent' than the 'LCST reagent'. Additionally, for example, in a mixture of water only (water comprising an example LCST reagent solvent) or water and sodium chloride only, sodium chloride may lack a LCST phase transition.

'UCST solvent': A reagent which may dissolve 'CST reagent' and may exhibit limited solubility in 'Low solubility reagent'.

'CST Reagent': A reagent which may enable 'low solubility reagent' to be nearly or completely soluble in UCST solvent reagent under certain temperatures and/or other conditions and insoluble or only partially soluble under certain different temperatures and/or other conditions. Increasing the concentration of CST reagent may, for example, decrease UCST.

'Low solubility reagent': A reagent which may possess low solubility in a solvent alone, or relatively high solubility in 'CST reagent', or may exhibit complete solubility in solvent in the presence of CST reagent above one or more concentrations and/or at certain temperatures and/or other conditions, or a combination thereof.

'High solubility reagent': A reagent which may possess high solubility in UCST solvent alone, or high solubility in 'CST Reagent', or high solubility in 'low solubility reagent', or a combination thereof. High solubility reagent may, for example, decrease UCST and/or influence other phase transition properties in the liquid system.

'UCST increasing reagent': A reagent which may possess high solubility in UCST solvent alone, or low solubility in 'CST reagent' alone, or low solubility in 'Low solubility reagent' alone, or a combination thereof. Low solubility reagent may, for example, increase UCST and/or influence other phase transition properties in the liquid system.

Solvents, UCST solvents, LCST solvents, UCST solvent reagent, LCST solvent reagent: May comprise a reagents which may dissolve CST reagent, which may comprise, for example, including, but not limited to, water or ammonia.

Miscible solubility or substantially miscible solubility or miscible may defined as a composition, which may be at specific temperatures or other conditions, which comprises a single liquid phase combined solution. For example, a low solubility reagent may be miscible or substantially miscible in a UCST solvent and CST reagent solution above a UCST, meaning a specific or defined amount of low solubility reagent or a liquid phase comprising mostly low solubility reagent may form a single liquid phase solution at these conditions. Miscible solubility or substantially miscible solubility or miscible may not mean miscible in a proportions and temperatures, as, for example, a low solubility reagent may not be miscible in a proportions and temperatures in a UCST system.

Substantially miscible or miscible may be defined as a one or more or a combination of reagents which, when combined at specific temperatures or other conditions, form a liquid stream with at least 90% of the total mass of said reagents in a combined single liquid phase.

Substantially Insoluble:
  solubility less than 30 wt %, or 20 wt %, or 10 wt %
  solubility less than 30 wt % and solubility greater than 70 wt %, or 80 wt %, or 90 wt %
  maximum solubility less than 100 wt %, or 90 wt %, or 80 wt %, or 70 wt %, or 60 wt %, or 50 wt %, or 40 wt %, or 30 wt %, or 20 wt %, or 10 wt %

Limited solubility or Low Water Solubility:
  solubility less than 50 wt %, or less than 40 wt %, or less than 30 wt %, or 20 wt %, or 10 wt %
  solubility less than 30 wt % and solubility greater than 70 wt %, or 80 wt %, or 90 wt %
  maximum solubility less than 100 wt %, or 90 wt %, or 80 wt %, or 70 wt %, or 60 wt %, or 50 wt %, or 40 wt %, or 30 wt %, or 20 wt %, or 10 wt %

LCST binder reagents may follow the CST reagent—if the CST reagent is predominately dissolved in water, the binder reagent may predominately dissolve in water. If the CST reagent is predominately a separate liquid phase from water, the binder reagent may be predominately dissolved in said separate liquid phase containing predominately CST reagent.

A 'Low solubility reagent' may not always be in the liquid phase containing the relative greatest amount or most of the CST reagent. For example, given a UCST liquid system comprising 'Low solubility reagent', UCST solvent, and CST reagent, the 'Low solubility reagent' may substantially form a liquid phase containing mostly low solubility reagent below a UCST and may form a combined single liquid phase solution with UCST solvent and CST reagent above a UCST. Said liquid phase containing mostly low solubility reagent may contain the minority amount of CST reagent, while another liquid phase comprising CST reagent and UCST solvent may contain most of the CST reagent in the liquid system.

Note: Depending on the CST reagent and liquid system composition, increasing the concentration of CST reagent beyond a certain concentration relative to 'Low solubility reagent' and/or one or more other reagents may transition the liquid system from liquid system possessing an UCST into a liquid system possessing a LCST. Said transition may be exploited in one or more refrigeration cycles or heating cooling transfer systems or extractions or heat engines or one or more applications described herein.

Other Notes:
Note: Adjusted may be a synonym to, including, but not limited to, tuned, tailored, change,
Note: 'CST reagent' may also refer to 'UCST reagent'
Note: A 'low solubility reagent' may exhibit substantial or miscible solubility in a solution above one or more temperatures and limited solubility or immiscible solubility below one or more of said temperatures.
Note: One or more reagents may be 'refrigerants'. Refrigerants in the context of embodiments with evaporators and absorbers may comprise reagents with relatively low boiling point or relatively high vapor pressure. Refrigerants may exhibit properties of, for example, 'low solubility reagents.'
Note: Nanofiltration (NF) and Reverse Osmosis (RO) are provided as example membrane based processes in the figures. Other membrane based processes or membrane based separation devices may be employed instead or in addition to NF or RO.
Note: Example summaries of other example embodiments, which may include, but are no limited to the following:
  Datacenter cooling transfer using UCST phase change liquids and liquid-liquid separation
  Datacenter cooling transfer using LCST phase change liquids and combined two-phase liquid (without liquid-liquid separation)
  Datacenter cooling transfer using LCST phase change liquids and combined two-phase liquid with evaporative cooling
  Power Plant Condenser Cooling using LCST phase change liquids with Liquid-Liquid Separation
  Power Plant Condenser Cooling using LCST phase change liquids and combined two-phase liquid with evaporative cooling
  Power Plant Condenser Cooling using UCST phase change liquids with Liquid-Liquid Separation
  Power Plant Condenser Cooling using UCST solubility change liquids and combined two-phase liquid with evaporative cooling
  Employing LCST solubility change liquids as an electronic coolant or high power electronic coolant
Note: A CST reagent+refrigerant solution from which refrigerant is evaporated and the remaining residuals (which may be residual CST reagent) are mixed with the absorption solution
Note: One or more embodiments may further comprise or employ one or more stages for evaporative cooling
Note: Applicable to, for example, indirect and/or direct cooling
Note: CST reagents may include CST reagents. CST reagents may also refer to reagents which enable or result in a solution exhibiting one or more LCST or UCST. For example, an example compound which may be referred to as an example 'CST reagent' in the present document, although is not necessarily a polymer according to conventional definitions, may be, including, but not limited to, Propylene Glycol n-Propyl Ether (PnP). CST reagents may exhibit or enable liquid phase transition properties in an aqueous solution. A CST reagent may comprise one or more reagents which exhibit or enable one or more liquid phase transition properties in a solution. CST reagents may also refer to one or more reagents which may decrease UCST with increasing concentration, which may involve a limited concentration range.

Example Composition
Water ('UCST Solvent')
Propylene Carbonate ('Low Solubility Reagent')
Polypropylene Glycol 425 ('CST reagent')
Methyl tert-butyl ether or MTBE ('Desired Gas')

Compositions, Temperatures, Pressures, and Other Parameters:
  Example 'CST reagents', or 'LCST Reagents', or 'UCST reagents', or 'UCST drivers', 'Large MW Reagents', 'Low MW Reagents', 'or organic reagents' may include, but are not limited to, one or more or a combination of the following: Polyethylene Glycol Dimethyl Ether, Polyethylene Glycol Monomethyl Ether, Dipropylene Glycol n-Butyl Ether (DPnB), Tri(propylene glycol) butyl ether mixture of isomers (TPnB), Propylene glycol n-butyl ether (PnB), Dipropylene Glycol n-Propyl Ether (DPnP), Diethylene Glycol Monohexyl Ether (D-Hex n-hexyl ether), Propylene glycol propyl ether (PnP), 2-Butoxyethanol (EB Butyl Glycol), PPG 425, PPG 725, PPG 1000, PPG, PPG with a molecular weight greater than 1000, PEGDME 250, PEGDME 500, PEGDME with a molecular weight greater than 500, PEGMME 350, PEGMME 550, PEGMME 750, PEGMME with a molecular weight greater than 550, PEG, PEG with a molecular weight greater than 1000, PEG 1000, PEG 600, PEG 400, PEG 200, ionic liquids.

It may be important to note Large MW reagent and Low MW reagent may be differentiated by, including, but not limited, in one or more or a combination of ways: 1) Large MW reagent has a relatively larger molar mass or effective molecular weight than Low MW reagent; 2) Large MW reagent may be independently soluble or miscible in the aqueous phase solution, while, independently, Low MW reagent may be insoluble or only partially soluble in the aqueous phase solution at the same temperature as Large MW reagent may be soluble or miscible.

Example 'LCST binding reagents', or 'LCST binder reagents', or 'Low Solubility Reagents' or 'Low MW Reagent' may include, but are not limited to, one or more or a combination of the following: 2-Butoxyethanol, Propylene Glycol n-Propyl Ether, Triacetin Ethylene Glycol Diacetate, Propylene Glycol Diacetate, Dipropylene Glycol Dimethyl Ether (DPE), 2-Heptanone, Propylene glycol monomethyl ether acetate, Propylene Carbonate, Cyclohexanone, 1-Octanol, Dipropylene Glycol Methyl Ether Acetate, 1-MethyL-2-pyrrolidinone, Ethylene glycol monohexyl ether, Acetal (1,1-Diethoxyethane), Isoamyl acetate, Dibutyl ether, m-Xylene, Isopropyl acetate, Dimethyl carbonate, Butanone, Methyl tert-butyl ether (MTBE), o-Xylene, Acetylacetone, P-Xylene, Methyl Isobutyl Ketone, Toluene, 3-Pentanone, Propyl acetate, Ethylene glycol monopropyl ether, 2-Methoxyethyl acetate, 5-MethyL-2-hexanone, 4-MethyL-2-pentanone, 3-Pentanone, 2-Pentanone, 2-methyl tetrahydrofuran The UCST liquid systems described herein may include compositions that possess a UCST temperature that is adjustable or tunable to any temperature from −20-1000° C.

The LCST liquid systems introduced herein may include compositions that possess a LCST temperature that is adjustable or tunable to any temperature from −20-1000° C.

UCST liquid system compositions include, but are not limited to, one or more or a combination of the following: water, organic solvent, polymer, glycol, carbonate, carbonate ester, ester, ether, diol, lactam, protic solvents, aprotic solvents, amide, alcohol, fluorinated compound, halogenated compound, hydrocarbon, organic polymer, alkylene glycol, alkylene carbonate, polyol, urea, ionic liquid, imine, amine, amide, imide, azide, azine, acrylamide, acrylic, carboxylic acid, ketone, aldehydes, alkaloids, halides, carbonyl, nitrile, acetyl, peroxide, ionic compounds, epoxide, thioester, acetal, alkane, alkene, alkyne, haloalkane, hydroperoxide, methoxy, Carboxylate, cyanate, nirate, nitrite, nitroso, oximine, carbamate, pyridine, organic sulfur compound, organic phosphorous compound, boron, boron containing compound, inorganic chemical, inorganic compound, enol LCST reagent compositions include, but are not limited to, one or more or a combination of the following: water, organic solvent, polymer, glycol, carbonate, carbonate ester, ester, ether, diol, lactam, protic solvents, aprotic solvents, amide, alcohol, fluorinated compound, halogenated compound, hydrocarbon, organic polymer, alkylene glycol, alkylene carbonate, polyol, urea, ionic liquid, imine, amine, amide, imide, azide, azine, acrylamide, acrylic, carboxylic acid, ketone, aldehydes, alkaloids, halides, carbonyl, nitrile, acetyl, peroxide, ionic compounds, epoxide, thioester, acetal, alkane, alkene, alkyne, haloalkane, hydroperoxide, methoxy, Carboxylate, cyanate, nirate, nitrite, nitroso, oximine, carbamate, pyridine, organic sulfur compound, organic phosphorous compound, boron, boron containing compound, inorganic chemical, inorganic compound, enol Viscosity is greater than, equal to, or less than 100,000 cP, or 10,000 cP, or 1,000 cP, or 500 cP, or 100 cP, or 50 cP, or 40 cP, or 30 cP, or 20 cP, or 10 cP, or 9 cP, or 8 cP, or 7 cP, or 6 cP, or 5 cP, or 4 cP, or 3 cP, or 2 cP, or 1 cP or 0.5 cP, or combination thereof.

Cooling Inputs or Sources include, but are not limited to, one or more or a combination of the following: thermocline water body, thermocline liquid body, water body, cold liquid body, evaporative cooling, heat pump cooling, air cooling, heat exchange with enthalpy source, cyrogenic cooling, LNG gasification, pressure reduction, cold surface, radiative cooling, endothothermic phase change Heating Inputs or Sources include, but are not limited to, one or more or a combination of the following: Combustion, Waste Heat, Ambient Temperature Changes, Diurnal Temperature Variation, Thermocline liquid body, thermocline solid body, thermocline gaseous body, Thermocline of a water body, halocline, heat pump, solar thermal, solar thermal pond, light, electricity, nuclear, steam, combustion, compression, pressure increase, geothermal, radiative heat, condensation, exothermic dissolution, exothermic precipitation, exothermic formation of more liquid phases, exothermic formation of less liquid phases, exothermic phase change, or other heat sources described herein.

Temperatures: temperatures of operation are greater than, less than, or equal to or a combination thereof include, but are not limited to, one or more or a combination of the following: −100° C., or −90° C., or −80° C., or −70° C., or −60° C., or −50° C., or −40° C., or −30° C., or −20° C., or −10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Mass percentages of one or more components comprise greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Relative mass distribution of one or more liquid phases may include, but is not limited to, greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%. Separation Devices may include, but are not limited to, one or more or a combination of the following: decanter, separatory funnel, coalescer, centrifuge, filter, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, or hybrid systems Depth reached by workings fluids, including, but not limited to, working fluids possessing an UCST or LCST, recovering cool or heat or enthalpy or entropy or combination thereof from water body or other liquid body thermocline to recover cool or heat may include, but are not limited to, one or more or a combination of the following: depths in the range of 0 to 15,000 meters, depths in the range of 0 to 1,000,000 meters; less than, equal to, or greater than 10 meters, or 20 meters, or 50 meters, or 100 meters, or 250 meters, or 500 meters, or 1000 meters Applications may include, but are not limited to, one or more or a combination of the following: refrigeration, heat pump, chilling, chiller, HVAC chiller, cool transfer, heat transfer, radiative heating, radiative cooling, osmotic heat engine, geothermal heat transfer, ground source heat pump, geothermal cooling, geothermal heating, food & beverage production, industrial cooling, industrial heating, district heat, power generation, power plant cooling, transportation cooling, transportation heating, space heating, space cooling, HVAC, mine cooling, electric vehicle cooling, internal combustion engine cooling, building cooling, reactor cooling, reactor jacket cooling, nuclear cooling, nuclear reactor cooling, generating electricity from small temperature differences, generating electricity from relatively larger temperature differences, generating power from temperature differences, transferring heat or cool long distances, data center cooling, extractions, gas separations, separations, protein extractions, protein separations The compositions discussed herein may be expected to find numerous applications outside of heat or cooling transfer or energy generation. Example applications may include, but are not limited to, one or more or a combination of the following: drug delivery systems, drug delivery systems where solid carriers dissolve upon heating or cooling, biocompatible applications, diagnostic or sensor devices, diagnostic or sensor devices wherein the presence of one or more analytes results in the phase separation/mixing triggered by a certain analyte, low tech thermometers, sensors which form more or less layers or change colors above or below one or more specific temperatures, thermometers, temperature probes, temperature sensors, humidifiers, humidifiers or water evaporators or water absorbers, humidifiers, humidifiers or water evaporators or water absorbers wherein one or more liquid phases has a different water vapor pressure than other liquid phases or combined solution, cold or heat storage in packaging, reusable hot or cold packs, carriers for one or more types of catalysts, transportation of fuels, transportation of gases, transportation of liquids, reversible transport of reagents.

Reagents or compositions may involve multiple phases or properties, which may include, but are not limited to, Gas, Liquid, aqueous, solid, dissolved, one or more ionic species or forms, one or more liquid phase species, biphasic mixture, multiphasic mixture, multiphasic mixture comprising liquids, solid mixture, supercritical, hydrate, triple-point, or combination thereof.

Reagents or compositions may include, but are not limited to, one or more or a combination of the following: compound containing carbon, compound containing hydrogen, compound containing oxygen, compound containing nitrogen, compound containing sulfur, saturated hydrocarbon, unsaturated hydrocarbon, cyclic hydrocarbon, cyclo hydrocarbon, aromatic hydrocarbon, alkane, alkene, alkyne, cycloalkane, alkadiene, polymers, halogenated hydrocarbons, hydrocarbons with one or more functional groups, one or more hydrocarbons in crude oil, one or more different hydrocarbons in crude oil, one or more hydrocarbons in naphtha, one or more hydrocarbons in gasoline, one or more hydrocarbons in diesel, one or more hydrocarbons in heavy oil, one or more hydrocarbons in natural gas, natural gas liquids, one or more hydrocarbons in kerosene, organic solvents, light hydrocarbons, heavy hydrocarbons, water insoluble hydrocarbons, partially water soluble hydrocarbons, water soluble hydrocarbons, low toxicity hydrocarbons, medium toxicity hydrocarbons, high toxicity hydrocarbons, methane, Ethane, Ethene (ethylene), Ethyne (acetylene), Propane, Propene (propylene), Propyne (methylacetylene), Cyclopropane, Propadiene, Butane, Butene (butylene), Butyne, Cyclobutane, Butadiene, Pentane, Pentene, Pentyne, Cyclopentane, Pentadiene, (piperylene), Hexane, Hexene, Hexyne, Cyclohexane, Hexadiene, Heptane, Heptene, Heptyne, Cycloheptane, Heptadiene, Octane, Octene, Octyne, Cyclooctane, Octadiene, hydrocarbon solution, hydrocarbon containing mixture, amino acids Membrane—Based Separation may comprise one or a combination of the following: Nanofiltration, Organic Solvent Nanofiltration, Reverse Osmosis, Forward Osmosis, Ultrafiltration, Microfiltration Distillation or evaporations may comprise one or a combination of the following: Batch distillation, Continuous distillation, Simple distillation, Fractional distillation, Steam distillation, Azeotropic distillation, Multi-effect distillation, Multi-stage flash distillation, Flash distillation, Mechanical vapor compression distillation, Membrane distillation, Vacuum distillation, Short path distillation, Zone distillation, Air sensitive distillation Switchable solvent—may comprise one or a combination of the following: Thermally switchable, $CO_2$-switchable, Switchable solvents responsive to other changes to system conditions.

One or more reagents may comprise water, organic solvent, siloxanes, ionic liquids, water soluble polymer, soluble polymer, glycol, polyethylene glycol, polypropylene glycol, ethers, glycol ethers, glycol ether esters, triglyme, polyethylene glycol-propylene glycol block polymers, polyethylene glycol-polypropylene glycol block polymers, polyethylene glycols of multiple geometries, including, branched polyethylene glycols, star polyethylene glycols, comb polyethylene glycols, methoxypolyethylene glycol, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a reagent with a vapor pressure less than 0.01 atm at 20° C., soluble reagents with a molecular weight greater than 80 daltons, volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a reagent with a vapor pressure greater than 0.01 atm at 20° C., or a mixture thereof.

One or more reagents may comprise water, ammonia, ammonium, amine, azine, amino ethyl ethanol amine, 2-amino-2-methylpropan-1-ol (AMP), MDEA, MEA, primary amine, secondary amine, tertiary amine, low molecular weight primary or secondary amine, metaL-ammine complex, metaL-ammonia complex, metaL-ammonium complex, sterically hindered amine, imines, azines, piperazine, alkali metal, lithium, sodium, potassium, rubidium, caesium, alkaline earth metal, calcium, magnesium, ionic liquid, thermally switchable compounds, $CO_2$ switchable compounds, enzymes, metal-organic frameworks, quaternary ammonium, quaternary ammonium cations, quaternary ammonium cations embedded in polymer, or mixtures thereof.

ion exchange, ion exchange membrane, electrodialysis, or removal or replacement of the absorbent and/or $CO_2$ containing solution.

One or more reagents may comprise organic solvent, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, zwitterionic polymers, amino acids, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a reagent with a vapor pressure less than 0.01 atm at 20° C., soluble reagents with a molecular weight greater than 80 daltons, or mixtures thereof.

The membrane may be comprised of any useful material and such useful material may vary depending upon the components to be separated, their molecular weight, viscosity, and/or other properties. Useful membranes may include, for example, membranes comprised of a material selected from a thin film composite; a polyamide; a cellulose acetate; a ceramic membrane; other materials and combinations thereof.

One or more reagents may comprise, for example, one or more or a combination of the following: volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a reagent with a vapor pressure greater than 0.01 atm at 20° C., or a mixture thereof In some embodiments one or more reagents may comprise a thermally switchable reagent, a $CO_2$ switchable reagent, or a non-ionic carbon containing compound.

Chilled, wherein cooling may be conducted by, for example, including, but not limited to, ambient source, water bodies, cooling tower, industrial evaporative chiller, evaporative cooling and other chilling or cooling processes known in the art.

For example, the membranes, evaporators, or other separatin mechanisms may include one or more or a combination of the following: membrane, reverse osmosis, hot reverse osmosis, nanofiltration, organic solvent nanofiltration, hot nanofiltration, ultrafiltration, hot ultrafiltration, microfiltration, filtration, distillation, membrane distillation, multi-effect distillation, mechanical vapor compression distillation, binary distillation, azeotrope distillation, hybrid separation devices, flash distillation, multistage flash distillation, extractive distillation, switchable solvent, LCST phase change, UCST phase change, 'salting-out,' or centrifuge, or combinations thereof.

reagentreagent In some embodiments the membrane may have a molecular weight cutoff of greater than about 80 daltons. That is, the membrane allows passage of a substantial or majority amount of components with a molecular weight or hydration radius of less than about 80 daltons while rejecting a substantial or majority amount of components with a molecular weight of greater than about 80 daltons. In the art, another definition of molecular weight cut-off may refer to the lowest molecular weight solute (in daltons) in which 90% of the solute is retained by the membrane, or the molecular weight of the molecule that is 90% retained by the membrane. Membranes with a molecular weight cutoff of less than 1,000 daltons, or less than 10,000 daltons, or less than 50,000 daltons, or less than 100,000 daltons, or less than 200,000 daltons, or less than 500,000 daltons, or less than 1,000,000 daltons may also be useful depending upon the circumstances and components employed Reagents may include, but are not limited to, water, ammonia, ammonium amine, primary amine, secondary amine, tertiary amine, methyl amine (MEA), methylethanol amine, aminoethylethanolamine, azine, imine, strong base, hydroxide, sodium hydroxide, potassium hydroxide, sodium oxide, potassium oxide, organic solvent, commercial $CO_2$ capture absorbents, quaternary ammonium compound, Selexol, Rectisol, KS-1, UCARSOL, metal-organic framework, solid adsorbent, high surface area compounds, activated carbon, zeolites, carbon nanotubes, graphene, graphene oxide, amine, amino ethyl ethanol amine, 2-Amino-2-methylpropan-1-ol (AMP), MDEA, MEA, primary amine, secondary amine, or tertiary amine, low molecular weight primary or secondary amine, metaL-ammine complex, metaL-ammonia complex, metaL-ammonium complex, sterically hindered amine, imines, azines, piperazine, amine functionalized polymers, alkali metal, lithium, sodium, potassium, rubidium, caesium, alkaline earth metal, calcium, magnesium, cations, ionic liquid, $CO_2$ switchable solvents, $CO_2$ switchable surfactants carbonate, polymer containing amine functional groups, poler containing $CO_2$ reactive functional groups, enzymes, metal-organic frameworks, glycolamine, diglycolamine, piperazine, diethanolamine, diglycolamine, diisopropanolamine, quaternary ammonia or quaternary ammonium cations, or quaternary ammonium cations embedded in polymer, or mixtures thereof.

The concentration of one or more reagents relative to solvent or relative to one or more other reagents may include, but is not limited to, mass % concentrations of less than any of the following: 0.001%, or 0.1%, or 0.5%, or 1%, or 1.5%, or 2%, or 2.5%, or 3%, or 3.5%, or 4%, or 4.5%, or 5%, or 5.5%, or 6%, or 6.5%, or 7%, or 7.5%, or 8%, or 8.5%, or 9%, or 9.5%, or 10%, or 10.5%, or 11%, or 11.5%, or 12%, or 12.5%, or 13%, or 13.5%, or 14%, or 14.5%, or 15%, or 20%, or 30%, or 40%, or 50%, or 60%, or 70%, or 80%, or 90%, or 100%.

Heat sources, may include, but are not limited to, Power Plant (Natural gas, coal, oil, petcoke, biofuel, municipal waste), Waste Water Treatment, Landfill gas, Air, Metal production/refining (such as Iron, Steel, Aluminum, etc.), Glass production, Oil refineries, HVAC, Transportation vehicles (ships, boats, cars, buses, trains, trucks, airplanes), Natural Gas, Biogas, Alcohol fermentation, Volcanic Activity, Decomposing leaves/biomass, Septic tank, Respiration, Manufacturing facilities, Fertilizer production, or Geothermal processes where $CO_2$ (g) releases from a well or wells.

One or more embodiments may be aqueous or non-aqueous. Solvents may include, for example, polar organic solvents, including, but not limited to, ethylene carbonate, propylene carbonate, ethylene glycol, propylene glycol, DMSO, water and acetonitrile or inorganic solvents, such as liquid ammonia or liquid amines and mixtures thereof.

The concentration of one or more reagents may be as a low as 0.000001 M or as great as pure reagent. In molarity terms, the concentration of the one or more reagents may be as low as 0.00001M or less than any of the following: 0.01 M, or 0.05M, or 0.1M, or 0.3M, or 0.5M, or 0.8 M, or 1M, or 1.3M, or 1.5M, or 1.8M, or 2M, or 2.3M, or 2.5M, or 2.8M, or 3M, or 3.3M, or 3.5M, or 3.8M, or 4M, or 5M, or 6M, or 7M, or 8M, or 9M, or 10M, or 12M, or 15M, or 18M, or even pure reagent One or more soluble reagents may be preheated or cooled before, during, or after injection into one or more mixing apparatuses.

Mixing apparatuses and methods may include, but are not limited to, one or more or a combination of the following: batch mixers, continuous stirred-tank reactors, CSTRs, distillation column, packed column, electrospray, spray column, countercurrent spray column, and/or other apparatuses and/or methods. The apparatus may be heated using waste heat or other heat source for, including, but not limited to, promoting gas desorption, promoting gas desorption, reducing viscosity and/or increasing the rate of solvent mixing.

Reagents or streams may include, but is not limited to, one or more or a combination of the following: water, polymers, organic solvents, concentrated soluble reagent solutions, water soluble polymers, combinations of soluble reagents, solvent mixtures, emulsions, pure reagent, pure solvent, aqueous solvent, surfactant containing solvents, zwitterions, solids, soluble solids, gases, liquid-solid mixtures, soluble gases, aerosols, suspended solids, solid-gas mixtures, super critical fluids, and fluid mixtures.

Application of Heating or Cooling: Heating or cooling may be incorporated throughout the integrated process.

In water, Polyethylene glycols (PEGs) and polypropylene glycols (PPGs), for example, may have higher Gibbs free energy of mixing and osmotic pressure at lower temperatures.

The concentration of one or more reagents or soluble reagents, including, but not limited to, may contain a mass % concentration of said one or more reagents or soluble reagents as low as 0.0001% to as great as 99.99999%. Mass % concentrations of the one or more reagents or soluble reagents may be practically greater than any of the following: 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Mass % solubility of one or more reagents may be practically greater than any of the following: insoluble, 0.001%, 0.01%, 0.1%, or 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 61%, or 62%, or 63%, or 64%, or 65%, or 66%, or 67%, or 68%, or 69%, or 70%, or 71%, or 72%, or 73%, or 74%, or 75%, or 76%, or 77%, or 78%, or 79%, or 80%, or 81%, or 82%, or 83%, or 84%, or 85%, or 86%, or 87%, or 88%, or 89%, or 90%, or 90.5%, or 91%, or 91.5%, or 92%, or 92.5%, or 93%, or 93.5%, or 94%, or 94.5%, or 95%, or 95.5%, or 96%, or 96.5%, or 97%, or 97.5%, or 98%, or 98.5%, or 99%, or 99.5%, or 99.9%, or 100%, or completely miscible.

System pressures, may include, but are not limited to, greater than one or more or a combination of the following: 0.00001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 40 atm, or 50 atm, or 60 atm, or 75 atm, or 100 atm, or 120 atm, or 150 atm, or 200 atm, or 500 atm, or 1,000 atm, or 10,000 atm, or 100,000 atm, or less than 1,000,000 atm.

Separation devices and mechanisms may include, but are not limited to, one or more or a combination of the following: coalescer, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, hybrid systems, thermally switchable solvent, centrifuge, or filter or combinations thereof.

The power source of one or more pumps may include, but is not limited to, one or more or a combination of the following: electricity, pressure exchanger, turbocharger, hydraulic pressure, heat, pressure retarded osmosis, or forward osmosis.

Following the membrane or filter based separation, energy can be recovered by both or either the permeate and/or the concentrate. These energy recovery devices are known in the art and may include, but are not limited to, pressure exchangers and turbochargers.

Heat sources may include, but are not limited to, waste heat, power plant waste heat, steam, heat, pump or compressor waste heat, industrial process waste heat, steel waste heat, metal refining and production waste heat, paper mill waste heat, cement production waste heat, calcination waste heat, factory waste heat, petroleum refining waste heat, solar heat, solar pond, air conditioner waste heat, combustion heat, geothermal heat, ocean or water body thermal heat, stored heat, and gas absorption solution heat. Temperatures of heating or cooling for any of the embodiments disclosed include, but are not limited to, less than any of the following: −20° C., or −10° C., or 0° C., or 10° C., or 20° C., or 25° C., or 30° C., or 35° C., or 40° C., or 41.5° C., or 41.5° C., or 41.5° C.-60° C., or 45° C., or 50° C., or 55° C., or 60° C., or 60-100° C., or 110° C., or 150° C., or 1000° C.

Organic reagents may be employed if advantageous, including, but not limited to, polyethylene glycols 150-2000, polypropylene glycols 425-4000 and glycol ethers, such as triglyme.

One or more embodiments may be constructed and transported in smaller scale modules or as a unit, such as in shipping containers and transported and used in other locations.

Multicomponent separation devices or multistage separation devices may be employed. Said device or devices may include, but are not limited to, one or more or a combination of the following: binary distillation, azeotrope distillation, membrane distillation, mechanical vapor compression, hybrid systems, flash distillation, multistage flash distillation, multieffect distillation, extractive distillation, switchable solvent, reverse osmosis, nanofiltration, organic solvent nanofiltration, ultrafiltration, and microfiltration. For example, such a hybrid system may involve at least partially recovering the soluble reagent using nanofiltration and then further concentrating the soluble reagent using membrane distillation. Another example of such a hybrid system may be a process wherein a switchable solvent 'switches' out of solution due to the presence of a stimulant, such as a change in temperature, then nanofiltration is employed to further concentrate the switchable solvent or remove remaining switchable solvent in other solution. The switchable solvent or other reagent dissolved in solution may be further recovered or concentrated or even removed from the one or more layers or separate solutions that are formed.

The osmotic pressure range of one or more solutions may be as low as 0.001 atm to as great as 1,000,000 atm. The osmotic pressure may be as low as less than any of the following: 0.001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 35 atm, or 40 atm, or 45 atm, or 50 atm, or 55 atm, or 60 atm, or 65 atm, or 70 atm, or 75 atm, or 80 atm, or 85 atm, or 90 atm, or 95 atm, or 100 atm, or 150 atm, or 200 atm, or 500 atm, or 1,000 atm, or 10,000 atm, or 100,000 atm, or less than 1,000,000 atm, or pure solvent.

Solid precipitation, dissolution, or liquid freezing may occur, intentionally or unintentionally, within one or more embodiments, including, but not limited to, due to changes in concentrations, concentrations, dissolved gas concentrations, pressures, temperature, other system conditions, or combinations thereof One or more CST reagents may comprise random or sequential copolymers of low molecular weight diols such as 1,2 propanediol, 1,2 ethanediol, and/or 1,3 propanediol.

For example, thermosensitive poly(N isopropylacrylamide) (PNIPAM) hydrogels can absorb water below the volume phase transition temperature (VPTT, ~32 C) and expel water at temperatures above the VPTT. Other examples of these hydrogel reagents include polyacrylamide (PAM), PNIPAM, and poly(Nisopropylacrylamide-co-acrylic acid) and sodium (P(NIPAM-co-SA)).

Other CST reagents may include, but are not limited to, Methylcellulose and triethylamine.

Reagents that change solubility or other recovery method due to pressure or a combination of pressure and temperature may also be useful. These may include, but are not limited to, PSA, polyacrylamide (PAM), PNIPAM, and poly(Nisopropylacrylamide-co-acrylic acid sodium (P(NIPAM-co-SA)) hydrogels.

Changes in solution kinetic energy can act as a stimulus to change or promote a change in the solubility or other form of recovery of an added reagent. Kinetic energy can be of various forms, including, but not limited to, mixing and sonication. Ultrasonic sonication may increase or decrease solubility or phase transition.

Examples of waste heat sources may include, but are not limited to, the following: Power Plant (Natural gas, coal, oil, petcoke, biofuel, municipal waste), Condensing water, Flue Gas, Steam, Oil refineries, Metal production/refining (Iron, Steel, Aluminum, etc.), Glass production, Manufacturing facilities, Fertilizer production, Transportation vehicles (ships, boats, cars, buses, trains, trucks, airplanes), Waste Water Treatment, Solar thermal, Solar pond, Solar photovoltaic, Geothermal (Deep Well), Biofuel powered vehicles, Biofuel/Biomass/Municipal Waste Power Plants, Desulfurization, Alcohol production, hydrogen sulfide treatment, acid (e.g. sulfuric) production, Renewable fertilizer production, Ocean Thermal, Space heating, Grey water, Diurnal temperature variation, Geothermal (Shallow well/loop), or respiration.

Heat or cooling may be applied at any point of one or more embodiments

Heat exchangers and recovery devices may be employed where advantageous.

Mixing devices, may include, but are not limited to, on or more or a combination of the following:
CSTR, Batch, Semibatch, or flash devices
Turbine: Rushton Turbine, or Smith Turbine, or Helical Turbine, or Bakker Turbine
Low shear mixer, High shear mixer, Dynamic mixer, Inline mixer, Static mixer, Turbulent flow mixer, No mixer, Close-clearance mixer, High shear disperser, Static mixers, Liquid whistles, Mix-Itometer, Impeller mixer, Liquid-Liquid mixing, Liquid-Solid mixing, Liquid-Gas mixing, Liquid-Gas-Solid mixing, Multiphase mixing, Radial Flow, Axial Flow, Flat or curved blade geometry Any portion of the process may be heated or cooled. Heat sources may include, but are not limited to, waste heat, power plant waste heat, steam, heat, pump or compressor waste heat, industrial process waste heat, steel waste heat, metal refining and production waste heat, paper mill waste heat, factory waste heat, petroleum refining waste heat, solar heat, solar pond, air conditioner waste heat, combustion heat, geothermal heat, ocean or water body thermal heat, stored heat, and $CO_2(g)$ absorption solution heat.

One or more reagents or compositions may comprise: Aqueous solution, Water soluble polymer, Soluble polymer, Glycol Polyethylene Glycol, Polypropylene Glycol Ethers, Glycol Ethers, Glycol ether esters, Triglyme. Polyethylene Glycols of multiple geometries, Methoxypolyethylene Glycol, Polyvinyl Alcohol Polyvinylpyrrolidone, Polyacrylic Acid, Diol polymers, 1,2 propanediol, 1,2 ethanediol, 1,3 propanediol, Cellulose Ethers, Methylcellulose, Cellosize, Carboxymethylcellulose, Hydroxyethylcellulose, Sugar Alcohol, Sugars, Alcohols Ketones, Aldehydes, Esters, Organosilicon compounds, Halogenated solvents CST Reagents may include, but are not limited to, one or more or a combination of the following:

Poly(ethylene glycol) (PEG) and Poly(ethylene oxide) (PEO)
- Heterobifunctional PEGs: Azide (—N3) Functionalized, Biotin Functionalized, Maleimide Functionalized, NHS Ester Functionalized, Thiol Functionalized, COOH Functionalized, Amine Functionalized, Hydroxyl Functionalized, Acrylate/Methacrylate Functionalized
- Homobifunctional PEGs
- Monofunctional PEGs
- PEG Dendrimers and Multi-arm PEGs: PEG-core Dendrimers, Multi-arm PEGs, Multi-arm PEG Block Copolymers
- PEG Copolymers: PEG Diblock Copolymers, PEG/PPG Triblock Copolymers, Biodegradable PEG Triblock Copolymers, Multi-arm PEG Block Copolymers, Random Copolymers
- PEG and Oligo Ethylene Glycol: Examples: PEG 200, PEG 300, PEG 400, PEG 600, PEG 1000, PEG 1450, PEG 1500, PEG 2050, PEG 3350, PEG 8000, PEG 10000
- Poly(ethylene oxide)
- High Oligomer Purity PEG
- Polyethylene glycol-polyvinyl alcohol (PEG-PVA)

Polypropylene Glycol (PPG)
- Examples: PPG 425-4000

Poly(N-isopropylacrylamide) (PNIPAM) and Polyacrylamide (PAM)
- PNIPAM Copolymers
- Poly(N-isopropylacrylamide) (PNIPAM)
- Polyacrylamide (PAM) and Copolymers Poly(2-oxazoline) and Polyethylenimine (PEI)

Poly(acrylic acid), Polymethacrylate and Other Acrylic Polymers

Poly(vinyl alcohol) (PVA) and Copolymers
- Poly(vinyl alcohol) (PVA)
- Poly(vinyl alcohoL-co-ethylene) ethylene Poly(vinylpyrrolidone) (PVP) and Copolymers Polyelectrolytes, may include, but not limited to, one or more or a combination of the following: Poly(styrenesulfonate) (PSS) and Copolymers, Polyacrylamide (PAM)-based Polyelectrolytes, Poly(acrylic acid) (PAA), Sodium Salt, Poly(allylamine hydrochloride), Poly(diallyldimethylammonium chloride) Solution, Poly(vinyl acid)

Cucurbit[n]uril Hydrate

Quaternary ammonium polymers

Carboxypolymethylene (carbomer)

Polyvinyl methyl ether-maleic anhydride (PVM-MA)

Carboxypolymethylene (carboxyvinyl polymer)

Polyvinyl methyl ether-maleic anhydride

Carboxymethylcellulose

Hydroxyethylcellulose and derivatives

Methylcellulose and derivatives

Other cellulose ethers, may include, but are not limited to:
- Ethylcellulose or Hydroxypropylcellulose Sodium carboxymethylcellulose Hydroxyethylcellulose and ethyl hydroxyethylcellulose Natural water-soluble polymers: Starches, Sugars, Polysaccharides, Agar, Alginates, Carrageenan, Furcellaran, Casein and caseinates, Gelatin, Guar gum and derivatives, Gum arabic, Locust bean gum, Pectin, Cassia gum, Fenugreek gum, Psyllium seed gum, Tamarind gum, Tara gum, Gum ghatti, Gum karaya, Gum tragacanth, Xanthan gum, Curdlan, Diutan gum, Gellan gum, Pullulan, Scleroglucan (sclerotium gum)

PEGs are available with different geometries, including, but not limited to, the following:
- Branched PEGs: have three to ten PEG chains emanating from a central core group.
- Star PEGs: have 10 to 100 PEG chains emanating from a central core group.
- Comb PEGs: have multiple PEG chains normally grafted onto a polymer backbone.

Reagent properties for embodiments, may include, but not limited to, one or more or a combination of the following:
- Soluble reagent, Soluble organic solvent, Soluble polymer, Water soluble reagent, Soluble reagent separable with a membrane, Water soluble reagent separable with a membrane, Water soluble organic solvent, Water soluble polymer, Organic solvent separable with a membrane, Polymer separable with a membrane, Soluble organic solvent separable with a membrane, Soluble polymer separable with a membrane, Large molecular weight water soluble organic solvent, Small molecular weight water soluble polymer, Non-volatile organic solvent, Low volatility organic solvent, High volatility organic solvent that is separable with a membrane, Organic solvent with a molecular weight, including, but not limited to, greater than 100 da or any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da, Polymer with a molecular weight, including, but not limited to, greater than 100 da or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da, Reagent with a molecular weight, including, but not limited to, greater than 100 da or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da, Organic solvent with a hydration radius, including, but not limited to, greater than 100 da, or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da
- Polymer with a hydration radius, including, but not limited to, greater than 100 da, or or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da
- Reagent with a hydration radius, including, but not limited to, greater than 100 da, or or greater than any of the following: 125 da, or 150 da, or 175 da, or 200 da, or 225 da, or 250 da, or 275 da, or 300 da, or 325 da, or 350 da, or 375 da, or 400 da, or 425 da, or 450 da, or 475 da, or 500 da, or 525 da, or 550 da, or 575 da, or 600 da
- The solubility of one or more reagents may be less than, equal to, or greater than including, but not limited to, one or more of the following: 0.00001 g per kg solvent, 0.01 g per kg solvent, 0.1 g per kg solvent, 0.5 g per kg solvent, 1 g per kg solvent, 1.5 g per kg of solvent, 2 g per kg of solvent, 3 g per kg of solvent, 4 g per kg of solvent, 5 g per kg of solvent, 6 g per kg of solvent, 7 g per kg of solvent, 8 g per kg of solvent, 9 g per kg of solvent, 10 g per kg of solvent, 11 g per kg of solvent, 12 g per kg of solvent, 13 g per kg of solvent, 14 g per kg of solvent, 15 g per kg of solvent, 16 g per kg of solvent, 17 g per kg of solvent, 18 g per kg of solvent, 19 g per kg of solvent, 20 g per kg of solvent, 21 g per kg of solvent, 22 g per kg of solvent, 23 g per kg of solvent, 24 g per kg of solvent, 25 g per kg of solvent, 26 g per kg of solvent, 27 g per kg of solvent, 28 g per kg of solvent, 29 g per kg of solvent, 30 g per kg of solvent, 40 g per kg of solvent, 50 g per kg of solvent, 60 g per kg of solvent, 70 g per kg of solvent, 80 g per kg of solvent, 90 g per kg of solvent, 100 g per kg of solvent, 110 g per kg of solvent, 150 g per kg of solvent, 200 g per kg of solvent, 300 g per kg of solvent, 400 g per kg of solvent, 500 g per kg of solvent, 750 g per kg of solvent, 1000 g per kg of solvent, 1500 g per kg of solvent, 2000 g per kg of solvent Additional applications for the embodiments described herein, may include, but are not limited to, one or more or a combination of the following: acid gas removal, hydrocarbon hydrocarbon separation, hydrocarbon-inert gas separation, acid gas processing, natural gas processing, gas processing, syngas purification, syngas acid gas removal, $CO_2$ removal from steam methane reforming gases, $CO_2$ removal from steam biomass reforming gases biogas upgrading, $CO_2$ removal from hydrocarbon reforming gases, biogas upgrading, gas treatment, $CO_2$ capture, post-combustion capture, pre combustion capture, landfill gas, flue gas, air separation, gas concentrating, gas removal, aerosol removal, aerosol separation, enhanced oil recovery with or without supercritical fluids, enhanced oil recovery gas processing, enhanced oil recovery gas processing for $CO_2$ reinjection, separation of Fischer-Tropsch gases or liquids.

Reagents, compounds, ionic compounds, salts, solvents, or reagents may include, but are not limited to, one or more or a combination of the following: H−, H+, D−, D+, H2−, H2+, H3+, He−, He+, He, H+, He2+, Li−, Li+, Na−, Na+, K−, K+, Cu−, Cu+, LiH−, LiH+, NaH−, NaH+, KH+, Be−, Be+, Mg−, Mg+, Ca−, Ca+, Zn−, Zn+, BeH−, BeH+, MgH−, MgH+, CaH−, ZnH+, BeH2+, B−, B+, AL−, Al+, Sc+, Ga−, Ga+, BH−, BH+, AlH−, AlH+, ScH+, GaH+, BH2−, BH2+, AlH2−, o2AlH2+, BH3−, BH3+, AlH3−, AlH3+, BH4−, AlH4−, C−, C+, Si−, Si+, Ti−, Ti+, Ge−, Ge+, CH−, CH+, SiH−, SiH+, GeH+, CH2−, CH2+, SiH2−, SiH2+, GeH2−, CH3−, CH3+, SiH3−, SiH3+, GeH3+, CH4−, CH4+, SiH4+, N−, N+, P−, P+, V+, AS−, As+, NH−, NH+, PH−, PH+, AsH+, NH2−, NH2+, PH2−, PH2+, AsH2+, NH3−, NH3+, PH3+, AsH3+, NH4+, PH4+, O−, O+, S−, S+, Se−, Se+, OH−, OH+, HS−, HS+, CrH−, HSe−, HSe+, H2O−, H2O+, H2S−, H2S+, H2Se+, H3O+, H3S+, H3Se+, F−, F+, CL−, Cl+, Br−, Br+, I−, I+, HF−, HF+, HCL−, HCl+, HBr−, HBr+, H2F+, H2Cl+, H2Br+, Ne−, Ne+, Ar−, Ar+, Kr+, NeH+, ArH+, KrH+, XeH+, Li2−, Li2+, NaLi−, NaLi+, Na2−, Na2+, NaK+, Be2−, Be2+, Mg2−, Mg2+, B2−, B2+, Al2−, Al2+, BC−, BC+, C2−, C2+, SiC−, SiC+, Si2−, Si2+, C2H−, C2H+, C2H2+, C2HCC−, HCCH−, C2H3−, C2H3+, C2H4−, C2H4+, C2H5−, C2H5+, C2H6+, C2H7+, LiN+, BeN−, BeN+, BN−, AlN−, AlN+, BN+, CN−, CN+, CP−, CP+, SiN−, SiN+, SiP−, SiP+, N2−, N2+, PN−, PN+, P2−, P2+, HCN−, HCN+, NNH+, HPO+, CNH2+, H2CN+, HCNH+, N2H2+, CH2NH$_2$+, N2H4+, CH3NH$_2$+, N2H5+, CH3NH$_3$+, CH3PH3+, LiO−, LiO+, LiS+, NaO−, NaO+, KO+, BeO−, BeO+, MgO−, MgO+, MgS−, MgS+, BeS−, BeS+, BO−, AlO−, AlO+, BS−, BS+, AlS−, AlS+, BO+, CO−, CO+, CS−, CS+, SiO−, SiO+, SiS−, SiS+, CSe−, CSe+, GeO+, NO−, NO+, NS−, NS+, PO−, PO+, PS−, PS+, O2−, O2+, SO−, SO+, S2−, S2+, SeO−, SeO+, SeS−, SeS+, Se2−, Se2+, COH+, HCO−, HCO+, HCS−, HCS+, HNO−, HNO+, NOH+, HNS−, HO2−, HO2+, KOH2+, H2CO−, H2CO+, H2CS−, H2CS+, H2O2+, H2S2+, CH2OH+, CH3O−, CH3O+, H2CSH+, H3O2+, CH3OH−, CH3OH+, CH3SH+, CH3OH2+, CH3SH2+, H5O2+, LiCL−, LiCl+, NaF−, NaF+, NaCL−, NaCl+, LiBr−, LiBr+, NaBr−, NaBr+, LiF−, LiF+, BeF−, BeF+, MgF−, MgF+, MgCL−, MgCl+, ZnF−, ZnF+, BeCL−, BeCl+, BF−, BF+, AlF−, AlF+, BCL−, BCl+, AlCL−, AlCl+, GaF+, GaCl+, CF−, CF+, CCL−, CCl+, SiF−, SiF+, SiCL−, SiCl+, GeF+, NF−, NF+, NCL−, NCl+, PF−, PF+, PCL−, PCl+, FO−, FO+, ClO−, ClO+, SF−, SF+, SCL−, SCl+, BrO−, F2−, F2+, ClF, ClF+, Cl2−, Cl2+, BrF−, BrF+, BrCL−, BrCl+, Br2−, Br2+, I2+, HOBr+, F2H+, FHF−, Cl2H+, CH3ClH+, LiNe+, Ne2+, Ar2+, Li3+, C3+, C3H3−, C3H3+, C3H3+, C3H5+, C3H7+, C3H7+, C3H7+, N3−, N3+, CH3CN−, CH3CN+, HNCNH2+, NCNH3+, C2H5NH+, C2H6N+, (CH3)2NH$_2$+, CH3CH2NH$_3$+, Li2O+, CNO−, NCO−, SCN−, BO2−, BO2+, N2O−, N2O+, CO$_2$−, CO$_2$+, OCS+, CS2−, CS2+, NO2−, NO2+, PO2−, PO2+, O3−, O3+, SO2−, SO2+, S3−, S3+, SeO2+, HCO2−, HNNO+, NNOH+, HOCO+, HNO2+, O3H+, SO2H+, CH2CO+, H2COO+, CH3CO−, CH3CO+, CH3OO−, CH3OO+, H2CONH2+, C2H4OH+, C2H4OH+, CH3CHOH+, FCO+, CF2−, CF2+, SiF2+, CCl2−, CCl2+, ClOO+, OOO−, OClO+, NF2+, SF2−, SF2+, F3−, C13−, HCCF+, HFCO+, CH2CHF+, C4+, C4H2+, C2N2+, HCCCN+, C3H3N+, CH3NHN2+, CH6N3+, (CH3)3NH+, C3H7NH$_3$+, CO3−−, NO3−, NO3+, SO3−, SO3+, HCO3−, C2H2O2+, H2NO3+, CH3COO−, H3CO$_3$+, NH$_2$CONH2+, NH$_2$COOH2+, NH3COOH+, CH5N2O+, H2NCOHNH2+, CH3COCH3−, CH3COHCH3+, C2Cl2+, BF3−, BF3+, ClO3−, CF3−, CF3+, SiF3+, CCl3−, CCl3+, SiCl3+, NF3−, NF3+, NF3H+, AsF3H+, CH2ClCH2OH2+, C5H5−, C3H3N2−, C4H4N−, C4H6N+, C4H6N+, C4H6N+, NC4H12+, C3O2+, PO4−−−, SO4−−, HSO4−, C4H4O+, C4H10O+, ClO4−, BF4−, CCl4+, C2HF3+, C6H5−, C6H6+, C6H7+, C5H6N+, C2O4−−, CF3CN+, C2F4+, SiF5−, SF5+, C7H7+, CF3COO−, PF6−, C6N4−, H, H, D, D, H2, H2, H3, He, He, He, H, He2, Li, Li, Na, Na, K, K, Cu, Cu, LiH, Li, NaH, NaH, KH, Be, Be, Mg, Mg, Ca, Ca, Zn, Zn, BeH, BeH, MgH, MgH, CaH, ZnH, BeH2, B, B, Al, Al, Sc, Ga, Ga, BH, BH, AlH, AlH, ScH, GaH, BH2, BH2, AlH2, o2AlH2, BH3, BH3, AlH3, AlH3, BH4, AlH4, C, C, Si, Si, Ti, Ti, Ge, Ge, CH, CH, SiH, SiH, GeH, CH2, CH2, SiH2, SiH2, GeH2, CH3, CH3, SiH3, SiH3, GeH3, CH4, CH4, SiH4, N, N, P, P, V, As, As, NH, NH, PH, PH, AsH, NH2, NH2, PH2, PH2, AsH2+, NH3, NH3, PH3, AsH3, NH$_4$, PH4, O, O, S, S, Se, Se, OH, OH, HS, HS, CrH, HSe, HSe, H2O, H2O, H2S, H2S, H2Se, H3O, H3S, H3Se, F, F, Cl, Cl, Br, Br, I, I, HF, HF, HCl, HCl, HBr, HBr, H2F, H2Cl, H2Br, Ne, Ne, Ar, Ar, Kr, NeH, ArH, KrH, XeH, Li2, Li2, NaLi, NaLi, Na2, Na2, NaK, Be2, Be2, Mg2, Mg2, B2, B2, Al2, Al2, BC, BC, C2, C2, SiC, SiC, Si2, Si2, C2H, C2H, C2H2, H2CC, HCCH, C2H3, C2H3, C2H4, C2H4, C2H5, C2H5, C2H6, C2H7, LiN, BeN, BeN, BN, AlN, AlN, BN, CN, CN, CP, CP, SiN, SiN, SiP, SiP, N2, N2, PN, PN, P2, P2, HC, HCN, NNH, HPO, CNH2, H2CN, HCNH, N2H2, CH2NH$_2$, N2H4, CH3NH$_2$, N2H5, CH3NH$_3$, CH3PH3, LiO, LiO, LiS, NaO, NaO, KO, BeO, BeO, MgO, MgO, MgS, MgS, BeS, BeS, BO, AlO, AlO, BS, BS, AlS, AlS, BO, CO, CO, CS, CS, SiO, SiO, SiS, SiS, CSe, CSe, GeO, NO, NO, NS, NS, PO, PO, PS, PS, O2, O2, SO, SO, S2, S2, SeO, SeO, SeS, SeS, Se2, Se2, COH, HCO, HCO, HCS, HCS, HNO, HNO, NOH, HNS, HO2, HO2, KOH2, H2CO, H2CO, H2CS, H2CS, H2O2, H2S2, CH2OH, CH3O, CH3O, H2CSH, H3O2, CH3OH, CH3OH, CH3 SH, CH3OH2, CH3 SH2, H5O2, LiCl, LiCl, NaF, NaF, NaCl, NaCl, LiBr, LiBr, NaBr, NaBr, LiF, LiF, BeF, BeF, MgF, MgF, MgCl, MgCl, ZnF, ZnF, BeCl, BeCl, BF, BF, AlF, AlF, BCl, BCl, AlCl, AlCl, GaF, GaCl, CF, CF, CCl, CCl, SiF, SiF, SiCl, SiCl, GeF, NF, NF, NO, NO, PF, P, PCl, PC, FO, FO, ClO, ClO, SF, SF, SCl, SCl, BrO, F2, F2, ClF, ClF, Cl2, Cl2, BrF, BrF, BrCl, BrCl, Br2, Br2, I2, HOBr, F2H, FHF–, Cl2H, CH3ClH, LiNe, Ne2, Ar2, Li3, C3, C3H3, C3H3, C3H3, C3H5, C3H7, C3H7, C3H7, N3, N3, CH3 CN, CH3 CN, HNCNH2, NCNH3, C2H5NH, C2H6N, (CH3)2NH$_2$, CH3CH2NH$_3$, Li2O, CNO, NCO, SCN, BO2, BO2, N2O, N2O, CO2, CO2, OCS, CS2, CS2, NO2, NO2, PO2, PO2, O3, O3, SO2, SO2, S3, S3, SeO2, HCO2, HNNO, NNOH, HOCO, HNO2, O3H, SO2H, CH2CO, H2COO, CH3CO, CH3CO, CH3OO, CH3OO, H2CONH2, C2H4OH, C2H4OH, CH3CHOH, FCO, CF2, CF2, SiF2, CCl2, CCl2, ClOO, OClO, OClO, NF2, SF2, SF2, F3, Cl3, HCCF, HFCO, CH2CHF, C4, C4H2, C2N2, HCCCN, C3H3N, CH3NHN2, CH6N3, (CH3)3NH, C3H7NH$_3$, CO$_3$, NO3, NO3, SO3, SO3, HCO3, C2H2O2, H2NO3, CH3COO, H3CO$_3$, NH$_2$CONH2, NH$_2$COOH2, NH$_3$COOH, CH5N20, H2NCOHNH2, CH3COCH3, CH3COHCH3, C2Cl2, BF3, BF3, ClO3, CF3, CF3, SiF3, CCl3, CCl3, SiCl3, NF3, NF3, NF3H, AsF3H, CH2ClCH2OH2, C5H5, C3H3N2, C4H4N, C4H6N, C4H6N, C4H6N, NC4H12, C3O2, PO4, SO4, H5O4, C4H4O, C4H10O, ClO4, BF4, CCl4, C2HF3, C6H5, C6H6, C6H7, C5H6N, C2O4, CF3CN, C2F4, SiF5, SF5, C7H7, CF3COO, PF6, C6N4, ionic liquids Liquid-liquid phase transition temperature range Temperature may be equivalents to CST, or LCST, or UCST, or a combination thereof Liquid-liquid phase transition temperature range Temperatures heating or LCST temperature or combination thereof may include, but are not limited to, equal to, greater than, or less than one or more or a combination of the following: –100° C., or –90° C., or –80° C., or –70° C., or –60° C., or –50° C., or –40° C., or –30° C., or –20° C., or –10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Liquid-liquid phase transition temperature range Temperatures cooling or UCST temperature or combination thereof may include, but are not limited to, equal to, greater than, or less than one or more or a combination of the following: –100° C., or –90° C., or –80° C., or –70° C., or –60° C., or –50° C., or –40° C., or –30° C., or –20° C., or –10° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 30° C., 40° C., 50° C., 60° C., 70° C., 80° C., 90° C., 100° C., 110° C., 120° C., 130° C., 140° C., 150° C., 140° C., 150° C., 200° C., 500° C., 1000° C., 2000° C., 3000° C., 10000° C., 100000° C.

Absorption unit operations may include, but are not limited to, one or more or a combination of the following: absorption column, column, contactor, gas-liquid contactor, liquid-liquid contactor, liquid solid contactor, membrane contactor, gas membrane contactor, packed column, membrane column, plated column, multistage column, solid handling column, liquid handling column, multiphase column, rotating absorption unit, kinetic motion absorption unit, stripping column, mixing vessel, continuously stirred reactor, pressurization vessel, depressurization vessel, multistage vessel, batch setup, mixing of two or more phases, formation of more phases from less phases, formation of less phases from relatively more phases, heating vessel, cooling vessel, membrane absorption, membrane selective absorption Evaporator or desorption unit operations may include, but are not limited to, one or more or a combination of the following: column, contactor, gas-liquid contactor, membrane column, membrane contactor, gas membrane contactor, packed column, plated column, multistage column, multistage vessel, batch setup, liquid-liquid contactor, liquid solid contactor, solid handling column, liquid handling column, multiphase column, rotating desorption unit, kinetic motion desorption unit, stripping column, mixing vessel, continuously stirred reactor, reboiler, depressurization vessel, pressurization vessel, flash vessel, flash unit, multistage flash unit, mixing of two or more phases, formation of more phases from less phases, formation of less phases from relatively more phases, heating vessel, cooling vessel, carrier gas stripping, steam stripping, air stripping, recirculating gas stripping, stripping using one or more gases being desorbed, ammonia stripping, membrane stripping, membrane distillation, membrane selective absorption One or more reagents may comprise hydrocarbons. Hydrocarbons, may include, but are not limited to, one or more or a combination of the following: compound containing carbon, compound containing hydrogen, compound containing oxygen, compound containing nitrogen, compound containing sulfur, saturated hydrocarbon, unsaturated hydrocarbon, cyclic hydrocarbon, cyclo hydrocarbon, aromatic hydrocarbon, alkane, alkene, alkyne, cycloalkane, alkadiene, polymers, halogenated hydrocarbons, hydrocarbons with one or more functional groups, one or more hydrocarbons in crude oil, one or more different hydrocarbons in crude oil, one or more hydrocarbons in naphtha, one or more hydrocarbons in gasoline, one or more hydrocarbons in diesel, one or more hydrocarbons in heavy oil, one or more hydrocarbons in natural gas, natural gas liquids, one or more hydrocarbons in kerosene, organic solvents, light hydrocarbons, heavy hydrocarbons, water insoluble hydrocarbons, partially water soluble hydrocarbons, water soluble hydrocarbons, low toxicity hydrocarbons, medium toxicity hydrocarbons, high toxicity hydrocarbons, methane, Ethane, Ethene (ethylene), Ethyne (acetylene), Propane, Propene (propylene), Propyne (methylacetylene), Cyclopropane, Propadiene, Butane, Butene (butylene), Butyne, Cyclobutane, Butadiene, Pentane, Pentene, Pentyne, Cyclopentane, Pentadiene, (piperylene), Hexane, Hexene, Hexyne, Cyclohexane, Hexadiene, Heptane, Heptene, Heptyne, Cycloheptane, Heptadiene, Octane, Octene, Octyne, Cyclooctane, Octadiene, hydrocarbon solution, hydrocarbon containing mixture Superior properties for desorption or evaporation may include, but are not limited to, one or more or a combination of the following: higher equilibrium partial pressure of one or more gases or different gases, lower equilibrium partial pressure of one or more gases or different gases, faster desorption kinetics, greater desorption of a desired gas relative to a less desired gas, low viscosity, low volatility of other solvent constituents, low relative volatility of other solvent constituents, no degradation, no corrosion, minimal degradation, minimal corrosion, compatibility with gas impurities, minimal impurities in desorbed gases Salts may include, but are not limited to, one or more or a combination of the following: ionic compounds, ionic liquids, anions, cations, complex salts, complex ions, compounds with properties similar to salts, salts with properties dissimilar to salts, alkali, alkaline earth, transition metal, metal, semiconductor, metalloids, ammonia, ammonium, amine, basic compound, halogenated compound, sulfate, nitrate, carbonate, hydrogen carbonate, carbamate, nitrite, sulfite, carbon compound, sulfur compound, electrolyte, nitrogen compound, phosphorous compound, phosphorous containing anion, halogen containing anion Some reagents may include, but are not limited to, Carbon Dioxide (gas), Carbon Dioxide (liquid), Carbon Dioxide (aqueous), Carbon Dioxide (solid), Carbon Dioxide (dissolved), Carbon Dioxide (one or more ionic species), Carbon Dioxide (one or more liquid phase species), Carbon Dioxide (solid mixture), Carbon Dioxide (supercritical), Carbon Dioxide (Hydrate), Carbon Dioxide (triple point), Acidic Reagent (gas), Acidic Reagent (liquid), Acid Reagent (aqueous), Acidic Reagent Gas (Hydrate) Acidic Reagent (solid), Acidic Reagent (dissolved), Acidic Reagent (one or more ionic species), Acidic Reagent (one or more liquid phase species), Acidic Reagent (solid mixture), Acid Reagent (supercritical), Acidic Reagent (triple point), Basic Compound (gas), Basic Compound (liquid), Basic Compound (solid), Basic Compound (dissolved), Basic Compound (one or more ionic species), Basic Compound (one or more liquid phase specific), Basic Compound (solid mixture), Basic Compound (supercritical), Basic Compound (hydrate), Basic Compound (triple point), Hydrocarbon (gas), Hydrocarbon (liquid), Hydrocarbon (aqueous), Hydrocarbon (dissolved), Hydrocarbon (non-aqueous), Hydrocarbon (one or more ionic species), Hydrocarbon (one or more liquid phase species), Hydrocarbon (solid), Hydrocarbon (solid mixture), Hydrocarbon (supercritical), Hydrocarbon (Hydrate), Hydrocarbon (triple point).

Viscosity is greater than, equal to, or less than 100,000 cP, or 10,000 cP, or 1,000 cP, or 500 cP, or 100 cP, or 50 cP, or 40 cP, or 30 cP, or 20 cP, or 10 cP, or 9 cP, or 8 cP, or 7 cP, or 6 cP, or 5 cP, or 4 cP, or 3 cP, or 2 cP, or 1 cP or 0.5 cP, or combination thereof Cooling Inputs or Sources may include, but are not limited to, one or more or a combination of the following: thermocline water body, thermocline liquid body, water body, cold liquid body, evaporative cooling, heat pump cooling, air cooling, heat exchange with enthalpy source, cyrogenic cooling, LNG gasification, pressure reduction, cold surface, radiative cooling, endothothermic phase change Heating Inputs or Sources may include, but are not limited to, one or more or a combination of the following: Waste Heat, Ambient Temperature Changes, Diurnal Temperature Variation, Thermocline liquid body, thermocline solid body, thermocline gaseous body, Thermocline of a water body, halocline, heat pump, solar thermal, solar thermal pond, light, electricity, steam, combustion, compression, pressure increase, geothermal, radiative heat, condensation, exothermic dissolution, exothermic precipitation, exothermic formation of more liquid phases, exothermic formation of less liquid phases, exothermic phase change, or other heat sources described herein.

Temperatures: temperatures of operation or UCST or LCST or a combination thereof may be greater than, less than, or equal to or a combination thereof include, but are not limited to, one or more or a combination of the following: $-100°$ C., or $-90°$ C., or $-80°$ C., or $-70°$ C., or $-60°$ C., or $-50°$ C., or $-40°$ C., or $-30°$ C., or $-20°$ C., or $-10°$ C., $0°$ C., $1°$ C., $2°$ C., $3°$ C., $4°$ C., $5°$ C., $6°$ C., $7°$ C., $8°$ C., $9°$ C., $10°$ C., $11°$ C., $12°$ C., $13°$ C., $14°$ C., $15°$ C., $16°$ C., $17°$ C., $18°$ C., $19°$ C., $20°$ C., $21°$ C., $30°$ C., $40°$ C., $50°$ C., $60°$ C., $70°$ C., $80°$ C., $90°$ C., $100°$ C., $110°$ C., $120°$ C., $130°$ C., $140°$ C., $150°$ C., $140°$ C., $150°$ C., $200°$ C., $500°$ C., $1000°$ C., $2000°$ C., $3000°$ C., $10000°$ C., $100000°$ C.

Mass percentages of one or more components comprise greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

Relative mass distribution of one or more liquid phases may include, but is not limited to, greater than or less than or equal to one or more or a combination of the following: 0.0000001%, 0.001%, 0.01%, 0.1%, 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

A 'substantial' concentration of one or more components (For Example: reagents or reagents or solvents or antisolvents) may include, but is not limited to, mass percentages of one or more components comprising greater than or equal to one or more or a combination of the following: 1%, or 5%, or 10%, or 11%, or 12%, or 13%, or 14%, 15%, or 16%, or 17%, or 18%, or 19%, or 20%, or 21%, or 22%, or 23%, or 24%, or 25%, or 26%, or 27%, or 28%, or 29%, or 30%, or 31%, or 32%, or 33%, or 34%, or 35%, or 36%, or 37%, or 38%, or 39%, or 40%, or 41%, or 42%, or 43%, or 44%, or 45%, or 46%, or 47%, or 48%, or 49%, or 50%, or 51%, or 52%, or 53%, or 54%, or 55%, or 56%, or 57%, or 58%, or 59%, or 60%, or 65%, or 70%, or 75%, or 80%, or 85%, or 90%, or 95%, or less than or equal to 100%.

pH may be greater than or equal to or less than one or more or a combination of the following: 1, or 2, or 3, or 4, or 5, or 6, or 7, or 8, or 9, or 10, or 11, or 12, or 13, or 14

Separation Devices may include, but are not limited to, one or more or a combination of the following: decanter, separatory funnel, coalescer, centrifuge, filter, switchable solvent, cyclone, semi-permeable membrane, nanofiltration, organic solvent nanofiltration, reverse osmosis, ultrafiltration, microfiltration, hot nanofiltration, hot ultrafiltration, distillation, membrane distillation, flash distillation, multi-effect distillation, mechanical vapor compression distillation, or hybrid systems One or more reagents may comprise water, organic solvent, siloxanes, ionic liquids, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a reagent with a vapor pressure less than 0.01 atm at 20° C., soluble reagents with a molecular weight greater than 80 daltons, volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a reagent with a vapor pressure greater than 0.01 atm at 20° C., or a mixture thereof.

water, ammonia, ammonium, amine, azine, amino ethyl ethanol amine, 2-amino-2-methylpropan-1-ol (AMP), MDEA, MEA, primary amine, secondary amine, tertiary amine, low molecular weight primary or secondary amine, metaL-ammine complex, metaL-ammonia complex, metaL-ammonium complex, sterically hindered amine, imines, azines, piperazine, alkali metal, lithium, sodium, potassium, rubidium, caesium, alkaline earth metal, calcium, magnesium, ionic liquid, thermally switchable compounds, $CO_2$ switchable compounds, enzymes, metal-organic frameworks, quaternary ammonium, quaternary ammonium cations, quaternary ammonium cations embedded in polymer, or mixtures thereof.

Soluble reagent may comprise, for example, water, organic solvent, water soluble polymer, soluble polymer, glycol, polyethylene glycol, polypropylene glycol, ethers, glycol ethers, glycol ether esters, triglyme, polyethylene glycols of multiple geometries, including, branched polyethylene glycols, star polyethylene glycols, comb polyethylene glycols, methoxypolyethylene glycol, polyvinyl alcohol, polyvinylpyrrolidone, polyacrylic Acid, diol polymers, 1,2 propanediol, 1,2 ethanediol, 1,3 propanediol, cellulose ethers, methylcellulose, cellosize, carboxymethylcellulose, hydroxyethylcellulose, sugar alcohol, sugars, alcohols, ketones, aldehydes, esters, organosilicon compounds, halogenated solvents, non-volatile solvents, a reagent with a vapor pressure less than 0.01 atm at 20° C., soluble reagents with a molecular weight greater than 80 daltons, or mixtures thereof.

Useful membranes for at least partial recovery may include, for example, any membrane capable of at least partially rejecting said reagent while allowing substantial passage of $CO_2$ containing solution or gas containing solution or vice versa. Such membranes may comprise a membrane selected from the group consisting of Reverse Osmosis, Nanofiltration, Organic Solvent Nanofiltration, Ultrafiltration, Microfiltration, and Filtration membranes. In some embodiments the membrane may have a molecular weight cutoff of greater than about 80 daltons. That is, the membrane allows passage of a substantial or majority amount of components with a molecular weight of less than about 80 daltons while rejecting a substantial or majority amount of components with a molecular weight of greater than about 80 daltons up to about 600 daltons. In the art, another definition of molecular weight cut-off may refer to the lowest molecular weight solute (in daltons) in which 90% of the solute is retained by the membrane, or the molecular weight of the molecule that is 90% retained by the membrane. Membranes with a molecular weight cutoff of less than 1,000 daltons, or less than 10,000 daltons, or less than 50,000 daltons, or less than 100,000 daltons, or less than 200,000 daltons, or less than 500,000 daltons, or less than 1,000,000 daltons may also be useful depending upon the circumstances and components employed.

The membrane may be comprised of any useful material and such useful material may vary depending upon the components to be separated, their molecular weight, viscosity, and/or other properties. Useful membranes may include, for example, membranes comprised of a material selected from a thin film composite; a polyamide; a cellulose acetate; a ceramic membrane; other materials and combinations thereof.

One or more reagents may comprise, for example, one or more or a combination of the following: volatile organic solvents, soluble reagents with a molecular weight less than 600 daltons, soluble reagents with a molecular weight less than 200 daltons, dimethoxymethane, acetone, acetaldehyde, methanol, dimethyl ether, THF, ethanol, isopropanol, propanal, methyl formate, azeotropes, alcohols, ketones, aldehydes, esters, organosilicon compounds, halogenated solvents, a reagent with a vapor pressure greater than 0.01 atm at 20° C., or a mixture thereof.

One or more embodiments may employ a membrane with a molecular weight cut-off, which may include but not limited to, less than any of the following: 250 da, or 200 da, or 150 da, or 125 da, or 100 da, or 95 da, or 90 da, or 85 da, or 80 da, or 75 da Multicomponent separation devices or multistage separation devices may be employed. Said device or devices may include, but are not limited to, one or more or a combination of the following: binary distillation, azeotrope distillation, membrane distillation, mechanical vapor compression, hybrid systems, flash distillation, multistage flash distillation, multieffect distillation, extractive distillation, switchable solvent, reverse osmosis, nanofiltration, organic solvent nanofiltration, ultrafiltration, and microfiltration. For example, such a hybrid system may involve at least partially recovering the soluble reagent using nanofiltration and then further concentrating the soluble reagent using membrane distillation. Another example of such a hybrid system may be a process wherein a switchable solvent 'switches' out of solution due to the presence of a stimulant, such as a change in temperature, then nanofiltration is employed to further concentrate the switchable solvent or remove remaining switchable solvent in other solution. The switchable solvent or other reagent dissolved in solution may be further recovered or concentrated or even removed from the one or more layers or separate solutions that are formed.

Applied Pressure or Osmotic Pressure of Solution: The osmotic pressure range of a solution may be as low as 0.001 atm to as great as 1,000,000 atm. The osmotic pressure may be as low as less than any of the following: 0.001 atm, or 0.01 atm, or greater than or less than 0.05 atm, or 0.1 atm, or 0.2 atm, or 0.3 atm, or 0.4 atm, or 0.5 atm or 0.6 atm, or 0.7 atm, or 0.8 atm, or 0.9 atm, or 1 atm, or 1.1 atm, or 1.2 atm, or 1.3 atm, or 1.4 atm, or 1.5 atm, or 1.6 atm, or 1.7 atm, or 1.8 atm, or 1.9 atm, or 2 atm, or 2.1 atm, or 2.2 atm, or 2.3 atm, or 2.4 atm, or 2.5 atm, or 2.6 atm, or 2.7 atm, or 2.8 atm, or 2.9 atm, or 3 atm, or 3.5 atm, or 4 atm, or 4.5 atm, or 5 atm, or 5.5 atm, or 6 atm, or 6.5 atm, or 7 atm, or 7.5 atm, or 8 atm, or 8.5 atm, or 9 atm, or 9.5 atm, or 10 atm, or 12 atm, or 15 atm, or 18 atm, or 20 atm, or 22 atm, or 25 atm, or 28 atm, or 30 atm, or 35 atm, or 40 atm, or 45 atm, or 50 atm, or 55 atm, or 60 atm, or 65 atm, or 70 atm, or 75 atm, or 80 atm, or 85 atm, or 90 atm, or 95 atm, or 100 atm, or 150 atm, or 200 atm, or 500 atm, or 1,000 atm, or 10,000 atm, or 100,000 atm, or less than 1,000,000 atm, or pure solvent.

Using waste heat or chilling to accelerate or facilitate one or more steps and other hybrid waste heat and membrane recovery process combinations may be employed Solid precipitation and dissolution may occur in one or more embodiments, which may include as a results of including, but not limited to, due to changes in concentrations, concentrations, dissolved gas concentrations, pressures, temperature, other system conditions, or combinations thereof.

One or more separation devices or techniques or methods, may include, but not limited to, one or more or a combination of the following: filtration, centrifuge, decanting, distillation, magnetism, and/or membrane based process, such as reverse osmosis, osmotically assisted reverse osmosis, disc tube reverse osmosis (DTRO), high pressure reverse osmosis, forward osmosis, electrodialysis, nanofiltration, organic solvent nanofiltration ultrafiltration, membrane distillation, integrated electric-field nanofiltration, hot nanofiltration, or hot ultrafiltration.

Relatively plentiful sources of lesser osmotic pressure solution or low osmotic pressure solution may include, but are not limited to, one or more or a combination of the following: rainwater, river water, lake water, brackish water, seawater, dew, or groundwater, wastewater, non-potable water, or a derivative thereof.

Relatively plentiful sources of greater osmotic pressure solution or high osmotic pressure solution may include, but are not limited to, one or more or a combination of the following: seawater, saline aquifer, salt mine, or frackwater, or mine tailings, brine pond, solar pond, evaporation pond, reverse osmosis brine, desalination brine, waste brine, or mining water, or hypersaline lake, or antifreeze reagent, or sugar concentrate, or molasses, or organically derived draw solution, or lubricant, or a derivative thereof.

Heat Exchanging to Create Temperature Zones
  Heat Exchange between cold solution from cold zone entering warm zone and warm solution from warm zone entering cold zone.
  Potential Requirement—Phase transition temperature adjustment must be sufficiently large to enable an endothermic phase transition to occur in the temperature range of a 'cold temperature zone' and an exothermic phase transition to occur in the temperature range of a 'warm temperature zone'.

Storage of Liquid Streams
  Streams in the refrigeration cycle or heat transfer or thermal storage or combination thereof embodiments can be stored. Example streams which may be stored may include, but are not limited to, one or more or a combination of the following:
    Refrigeration Cycle (Salt or Phase Transition Temperature Adjustment Reagent Concentration Adjustment Based Phase Transition Adjustment, Reverse Osmosis or Nanofiltration or Ultra-Filtration):
      Storage of Permeate
      Storage of Concentrate or Retentate 'Salting-Out Reagent' Solution
      Storage of Mostly Organic Liquid Phase
      Storage of Mostly Water Liquid Phase
      Storage of Single Liquid Phase Combined Solution
      Storage of Diluted Aqueous Salt Solution or Diluted Phase Transition Temperature Adjustment Reagent Solution
    Refrigeration Cycle (Salt or Phase Transition Temperature Adjustment Reagent Concentration Adjustment Forward Osmosis or Osmotically Assisted Reverse Osmosis):
      Storage of Mostly Organic Composition #1 Solution
      Storage of Concentrate or Retentate 'Salting-Out Reagent' Solution
      Storage of Single Liquid Phase Combined Solution
      Storage of Diluted Aqueous Salt Solution or Diluted Phase Transition Temperature Adjustment Reagent Solution
      Storage of Mostly Organic Composition #2 Draw Solution
      Storage of Mostly Organic Composition #2 Diluted Draw Solution
      Storage of Mostly Organic Composition #2 Diluted Draw Solution after mixing with Residual Organic Composition #2 Retentate
      Storage of Mostly Water Liquid Phase before Treatment with Membrane Based Process
      Storage of Mostly Water Liquid Phase after Treatment with Membrane Based Process
    Refrigeration Cycle (Adjustment in the Concentration of a Large MW Reagent Relative to a Small Molecular Weight Reagent, Organic Solvent Nanofiltration Regeneration)
      Storage of Small Molecular Weight Reagent Permeate
      Storage of Large Molecular Weight Reagent Concentrate
      Storage of Mostly Aqueous Solution
      Storage of Single Liquid Phase Combined Solution
      Storage of Diluted Large Molecular Weight Reagent Solution
    Refrigeration Cycle (Adjustment in the Concentration of a Large MW Reagent Relative to a Small Molecular Weight Reagent, Organic Solvent Forward Osmosis Regeneration)

Enables Demand Response, Off-Peak metering, curtailment, improved renewables integration, and other techniques which currently cannot be used with prior art HVAC refrigeration cycles To minimize CAPEX of regeneration step, Permeate/Concentrate may be regenerated continuously until storage tanks of regenerated solutions are at a desired level. When heating or cooling demands arise, the present embodiment employ solutions stored in storage tanks. When cooling or heating is operating, the rate of cooling or heat may temporarily exceed the rate of regeneration.

Enables desynchronized operation

Regeneration/Concentration Adjustment using Forward Osmosis

Thermally Powered/Regenerative

Refrigeration Cycle Portion and Regeneration Portion

Water Removed/Phase Transition Temperature Adjustment Reagent Concentrated using FO, water removed in said step regenerated using a liquid-liquid phase transition Thermally regenerative draw solution, wherein reagents employed in said draw solution may be different than reagents in the refrigeration cycle Thermal regeneration employed heat exchanger method to enable regeneration at a different temperature than the refrigeration cycle portion without adding substantial heat to the refrigeration cycle RO Step to remove residual Organic Composition #2

Powered by two liquids of different osmotic pressures ultimately mixing (may be generally applicable to the RO and NF refrigeration cycle as well)

Low osmotic pressure solution diluting high osmotic pressure solution

Salt water mixing with freshwater

Saltier water mixing with less salty water

Wherein a portion of water from the less salty water or low osmotic pressure solution is separated from said less salty water or low osmotic pressure solution using reverse osmosis, forward osmosis, osmotically assisted reverse, nanofiltration, or a combination thereof before or during the addition of said portion of water to the refrigeration cycle District Heating, District Cooling, Thermal Storage—Low Energy Method to Enable Efficient Regeneration of a Liquid-Liquid Phase Transition Liquid at a Different Temperature than Storage or Transport of Said Liquid-Liquid Phase Transitioning Liquid Example Exemplary Embodiments A refrigeration cycle comprising:
A Refrigeration Cycle Portion; and
A Regeneration Portion;
  Wherein the refrigeration cycle portion comprises an exothermic liquid-liquid phase transition and an endothermic liquid-liquid phase transition;
  Wherein said exothermic phase transition occurs at a greater temperature than said endothermic phase transition due to a change in the concentration of a salt or phase transition temperature adjustment reagent;
And
  Wherein the regeneration portion comprises draw solution, a forward osmosis step, and a draw solution regeneration step;
  Wherein said forward osmosis step involves employing said draw solution to concentrate said refrigeration cycle portion salt or phase transition temperature adjustment reagent using Forward Osmosis and form a diluted draw solution;
  Wherein said regeneration step comprises regenerating said diluted draw solution into said draw solution and solvent or water;
  Wherein said solvent or water is returned to the refrigeration cycle portion.

A refrigeration cycle comprising:
A Refrigeration Cycle Portion; and
A Regeneration Portion;
  Wherein the refrigeration cycle portion comprises an exothermic liquid-liquid phase transition and an endothermic liquid-liquid phase transition;
  Wherein said exothermic phase transition occurs at a greater temperature than said endothermic phase transition due to a change in the concentration of a salt or phase transition temperature adjustment reagent;
And
  Wherein the regeneration portion comprises draw solution, a forward osmosis step, and a draw solution regeneration step;
  Wherein said forward osmosis step involves employing said draw solution to concentrate said refrigeration cycle portion salt or phase transition temperature adjustment reagent using Forward Osmosis and form a diluted draw solution;
  Wherein said regeneration step comprises regenerating said diluted draw solution by heating it above a liquid-liquid phase transition temperature, resulting in a liquid-liquid phase transition temperature forming a liquid phase comprising said draw solution and a liquid phase comprising solvent or water;
  Wherein said solvent or water is returned to the refrigeration cycle portion.

A refrigeration cycle comprising:
A first step comprising mixing a freshwater solution and a mostly organic liquid phase to form a single liquid phase in an exothermic liquid-liquid phase transition; and
A second step comprising adding or introducing a reagent comprising a concentrated solution of a salt or phase transition temperature adjustment reagent to form two liquid phases in an endothermic liquid-liquid phase transition;
Wherein one liquid phase comprises a diluted aqueous solution of a salt or phase transition temperature adjustment reagent; and another liquid phase comprises said mostly organic liquid phase;
Wherein said diluted aqueous solution of a salt or phase transition temperature adjustment reagent is concentrated into said concentrated solution of a salt or phase transition temperature adjustment reagent using forward osmosis with a draw solution possessing a greater osmotic pressure than said concentrated solution of a salt or phase transition temperature adjustment reagent; and
Forming a diluted draw solution;

Wherein said diluted draw solution is regenerated to form said freshwater and said draw solution Wherein regeneration comprises thermal regeneration in the form of a thermally driven liquid-liquid phase transition of the diluted draw solution into a draw solution liquid phase and a mostly water liquid phase Example Independent Exemplary Embodiments A refrigeration cycle comprising:

Adding water to an organic to form a single liquid phase combined solution in an exothermic liquid-liquid phase transition;

Adding concentrated salt solution or phase transition temperature adjustment reagent solution to said single liquid phase combined solution to form a two or more liquid phase mixture in an endothermic liquid-liquid phase transition A refrigeration cycle comprising:

A first step comprising adding water to an organic to form a single liquid phase combined solution in an exothermic liquid-liquid phase transition;

A second step comprising adding concentrated salt solution or phase transition temperature adjustment reagent solution to said single liquid phase combined solution to form a two or more liquid phase mixture in an endothermic liquid-liquid phase transition Wherein said first and second steps are reversable A refrigeration cycle comprising:

Adding water to an organic to form a single liquid phase combined solution in an exothermic liquid-liquid phase transition;

Adding a concentrated salt solution or phase transition temperature adjustment reagent solution to said single liquid phase combined solution to form a two or more liquid phase mixture in an endothermic liquid-liquid phase transition;

Wherein said concentrated salt solution or phase transition temperature adjustment reagent solution is regenerated by separating water from at least one of said two liquid phases using a membrane A refrigeration cycle comprising:

Adding water to an organic to form a single liquid phase combined solution in an endothermic liquid-liquid phase transition;

Adding a concentrated salt solution or phase transition temperature adjustment reagent solution to said single liquid phase combined solution to form a two or more liquid phase mixture in an exothermic liquid-liquid phase transition A refrigeration cycle comprising:

Adding water to an organic to form a single liquid phase combined solution in an endothermic liquid-liquid phase transition;

Adding a concentrated salt solution or phase transition temperature adjustment reagent solution to said single liquid phase combined solution to form a two or more liquid phase mixture in an exothermic liquid-liquid phase transition;

Wherein said concentrated salt solution or phase transition temperature adjustment reagent solution is regenerated by separating water from at least one of said two liquid phases using a membrane A refrigeration cycle comprising:

Adding water to an organic to form a single liquid phase combined solution in an exothermic liquid-liquid phase transition;

Adding a concentrated salt solution or phase transition temperature adjustment reagent solution to said single liquid phase combined solution to form a two liquid phase mixture in an endothermic liquid-liquid phase transition;

Wherein said concentrated salt solution or phase transition temperature adjustment reagent solution is regenerated by separating water from at least one of said two liquid phases using forward osmosis with a draw solution comprising a solution with a greater osmotic pressure than said concentrated salt solution or phase transition temperature adjustment reagent solution A refrigeration cycle comprising:

A first step comprising an endothermic liquid-liquid phase transition; and

A second step comprising an exothermic liquid-liquid phase transition;

Wherein a liquid-liquid phase transition temperature is adjusted between the first and second steps, Wherein said adjusting comprises adjusting a concentration using forward osmosis A refrigeration cycle comprising:

A first step comprising an endothermic liquid-liquid phase transition; and

A second step comprising an exothermic liquid-liquid phase transition;

Wherein a solubility of a first reagent is adjusted between the first and second steps, Wherein said adjusting of solubility comprises adjusting a concentration of a second reagent A refrigeration cycle comprising:

A first step comprising an endothermic liquid-liquid phase transition; and

A second step comprising an exothermic liquid-liquid phase transition;

Wherein a solubility of a first reagent is adjusted between the first and second steps, Wherein said adjusting of solubility comprises adjusting a concentration of a second reagent using forward osmosis A refrigeration cycle comprising:

A first step comprising mixing a freshwater solution and a mostly organic liquid phase to form a single liquid phase in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is concentrated into said concentrated solution of a salt or phase transition temperature adjustment reagent using a membrane A refrigeration cycle comprising:

A first step comprising dissolving a mostly organic liquid phase solution into a freshwater solution to form a single liquid phase solution in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is concentrated into said concentrated solution of a salt or phase transition temperature adjustment reagent using a membrane A refrigeration cycle comprising:

A first step comprising mixing a freshwater solution and a mostly organic liquid phase to form a single liquid phase in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is concentrated into said concentrated solution of a salt or phase transition temperature adjustment reagent using forward osmosis A refrigeration cycle comprising:

A first step comprising mixing a freshwater solution and a mostly organic liquid phase to form a single liquid phase in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is concentrated into said concentrated solution of a salt or phase transition temperature adjustment reagent using forward osmosis with a draw solution A refrigeration cycle comprising:

A first step comprising mixing a freshwater solution and a mostly organic liquid phase to form a single liquid phase in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is concentrated into said concentrated solution of a salt or phase transition temperature adjustment reagent using forward osmosis with a draw solution A refrigeration cycle powered a freshwater solution or a solution with a low osmotic pressure mixing with a concentrated solution or salt water solution or a solution with a high osmotic pressure comprising:

A first step comprising mixing a freshwater solution and a mostly organic liquid phase to form a single liquid phase in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is concentrated into said concentrated solution of a salt or phase transition temperature adjustment reagent using forward osmosis with a draw solution A refrigeration cycle powered a freshwater solution or a solution with a low osmotic pressure mixing with a concentrated solution or salt water solution or a solution with a high osmotic pressure comprising:

A first step comprising mixing a freshwater solution or low osmotic pressure solution and a mostly organic liquid phase to form a single liquid phase in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is concentrated into said concentrated solution of a salt or phase transition temperature adjustment reagent using forward osmosis with a draw solution comprising a brine or concentrate or high osmotic pressure solution A refrigeration cycle comprising:

A first step comprising mixing a freshwater solution and a mostly organic liquid phase to form a single liquid phase in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is concentrated into said concentrated solution of a salt or phase transition temperature adjustment reagent using forward osmosis with a draw solution possessing a greater osmotic pressure than said concentrated solution of a salt or phase transition temperature adjustment reagent; and Forming a diluted draw solution;

Wherein said diluted draw solution is regenerated to form said freshwater and said draw solution Example Dependent Exemplary Embodiments Wherein said concentrated salt solution or phase transition temperature adjustment reagent solution is regenerated by separating water from at least one of said two liquid phases using a membrane Wherein at least one liquid phase of said two or more liquid phase mixture comprises an organic Wherein at least one liquid phase of said two or more liquid phase mixture comprises said organic Wherein at least one liquid phase of said two or more liquid phase mixture comprises a diluted salt solution or phase transition temperature adjustment reagent solution Wherein at least one liquid phase of said two or more liquid phase mixture comprises a diluted salt solution or phase transition temperature adjustment reagent solution; and Wherein said diluted salt solution or phase transition temperature adjustment reagent solution is separated into concentrated salt solution or phase transition temperature adjustment reagent solution and water using a membrane Wherein at least one liquid phase of said two or more liquid phase mixture comprises a diluted salt solution or phase transition temperature adjustment reagent solution; and Wherein said diluted salt solution or phase transition temperature adjustment reagent solution is separated using forward osmosis into concentrated salt solution or phase transition temperature adjustment reagent solution and a diluted forward osmosis draw solution Wherein at least one liquid phase of said two or more liquid phase mixture comprises a diluted salt solution or phase transition temperature adjustment reagent solution; and Wherein said diluted salt solution or phase transition temperature adjustment reagent solution is separated using osmotically assisted reverse osmosis into concentrated salt solution or phase transition temperature adjustment reagent solution and a diluted draw solution Wherein said organic comprises an organic solvent, a polymer, or a combination thereof Wherein said organic comprises less than 30 wt % water Wherein said organic comprises less than 40 wt % water Wherein said organic comprises less than 50 wt % water Wherein said organic comprises less than 60 wt % water Wherein a portion of water from the less salty water or low osmotic pressure solution is separated from said less salty water or low osmotic pressure solution using reverse osmosis, forward osmosis, osmotically assisted reverse, nanofiltration, or a combination thereof before or during the addition or mixing of said freshwater or portion of water Wherein said water is regenerated from said multi-liquid phase mixture using a membrane Wherein said concentrated salt solution or phase transition temperature adjustment reagent solution is regenerated from said multi-liquid phase mixture using a membrane Wherein said water is regenerated from at least one liquid phase of said multi-liquid phase mixture using a membrane Wherein said concentrated salt solution or phase transition temperature adjustment reagent solution is regenerated from at least one liquid phase of said multi-liquid phase mixture using a membrane Wherein water is removed from at least one liquid phase of said multi-liquid phase mixture using reverse osmosis, nanofiltration, ultrafiltration, or a combination thereof Wherein water is removed from at least one liquid phase of said multi-liquid phase mixture using a draw solution and forward osmosis Wherein water is removed from at least one liquid phase of said multi-liquid phase mixture using a draw solution in forward osmosis Wherein water is removed from at least one liquid phase of said multi-liquid phase mixture using a draw solution in forward osmosis, forming a diluted draw solution Wherein water is removed from at least one liquid phase of said multi-liquid phase mixture using a draw solution in forward osmosis, forming a diluted draw solution and concentrated salt solution or phase transition temperature adjustment reagent solution Wherein water is removed from at least one liquid phase of said multi-liquid phase mixture using a draw solution in forward osmosis, forming a diluted draw solution Wherein said diluted draw solution is regenerated to form water and draw solution Wherein said diluted draw solution is regenerated to form draw solution Wherein said regeneration comprises a thermally powered liquid-liquid phase transition Wherein said regeneration comprises distillation Wherein said regeneration comprises evaporation Wherein the said draw solution possesses a liquid-liquid phase transition temperature range in at least some solutions with water Wherein said draw solution comprises a high osmotic pressure solution from one or more high osmotic pressure solution sources Wherein said high osmotic pressure solution sources comprise seawater, salt-water, evaporation pond, brine, hypersaline lake, juice concentrate, syrup concentrate, organic solvent, antifreeze concentrate, concentrated requiring dilution with water, saline aquifer brine, or a combination thereof Wherein said water or low osmotic pressure solution comprises a low osmotic pressure solution from one or more low osmotic pressure solution sources Wherein said low high osmotic pressure solution sources comprise freshwater, lake water, river water, brackish water, wastewater, groundwater, seawater, or a combination thereof Wherein said regenerated water is further treated to remove residual draw solution reagent or organic Composition #2 before being employed as said 'water'

Wherein one or more or a combination of liquid phases are stored

Example Independent Exemplary Embodiments

A refrigeration cycle comprising:
A first step comprising an endothermic liquid-liquid phase transition; and
A second step comprising an exothermic liquid-liquid phase transition;
Wherein liquid-liquid phase transition temperature is adjusted between the first and second steps,
Wherein said adjusting comprises adjusting a concentration using a membrane A refrigeration cycle comprising:
A first step comprising an endothermic liquid-liquid phase transition; and
A second step comprising an exothermic liquid-liquid phase transition;
Wherein liquid-liquid phase transition temperature is adjusted between the first and second steps,
Wherein said adjusting comprises adjusting a concentration using forward osmosis A refrigeration cycle comprising:
A first step wherein two separate liquid phases are mixed to form a single liquid phase solution in an exothermic liquid-liquid phase transition;
A second step wherein a reagent is introduced or added to said single liquid phase solution, resulting in the formation of a two liquid phase solution in an endothermic liquid-liquid phase transition A refrigeration cycle comprising:
A first step wherein two or more separate liquid phases are mixed to form a single liquid phase solution in an exothermic liquid-liquid phase transition;
A second step wherein a reagent is introduced or added to said single liquid phase solution, resulting in the formation of a two or more liquid phase solution in an endothermic liquid-liquid phase transition A refrigeration cycle comprising:
A first step wherein two or more separate liquid phases are mixed to form a single liquid phase solution in an exothermic liquid-liquid phase transition;
A second step wherein a reagent is introduced or added to said single liquid phase solution, resulting in the formation of a two or more liquid phase solution in an endothermic liquid-liquid phase transition;
Wherein the cycle is regenerated by removing or separating at least a portion of said introduced or added reagent from at least one of said two or more liquid phases A refrigeration cycle comprising:
A first step wherein two separate liquid phases are mixed to form a single liquid phase solution in an exothermic liquid-liquid phase transition;
A second step wherein a reagent is introduced or added to said single liquid phase solution, resulting in the formation of a two or more liquid phase solution in an endothermic liquid-liquid phase transition;
Wherein the cycle is regenerated by recovering said introduced or added reagent from at least one of said two or more liquid phases A refrigeration cycle comprising:
A first step wherein two separate liquid phases are mixed to form a single liquid phase solution in an exothermic liquid-liquid phase transition;
A second step wherein a reagent is introduced or added to said single liquid phase solution, resulting in the formation of a two or more liquid phase solution in an endothermic liquid-liquid phase transition;
Wherein the cycle is regenerated by separating said introduced or added reagent from at least one of said two or more liquid phases using a membrane A refrigeration cycle comprising:
A first step wherein a mostly organic liquid phase and a water liquid phase are mixed to form a single liquid phase solution in an exothermic liquid-liquid phase transition;
A second step wherein a reagent comprising a salt reagent or a phase transition temperature reagent or a solution thereof or a combination thereof is introduced or added to said single liquid phase solution, resulting in the formation of a two or more liquid phase solution in an endothermic liquid-liquid phase transition A refrigeration cycle comprising:
A first step wherein a mostly organic liquid phase and a water liquid phase are mixed to form a single liquid phase solution in an exothermic liquid-liquid phase transition;
A second step wherein a reagent comprising a salt reagent or a phase transition temperature reagent or a solution thereof or a combination thereof is introduced or added to said single liquid phase solution, resulting in the formation of a two or more liquid phase solution in an endothermic liquid-liquid phase transition
Wherein the cycle is regenerated by separating said introduced or added reagent from water using a membrane
Wherein said introduced or added reagent comprises a membrane concentrate or retentate
Wherein said water comprises a membrane permeate or originated from a membrane permeate A refrigeration cycle comprising:
A first step wherein two separate liquid phases are mixed to form a single liquid phase solution in an exothermic liquid-liquid phase transition;
A second step wherein a concentration of a reagent is changed in said single liquid phase solution, resulting in the formation of a two or more liquid phase solution in an endothermic liquid-liquid phase transition A refrigeration cycle comprising:
A first step wherein two separate liquid phases are mixed to form a single liquid phase solution in an endothermic liquid-liquid phase transition;
A second step wherein a reagent is introduced or added to said single liquid phase solution, resulting in the formation of a two liquid phase solution in an exothermic liquid-liquid phase transition A refrigeration cycle comprising:
A first step wherein two or more separate liquid phases are mixed to form a single liquid phase solution in an endothermic liquid-liquid phase transition;
A second step wherein a reagent is introduced or added to said single liquid phase solution, resulting in the formation of a two or more liquid phase solution in an exothermic liquid-liquid phase transition A refrigeration cycle comprising:
A first step wherein two or more separate liquid phases are mixed to form a single liquid phase solution in an endothermic liquid-liquid phase transition;
A second step wherein a reagent is introduced or added to said single liquid phase solution, resulting in the formation of a two or more liquid phase solution in an exothermic liquid-liquid phase transition;

Wherein the cycle is regenerated by removing or separating at least a portion of said introduced or added reagent from at least one of said two or more liquid phases A refrigeration cycle comprising:

A first step wherein two separate liquid phases are mixed to form a single liquid phase solution in an endothermic liquid-liquid phase transition;

A second step wherein a reagent is introduced or added to said single liquid phase solution, resulting in the formation of a two or more liquid phase solution in an exothermic liquid-liquid phase transition;

Wherein the cycle is regenerated by recovering said introduced or added reagent from at least one of said two or more liquid phases A refrigeration cycle comprising:

A first step wherein two separate liquid phases are mixed to form a single liquid phase solution in an endothermic liquid-liquid phase transition;

A second step wherein a reagent is introduced or added to said single liquid phase solution, resulting in the formation of a two or more liquid phase solution in an exothermic liquid-liquid phase transition;

Wherein the cycle is regenerated by separating said introduced or added reagent from at least one of said two or more liquid phases using a membrane A refrigeration cycle comprising:

A first step wherein a mostly organic liquid phase and a water liquid phase are mixed to form a single liquid phase solution in an endothermic liquid-liquid phase transition;

A second step wherein a reagent comprising a salt reagent or a phase transition temperature reagent or a solution thereof or a combination thereof is introduced or added to said single liquid phase solution, resulting in the formation of a two or more liquid phase solution in an exothermic liquid-liquid phase transition A refrigeration cycle comprising:

A first step wherein a mostly organic liquid phase and a water liquid phase are mixed to form a single liquid phase solution in an endoothermic liquid-liquid phase transition;

A second step wherein a reagent comprising a salt reagent or a phase transition temperature reagent or a solution thereof or a combination thereof is introduced or added to said single liquid phase solution, resulting in the formation of a two or more liquid phase solution in an exothermic liquid-liquid phase transition Wherein the cycle is regenerated by separating said introduced or added reagent from water using a membrane Wherein said introduced or added reagent comprises a membrane concentrate or retentate Wherein said water comprises a membrane permeate or originated from a membrane permeate A refrigeration cycle comprising:

A first step wherein two separate liquid phases are mixed to form a single liquid phase solution in an endothermic liquid-liquid phase transition;

A second step wherein a concentration of a reagent is changed in said single liquid phase solution, resulting in the formation of a two or more liquid phase solution in an exothermic liquid-liquid phase transition A refrigeration cycle comprising:

A first step comprising mixing a freshwater solution and a mostly organic liquid phase to form a single liquid phase in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is separated into said freshwater solution and said concentrated solution of a salt or phase transition temperature adjustment reagent using a membrane A refrigeration cycle comprising:

A first step comprising dissolving a mostly organic liquid phase solution into a freshwater solution to form a single liquid phase solution in an exothermic liquid-liquid phase transition; and A second step comprising adding or introducing a reagent comprising a concentrated solution of a salt or phase transition temperature adjustment reagent to form two liquid phases in an endothermic liquid-liquid phase transition;

Wherein one liquid phase comprises a diluted aqueous solution of a salt or phase transition temperature adjustment reagent; and another liquid phase comprises said mostly organic liquid phase;

Wherein said diluted aqueous solution of a salt or phase transition temperature adjustment reagent is separated into said freshwater solution and said concentrated solution of a salt or phase transition temperature adjustment reagent using a membrane Wherein said exothermic phase transition comprises mixing an organic liquid phase with a low osmotic pressure water liquid phase, resulting in a combined organic-water solution Wherein said endothermic phase transition comprises mixing said combined organic-water solution with a high osmotic pressure solution Example Independent Exemplary Embodiments A refrigeration cycle comprising:

An endothermic liquid-liquid phase transition occurring in a cold temperature zone; and An exothermic liquid-liquid phase transition occurring in a warm temperature zone;

Wherein said warm temperature zone is greater in temperature than said cold temperature zone A refrigeration cycle comprising:

An endothermic liquid-liquid phase transition occurring in a cold temperature zone; and An exothermic liquid-liquid phase transition occurring in a warm temperature zone;

Wherein said warm temperature zone is greater in temperature than said cold temperature zone Further comprising maintaining said temperature zones by heat exchanging the liquids from the cold temperature zone entering the warm temperature zone with the liquids from the warm temperature zone entering the cold temperature zone A refrigeration cycle comprising:
  An endothermic liquid-liquid phase transition occurring in a cold temperature zone; and
  An exothermic liquid-liquid phase transition occurring in a warm temperature zone;
  Wherein said warm temperature zone is greater in temperature than said cold temperature zone; and
  Wherein said endothermic liquid-liquid phase transition occurs at a lesser temperature than said exothermic phase transition due to a phase transition temperature adjustment
  Wherein said phase transition temperature adjustment comprises adjusting the concentration of a reagent A refrigeration cycle comprising:
  An endothermic liquid-liquid phase transition occurring in a cold temperature zone; and
  An exothermic liquid-liquid phase transition occurring in a warm temperature zone;
  Wherein said warm temperature zone is greater in temperature than said cold temperature zone by a temperature difference greater than the adiabatic temperature change of the exothermic phase transition, or the endothermic phase transition, or both A refrigeration cycle comprising:
  An endothermic liquid-liquid phase transition occurring in a cold temperature zone; and
  An exothermic liquid-liquid phase transition occurring in a warm temperature zone;
  Wherein said warm temperature zone is greater in temperature than said cold temperature zone by a temperature difference greater than the adiabatic temperature rise of the exothermic phase transition A refrigeration cycle comprising:
  An endothermic liquid-liquid phase transition occurring in a cold temperature zone; and
  An exothermic liquid-liquid phase transition occurring in a warm temperature zone;
  Wherein said warm temperature zone is greater in temperature than said cold temperature zone by a temperature difference greater than the adiabatic temperature drop of the endothermic phase transition A system for heating or cooling with temperature zones comprising:
  Two non-contiguously separate input liquid streams are preheated in a heat exchange with a liquid phase output stream
  Wherein said preheated two non-contiguously separate input liquid streams are mixed, resulting in an exothermic liquid-liquid phase transition into a combined single liquid phase solution
  Removing at least a portion of heat generated by said exothermic liquid-liquid phase transition; and
  Wherein said single liquid phase solution is pre-cooled in a heat exchange with said two non-contiguously separate liquid phase streams A system for heating or cooling with temperature zones comprising:
  Two non-contiguously separate input liquid streams are pre-cooled in a heat exchange with a liquid phase output stream
  Wherein said preheated two non-contiguously separate input liquid streams are mixed, resulting in an endothermic liquid-liquid phase transition into a combined single liquid phase solution
  Cooling an application requiring cooling due to heat absorbed by said endothermic liquid-liquid phase transition; and
  Wherein said single liquid phase solution is pre-heated in a heat exchange with said two non-contiguously separate liquid phase streams A system for heating or cooling comprising:
  An input liquid stream is pre-cooled in a heat exchange with one or more of the two or more non-contiguously separate liquid phase output streams;
  Wherein said pre-cooled input liquid stream is mixed with a salt or phase transition temperature adjustment reagent, resulting in a two or more liquid phase mixture in an endothermic liquid-liquid phase transition; and
  Further comprising one or more or a combination of the following:
    Separating at least a portion of the two or more liquid phases into two or more non-contiguous liquid streams;
    Removing said salt or added phase transition temperature adjustment reagent from at least one of said two or more liquid streams;
    Adjusting the concentration of salt or added phase transition temperature adjustment reagent from at least one of said two or more liquid streams;
    Pre-heating one or more of said two or more non-contiguously separate liquid phase output streams in a heat exchange with an input liquid stream A system for heating or cooling comprising:
  An input liquid stream is pre-heated in a heat exchange with one or more of the two or more non-contiguously separate liquid phase output streams;
  Wherein said pre-heated input liquid stream is mixed with a salt or phase transition temperature adjustment reagent, resulting in a two or more liquid phase mixture in an exothermic liquid-liquid phase transition; and
  Further comprising one or more or a combination of the following:
    Separating at least a portion of the two or more liquid phases into two or more non-contiguous liquid streams;
    Removing said salt or added phase transition temperature adjustment reagent from at least one of said two or more liquid streams;
    Adjusting the concentration of salt or added phase transition temperature adjustment reagent from at least one of said two or more liquid streams;
    Pre-cooling one or more of said two or more non-contiguously separate liquid phase output streams in a heat exchange with an input liquid stream Example Dependent Exemplary Embodiments Wherein said temperature zones are enabled by heat exchanging liquids from said warm temperature zone entering said cold temperature zone with liquids from said cold temperature zone entering said warm temperature zone
Wherein said endothermic phase transition occurs due to a change in a concentration of a reagent
Wherein said exothermic phase transition occurs due to a change in a concentration of a reagent
Wherein a concentration of a reagent in the solution undergoing an endothermic phase transition is different than the solution undergoing an exothermic phase transition
Wherein the concentration of a reagent is adjusted between said exothermic phase transition and said endothermic phase transition Wherein said endothermic phase transition occurs at a lower temperature than said exothermic phase transition due to a change in concentration of a reagent Wherein said endothermic phase transition occurs at a lower temperature than said exothermic phase transition due to an adjustment in phase transition temperature Wherein said change in concentration of a reagent adjusts the phase transition temperature of one or more other reagents Wherein said change in concentration of a reagent changes the solubility of one or more other reagents Wherein said change in concentration of a reagent is conducted using a membrane based process Wherein said membrane based process comprises reverse osmosis, forward osmosis, nanofiltration, osmotically assisted reverse osmosis, ultrafiltration, or a combination thereof Wherein said membrane based process comprises a vapor gap membrane, pervaporation membrane, membrane distillation, or gas-liquid contractor membrane Wherein said change in concentration of a reagent comprises adding a reagent Wherein said change in concentration of a reagent involves separating a reagent Wherein said change in concentration of a reagent involves removing a reagent Wherein said change in concentration of a reagent involves addition of a permeate originating from a membrane-based process Wherein said change in concentration of a reagent involves addition of a permeate originating from a membrane-based process Wherein said addition of a concentrate originating from a membrane-based process Wherein said change in concentration of a reagent is reversible Wherein said change in concentration of a reagent is reversed within the process Wherein said change in concentration of a reagent is reversed between said cold temperature zone and said warm temperature zone Wherein said endothermic phase transition is facilitated by a change in a concentration of a reagent; and Wherein said exothermic phase transition is facilitated by a change in a concentration of a reagent Wherein said endothermic phase transition is facilitated by a first change in a concentration of a reagent; and Wherein said exothermic phase transition is facilitated by a second change in a concentration of a reagent Wherein said first change in a concentration of a reagent is the reverse of said second change in concentration of a reagent Wherein said exothermic phase transition is facilitated by a first change in a concentration of a reagent Wherein said endothermic phase transition is facilitated by a second change in a concentration of a reagent; and Wherein said first change in a concentration of a reagent is the reverse of said second change in concentration of a reagent Wherein the adiabatic temperature change of an enthalpy of liquid-liquid phase transition is greater than the approach temperature and/or heat exchanger Delta-T of a heat exchanger Example Independent Exemplary Embodiment A process for separating gases comprising: (LCST)
Exothermically absorbing a desired gas from a gas mixture into a solution lean in desired gas, forming a solution rich in desired gas; and
Endothermically desorbing a desired gas from said solution rich in desired gas, forming a solution lean in desired gas;
Wherein a reagent is added to a solution rich in desired gas before or during desorbing to form an exothermic dissolution;
Wherein said added reagent is separated from said solution lean in desired gas solution before or during absorbing by adjusting a concentration to initiate/trigger an endothermic phase transition A process for separating gases comprising: (LCST)
Exothermically absorbing a desired gas from a gas mixture into a solution lean in desired gas, forming a solution rich in desired gas; and
Endothermically desorbing a desired gas from said solution rich in desired gas, forming a solution lean in desired gas;
Wherein a reagent is added to a solution rich in desired gas before or during desorbing to form an exothermic phase transition;
Wherein said added reagent is separated from said solution lean in desired gas solution before or during absorbing by adjusting a concentration to initiate/trigger an endothermic phase transition A process for separating gases comprising: (LCST)
Exothermically absorbing a desired gas from a gas mixture into a solution lean in desired gas, forming a solution rich in desired gas; and
Endothermically desorbing a desired gas from said solution rich in desired gas, forming a solution lean in desired gas;
Wherein a reagent is added to a solution rich in desired gas before or during or after desorbing to form an exothermic dissolution;
Wherein said added reagent is separated from said solution lean in desired gas solution before or during or after absorbing by adjusting a concentration to initiate/trigger an endothermic phase transition A process for separating gases comprising: (UCST)
Exothermically absorbing a desired gas from a gas mixture into a solution lean in desired gas, forming a solution rich in desired gas; and
Endothermically desorbing a desired gas from said solution rich in desired gas, forming a solution lean in desired gas;
Wherein a reagent is added to a solution lean in desired gas before or during absorbing to form an endothermic dissolution;
Wherein said added reagent is separated from said solution rich in desired gas solution before or during desorbing by adjusting a concentration to initiate/trigger an exothermic phase transition Example Dependent Exemplary Embodiments Wherein said added reagent comprises a liquid
Wherein said added reagent is separated as a liquid
Wherein said added reagent comprises a solid
Wherein said added reagent is separated as a solid
Wherein said added reagent comprises a gas
Wherein said added reagent is separated as a gas
Wherein said added reagent comprises one or more or a combination of organic chemicals Wherein said phase transition comprises a liquid-liquid phase transition Wherein said endothermic phase transition comprises forming a multi-liquid phase mixture from a single liquid phase solution, wherein at least one liquid phase of said multi-liquid phase mixture comprises added reagent Wherein said endothermic phase transition comprises forming a multi-liquid phase mixture from a single liquid phase solution, wherein at least one liquid phase of said multi-liquid phase mixture comprises a solution lean in desired gas Wherein said single liquid phase solution comprises added reagent dissolved in a solution lean in desired gas Wherein said endothermic phase transition absorbs heat from the exothermic absorption of a desired gas Wherein said endothermic phase transition cools or removes or absorbs heat from a solution lean in desired gas to facilitate desired gas absorption Wherein said endothermic phase transition cools or removing or absorbs heat from a solution lean in desired gas before or during absorption to facilitate desired gas absorption Wherein said endothermic phase transition facilitates desired gas absorption by increasing dielectric constant Wherein said endothermic phase transition facilitates desired gas absorption by decreasing dielectric constant Wherein said endothermic phase transition facilitates desired gas absorption by increasing desired gas solubility Wherein said endothermic phase transition facilitates desired gas absorption by decreasing the desired gas partial pressure of said solution lean in desired gas Wherein said endothermic phase transition facilitates desired gas absorption by increasing absorption kinetics Wherein said exothermic dissolution or phase transition comprises forming a single liquid phase solution from a multi-liquid phase mixture, wherein at least one liquid phase of said multi-liquid phase mixture comprises said added reagent Wherein said exothermic dissolution or phase transition comprises forming a single liquid phase solution from the dissolution of said added reagent, wherein said single liquid phase solution comprises added reagent dissolved in solution rich in desired gas Wherein said exothermic dissolution or phase transition comprises forming a single liquid phase solution from a multi-liquid phase mixture, wherein at least one liquid phase of said multi-liquid phase mixture comprises said solution rich in desired gas Wherein said single liquid phase solution comprises added reagent dissolved in a solution rich in desired gas Wherein said exothermic phase transition or dissolution involves releasing heat to facilitate desired gas desorption Wherein said exothermic phase transition or dissolution involves releasing heat to facilitate desired gas desorption, wherein said heat originated from said endothermic phase transition Wherein said exothermic phase transition or dissolution involves releasing the heat from said endothermic phase transition Wherein said exothermic phase transition or dissolution involves releasing the heat from said endothermic phase transition at a greater temperature than said endothermic phase transition Wherein said exothermic phase transition facilitates desired gas desorption by increasing dielectric constant Wherein said exothermic phase transition facilitates desired gas desorption by decreasing dielectric constant Wherein said exothermic phase transition facilitates desired gas desorption by decreasing desired gas solubility Wherein said exothermic phase transition facilitates desired gas desorption by increasing the desired gas partial pressure of said solution rich in desired gas Wherein said exothermic phase transition facilitates desired gas desorption by increasing desorption kinetics Wherein said exothermic phase transition heats a solution rich in desired gas to facilitate desired gas desorption Wherein said exothermic phase transition heats a solution rich in desired gas before or during desorption to facilitate desired gas desorption Wherein said adjusting of a concentration comprises adjusting a concentration using a membrane Wherein said adjusting of a concentration involves adding a second reagent soluble in the solution lean in desired gas and insoluble or with limited solubility in the added reagent Wherein said adjusting of a concentration involves adding a second reagent insoluble or with limited solubility in the solution lean in desired gas and soluble in the added reagent Wherein said adjusting of a concentration involves adding a second reagent which adjusts the phase transition temperature of said added reagent Wherein said adjusting of a concentration involves adding a second reagent which adjusts the phase transition temperature of said added reagent, wherein said phase transition temperature is adjusted to be less than the temperature of the single liquid phase solution comprising added solvent dissolved in desired gas lean solution Wherein said single liquid phase solution undergoes a liquid-liquid phase transition into a liquid phase comprising added reagent dissolved in said second reagent and another liquid phase comprising said solution lean in desired gas Wherein said single liquid phase solution undergoes a liquid-liquid phase transition into a liquid phase comprising added reagent and another liquid phase comprising said second reagent dissolved in said solution lean in desired gas Regenerate said second solution (from a liquid phase comprising said second reagent dissolved in said solution lean in desired gas)

Regenerate said second solution (from a liquid phase comprising added reagent dissolved in said second reagent)

Regenerate said added reagent (from a liquid phase comprising added reagent dissolved in said second reagent)

Adjusting methods
Compositions
Temperatures
Cross heat exchanger
Added
Removed

Representative Embodiments

A refrigeration cycle process comprising:
endothermically liquid-liquid phase transitioning a first composition in a first temperature zone; and
exothermically liquid-liquid phase transitioning a second composition in a second temperature zone;
wherein the first temperature zone is operably connected to the second temperature zone; and
wherein said second temperature zone is greater in temperature than said first temperature zone.

The process of embodiment 1 wherein said second temperature zone is greater in temperature than said first temperature zone by a temperature differential which is greater than (1) an adiabatic temperature change of the exothermic phase transition, or (2) an adiabatic temperature change of the endothermic phase transition, or (3) both (1) and (2).

The process of embodiment 1 further comprising heat exchanging at least a portion of the first composition in the first temperature zone with at least a portion of the second composition in the operably connected second temperature zone.

The process of embodiment 1 wherein said endothermic liquid-liquid phase transitioning occurs at a lesser temperature than said exothermic phase transitioning due to a phase transition temperature adjustment.

The process of embodiment 4 wherein said phase transition temperature adjustment comprises adjusting the concentration of a reagent.

The process of embodiment 1 wherein said endothermic phase transitioning, or said exothermic phase transitioning, or both occurs due to a change in a concentration of a reagent.

The process of embodiment 6 wherein said change in concentration of a reagent comprises using a membrane-based process The process of embodiment 7 wherein said membrane-based process comprises reverse osmosis, forward osmosis, nanofiltration, osmotically assisted reverse osmosis, ultra-filtration, or a combination thereof.

The process of embodiment 6 wherein said change in concentration of a reagent comprises one or more or a combination of the following: adding a reagent, separating a reagent, removing a reagent, adding a permeate originating from a membrane-based process, adding a concentrate originating from a membrane-based process, adding water, adding solvent, or adding water from regeneration of a forward osmosis draw solution.

The process of embodiment 6 wherein said change in concentration of a reagent is reversible.

The process of embodiment 1 wherein the first composition differs from the second composition in a concentration of a reagent The process of embodiment 6 which further comprises reversing said change in concentration of a reagent.

A continuous process for heating or cooling with temperature zones comprising:
preheating two or more separate input liquid streams via heat exchange with a liquid phase output stream;
mixing said preheated two or more separate input liquid streams to
form a single liquid phase solution in an exothermic liquid-liquid phase transition;
removing at least a portion of heat generated by said exothermic liquid-liquid phase transition; and
pre-cooling said single liquid phase solution via heat exchange with said two or more separate input liquid phase streams.

The process of embodiment 13 wherein said two or more separate input liquid streams are non-contiguous.

The process of embodiment 13 wherein at least one of said two or more input liquid streams comprises water, or a low osmotic pressure solution, or a combination thereof.

The process of embodiment 15 wherein said water comprises water selected from one or more sources comprising freshwater, lake water, river water, brackish water, wastewater, groundwater, seawater, or a combination thereof.

The process of embodiment 15 wherein said water comprises one or more of:
water comprising a permeate from a membrane-based process; or
water from the regeneration of a forward osmosis draw solution; or
water from one or more low osmotic pressure solution sources; or
water from one or more water sources; or
a combination thereof.

The process of embodiment 13 wherein at least one of said two or more separate input liquid streams comprises an organic liquid.

A process for heating or cooling comprising:
pre-cooling an input liquid stream via heat exchange with one or more of two or more non-contiguously separate liquid phase output streams to form a pre-cooled input liquid stream;
mixing said pre-cooled input liquid stream with a salt, a phase transition temperature adjustment reagent, or both to form a two or more liquid phase mixture in an endothermic liquid-liquid phase transition; and
wherein said process further comprises one or more or a combination of the following:
separating at least a portion of the two or more liquid phases into two or more non-contiguous liquid streams; or
removing said salt, said phase transition temperature adjustment reagent, or both from at least one of said two or more liquid phase mixture; or
adjusting a concentration of salt, phase transition temperature adjustment reagent, or both in at least one of said two or more non-contiguous liquid streams; or
pre-heating one or more of said two or more non-contiguous liquid streams via heat exchange with another input liquid stream.

The process of embodiment 19 wherein at least one liquid phase of said two or more non-contiguously separate liquid phase mixture comprises an organic solvent.

The process of embodiment 19 wherein at least one liquid phase of said two or more non-contiguously separate liquid phase mixture comprises a salt solution or a phase transition temperature adjustment reagent solution.

The process of embodiment 19 wherein said salt, said phase transition temperature adjustment reagent, or both is a concentrated solution of a salt or a phase transition temperature adjustment reagent.

The process of embodiment 19 which further comprises regenerating said salt, phase transition temperature adjustment reagent, or both by concentrating at least one liquid phase of said two or more liquid phase mixture with a membrane.

The process of embodiment 23 wherein said concentrating produces a retentate comprising a concentrated solution of salt, or phase transition temperature adjustment reagent and a permeate comprising at least a portion water.

The process of embodiment 19 which further comprises regenerating said salt, phase transition temperature adjustment reagent, or both by concentrating at least one liquid phase of said two or more liquid phase mixture with forward osmosis using a draw solution to form a diluted draw solution.

The process of embodiment 25 wherein said draw solution comprises a high osmotic pressure solution from one or more high osmotic pressure solution sources.

The process of embodiment 26 wherein said high osmotic pressure solution sources comprise seawater, salt-water, evaporation pond water, brine, hypersaline lake, juice concentrate, syrup concentrate, a concentrate, organic solvent, antifreeze concentrate, diluted water concentrate, diluted solvent concentrate, saline aquifer brine, or a combination thereof.

The process of embodiment 25 wherein said draw solution comprises a regenerable draw solution.

The process of embodiment 28 wherein said regenerable draw solution is made by a process comprising heating a diluted draw solution above a liquid-liquid phase transition temperature range into two or more liquid phases, or cooling a diluted draw solution below a liquid-liquid phase transition temperature range to form a a liquid-liquid phase transition forming two or more liquid phases,
  wherein at least one of said two or more liquid phases comprises water and at least one of said two or more liquid phases comprises a draw solution using a liquid-liquid phase transition.

The process of embodiment 26 wherein said draw solution comprises a regenerated draw solution and wherein regenerating comprises concentrating said diluted draw solution using one or more or a combination of the following: evaporation, distillation, multi-stage flash distillation (MSF), multiple-effect distillation (MED), vapor-compression (VC), ion exchange, membrane processes, electrodialysis reversal (EDR), reverse osmosis (RO), nanofiltration (NF), membrane distillation (MD), forward osmosis (FO), freezing desalination, geothermal desalination, solar desalination, solar humidification-dehumidification (HDH), multiple-effect humidification (MEH), seawater greenhouse, and combinations thereof

What is claimed is:

1. A refrigeration cycle process comprising:
    endothermically liquid-liquid phase transitioning a first composition in a first temperature zone; and
    exothermically liquid-liquid phase transitioning a second composition in a second temperature zone;
    wherein the first temperature zone is operably connected to the second temperature zone; and
    wherein said second temperature zone is greater in temperature than said first temperature zone.

2. The process of claim 1 wherein said second temperature zone is greater in temperature than said first temperature zone by a temperature differential which is greater than (1) an adiabatic temperature change of the exothermic phase transition, or (2) an adiabatic temperature change of the endothermic phase transition, or (3) both (1) and (2).

3. The process of claim 1 further comprising heat exchanging at least a portion of the first composition in the first temperature zone with at least a portion of the second composition in the operably connected second temperature zone.

4. The process of claim 1 wherein said endothermic liquid-liquid phase transitioning occurs at a lesser temperature than said exothermic phase transitioning due to a phase transition temperature adjustment.

5. The process of claim 4 wherein said phase transition temperature adjustment comprises adjusting the concentration of a reagent.

6. The process of claim 1 wherein said endothermic phase transitioning, or said exothermic phase transitioning, or both occurs due to a change in a concentration of a reagent.

7. The process of claim 6 wherein said change in concentration of a reagent comprises using a membrane-based process selected from reverse osmosis, forward osmosis, nanofiltration, osmotically assisted reverse osmosis, ultrafiltration, or a combination thereof.

8. The process of claim 6 which further comprises reversing said change in concentration of a reagent.

* * * * *